US009591692B2

(12) United States Patent
Hyde et al.

(10) Patent No.: US 9,591,692 B2
(45) Date of Patent: Mar. 7, 2017

(54) DYNAMIC POINT TO POINT MOBILE NETWORK INCLUDING DESTINATION DEVICE ASPECTS SYSTEM AND METHOD

(71) Applicant: Elwha LLC, Bellevue, WA (US)

(72) Inventors: Roderick A. Hyde, Redmond, WA (US); Edward K. Y. Jung, Bellevue, WA (US); Royce A. Levien, Lexington, MA (US); Richard T. Lord, Tacoma, WA (US); Robert W. Lord, Seattle, WA (US); Mark A. Malamud, Seattle, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 627 days.

(21) Appl. No.: 13/953,430

(22) Filed: Jul. 29, 2013

(65) Prior Publication Data

US 2014/0337838 A1 Nov. 13, 2014

Related U.S. Application Data

(63) Continuation-in-part of application No. 13/891,369, filed on May 10, 2013, and a continuation-in-part of
(Continued)

(51) Int. Cl.
*H04W 88/04* (2009.01)
*H04W 76/02* (2009.01)
*H04W 84/18* (2009.01)

(52) U.S. Cl.
CPC ......... *H04W 88/04* (2013.01); *H04W 76/023* (2013.01); *H04W 84/18* (2013.01)

(58) Field of Classification Search
CPC ......... H04L 45/04; H04L 45/22; H04L 45/50; H04L 12/437; H04L 12/4625; H04W 84/047
See application file for complete search history.

(56) References Cited

U.S. PATENT DOCUMENTS 6,445,916 B1 9/2002 Rahman
6,574,452 B1 6/2003 Morvan et al.
(Continued)

FOREIGN PATENT DOCUMENTS

EP 1527641 B1 5/2005
WO WO 2004/075169 A2 9/2004
(Continued)

OTHER PUBLICATIONS

"Analyst Blog Comcast to Boost Neighborhood Wi-Fi"; Zacks Equity Research; Jun. 11, 2013; 1 page; located at http://www.zacks.co,/commentary_print.php?article_id=101334&type=BLOG.
(Continued)

*Primary Examiner* — Jung Park

(57) ABSTRACT

A computationally implemented system and method that is designed to, but is not limited to: electronically receiving one or more at least partially mobile operating system operated intermediate electronic communication device relayed transmissions from one or more at least partially mobile operating system operated intermediate electronic communication devices activated from standby mode to be one or more communication network relays for use by one or more origination electronic communication devices to communicate at least in part with one or more destination electronic communication devices. In addition to the foregoing, other method aspects are described in the claims, drawings, and text forming a part of the present disclosure.

117 Claims, 67 Drawing Sheets

Related U.S. Application Data application No. 13/927,870, filed on Jun. 26, 2013, now abandoned, and a continuation-in-part of application No. 13/934,389, filed on Jul. 3, 2013, and a continuation of application No. 13/935,657, filed on Jul. 5, 2013, now Pat. No. 9,356,681, and a continuation-in-part of application No. 13/952,387, filed on Jul. 26, 2013, now Pat. No. 9,270,534.

(56) References Cited

U.S. PATENT DOCUMENTS

| | | |
|---|---|---|
| 6,745,043 B1 | 6/2004 | Lester et al. |
| 6,757,518 B2 | 6/2004 | Spratt et al. |
| 6,954,893 B2 | 10/2005 | Ternullo et al. |
| 7,167,443 B1 | 1/2007 | Dantu et al. |
| 7,463,890 B2 | 12/2008 | Herz et al. |
| 7,831,216 B1 | 11/2010 | Yenney et al. |
| 8,050,715 B1 | 11/2011 | Cole |
| 8,213,362 B2 | 7/2012 | Lee et al. |
| 8,280,428 B2 | 10/2012 | Pietraski |
| 8,499,304 B2 | 7/2013 | De Los Reyes et al. |
| 8,587,484 B2 | 11/2013 | Peng et al. |
| 8,630,192 B2 | 1/2014 | Raleigh |
| 8,665,743 B2 | 3/2014 | Zhu et al. |
| 8,774,732 B2 * | 7/2014 | Kobayakawa ......... H04B 7/155 370/315 |
| 8,903,244 B2 | 12/2014 | Walter |
| 8,966,476 B2 | 2/2015 | Doan et al. |
| 8,988,223 B2 | 3/2015 | Puleston et al. |
| 9,042,876 B2 | 5/2015 | Buck et al. |
| 2003/0054795 A1 | 3/2003 | Tamaki et al. |
| 2003/0187570 A1 | 10/2003 | Impson et al. |
| 2004/0142698 A1 | 7/2004 | Pietraski |
| 2004/0196834 A1* | 10/2004 | Ofek ..................... H01Q 1/246 370/352 |
| 2004/0203558 A1 | 10/2004 | Suzuki et al. |
| 2005/0198029 A1 | 9/2005 | Pohja et al. |
| 2006/0069671 A1 | 3/2006 | Conley et al. |
| 2006/0098594 A1* | 5/2006 | Ganesh .................. G01D 21/00 370/328 |
| 2007/0030824 A1 | 2/2007 | Ribaudo et al. |
| 2007/0086424 A1 | 4/2007 | Calcev et al. |
| 2008/0008162 A1 | 1/2008 | Martinez et al. |
| 2008/0070495 A1 | 3/2008 | Stricklen et al. |
| 2008/0125067 A1 | 5/2008 | Bells et al. |
| 2008/0172491 A1 | 7/2008 | Chhabra et al. |
| 2008/0242251 A1 | 10/2008 | Kraemer et al. |
| 2009/0005167 A1 | 1/2009 | Arrasvuori et al. |
| 2009/0029645 A1 | 1/2009 | Leroudier |
| 2009/0052415 A1 | 2/2009 | Ishii et al. |
| 2009/0089869 A1 | 4/2009 | Varghese |
| 2009/0201846 A1* | 8/2009 | Horn ................. H04W 72/1263 370/315 |
| 2010/0063850 A1 | 3/2010 | Daniel |
| 2010/0241289 A1 | 9/2010 | Sandberg |
| 2010/0278077 A1 | 11/2010 | Reunamäki et al. |
| 2010/0290379 A1* | 11/2010 | Bahk ................. H04W 52/0216 370/311 |
| 2011/0209064 A1* | 8/2011 | Jorgensen ............. G06F 9/4445 715/733 |
| 2011/0275316 A1 | 11/2011 | Suumäki et al. |
| 2011/0312278 A1 | 12/2011 | Matsushita et al. |
| 2012/0184306 A1 | 7/2012 | Zou et al. |
| 2012/0232968 A1 | 9/2012 | Calman et al. |
| 2012/0240197 A1 | 9/2012 | Tran et al. |
| 2013/0012221 A1 | 1/2013 | Zou et al. |
| 2013/0023227 A1 | 1/2013 | Yokoyama |
| 2013/0078995 A1 | 3/2013 | Jouin |
| 2013/0189925 A1 | 7/2013 | Staskawicz et al. |
| 2013/0232242 A1 | 9/2013 | Millington et al. |
| 2013/0273923 A1 | 10/2013 | Li et al. |
| 2013/0311666 A1 | 11/2013 | Fujii |
| 2013/0322388 A1 | 12/2013 | Ahn et al. |
| 2014/0044007 A1 | 2/2014 | Smadi |
| 2014/0089049 A1* | 3/2014 | Cristofaro .......... G06Q 30/0203 705/7.32 |
| 2014/0135015 A1 | 5/2014 | Liu et al. |
| 2014/0242961 A1 | 8/2014 | Bruins et al. |
| 2014/0334289 A1 | 11/2014 | Hyde et al. |
| 2014/0335781 A1 | 11/2014 | Hyde et al. |
| 2014/0335817 A1 | 11/2014 | Hyde et al. |
| 2014/0337841 A1 | 11/2014 | Hyde et al. |
| 2014/0364089 A1 | 12/2014 | Lienhart et al. |

FOREIGN PATENT DOCUMENTS

| | | |
|---|---|---|
| WO | WO 2009/092843 A1 | 7/2009 |
| WO | WO 2011/153507 A2 | 12/2011 |
| WO | WO 2012/079629 A1 | 6/2012 |
| WO | WO 2012/091418 A2 | 7/2012 |
| WO | WO2013-013638 A1 | 1/2013 |

OTHER PUBLICATIONS

"Comcast Unveils Plans for Millions of Xfinity WiFi Hotspots"; Comcast; Jun. 10, 2013; pp. 1-2; located at http://corporate.comcast.com/news-information/news-feed/comcast-unveils-plans-for-millions-of-xfinity-wifi-hotspots-through-its-home-based-neighborhood-hotspot-initiative-2.

"How it works"; Fon; bearing a date of 2013; pp. 1-3; Fon Ltd.

"The all-new Airport Time Capsule"; Apple; printed on Jun. 26, 2013; pp. 1-6; located at http://www.apple.com/airport-time-capsule/.

PCT International Search Report; International App. No. PCT/US2014/037527; Sep. 3, 2014; pp. 1-3.

Wzorek et al.; "Choosing Path Replanning Strategies for Unmanned Aircraft Systems"; Proceedings of the Twentieth International Conference on Automated Planning and Scheduling (ICAPS 2010); bearing a date of 2010; created on Jun. 3, 2016; pp. 193-200; Association for the Advancement of Artificial Intelligence.

European Patent Office, Extended European Search Report, Pursuant to Rule 62 EPC; App. No. EP 14795195.8; Dec. 6, 2016 (received by our Agent on Dec. 5, 2016); pp. 1-7.

* cited by examiner

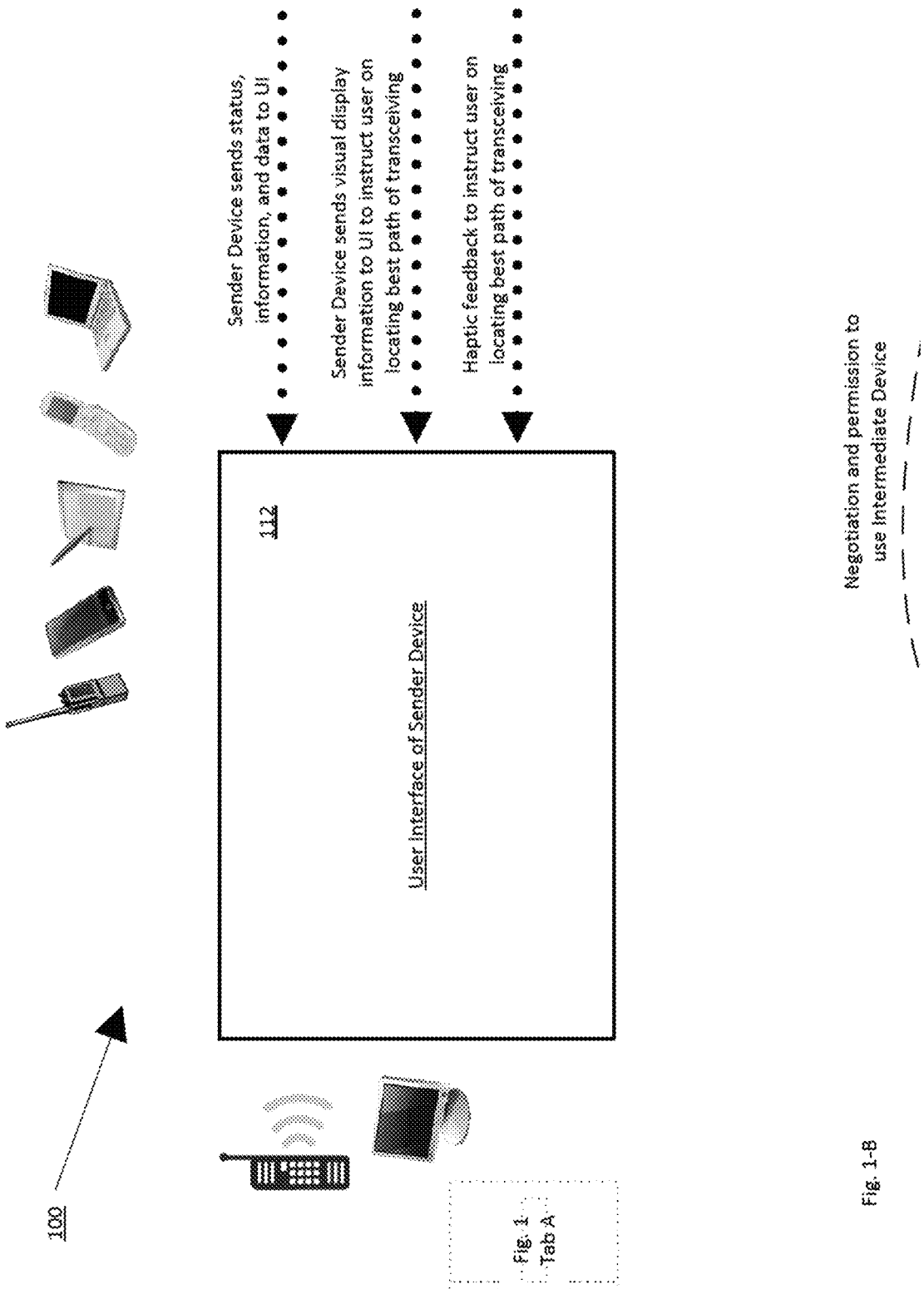

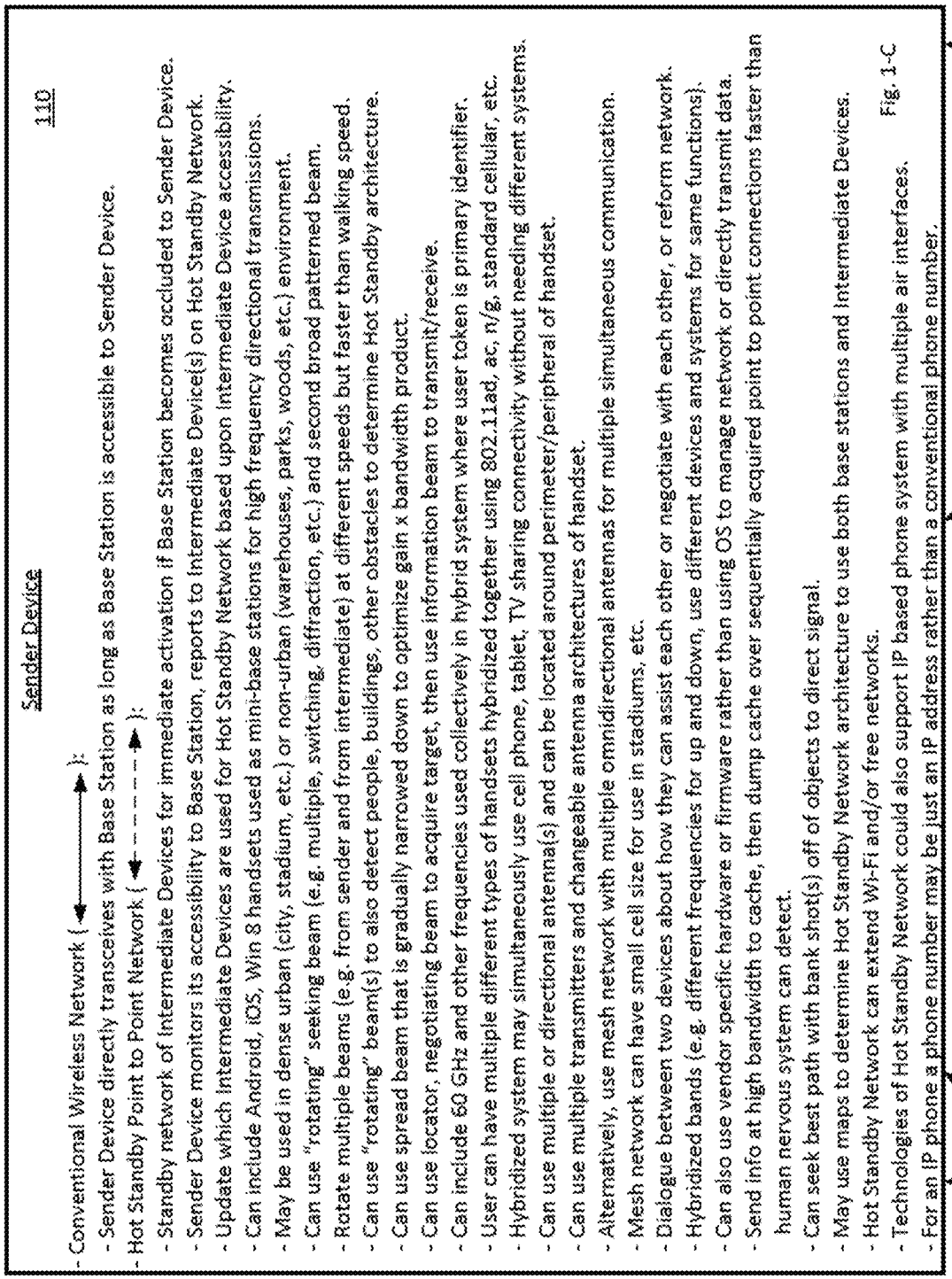
Fig. 1-C

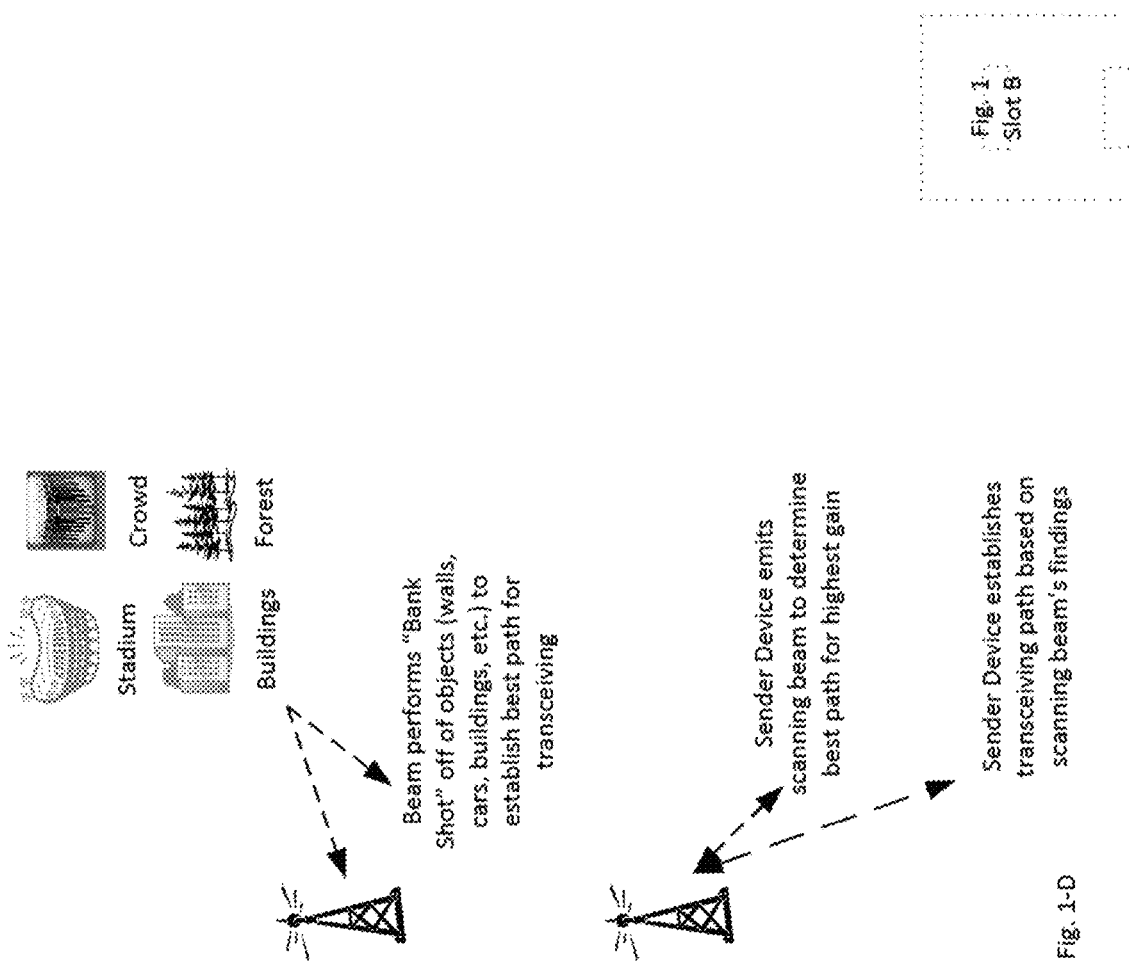

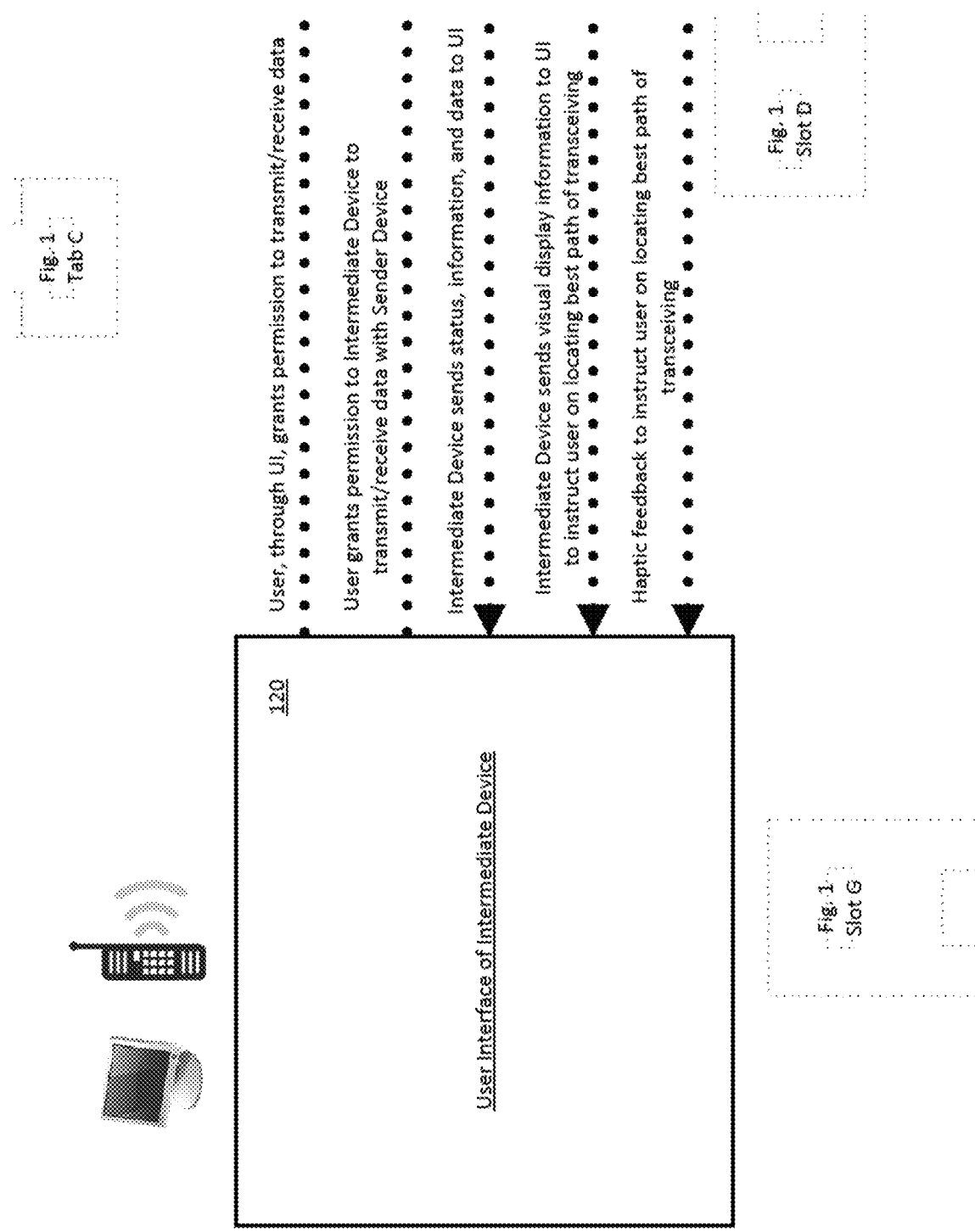
Fig. 1-E

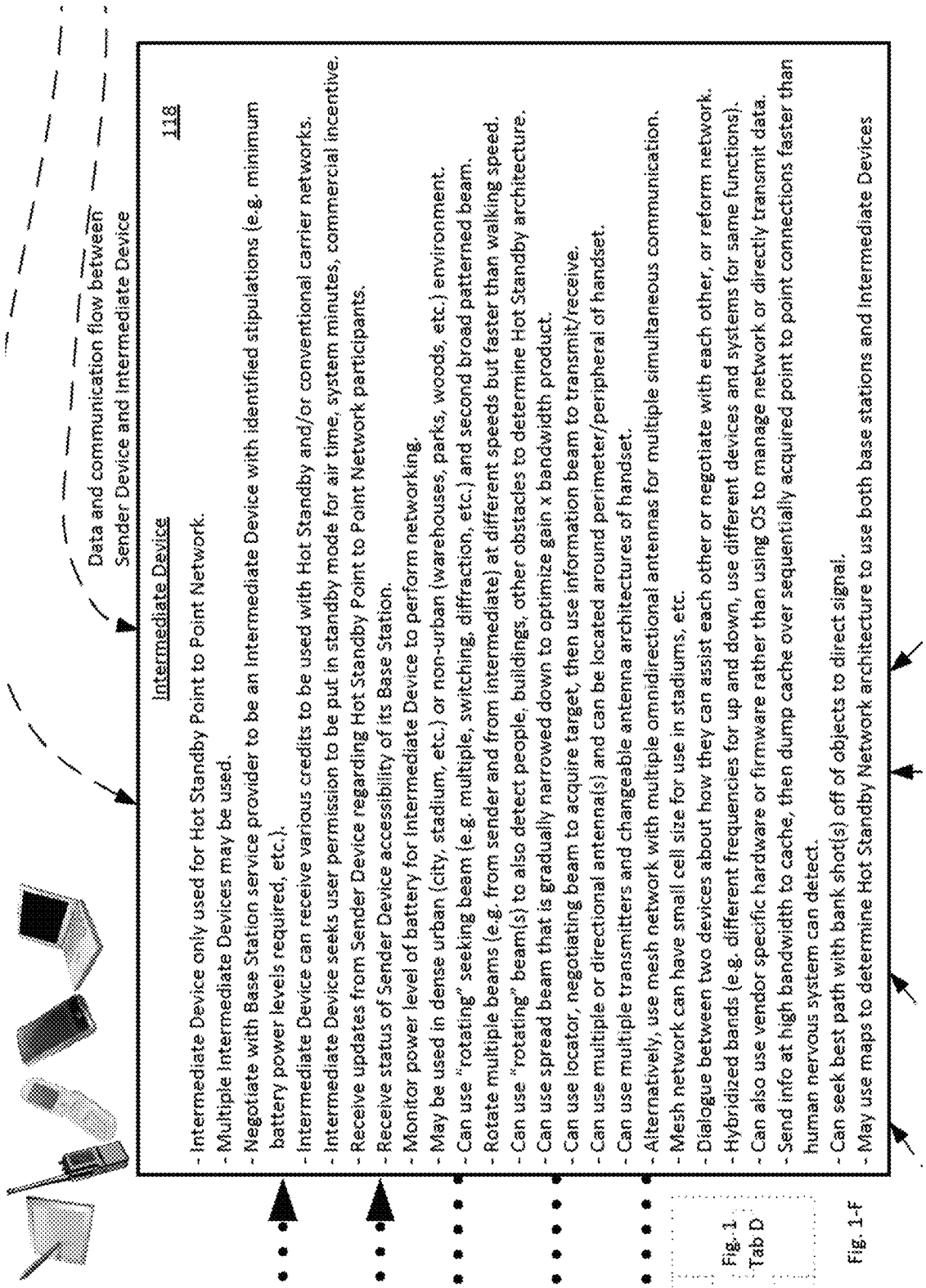

Intermediate Device 118

- Intermediate Device only used for Hot Standby Point to Point Network.
- Multiple Intermediate Devices may be used.
- Negotiate with Base Station service provider to be an Intermediate Device with identified stipulations (e.g. minimum battery power levels required, etc.).
- Intermediate Device can receive various credits to be used with Hot Standby and/or conventional carrier networks.
- Intermediate Device seeks user permission to be put in standby mode for air time, system minutes, commercial incentive.
- Receive updates from Sender Device regarding Hot Standby Point to Point Network participants.
- Receive status of Sender Device accessibility of its Base Station.
- Monitor power level of battery for Intermediate Device to perform networking.
- May be used in dense urban (city, stadium, etc.) or non-urban (warehouses, parks, woods, etc.) environment.
- Can use "rotating" seeking beam (e.g. multiple, switching, diffraction, etc.) and second broad patterned beam.
- Rotate multiple beams (e.g. from sender and from intermediate) at different speeds but faster than walking speed.
- Can use "rotating" beam(s) to also detect people, buildings, other obstacles to determine Hot Standby architecture.
- Can use spread beam that is gradually narrowed down to optimize gain x bandwidth product.
- Can use locator, negotiating beam to acquire target, then use information beam to transmit/receive.
- Can use multiple or directional antenna(s) and can be located around perimeter/peripheral of handset.
- Can use multiple transmitters and changeable antenna architectures of handset.
- Alternatively, use mesh network with multiple omnidirectional antennas for multiple simultaneous communication.
- Mesh network can have small cell size for use in stadiums, etc.
- Dialogue between two devices about how they can assist each other or negotiate with each other, or reform network.
- Hybridized bands (e.g. different frequencies for up and down, use different devices and systems for same functions).
- Can also use vendor specific hardware or firmware rather than using OS to manage network or directly transmit data.
- Send info at high bandwidth to cache, then dump cache over sequentially acquired point to point connections faster than human nervous system can detect.
- Can seek best path with bank shot(s) off of objects to direct signal.
- May use maps to determine Hot Standby Network architecture to use both base stations and Intermediate Devices

Fig. 1, Tab D

Fig. 1-F

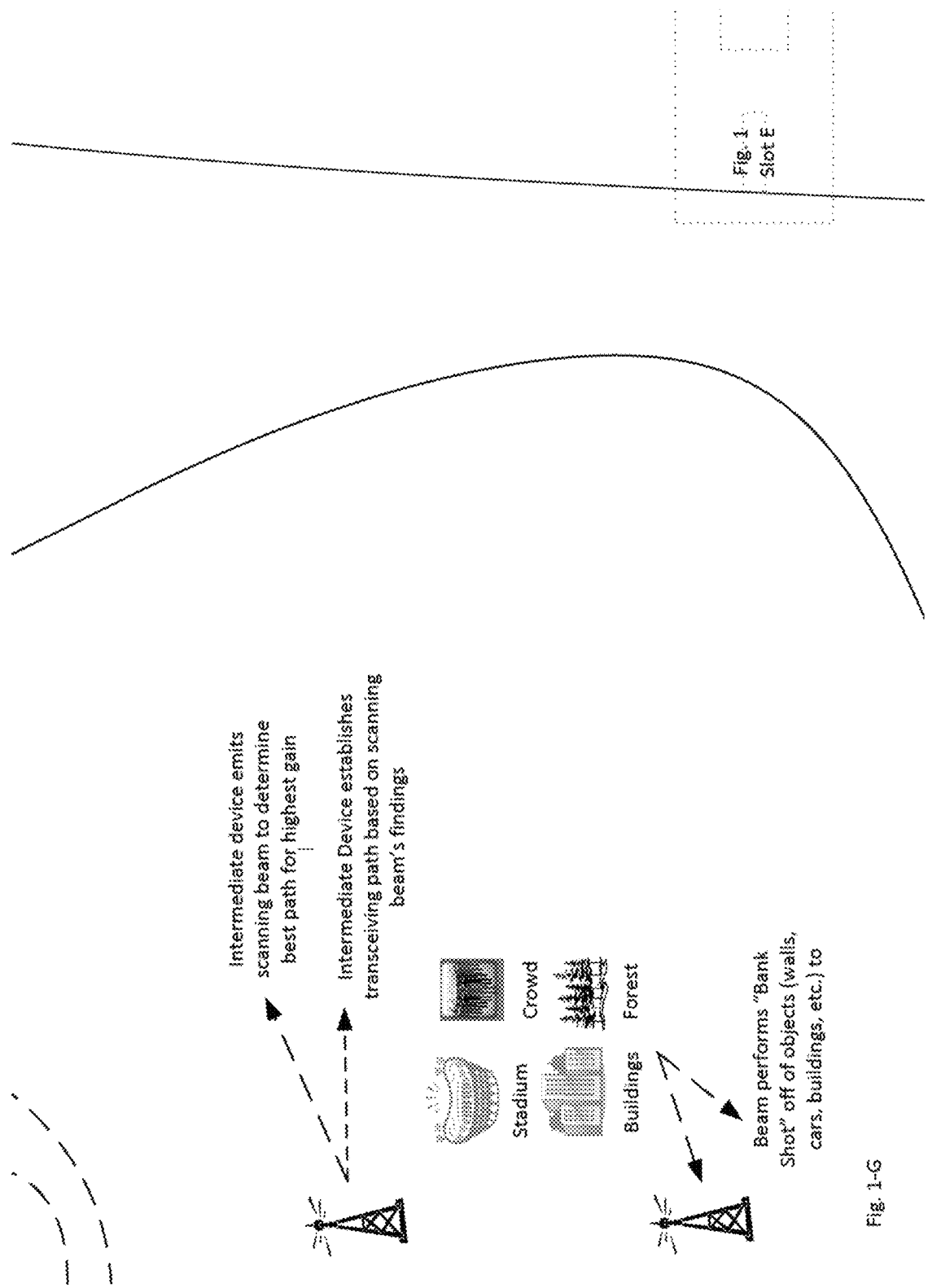

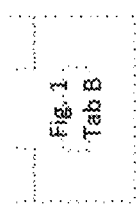
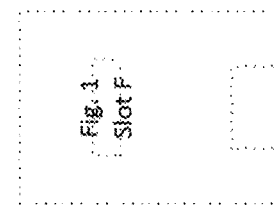
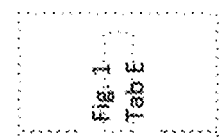
Fig. 1, Tab B
Fig. 1, Slot F
Fig. 1, Tab E
Fig. 1-H

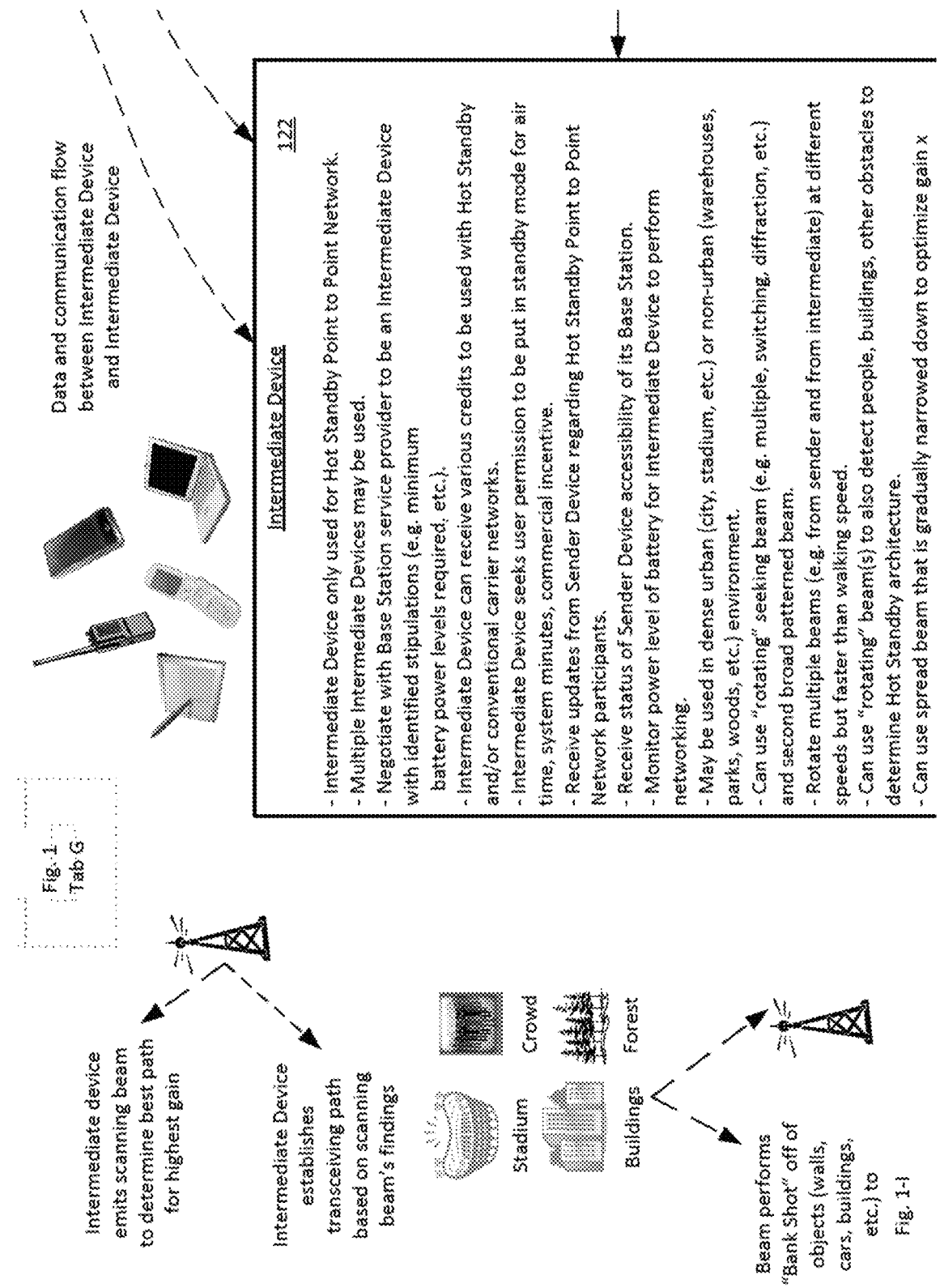

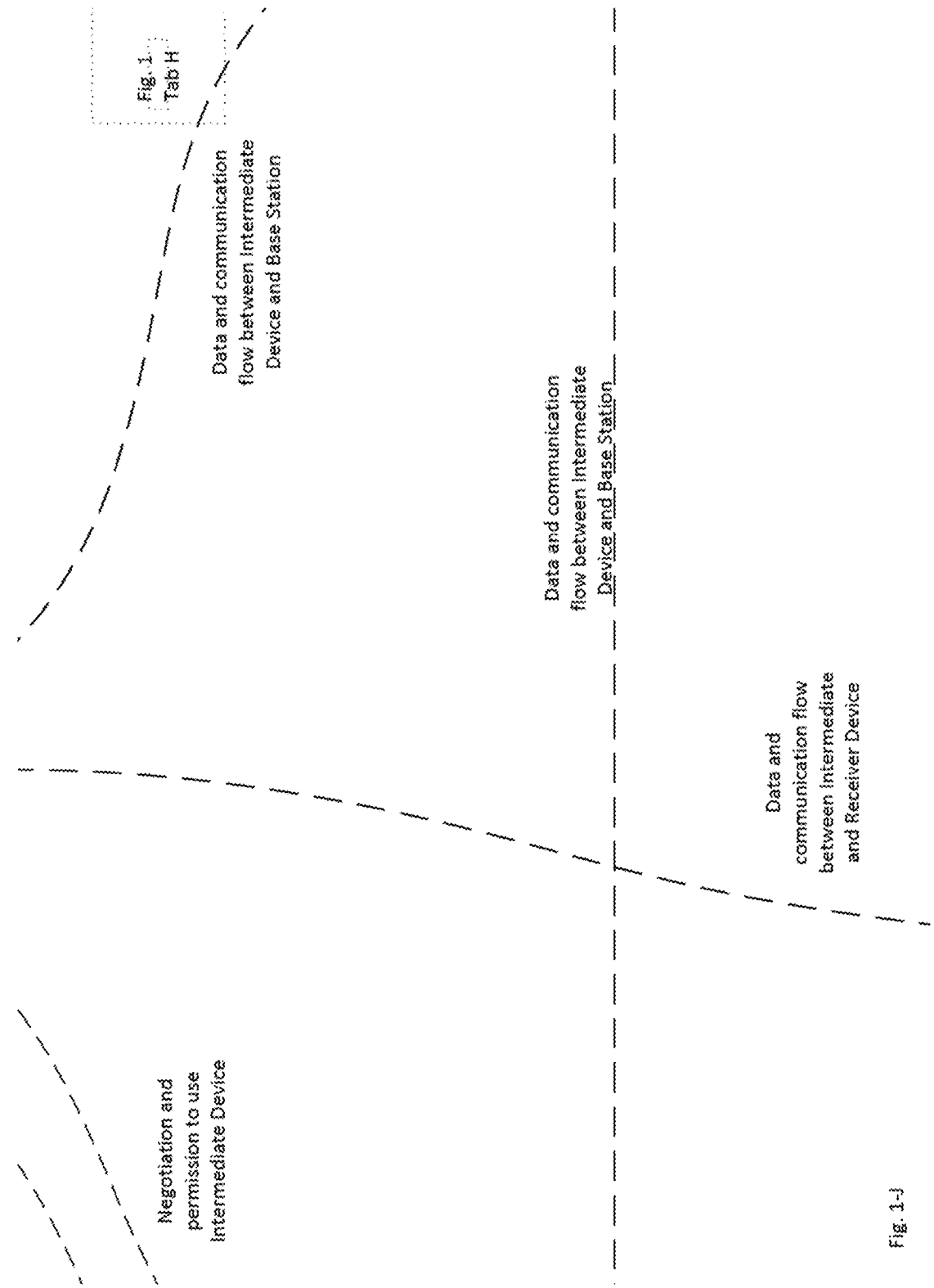

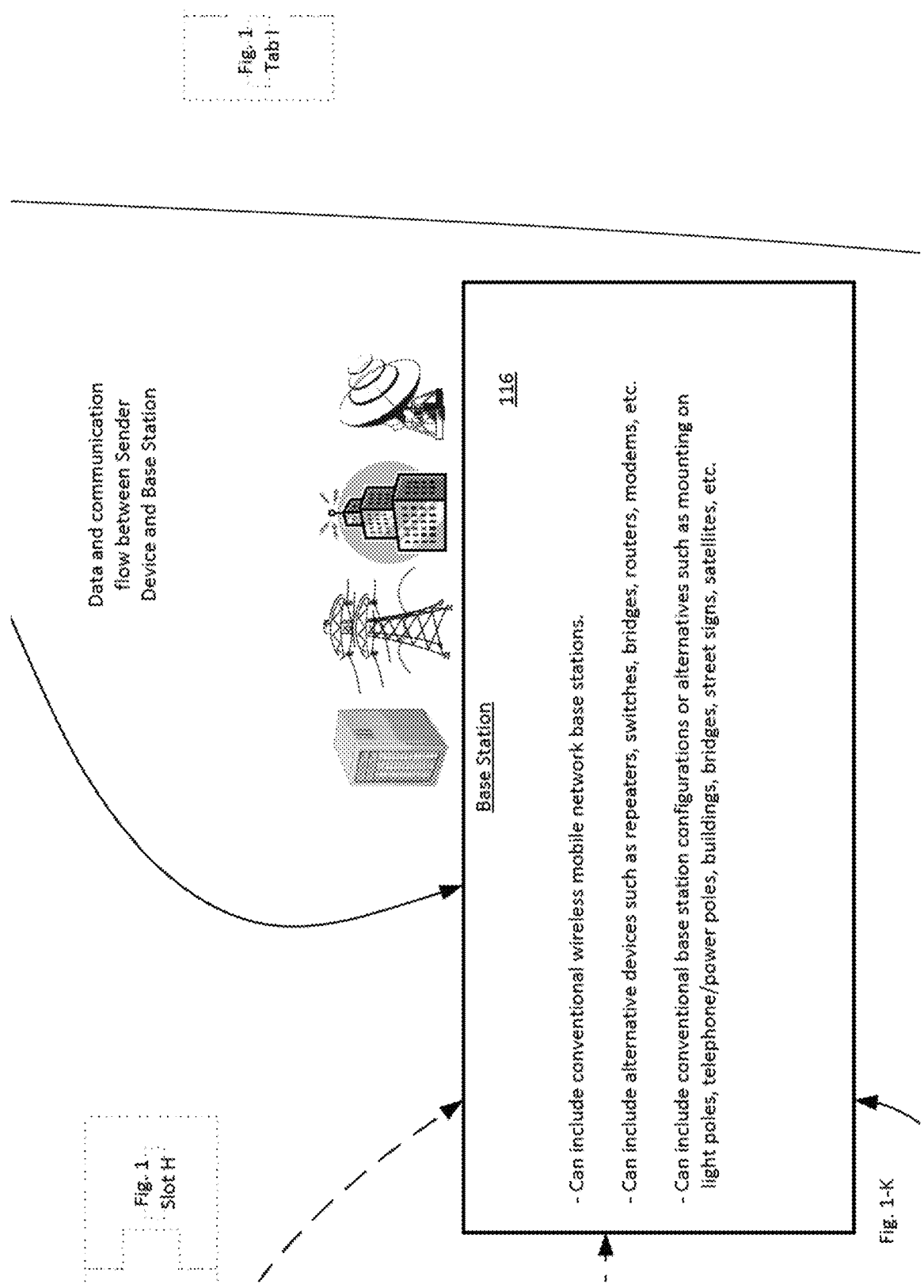

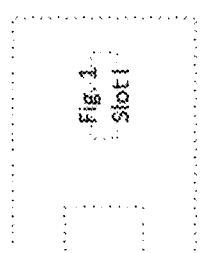
Fig. 1-i bandwidth product.
- Can use locator, negotiating beam to acquire target, then use information beam to transmit/receive.
- Can use multiple or directional antenna(s) and can be located around perimeter/peripheral of handset.
- Can use multiple transmitters and changeable antenna architectures of handset.
- Alternatively, use mesh network with multiple omnidirectional antennas for multiple simultaneous communication.
- Mesh network can have small cell size for use in stadiums, etc.
- Dialogue between two devices about how they can assist each other or negotiate with each other, or reform network.
- Hybridized bands (e.g. different frequencies for up and down, use different devices and systems for same functions).
- Can also use vendor specific hardware or firmware rather than using OS to manage network or directly transmit data.
- Send info at high bandwidth to cache, then dump cache over sequentially acquired point to point connections faster than human nervous system can detect.
- Can seek best path with bank shot(s) off of objects to direct signal.
- May use maps to determine Hot Standby Network architecture to use both base stations and Intermediate Devices

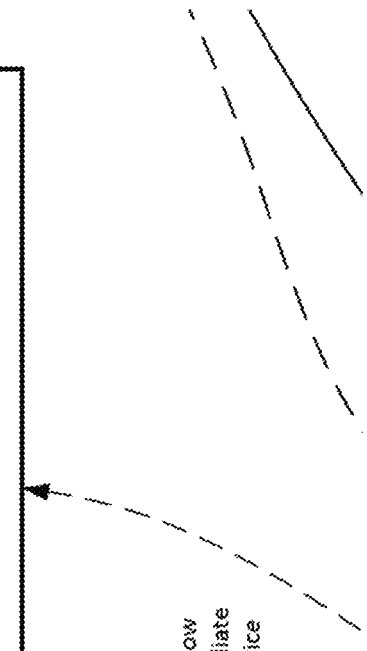

Data and communication flow between Intermediate and Receiver Device

Fig. 1 Slot N

Fig. 1-M

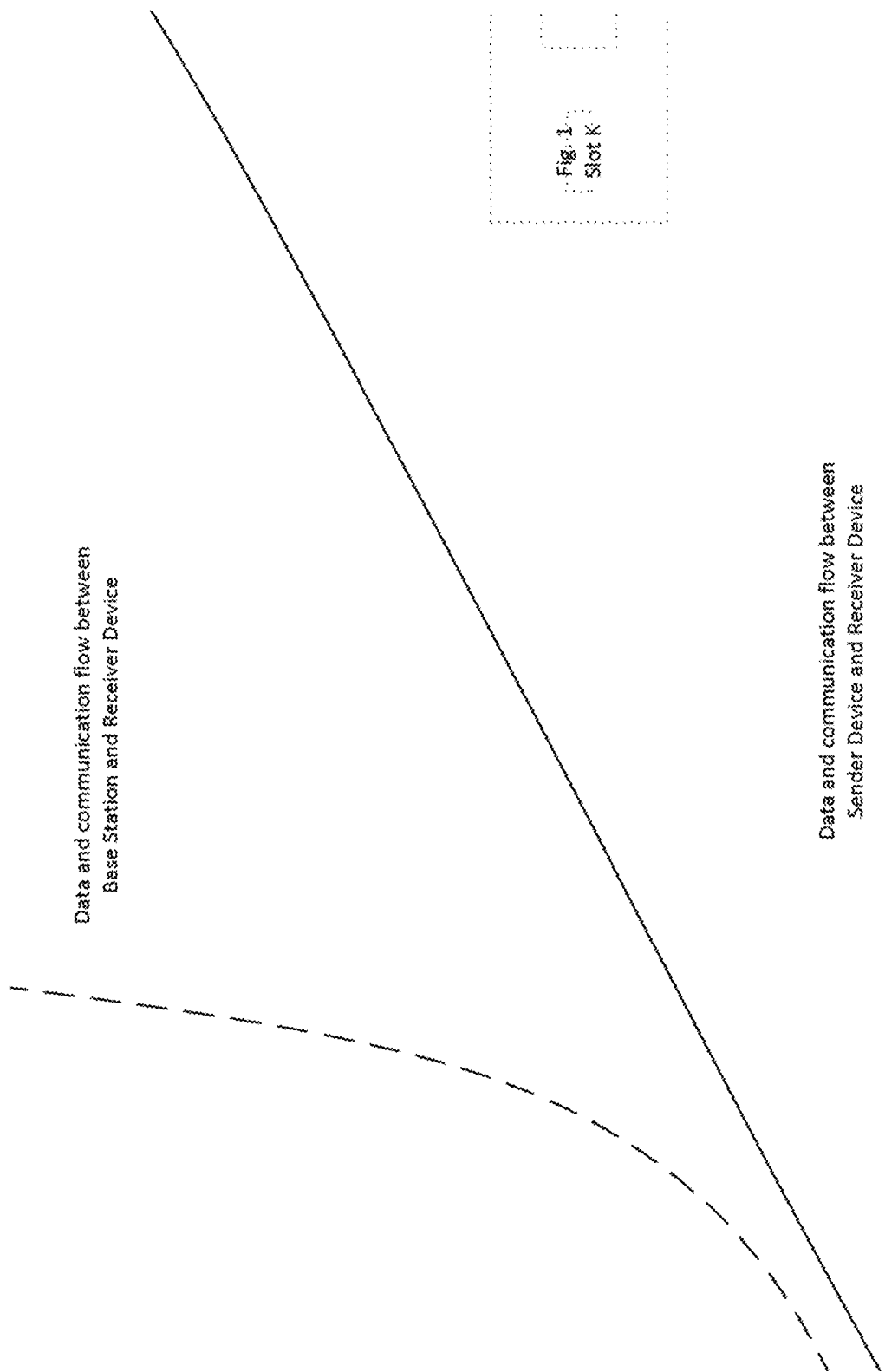

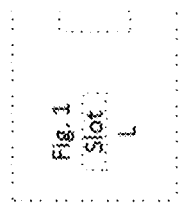
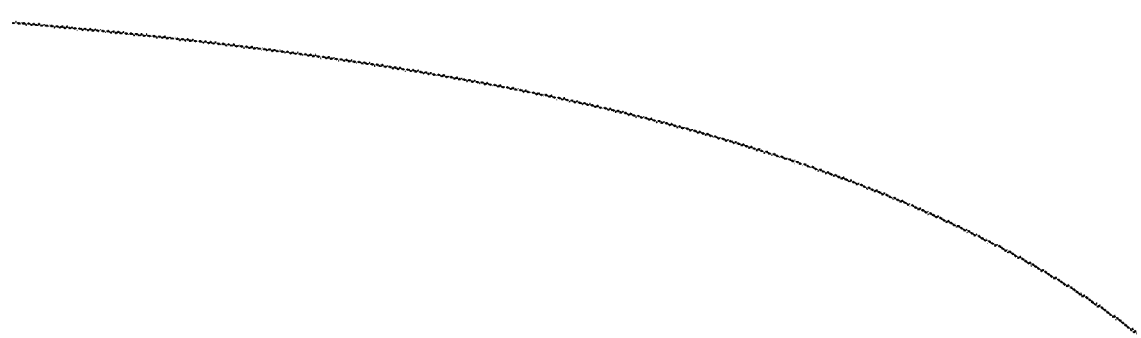
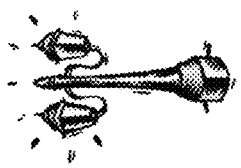
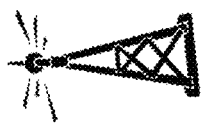
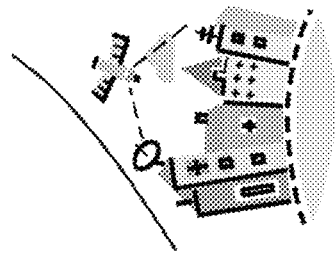
Fig. 1-O

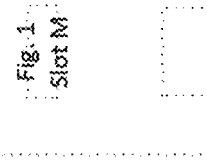
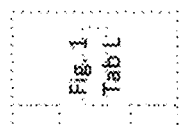

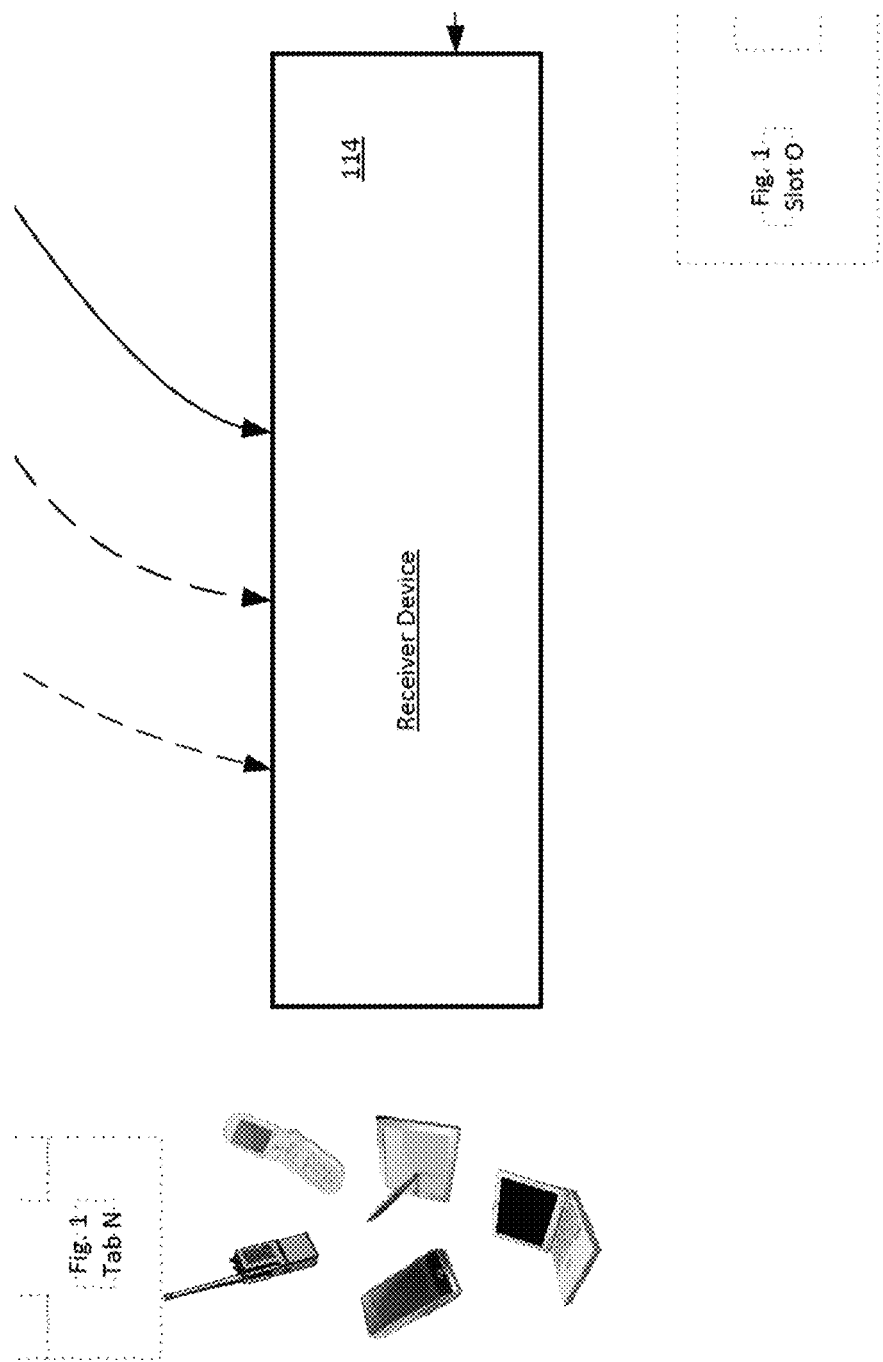

Fig. 1
Slot P

Fig. 1
Tab O

Fig. 1-R

Fig. 1
Slot Q

Fig. 1
Tab P

Fig. 1-S

Tab M

Tab Q

Fig. 1-T

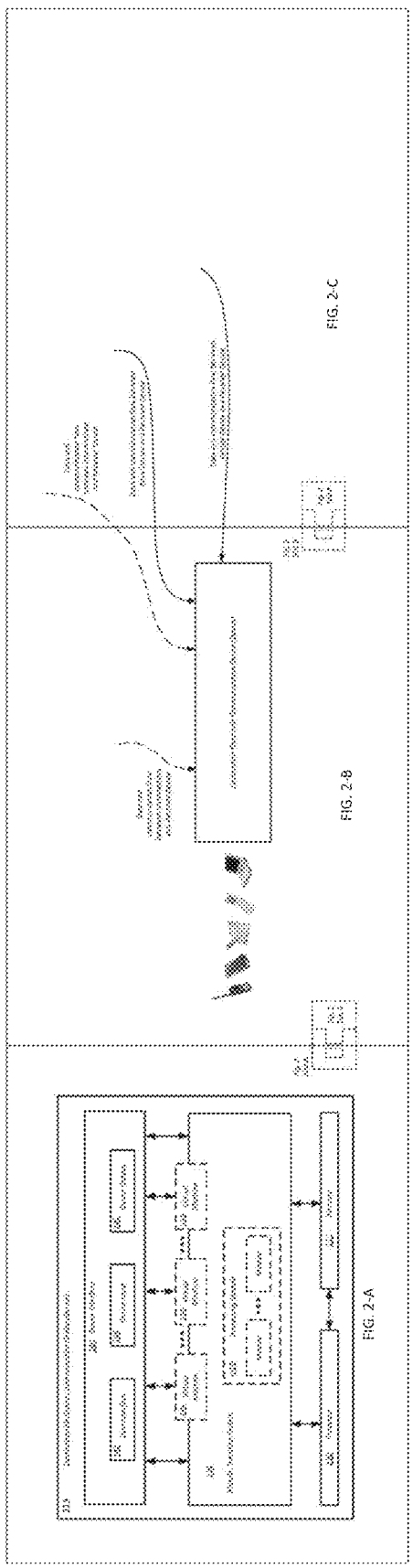
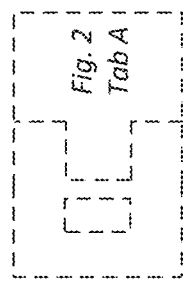
FIG. 2

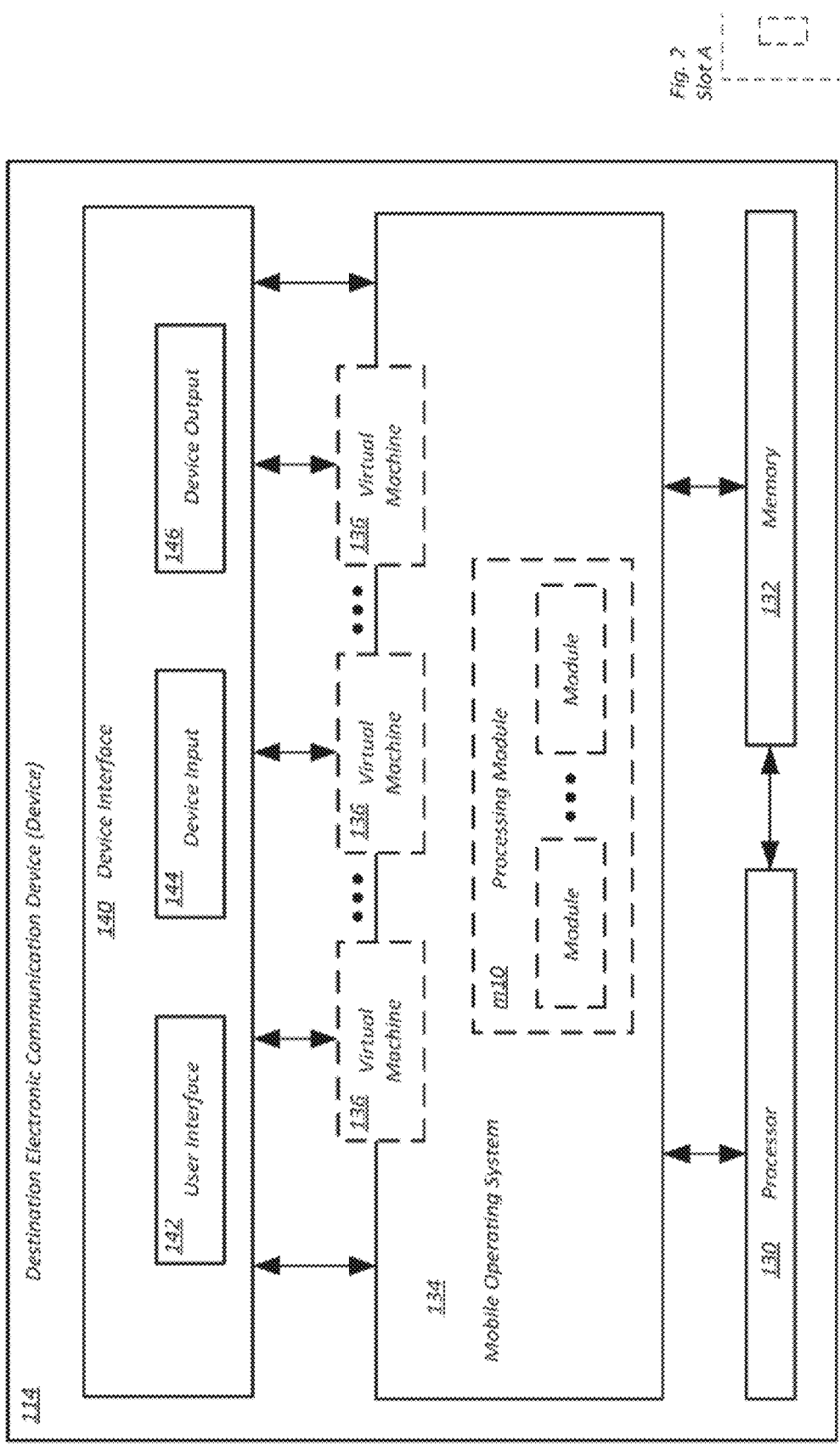
FIG. 2-A

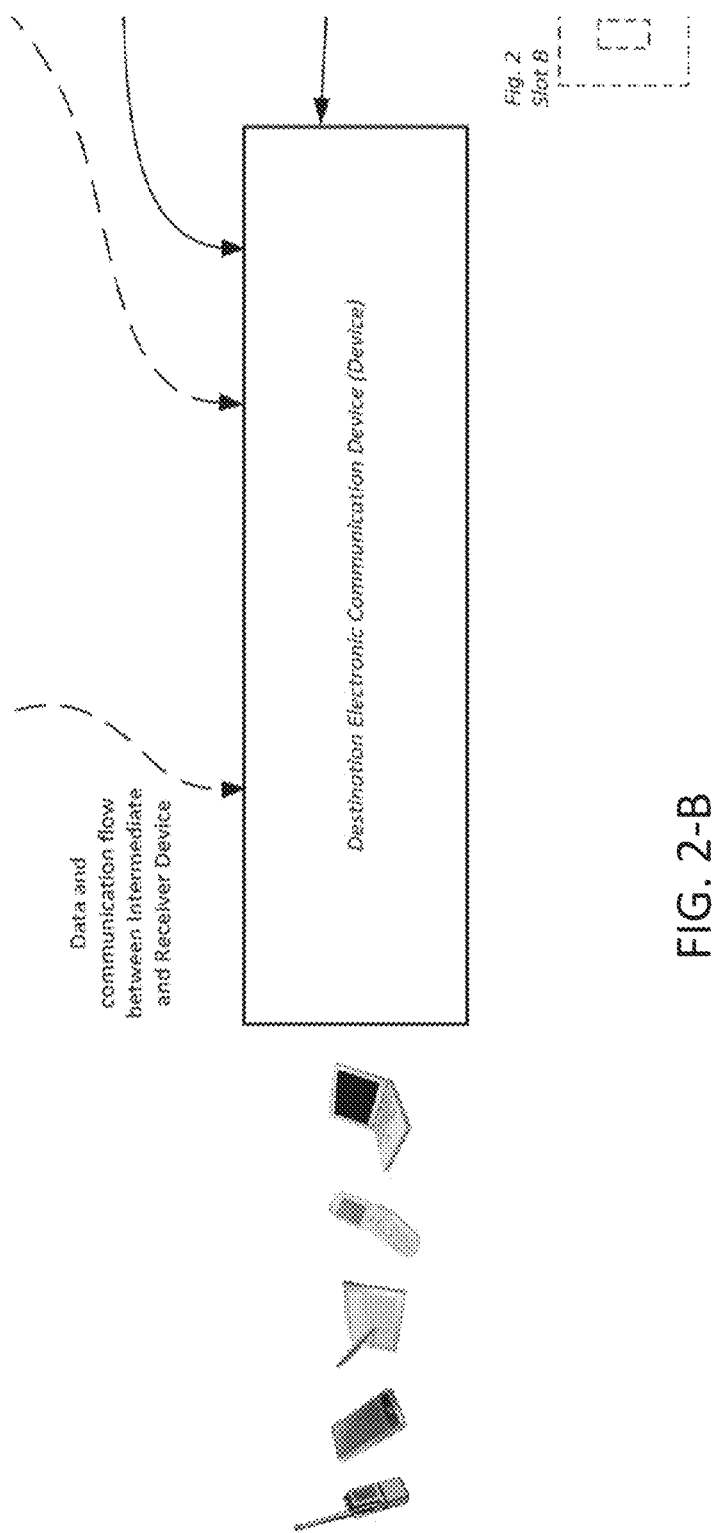
FIG. 2-B

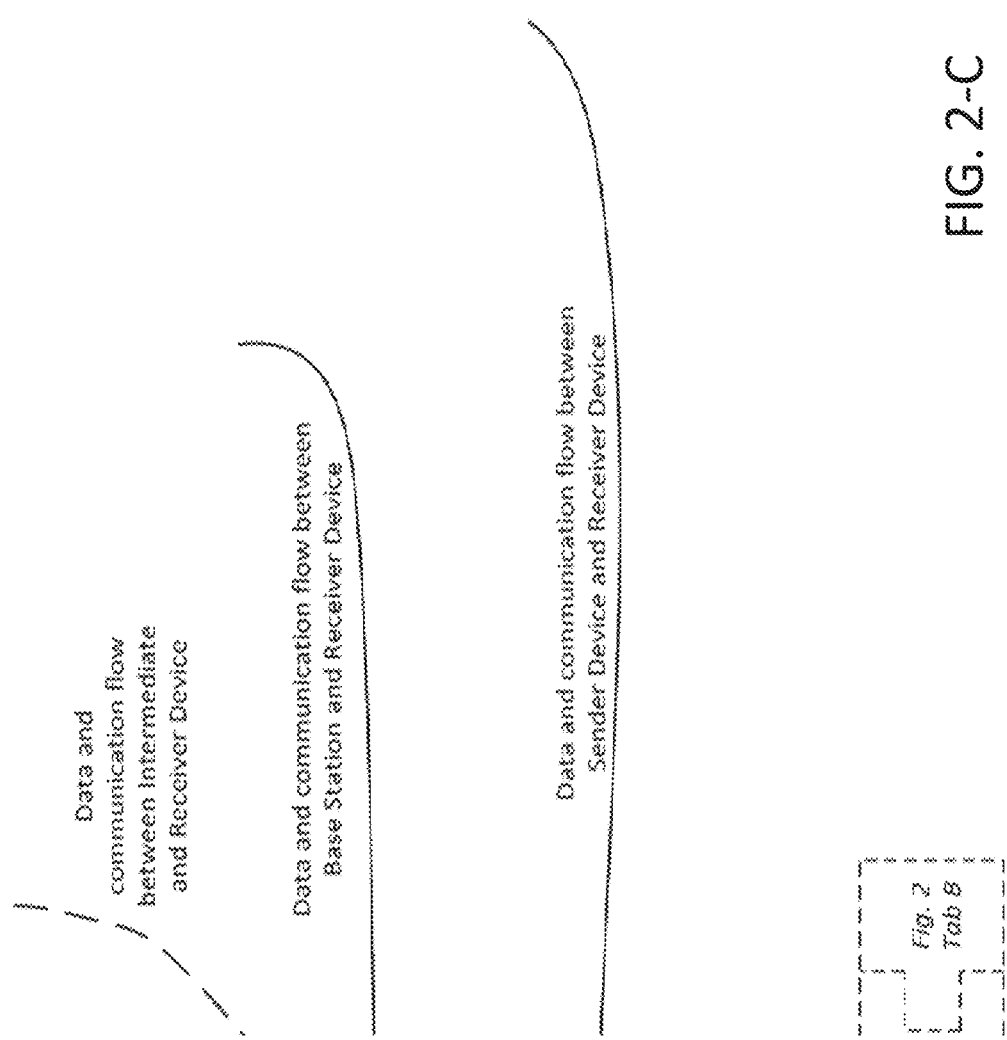
FIG. 2-C

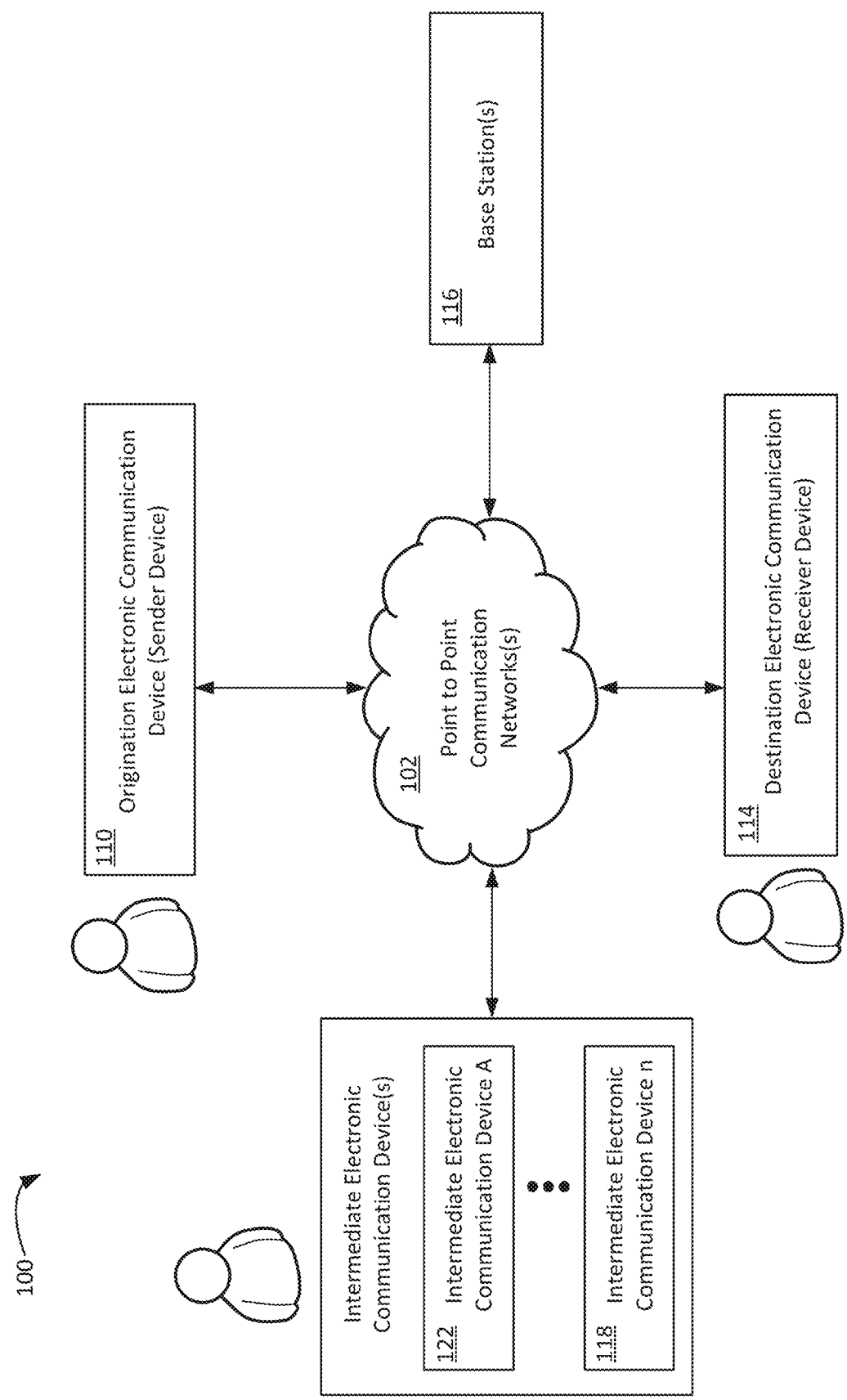
FIG. 3-A m11 electronically receiving mobile operating system operated intermediate electronic communication device relayed transmissions from mobile operating system operated intermediate electronic communication devices activated from standby mode to be communication network relays for use by origination electronic communication devices to communicate with destination electronic communication devices module m1101 accessing data from a data source via a virtual machine representation a computing machine including accessing data from a data source via a virtual machine representation a real machine module m1102 accessing data from a data source via a virtual machine representation a computing machine including accessing data from a data source via a virtual machine representation a virtual machine module m1103 accessing data from a data source via a virtual machine representation a virtual machine including converting a file having a file-type associated with virtual machine to a file-type associated with virtual machine representation module m1104 wherein file-type associated with second virtual machine is configured for a limited-resource computing machine module m1105 wherein file-type associated with second virtual machine is configured for a mobile computing machine module m1106 mobile operating system operated intermediate electronic communication devices being activated from standby mode based upon direct access by origination electronic communication devices to base stations of base station based communication networks becoming unavailable to origination electronic communication devices module m1107 relayed transmissions being received after prior transmissions from mobile operating system operated intermediate electronic communication devices as mobile handset communication devices for communication with users of other mobile handset communication devices module

FIG. 5-A

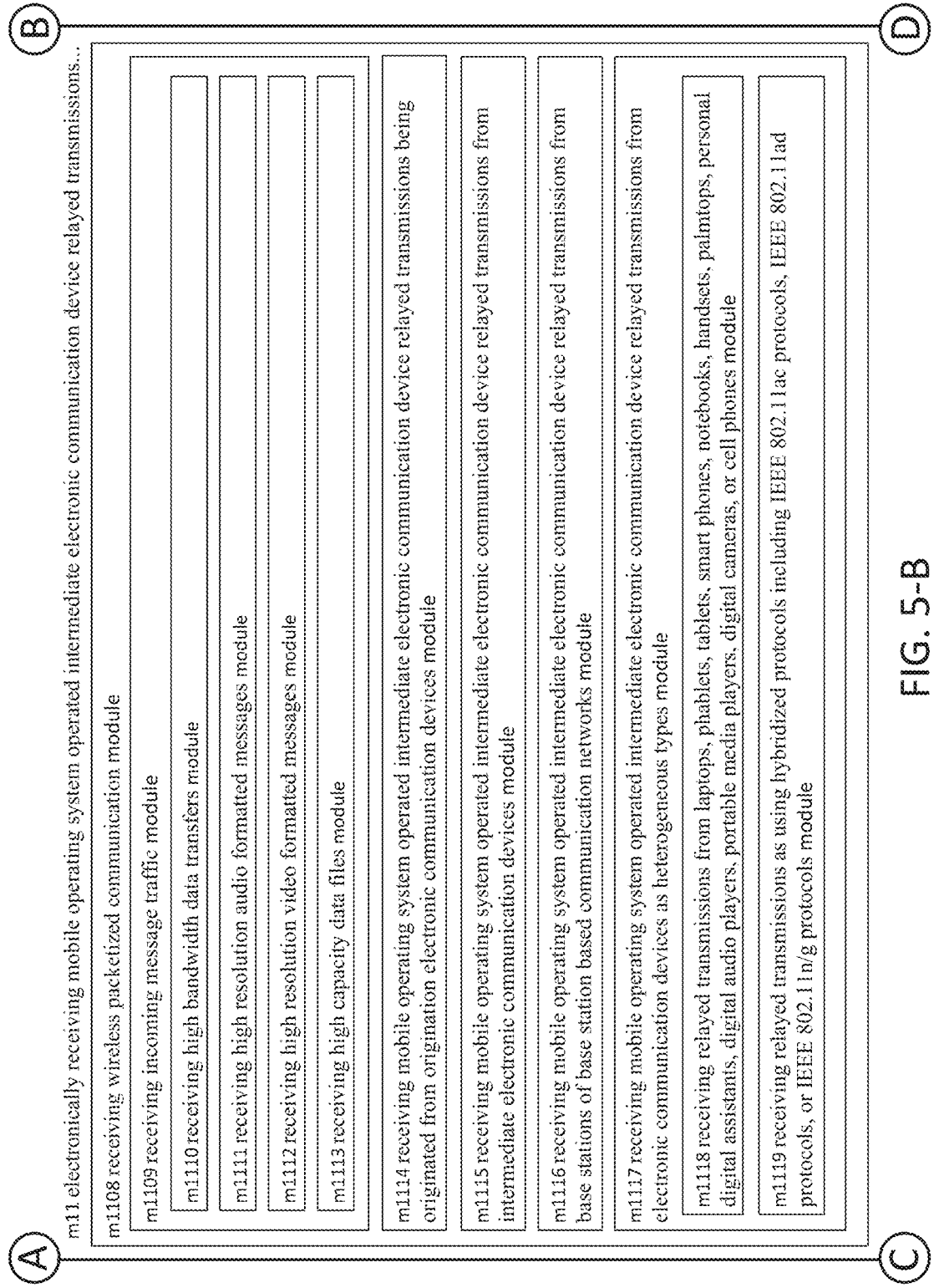
FIG. 5-B

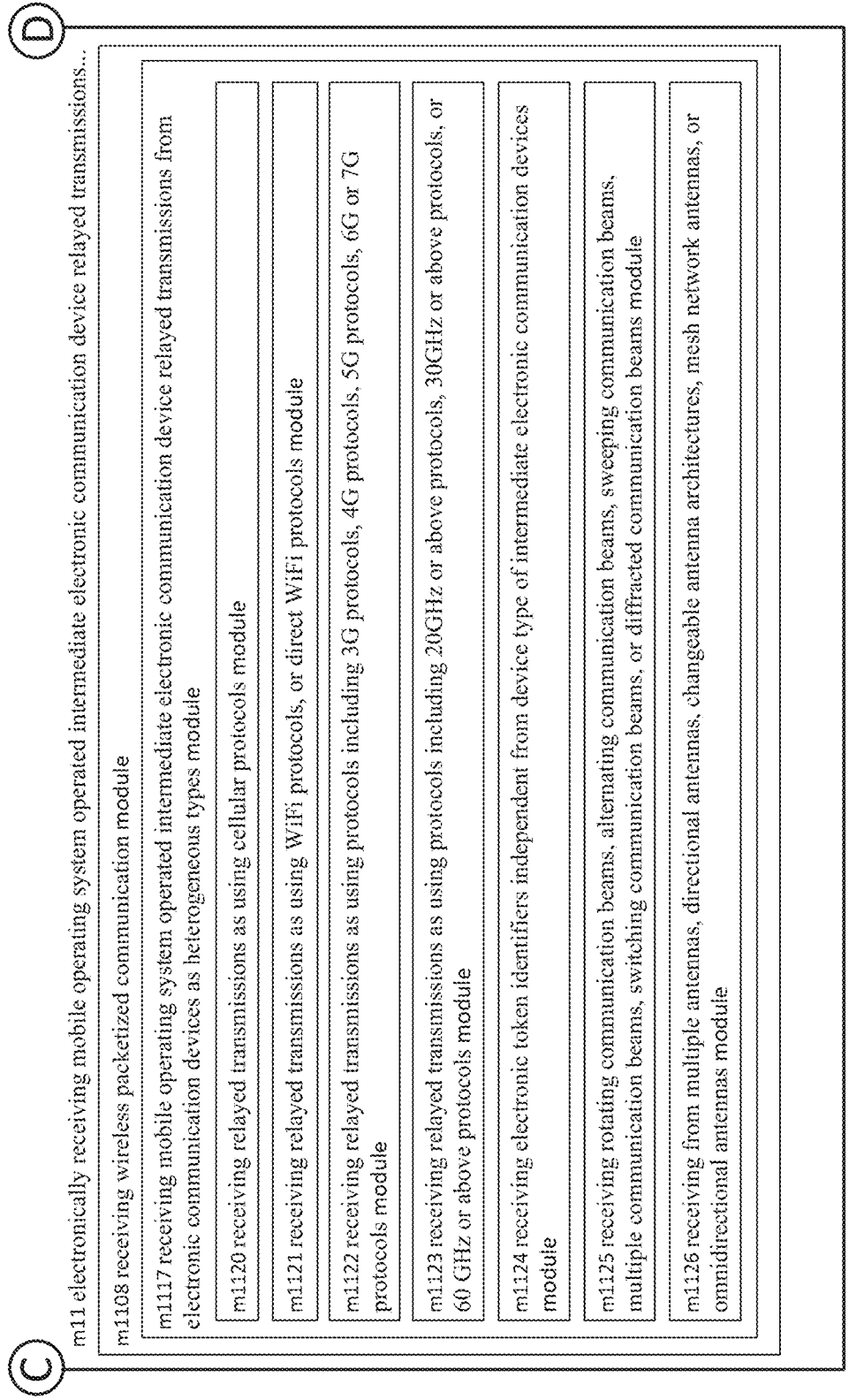
FIG. 5-C m12 obtaining information regarding mobile operating system operated intermediate electronic communication device relayed transmissions from mobile operating system operated intermediate electronic communication devices activated from standby mode to be communication network relays module m1201 obtaining information contained in mobile operating system operated intermediate electronic communication device relayed transmissions module m1202 obtaining information regarding obstructed communication paths that intermediate electronic communication devices have encountered when attempting to communicate with devices other than origination electronic communication devices module m1203 receiving information involving receiving wireless transmissions module m1204 obtaining location information regarding fixed position objects that have previously obstructed communication intermediate electronic communication devices module m1205 obtaining information regarding map data of locations of fixed position objects module m1206 obtaining information regarding time based distributions of instances of obstruction of electronic device communication for particular geographical locations module m1207 obtaining information contained in mobile operating system operated intermediate electronic communication device relayed transmissions including obtaining information regarding statistical probabilities of remaining in communication with intermediate electronic communication devices module m1208 obtaining information contained in mobile operating system operated intermediate electronic communication device relayed transmissions including obtaining information regarding distances from intermediate electronic communication devices to destination electronic communication devices module m1209 obtaining information contained in mobile operating system operated intermediate electronic communication device relayed transmissions including obtaining GPS positioning data regarding intermediate electronic communication devices module

FIG. 6-A

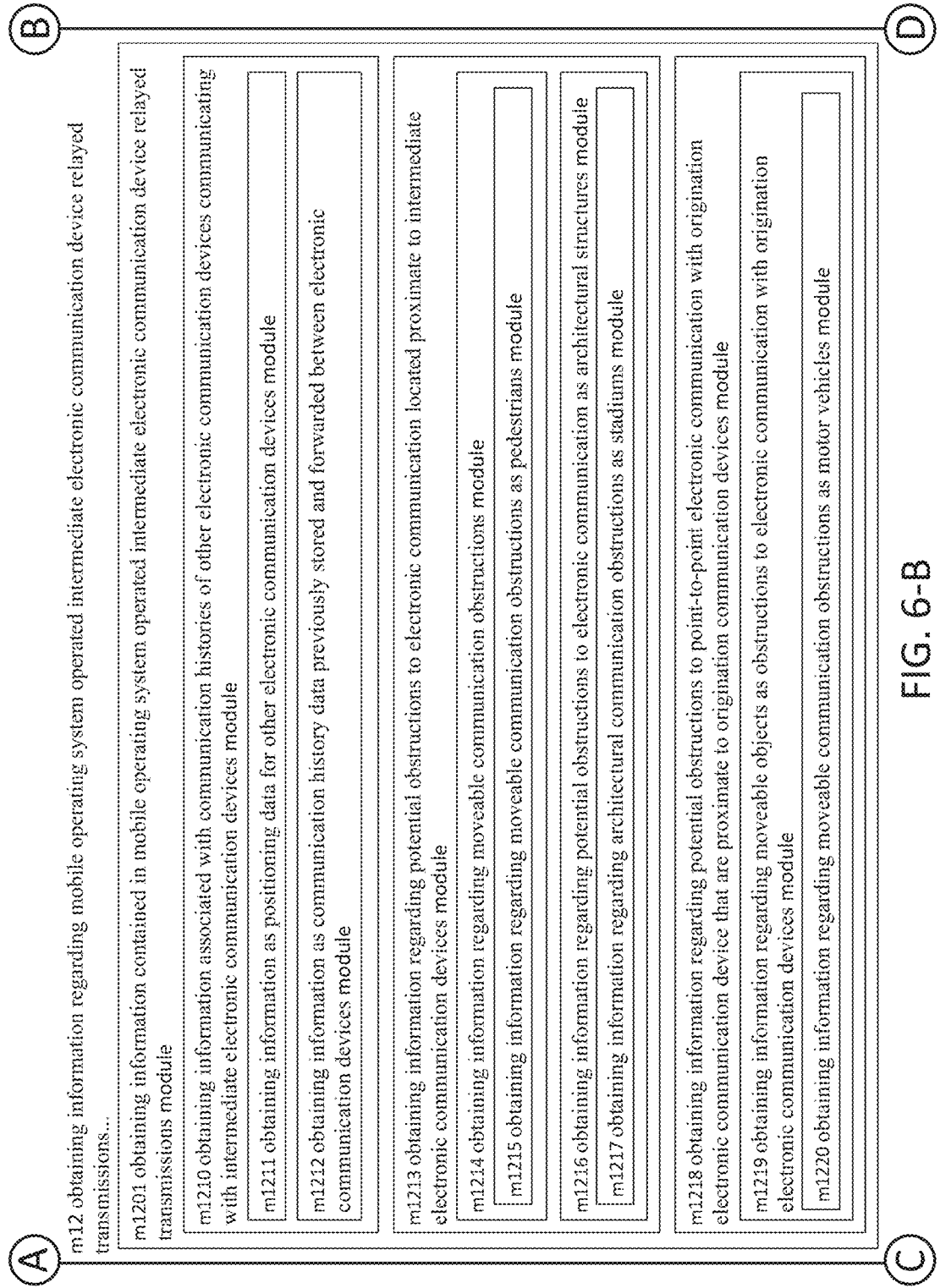
FIG. 6-B

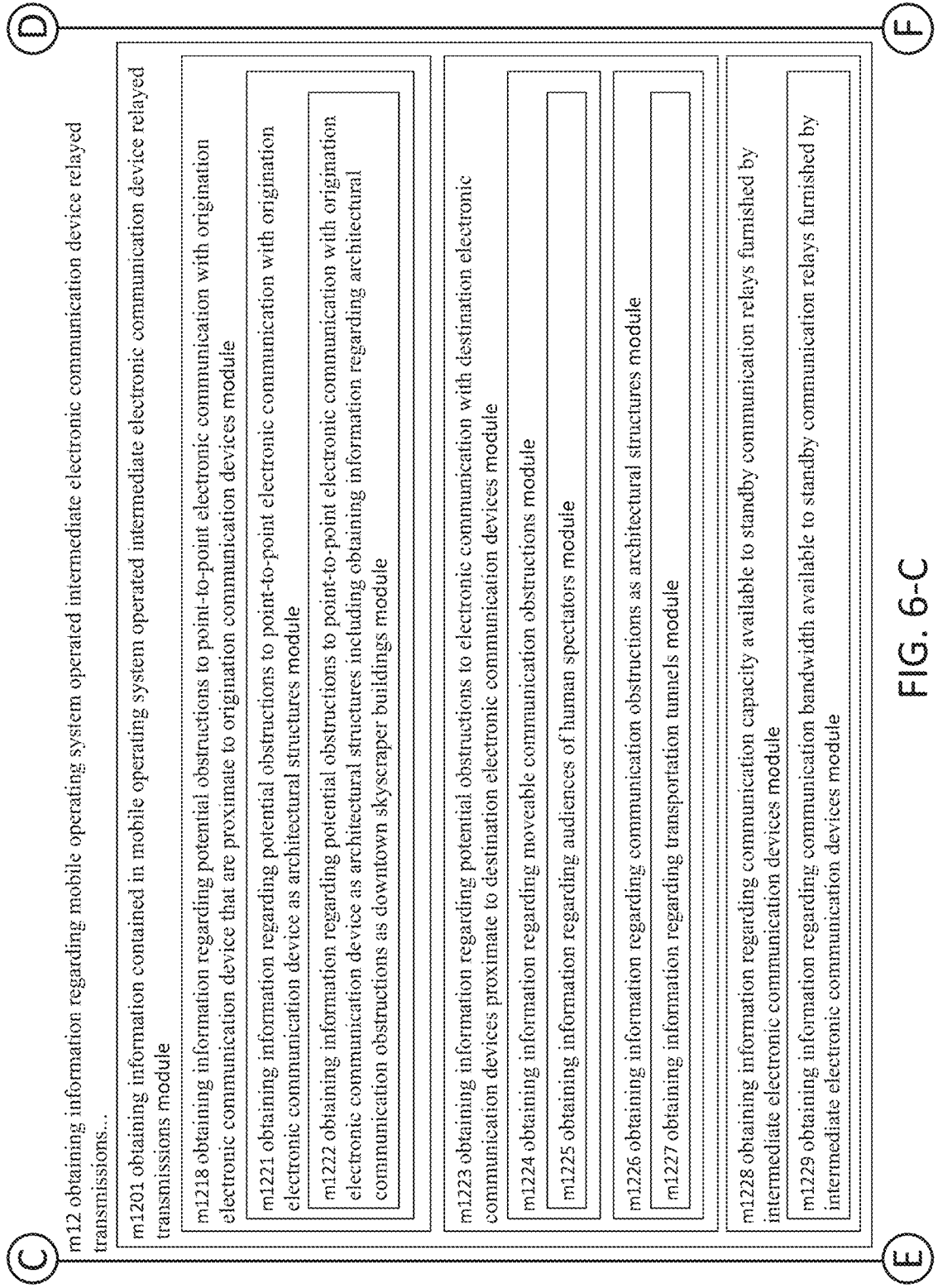
FIG. 6-C

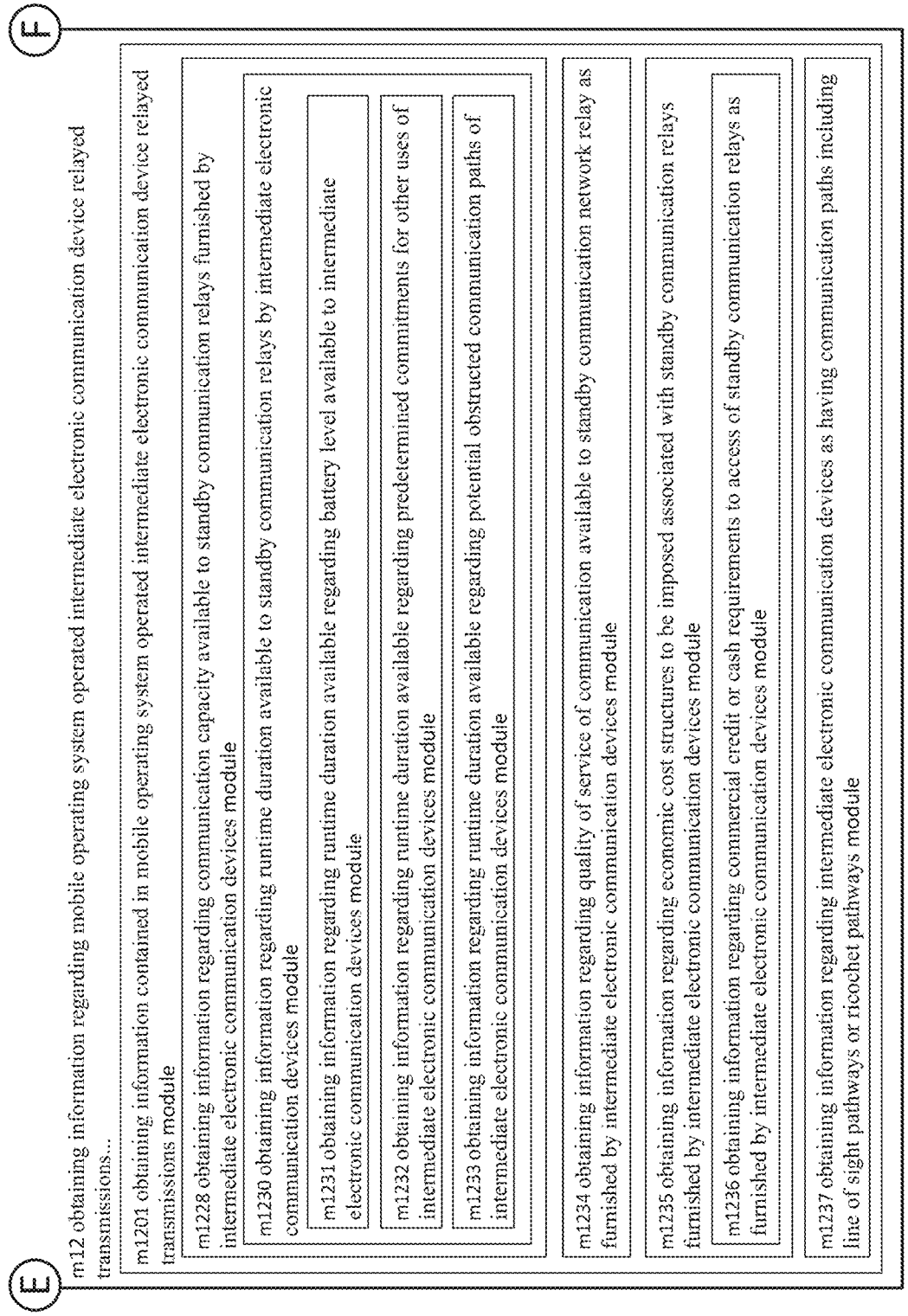
FIG. 6-D m13 electronically deriving assessments associated with mobile operating system operated intermediate electronic communication device relayed transmissions from mobile operating system operated intermediate electronic communication devices activated from standby mode to be communication network relays module m1301 deriving assessments associated with mobile operating system operated intermediate electronic communication device relayed transmissions through receiving information module m1302 receiving information involving access of data storage module m1303 receiving information involving receiving wireless transmissions module m1304 receiving location information regarding moveable objects that have previously obstructed communication of communication network relays furnished by intermediate electronic communication devices module m1305 receiving information regarding statistical probabilities of remaining in communication with communication network relays furnished by intermediate electronic communication devices module m1306 receiving GPS positioning data regarding network communication relays furnished by intermediate electronic communication devices module m1307 receiving information regarding potential obstructions to electronic network relay communication located proximate to intermediate electronic communication devices module m1308 receiving information associated with communication histories of successful communications of other electronic communication devices communicating with network communication relays as furnished by intermediate electronic communication device module m1309 receiving information as communication history data previously stored and forwarded between electronic communication devices module m1310 receiving information regarding communication capacity available to standby communication network relays furnished by intermediate electronic communication device module

FIG. 7-A m13 electronically deriving assessments associated with mobile operating system operated intermediate electronic communication device...

m1301 deriving assessments associated with mobile operating system operated intermediate electronic communication device relayed transmissions through receiving information module m1311 receiving information regarding potential obstructions to electronic communication with origination electronic communication devices that are proximate to origination communication devices module m1304 receiving location information regarding moveable objects that have previously obstructed communication of communication network relays furnished by intermediate electronic communication devices module m1312 receiving information from fixed position communication network base stations module m1313 receiving information regarding potential obstructions to electronic relay network communication with destination electronic communication devices proximate to destination electronic communication devices module m1314 receiving service quality ratings regarding communication network relays as furnished by intermediate electronic communication devices module m1315 receiving cost ratings involved with standby network service plans associated with communication network relays as furnished by intermediate electronic communication devices module m1316 receiving availability forecast ratings involved with standby network communication relays as furnish by intermediate electronic communication devices module m1317 receiving reliability ratings involved with standby network relays as furnished by intermediate electronic communication devices module m1318 receiving duration of connection ratings involved with communication network relays as furnished by intermediate electronic communication devices module m1319 receiving communication bandwidth ratings involved with potential standby communication networks associated with communication network relays as furnished by intermediate electronic communication devices module

FIG. 7-B

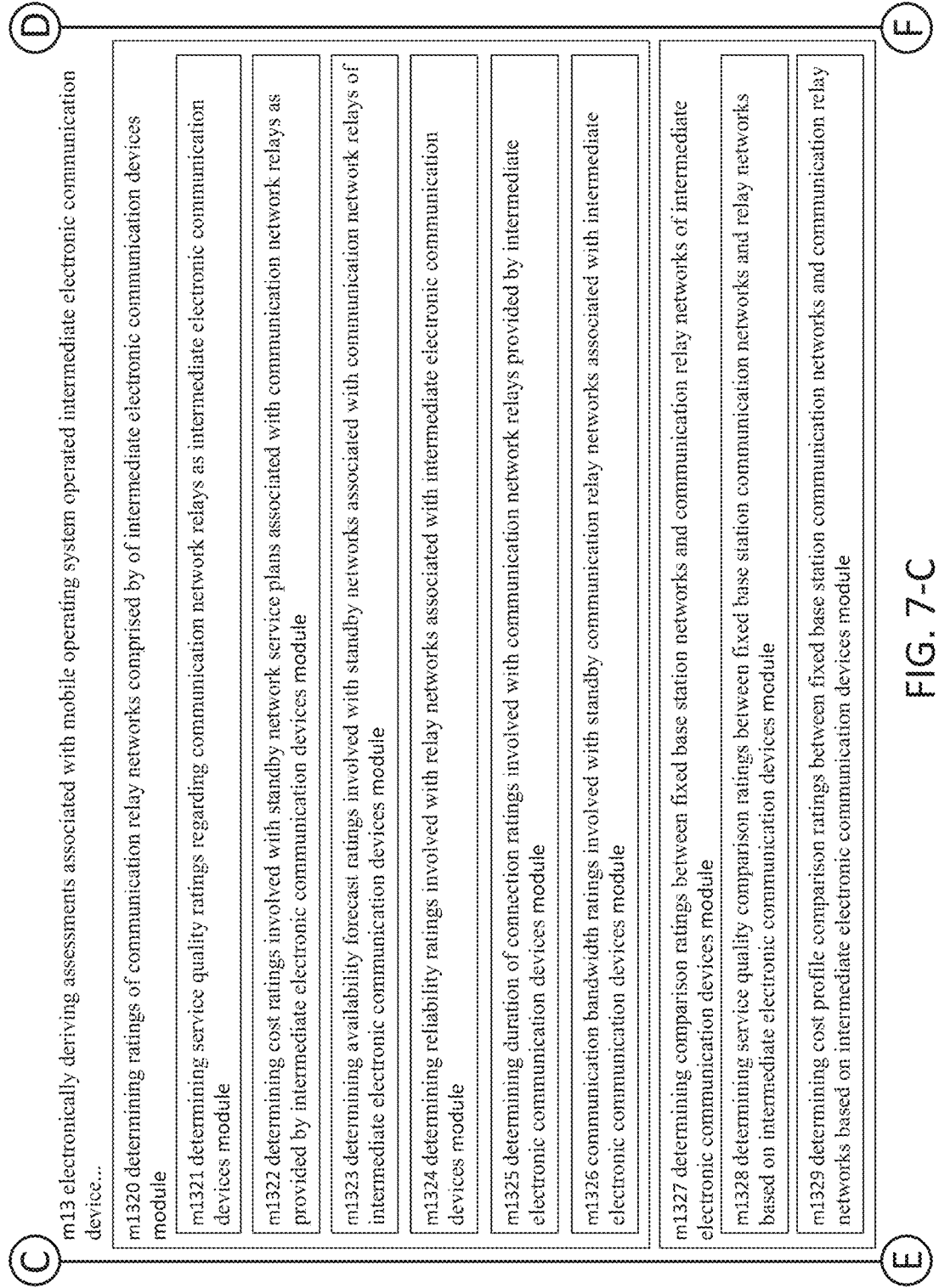
FIG. 7-C

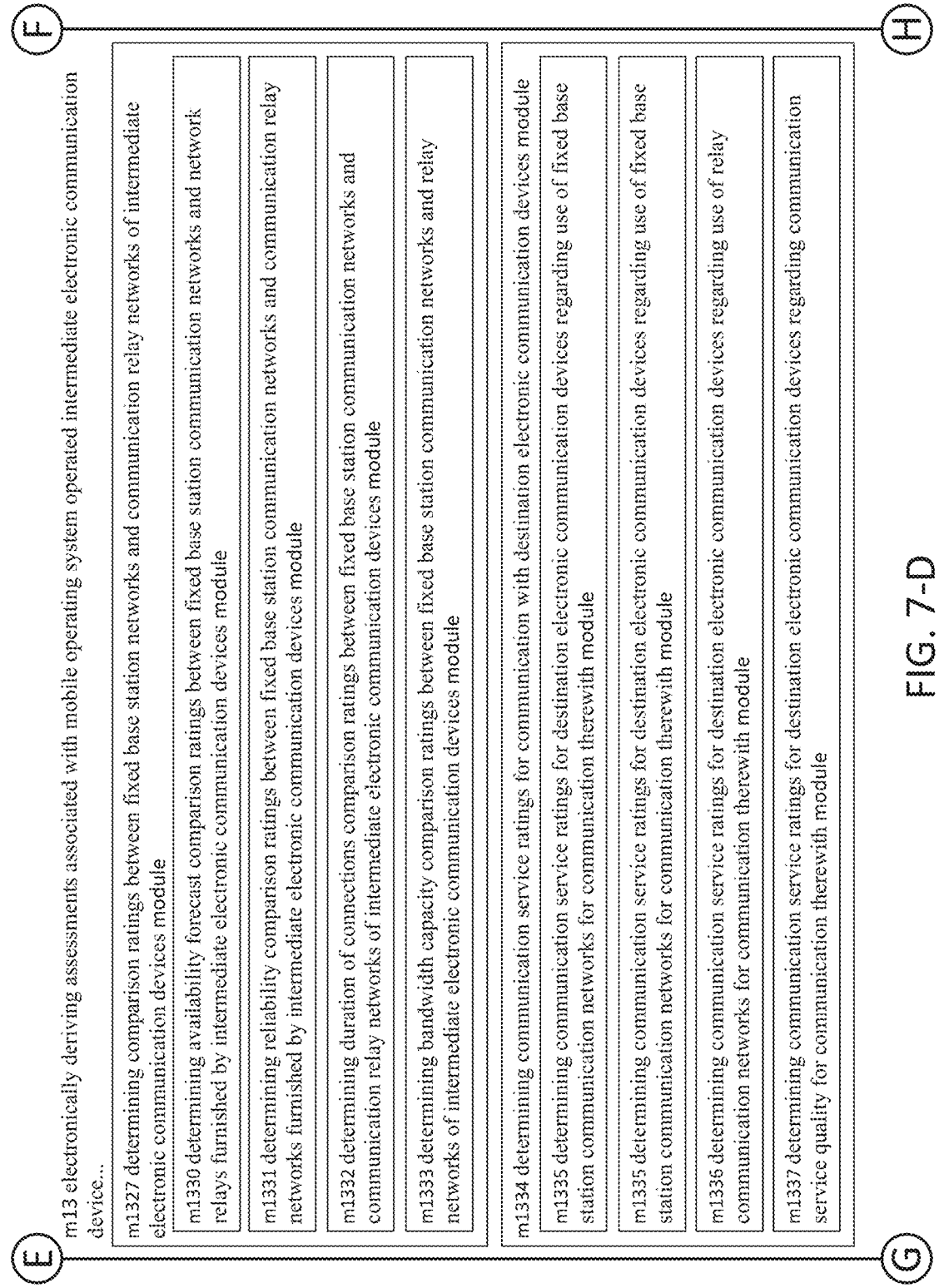
FIG. 7-D

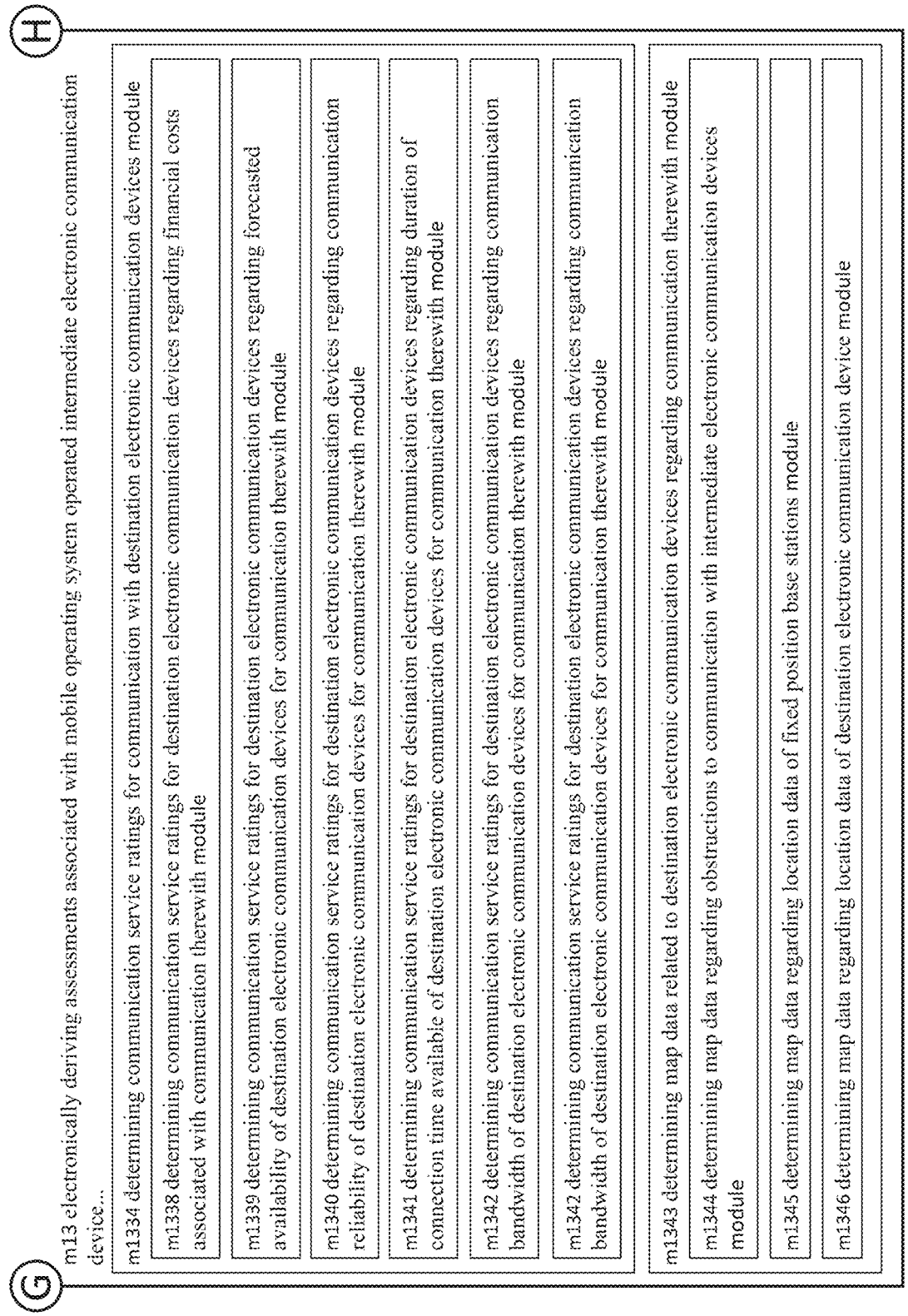
FIG. 7-E

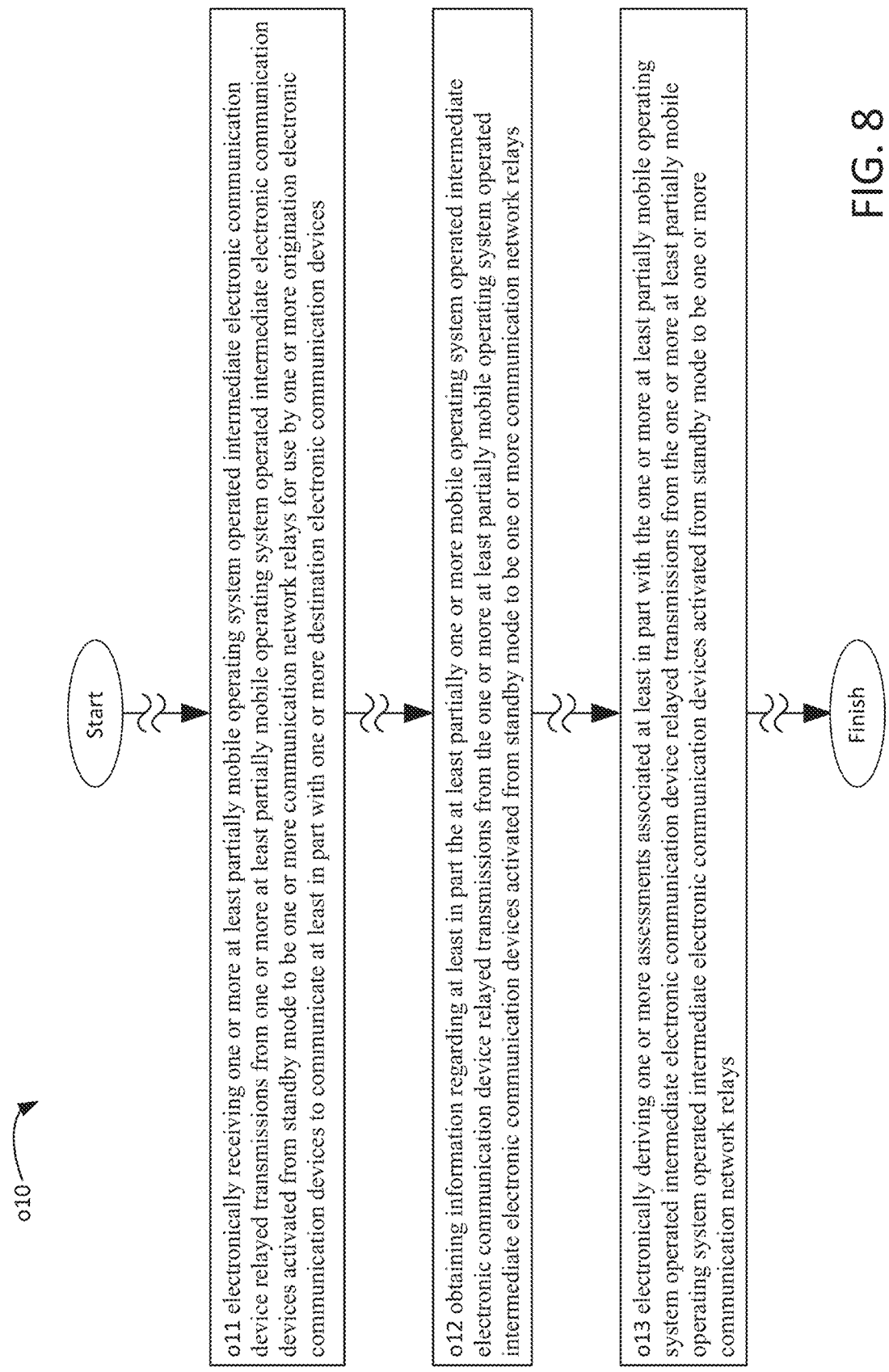

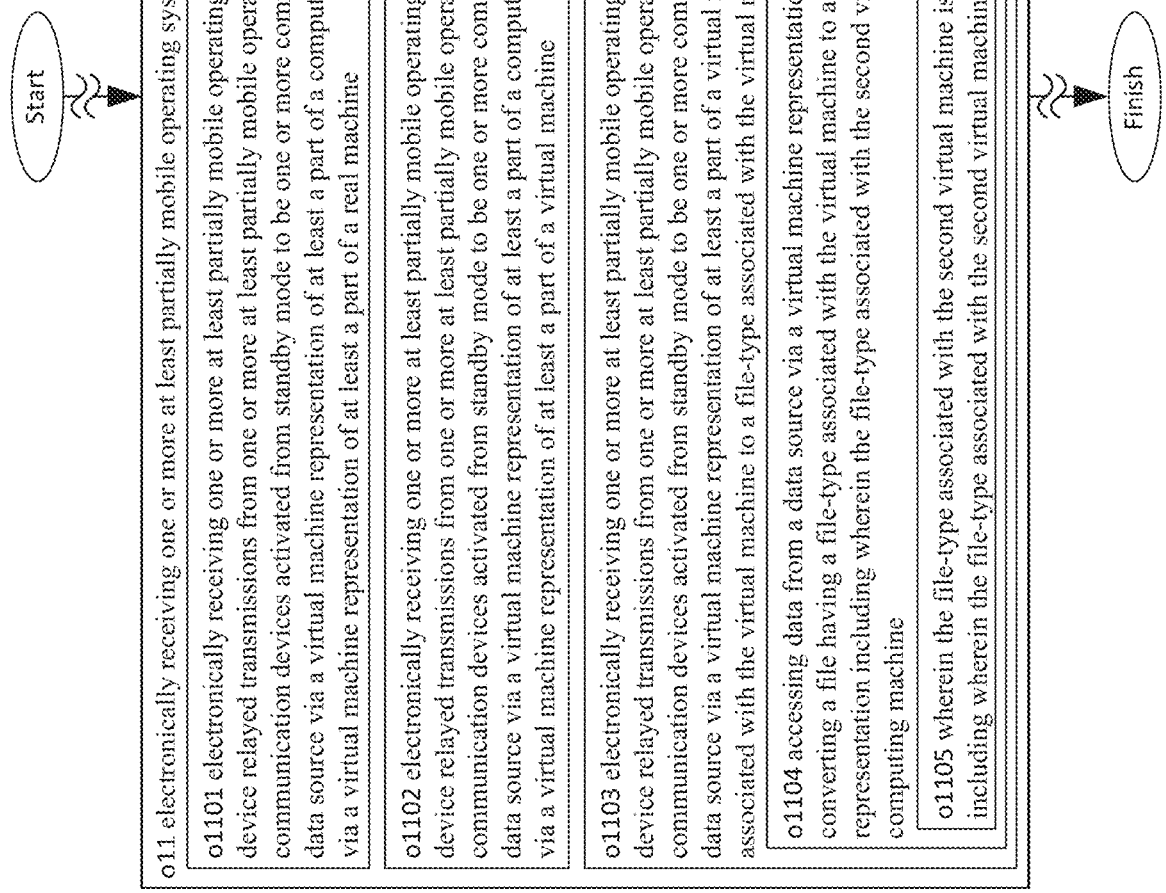
FIG. 9-A

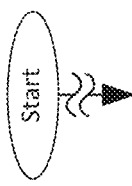

o11 electronically receiving one or more at least partially mobile operating system operated intermediate electronic communication device...

o1106 electronically receiving one or more at least partially mobile operating system operated intermediate electronic communication device relayed transmissions from one or more at least partially mobile operating system operated intermediate electronic communication devices activated from standby mode to be one or more communication network relays including the one or more at least partially mobile operating system operated intermediate electronic communication devices being activated from standby mode based at least in part upon direct access by the one or more origination electronic communication devices to one or more base stations of one or more base station based communication networks becoming unavailable to the one or more origination electronic communication devices o1107 electronically receiving one or more at least partially mobile operating system operated intermediate electronic communication device relayed transmissions from one or more at least partially mobile operating system operated intermediate electronic communication devices activated from standby mode to be one or more communication network relays for use by one or more origination electronic communication devices to communicate at least in part with one or more destination electronic communication devices including the relayed transmissions being received after prior transmissions from the one or more at least partially mobile operating system operated intermediate electronic communication devices as one or more mobile handset communication devices for communication with one or more users of other one or more mobile handset communication devices o1108 electronically receiving one or more at least partially mobile operating system operated intermediate electronic communication device relayed transmissions from one or more at least partially mobile operating system operated intermediate electronic communication devices activated from standby mode to be one or more communication network relays including receiving wireless packetized communication o1109 receiving wireless packetized communication including receiving incoming message traffic o1110 receiving incoming message traffic including receiving one or more high bandwidth data transfers

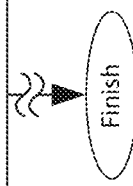

FIG. 9-B

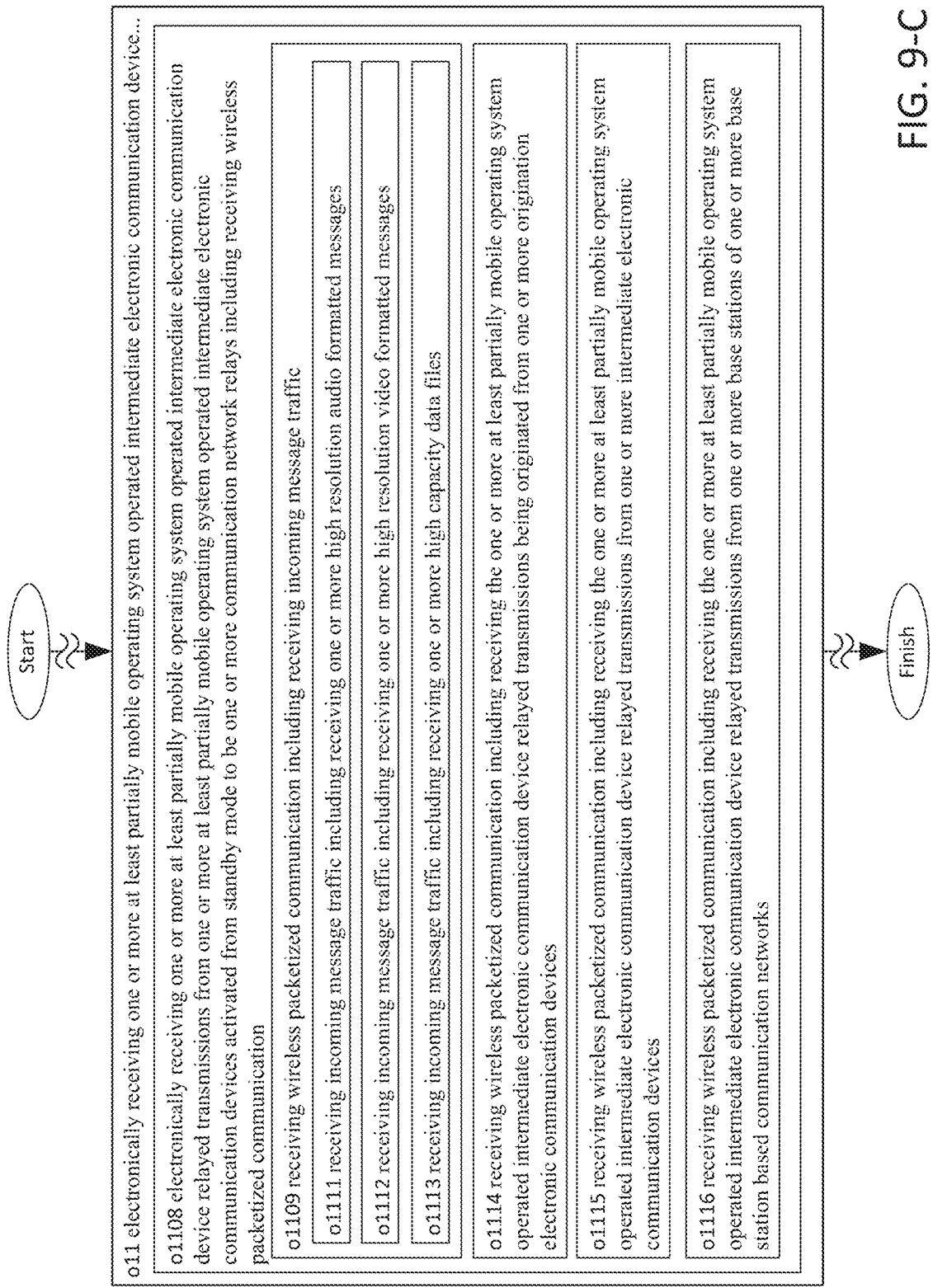

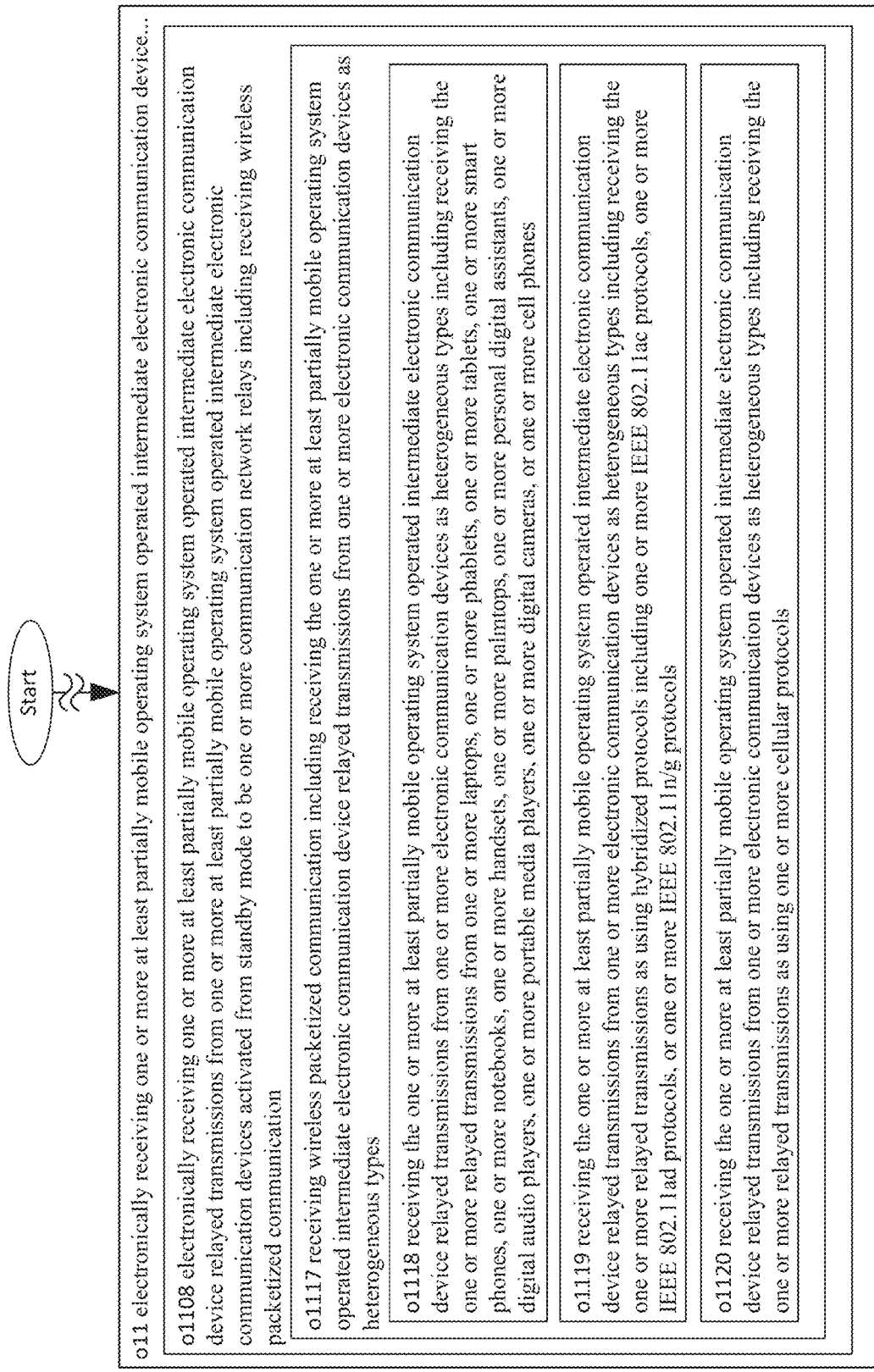
FIG. 9-D

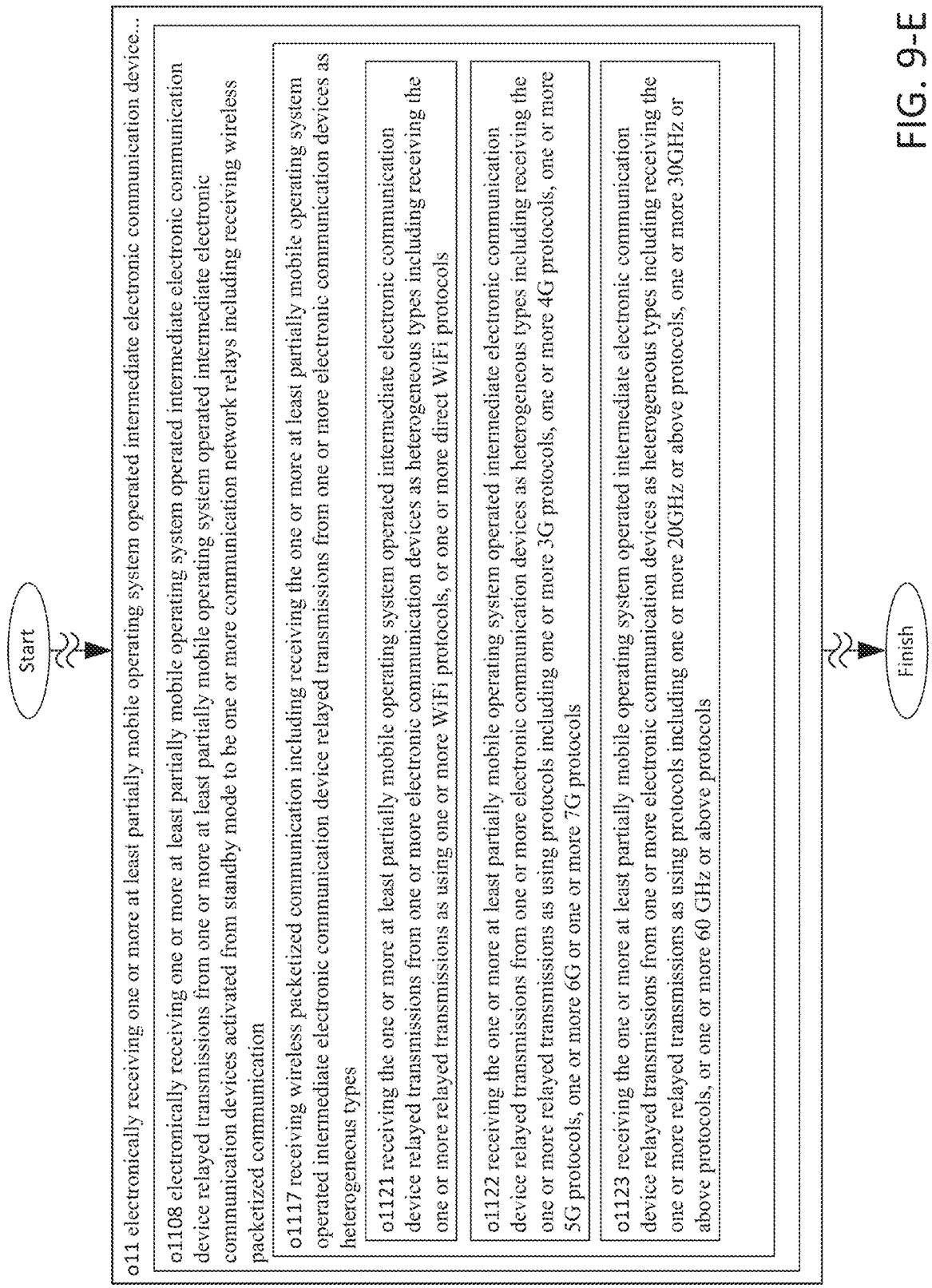

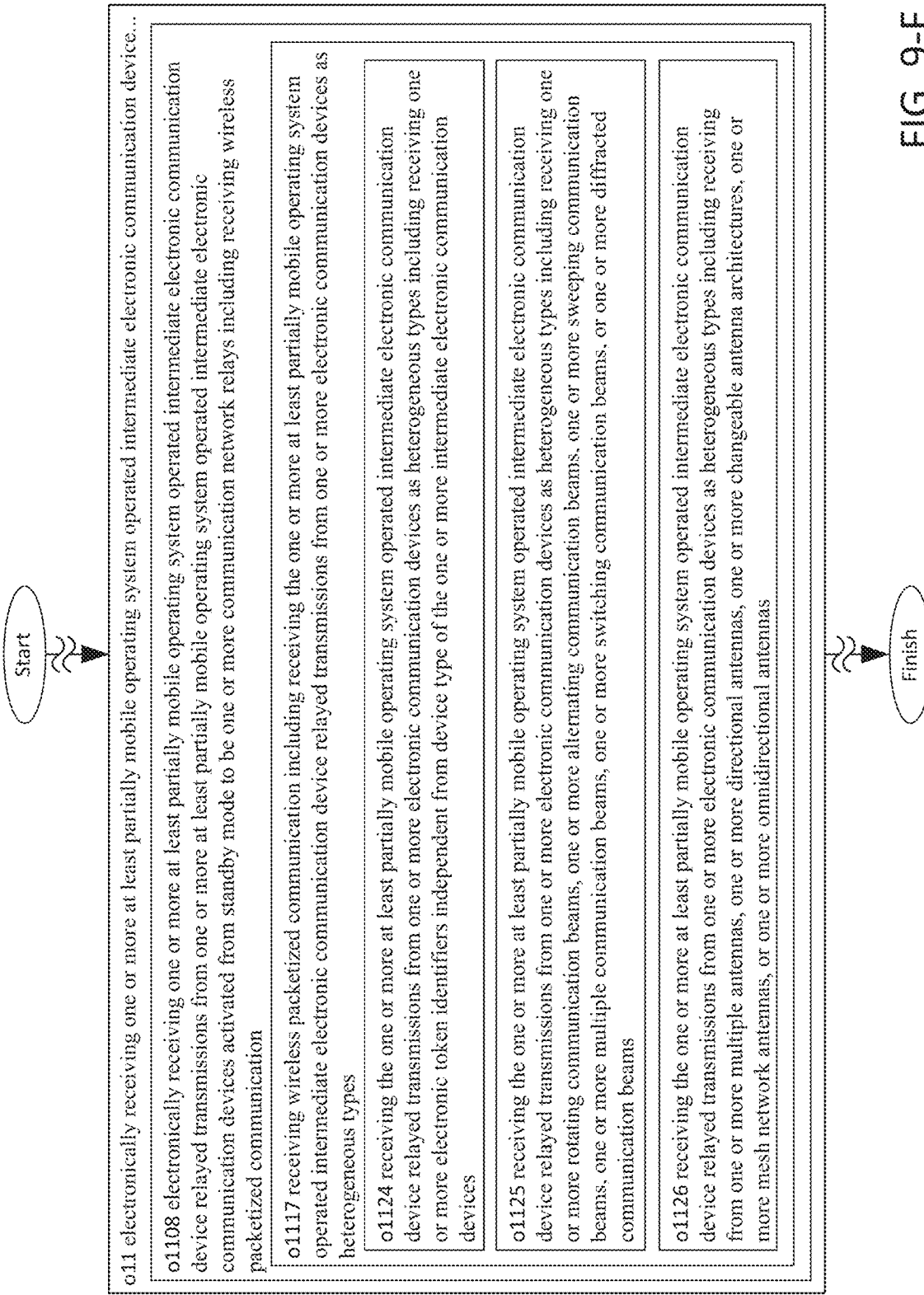
FIG. 9-F

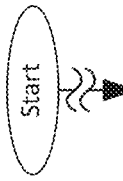
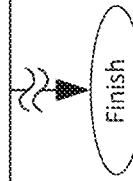

FIG. 10-A o12 obtaining information regarding at least in part the at least partially one or more mobile operating system operated intermediate electronic communication device...

o1201 obtaining information regarding at least in part the at least partially one or more mobile operating system operated intermediate electronic communication device relayed transmissions from the one or more at least partially mobile operating system operated intermediate electronic communication devices including obtaining information at least partially contained in the one or more at least partially mobile operating system operated intermediate electronic communication device relayed transmissions o1202 obtaining information at least partially contained in the one or more at least partially mobile operating system operated intermediate electronic communication device relayed transmissions including obtaining information regarding one or more obstructed communication paths that the one or more intermediate electronic communication devices have encountered when attempting to communicate with devices other than the one or more origination electronic communication devices o1203 establishing through receiving information including receiving information involving receiving one or more wireless transmissions o1204 obtaining information regarding one or more obstructed communication paths that the one or more intermediate electronic communication devices have encountered when attempting to communicate with devices other than the one or more origination electronic communication devices including obtaining location information regarding one or more fixed position objects that have previously obstructed communication of one or more of the intermediate electronic communication devices o1205 obtaining information at least partially contained in the one or more at least partially mobile operating system operated intermediate electronic communication device relayed transmissions including obtaining information regarding map data of locations of fixed position objects

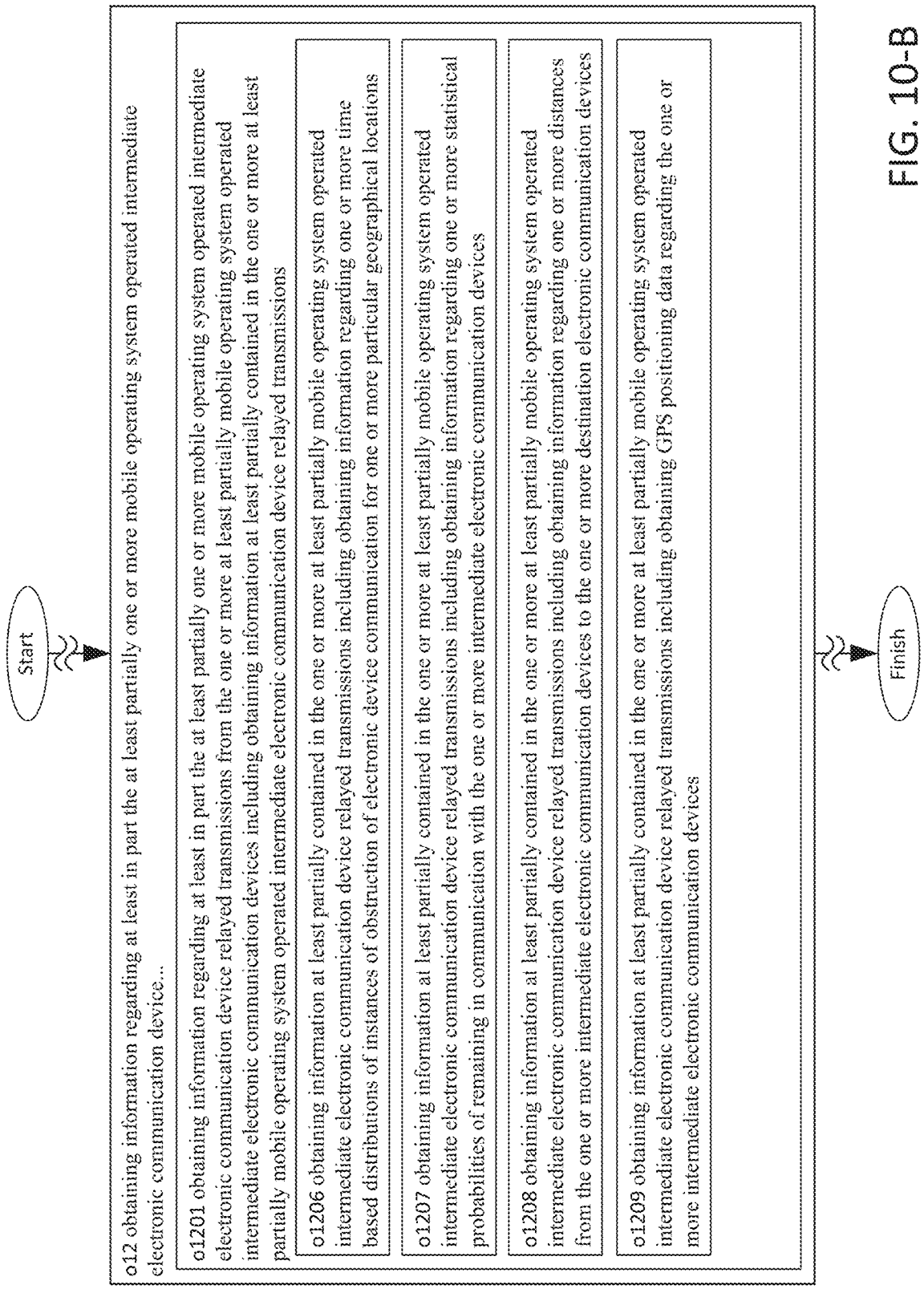
FIG. 10-B

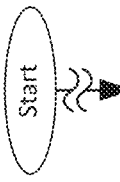
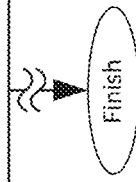

FIG. 10-C o12 obtaining information regarding at least in part the at least partially one or more mobile operating system operated intermediate electronic communication device...

o1201 obtaining information regarding at least in part the at least partially one or more mobile operating system operated intermediate electronic communication device relayed transmissions from the one or more at least partially mobile operating system operated intermediate electronic communication devices including obtaining information at least partially contained in the one or more at least partially mobile operating system operated intermediate electronic communication device relayed transmissions o1210 obtaining information at least partially contained in the one or more at least partially mobile operating system operated intermediate electronic communication device relayed transmissions including obtaining information associated with communication histories of one or more other electronic communication devices communicating with the one or more intermediate electronic communication devices o1211 obtaining information associated with communication histories of one or more other electronic communication devices communicating with the one or more intermediate electronic communication devices including obtaining information as positioning data for the one or more other electronic communication devices o1212 obtaining information associated with communication histories of one or more other electronic communication devices communicating with the one or more intermediate electronic communication devices including obtaining information as communication history data previously stored and forwarded between one or more electronic communication devices o1213 obtaining information at least partially contained in the one or more at least partially mobile operating system operated intermediate electronic communication device relayed transmissions including obtaining information regarding one or more potential obstructions to electronic communication located proximate to one or more of the intermediate electronic communication devices

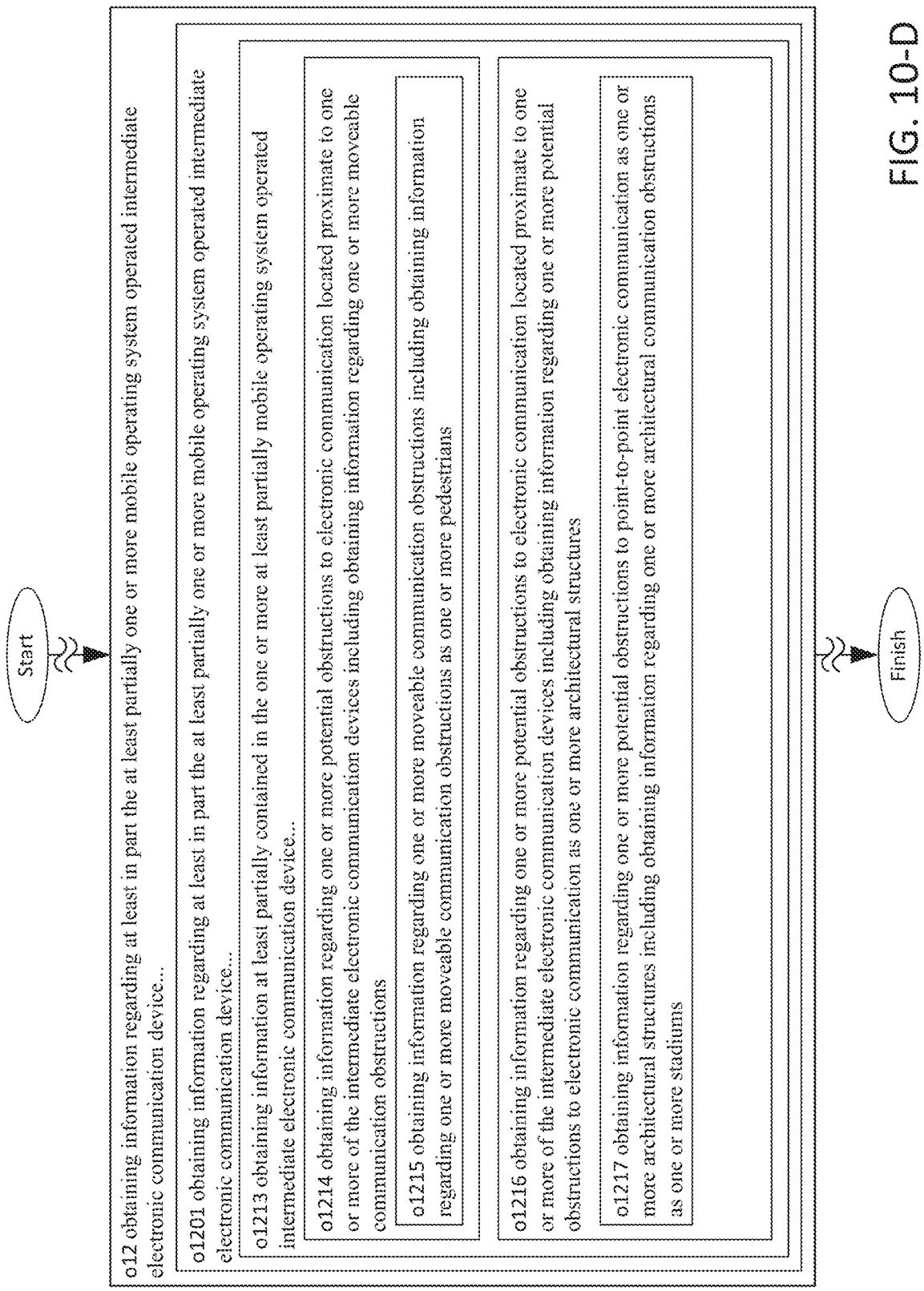
FIG. 10-D o12 obtaining information regarding at least in part the at least partially one or more mobile operating system operated intermediate electronic communication device...

o1201 obtaining information regarding at least in part the at least partially one or more mobile operating system operated intermediate electronic communication device...

o1218 obtaining information at least partially contained in the one or more at least partially mobile operating system operated intermediate electronic communication device relayed transmissions including obtaining information regarding one or more potential obstructions to point-to-point electronic communication with the origination electronic communication device that are proximate to one or more of the origination electronic communication devices o1219 obtaining information regarding one or more potential obstructions to point-to-point electronic communication with the origination electronic communication device that are proximate to one or more of the origination communication devices including obtaining information regarding one or more moveable objects as obstructions to electronic communication with one or more of the origination electronic communication devices o1220 obtaining information regarding one or more moveable objects as obstructions to electronic communication with one or more of the origination electronic communication devices including obtaining information regarding one or more moveable communication obstructions as motor vehicles o1221 obtaining information regarding one or more potential obstructions to point-to-point electronic communication with the origination electronic communication device that are proximate to one or more of the origination communication devices including obtaining information regarding one or more potential obstructions to point-to-point electronic communication with the origination electronic communication device as one or more architectural structures

FIG. 10-E

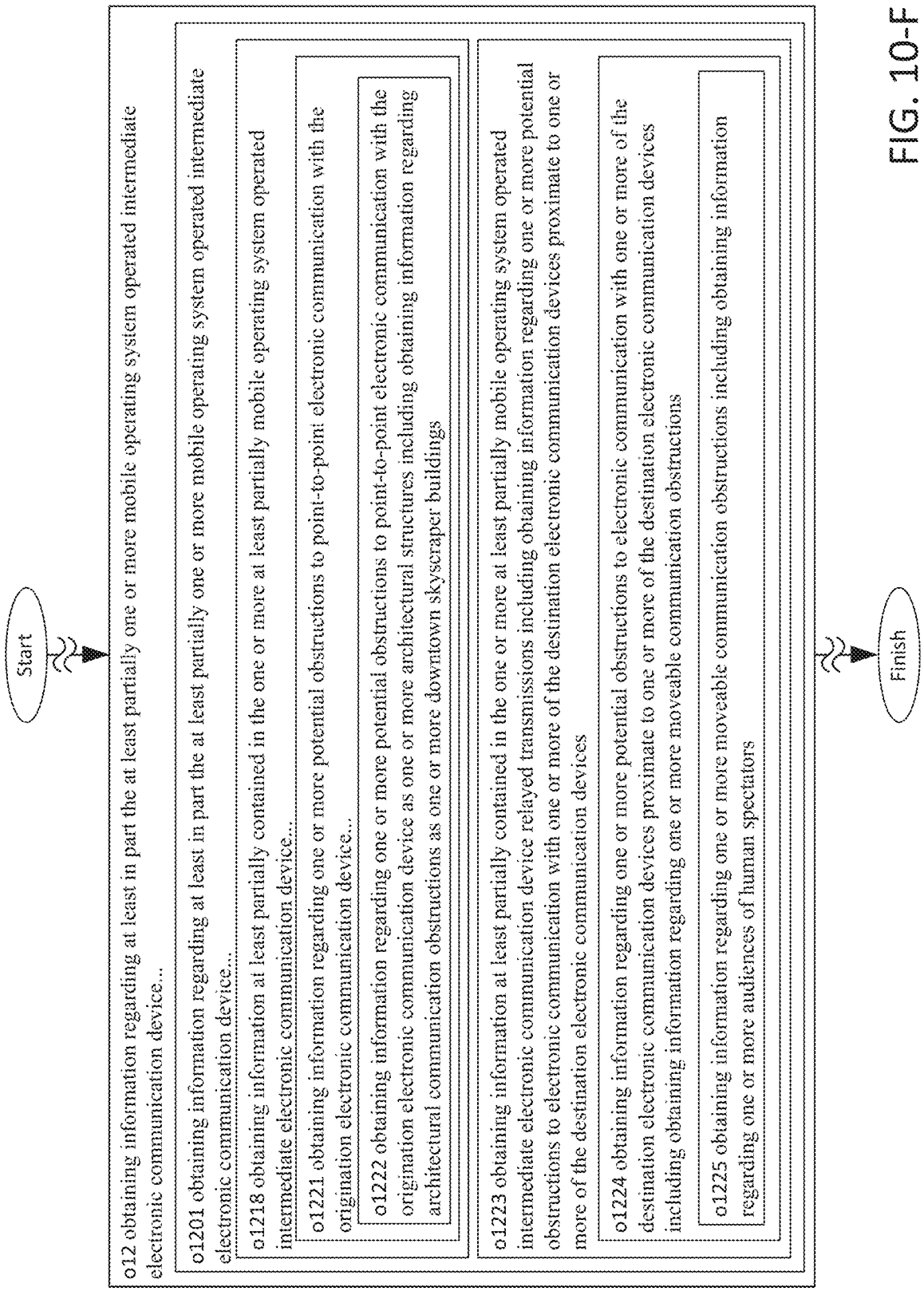
FIG. 10-F

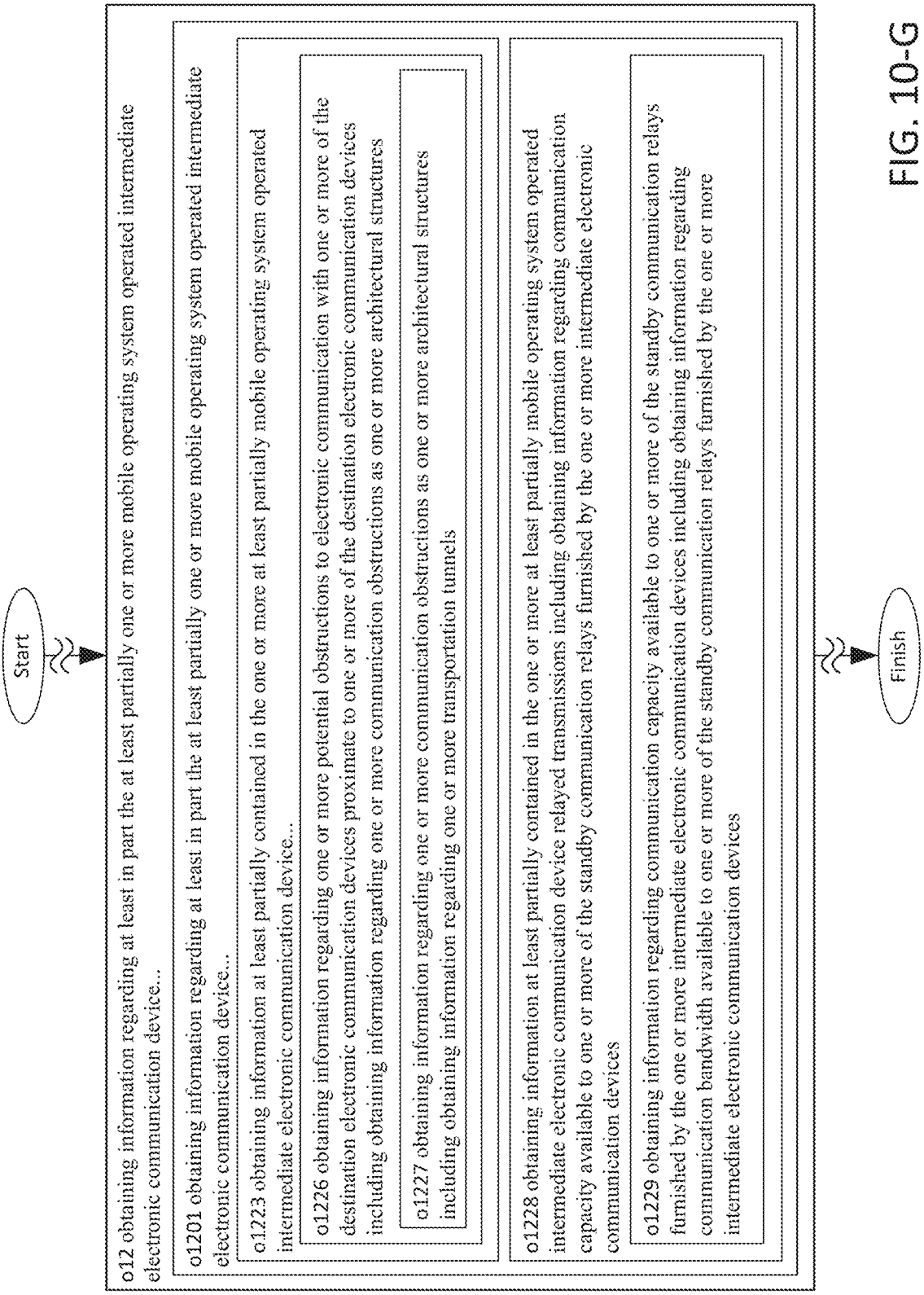

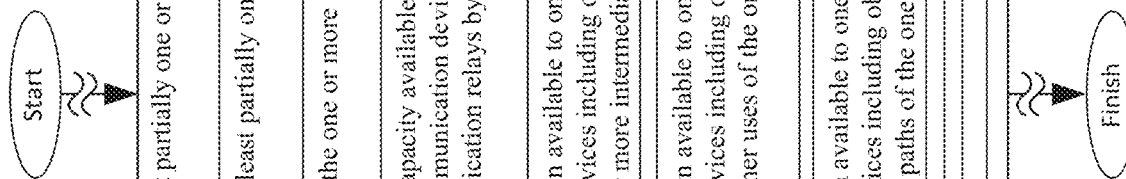
FIG. 10-H

This Page Left Intentionally Blank

FIG. 10-I

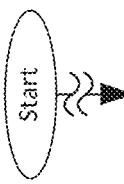
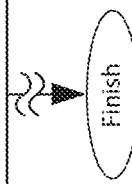

o12 obtaining information regarding at least in part the at least partially one or more mobile operating system operated intermediate electronic communication device...

o1201 obtaining information regarding at least in part the at least partially one or more mobile operating system operated intermediate electronic communication device...

o1234 obtaining information at least partially contained in the one or more at least partially mobile operating system operated intermediate electronic communication device relayed transmissions including obtaining information regarding quality of service of communication available to one or more standby communication network relay as furnished by the one or more intermediate electronic communication devices o1235 obtaining information at least partially contained in the one or more at least partially mobile operating system operated intermediate electronic communication device relayed transmissions including obtaining information regarding one or more economic cost structures to be imposed associated with one or more of the standby communication relays as furnished by the one or more intermediate electronic communication devices o1236 obtaining information regarding one or more economic cost structures to be imposed associated with one or more of standby communication relays furnished by the one or more intermediate electronic communication devices including obtaining information regarding commercial credit or cash requirements to access one or more of the standby communication relays as furnished by the one or more intermediate electronic communication devices o1237 obtaining information at least partially contained in the one or more at least partially mobile operating system operated intermediate electronic communication device relayed transmissions including obtaining information regarding the one or more intermediate electronic communication devices as having one or more communication paths including one or more line of sight pathways or one or more ricochet pathways

FIG. 10-J

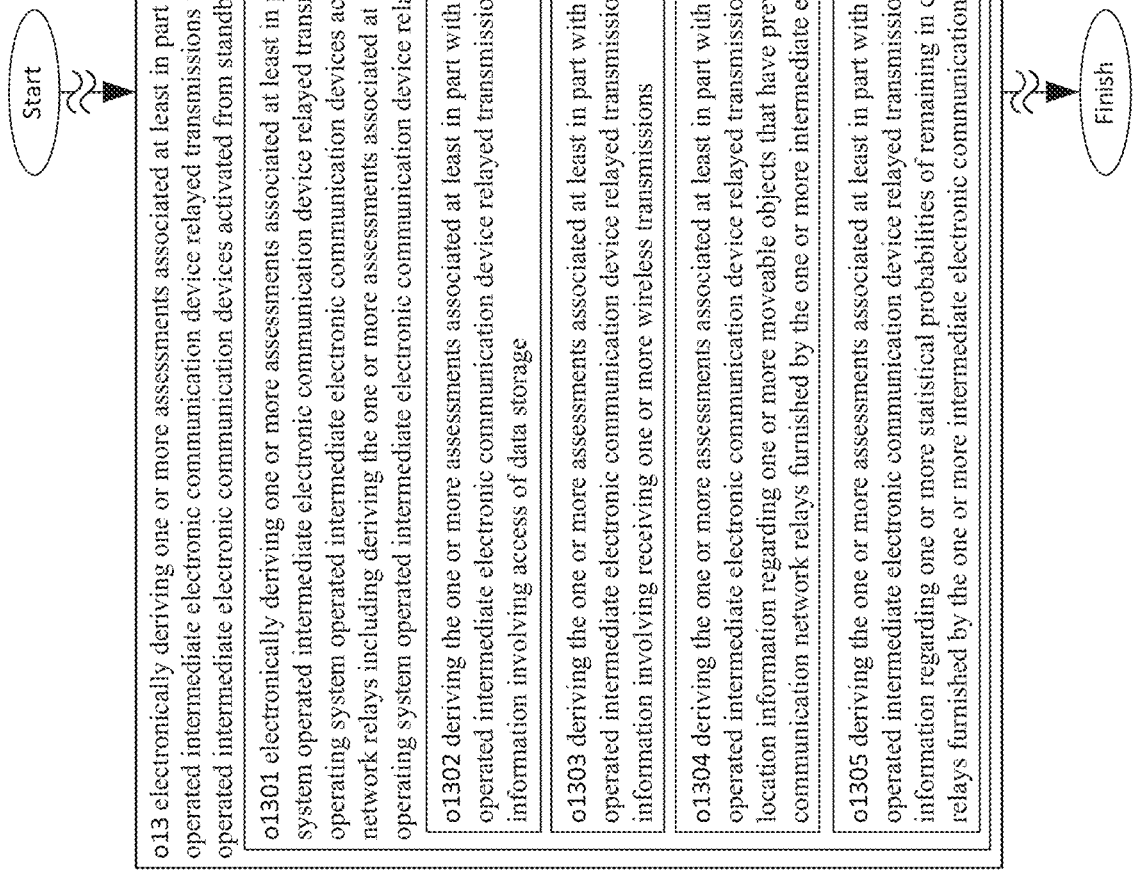
FIG. 11-A o13 electronically deriving one or more assessments associated at least in part with the one or more at least partially mobile operating system operated intermediate electronic communication device...

o1301 electronically deriving one or more assessments associated at least in part with the one or more at least partially mobile operating system operated intermediate electronic communication device...

o1306 deriving the one or more assessments associated at least in part with the one or more at least partially mobile operating system operated intermediate electronic communication device relayed transmissions through receiving information including receiving GPS positioning data regarding the network communication relays furnished by the one or more intermediate electronic communication devices o1307 deriving the one or more assessments associated at least in part with the one or more at least partially mobile operating system operated intermediate electronic communication device relayed transmissions through receiving information including receiving information regarding one or more potential obstructions to electronic network relay communication located proximate to one or more of the intermediate electronic communication devices o1308 deriving the one or more assessments associated at least in part with the one or more at least partially mobile operating system operated intermediate electronic communication device relayed transmissions through receiving information including receiving information associated with communication histories of successful communications of one or more network communication relays as furnished by the one or more intermediate electronic communication devices communicating with one or more network communication relays as furnished by the one or more intermediate electronic communication device o1309 receiving information associated with communication histories of successful communications of one or more other electronic communication devices communicating with the one or more network communication relays as furnished by the one or more intermediate electronic communication device including receiving information as communication history data previously stored and forwarded between one or more other electronic communication devices

FIG. 11-B

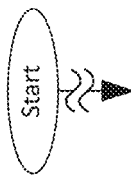

o13 electronically deriving one or more assessments associated at least in part with the one or more at least partially mobile operating system operated intermediate electronic communication device… o1301 electronically deriving one or more assessments associated at least in part with the one or more at least partially mobile operating system operated intermediate electronic communication device… o1310 deriving the one or more assessments associated at least in part with the one or more at least partially mobile operating system operated intermediate electronic communication device relayed transmissions through receiving information including receiving information regarding communication capacity available to one or more standby communication network relays furnished by the one or more intermediate electronic communication device o1311 deriving the one or more assessments associated at least in part with the one or more at least partially mobile operating system operated intermediate electronic communication device relayed transmissions through receiving information including receiving information regarding one or more potential obstructions to electronic communication with the one or more origination electronic communication devices that are proximate to the one or more origination communication devices o1304 deriving the one or more assessments associated at least in part with the one or more at least partially mobile operating system operated intermediate electronic communication device… o1312 receiving location information regarding one or more moveable objects that have previously obstructed communication of the one or more communication network relays furnished by the one or more intermediate electronic communication devices including receiving information from one or more fixed position communication network base stations o1313 receiving location information regarding one or more moveable objects that have previously obstructed communication of the one or more communication network relays furnished by the one or more intermediate electronic communication devices including receiving information regarding one or more potential obstructions to electronic relay network communication with one or more destination electronic communication devices proximate to one or more destination electronic communication devices

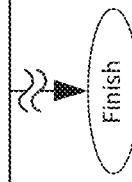

FIG. 11-C

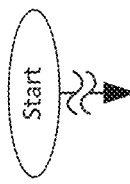

o13 electronically deriving one or more assessments associated at least in part with the one or more at least partially mobile operating system operated intermediate electronic communication device...

o1301 electronically deriving one or more assessments associated at least in part with the one or more at least partially mobile operating system operated intermediate electronic communication device...

o1314 deriving the one or more assessments associated at least in part with the one or more at least partially mobile operating system operated intermediate electronic communication device relayed transmissions through receiving information including receiving at least in part service quality ratings regarding the one or more communication network relays as furnished by the one or more intermediate electronic communication devices o1315 deriving the one or more assessments associated at least in part with the one or more at least partially mobile operating system operated intermediate electronic communication device relayed transmissions through receiving information including receiving at least in part cost ratings involved with standby network service plans associated with one or more communication network relays as furnished by the one or more intermediate electronic communication devices o1316 deriving the one or more assessments associated at least in part with the one or more at least partially mobile operating system operated intermediate electronic communication device relayed transmissions through receiving information including receiving at least in part availability forecast ratings involved with one or more standby network communication relays as furnish by the one or more intermediate electronic communication devices o1317 deriving the one or more assessments associated at least in part with the one or more at least partially mobile operating system operated intermediate electronic communication device relayed transmissions through receiving information including receiving at least in part reliability ratings involved with one or more standby network relays as furnished by the one or more intermediate electronic communication devices

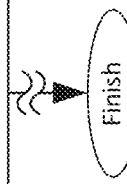

FIG. 11-D

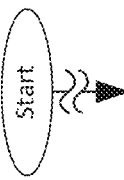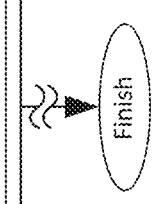

FIG. 11-E o13 electronically deriving one or more assessments associated at least in part with the one or more at least partially mobile operating system operated intermediate electronic communication device...

o1301 electronically deriving one or more assessments associated at least in part with the one or more at least partially mobile operating system operated intermediate electronic communication device...

o1318 deriving the one or more assessments associated at least in part with the one or more at least partially mobile operating system operated intermediate electronic communication device relayed transmissions through receiving information including receiving at least in part duration of connection ratings involved with one or more communication network relays as furnished by the one or more intermediate electronic communication devices o1319 deriving the one or more assessments associated at least in part with the one or more at least partially mobile operating system operated intermediate electronic communication device relayed transmissions through receiving information including receiving at least in part communication bandwidth ratings involved with potential one or more standby communication networks associated with one or more communication network relays as furnished by the one or more intermediate electronic communication devices o1320 electronically deriving one or more assessments associated at least in part with the one or more at least partially mobile operating system operated intermediate electronic communication device relayed transmissions from the one or more at least partially mobile operating system operated intermediate electronic communication devices activated from standby mode to be one or more communication relay networks comprised at least in part by one or more of the intermediate electronic communication devices o1321 determining ratings of one or more communication relay networks comprised at least in part by one or more of the intermediate electronic communication devices including determining service quality ratings regarding one or more communication network relays as the one or more intermediate electronic communication devices

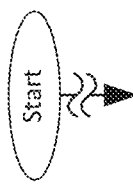

FIG. 11-F o13 electronically deriving one or more assessments associated at least in part with the one or more at least partially mobile operating system operated intermediate electronic communication device...

o1320 electronically deriving one or more assessments associated at least in part with the one or more at least partially mobile operating system operated intermediate electronic communication device...

o1322 determining ratings of one or more communication relay networks comprised at least in part by one or more of the intermediate electronic communication devices including determining cost ratings involved with standby network service plans associated with one or more communication network relays as provided by the intermediate electronic communication devices o1323 determining ratings of one or more communication relay networks comprised at least in part by one or more of the intermediate electronic communication devices including determining availability forecast ratings involved with one or more standby networks associated with one or more communication network relays of the one or more intermediate electronic communication devices o1324 determining ratings of one or more communication relay networks comprised at least in part by one or more of the intermediate electronic communication devices including determining reliability ratings involved with one or more relay networks associated with the one or more intermediate electronic communication devices ices o1325 determining ratings of one or more communication relay networks comprised at least in part by one or more of the intermediate electronic communication devices including determining duration of connection ratings involved with communication network relays provided by the one or more intermediate electronic communication devices o1326 determining ratings of one or more communication relay networks comprised at least in part by one or more of the intermediate electronic communication devices including communication bandwidth ratings involved with one or more standby communication relay networks associated with the one or more intermediate electronic communication devices

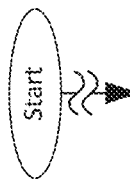

o13 electronically deriving one or more assessments associated at least in part with the one or more at least partially mobile operating system operated intermediate electronic communication device...

o1327 electronically deriving one or more assessments associated at least in part with the one or more at least partially mobile operating system operated intermediate electronic communication device relayed transmissions from the one or more at least partially mobile operating system operated intermediate electronic communication devices activated from standby mode to be one or more communication network relays including determining one or more comparison ratings between one or more fixed base station networks and one or more communication relay networks of the one or more intermediate electronic communication devices o1328 determining one or more comparison ratings between one or more fixed base station networks and one or more communication relay networks of the one or more intermediate electronic communication devices including determining one or more service quality comparison ratings between one or more fixed base station communication networks and one or more relay networks based on the one or more intermediate electronic communication devices o1329 determining one or more comparison ratings between one or more fixed base station networks and one or more communication relay networks of the one or more intermediate electronic communication devices including determining one or more cost profile comparison ratings between one or more fixed base station communication networks and one or more communication relay networks based on the one or more intermediate electronic communication devices o1330 determining one or more comparison ratings between one or more fixed base station networks and one or more communication relay networks of the one or more intermediate electronic communication devices including determining one or more availability forecast comparison ratings between one or more fixed base station communication networks and one or more network relays furnished by the one or more intermediate electronic communication devices

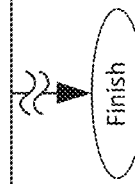

FIG. 11-G

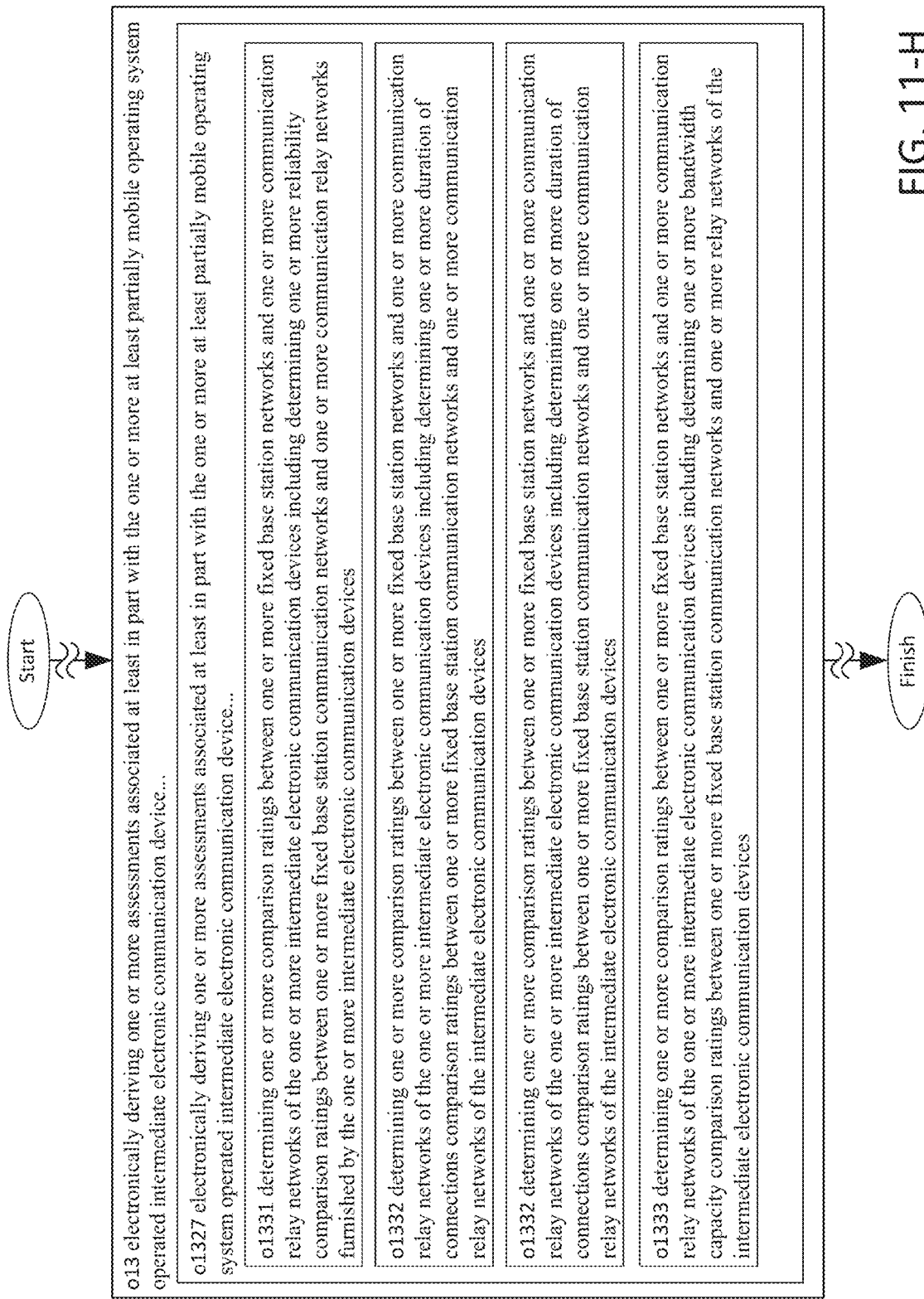
FIG. 11-H

This Page Left Intentionally Blank

FIG. 11-I

FIG. 11-J

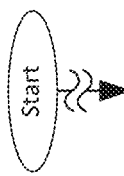
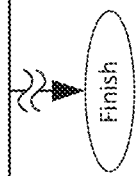
FIG. 11-K

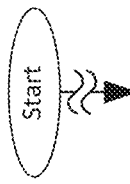
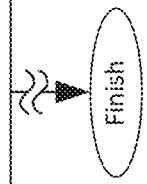

o13 electronically deriving one or more assessments associated at least in part with the one or more at least partially mobile operating system operated intermediate electronic communication device...

o1343 electronically deriving one or more assessments associated at least in part with the one or more at least partially mobile operating system operated intermediate electronic communication device relayed transmissions from the one or more at least partially mobile operating system operated intermediate electronic communication devices activated from standby mode to be one or more communication network relays including determining map data related to the one or more destination electronic communication devices regarding communication therewith o1344 determining map data related to the one or more destination electronic communication devices regarding communication therewith including determining map data regarding one or more obstructions to communication with the one or more intermediate electronic communication devices o1345 electronically deriving one or more assessments associated at least in part with the one or more at least partially mobile operating system operated intermediate electronic communication device relayed transmissions from the one or more at least partially mobile operating system operated intermediate electronic communication devices activated from standby mode to be one or more communication network relays including determining map data related to the one or more destination electronic communication devices regarding communication therewith including determining map data regarding location data of one or more fixed position base stations o1346 determining map data related to the one or more destination electronic communication devices regarding communication therewith including determining map data regarding location data of the destination electronic communication device

FIG. 11-L

DYNAMIC POINT TO POINT MOBILE NETWORK INCLUDING DESTINATION DEVICE ASPECTS SYSTEM AND METHOD

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation-in-part of U.S. patent application Ser. No. 13/891,369, entitled DYNAMIC POINT TO POINT MOBILE NETWORK SYSTEM AND METHOD, naming Roderick A. Hyde, Edward K. Y. Jung, Royce A. Levien, Richard T. Lord, Robert W. Lord, Mark A. Malamud, Doug O. Reudink and Clarence T. Tegreene as inventors, filed 10 May 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/927,870, entitled DYNAMIC POINT TO POINT MOBILE NETWORK INCLUDING ORIGINATION DEVICE ASPECTS SYSTEM AND METHOD, naming Roderick A. Hyde, Edward K. Y. Jung, Royce A. Levien, Richard T. Lord, Robert W. Lord, Mark A. Malamud, Doug O. Reudink and Clarence T. Tegreene as inventors, filed 26 Jun. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/934,389, entitled DYNAMIC POINT TO POINT MOBILE NETWORK INCLUDING INTERMEDIATE DEVICE ASPECTS SYSTEM AND METHOD, naming Roderick A. Hyde, Edward K. Y. Jung, Royce A. Levien, Richard T. Lord, Robert W. Lord, Mark A. Malamud, Doug O. Reudink and Clarence T. Tegreene as inventors, filed 3 Jul. 2013, which is currently co-pending or is an application of which a currently co-pending application is entitled to the benefit of the filing date.

For purposes of the USPTO extra-statutory requirements, the present application constitutes a continuation of United States Patent Application No. U.S. patent application Ser. No. 13/935,657, entitled DYNAMIC POINT TO POINT MOBILE NETWORK INCLUDING DESTINATION DEVICE ASPECTS SYSTEM AND METHOD, naming Roderick A. Hyde, Edward K. Y. Jung, Royce A. Levien, Richard T. Lord, Robert W. Lord, Mark A. Malamud, Doug O. Reudink, and Clarence T. Tegreene as inventors, filed 5 Jul. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/952,387, entitled DYNAMIC POINT TO POINT MOBILE NETWORK INCLUDING ORIGINATION DEVICE ASPECTS SYSTEM AND METHOD, naming Roderick A. Hyde, Edward K. Y. Jung, Royce A. Levien, Richard T. Lord, Robert W. Lord, Mark A. Malamud, Doug O. Reudink, and Clarence T. Tegreene as inventors, filed 26 Jul. 2013, which is currently co-pending or is an application of which a currently co-pending application is entitled to the benefit of the filing date.

RELATED APPLICATIONS

U.S. patent application Ser. No. 13/953,480, entitled DYNAMIC POINT TO POINT MOBILE NETWORK INCLUDING INTERMEDIATE DEVICE ASPECTS SYSTEM AND METHOD, naming Roderick A. Hyde, Edward K. Y. Jung, Royce A. Levien, Richard T. Lord, Robert W. Lord, Mark A. Malamud, Doug O. Reudink, and Clarence T. Tegreene as inventors, filed 29 Jul. 2013, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

SUMMARY

In one aspect, a computationally-implemented method includes, but is not limited to electronically receiving one or more at least partially mobile operating system operated intermediate electronic communication device relayed transmissions from one or more at least partially mobile operating system operated intermediate electronic communication devices activated from standby mode to be one or more communication network relays for use by one or more origination electronic communication devices to communicate at least in part with one or more destination electronic communication devices; obtaining information regarding at least in part the at least partially one or more mobile operating system operated intermediate electronic communication device relayed transmissions from the one or more at least partially mobile operating system operated intermediate electronic communication devices activated from standby mode to be one or more communication network relays; and electronically deriving one or more assessments associated at least in part with the one or more at least partially mobile operating system operated intermediate electronic communication device relayed transmissions from the one or more at least partially mobile operating system operated intermediate electronic communication devices activated from standby mode to be one or more communication network relays. In addition to the foregoing, other method aspects are described in the claims, drawings, and text forming a part of the disclosure set forth herein.

In one or more various aspects, related machines, compositions of matter, or manufactures of systems may include, but are not limited to, circuitry and/or programming for effecting the herein-referenced method aspects; the circuitry and/or programming can be virtually any combination of hardware, software, and/or firmware configured to effect the herein-referenced method aspects depending upon the design choices of the system designer (limited to patentable subject matter under 35 USC 101).

A computationally-implemented system includes, but is not limited to: means for electronically receiving one or more at least partially mobile operating system operated intermediate electronic communication device relayed transmissions from one or more at least partially mobile operating system operated intermediate electronic communication devices activated from standby mode to be one or more communication network relays for use by one or more origination electronic communication devices to communicate at least in part with one or more destination electronic communication devices; means for obtaining information regarding at least in part the at least partially one or more mobile operating system operated intermediate electronic communication device relayed transmissions from the one or more at least partially mobile operating system operated intermediate electronic communication devices activated from standby mode to be one or more communication network relays; and means for electronically deriving one or more assessments associated at least in part with the one or more at least partially mobile operating system operated intermediate electronic communication device relayed transmissions from the one or more at least partially mobile operating system operated intermediate electronic communication devices activated from standby mode to be one or more communication network relays. In addition to the foregoing, other system aspects are described in the claims, drawings, and text forming a part of the disclosure set forth herein.

A computationally-implemented system includes, but is not limited to electrical circuitry arrangement for electronically receiving mobile operating system operated intermediate electronic communication device relayed transmissions from mobile operating system operated intermediate electronic communication devices activated from standby mode to be communication network relays for use by origination electronic communication devices to communicate with destination electronic communication devices; electrical circuitry arrangement for obtaining information regarding mobile operating system operated intermediate electronic communication device relayed transmissions from mobile operating system operated intermediate electronic communication devices activated from standby mode to be communication network relays; and electrical circuitry arrangement for electronically deriving assessments associated with mobile operating system operated intermediate electronic communication device relayed transmissions from mobile operating system operated intermediate electronic communication devices activated from standby mode to be communication network relays. In addition to the foregoing, other system aspects are described in the claims, drawings, and text forming a part of the disclosure set forth herein.

A system includes, but is not limited to electronically receiving mobile operating system operated intermediate electronic communication device relayed transmissions from mobile operating system operated intermediate electronic communication devices activated from standby mode to be communication network relays for use by origination electronic communication devices to communicate with destination electronic communication devices module configured to operate in accordance with electronically receiving one or more at least partially mobile operating system operated intermediate electronic communication device relayed transmissions from one or more at least partially mobile operating system operated intermediate electronic communication devices activated from standby mode to be one or more communication network relays for use by one or more origination electronic communication devices to communicate at least in part with one or more destination electronic communication devices; obtaining information regarding mobile operating system operated intermediate electronic communication device relayed transmissions from mobile operating system operated intermediate electronic communication devices activated from standby mode to be communication network relays module configured to operate in accordance with obtaining information regarding at least in part the at least partially one or more mobile operating system operated intermediate electronic communication device relayed transmissions from the one or more at least partially mobile operating system operated intermediate electronic communication devices activated from standby mode to be one or more communication network relays; and electronically deriving assessments associated with mobile operating system operated intermediate electronic communication device relayed transmissions from mobile operating system operated intermediate electronic communication devices activated from standby mode to be communication network relays module configured to operate in accordance with electronically deriving one or more assessments associated at least in part with the one or more at least partially mobile operating system operated intermediate electronic communication device relayed transmissions from the one or more at least partially mobile operating system operated intermediate electronic communication devices activated from standby mode to be one or more communication network relays. In addition to the foregoing, other system aspects are described in the claims, drawings, and text forming a part of the disclosure set forth herein.

An article of manufacture including one or more non-transitory signal-bearing storage medium bearing one or more instructions for electronically receiving one or more at least partially mobile operating system operated intermediate electronic communication device relayed transmissions from one or more at least partially mobile operating system operated intermediate electronic communication devices activated from standby mode to be one or more communication network relays for use by one or more origination electronic communication devices to communicate at least in part with one or more destination electronic communication devices; one or more instructions for obtaining information regarding at least in part the at least partially one or more mobile operating system operated intermediate electronic communication device relayed transmissions from the one or more at least partially mobile operating system operated intermediate electronic communication devices activated from standby mode to be one or more communication network relays; and one or more instructions for electronically deriving one or more assessments associated at least in part with the one or more at least partially mobile operating system operated intermediate electronic communication device relayed transmissions from the one or more at least partially mobile operating system operated intermediate electronic communication devices activated from standby mode to be one or more communication network relays. In addition to the foregoing, other computer program product aspects are described in the claims, drawings, and text forming a part of the disclosure set forth herein.

A system including one or more computing devices; and one or more instructions when executed on the one or more computing devices cause the one or more computing devices to perform electronically receiving one or more at least partially mobile operating system operated intermediate electronic communication device relayed transmissions from one or more at least partially mobile operating system operated intermediate electronic communication devices activated from standby mode to be one or more communication network relays for use by one or more origination electronic communication devices to communicate at least in part with one or more destination electronic communication devices; obtaining information regarding at least in part the at least partially one or more mobile operating system operated intermediate electronic communication device relayed transmissions from the one or more at least partially mobile operating system operated intermediate electronic communication devices activated from standby mode to be one or more communication network relays; and electronically deriving one or more assessments associated at least in part with the one or more at least partially mobile operating system operated intermediate electronic communication device relayed transmissions from the one or more at least partially mobile operating system operated intermediate electronic communication devices activated from standby mode to be one or more communication network relays. In addition to the foregoing, other computer program product aspects are described in the claims, drawings, and text forming a part of the disclosure set forth herein.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise.

With reference now to the figures, shown are one or more examples of is an example of Dynamic Point to Point Mobile Network Including Destination Device Aspects System and Method that may provide context, for instance, in introducing one or more processes and/or devices described herein.

In accordance with 37 CFR 1.84(h)(2)

FIG. 1-A FIG. 1-B FIG. 1-C FIG. 1-D
FIG. 1-E FIG. 1-F FIG. 1-G FIG. 1-H
FIG. 1-I FIG. 1-J FIG. 1-K FIG. 1-L
FIG. 1-M FIG. 1-N FIG. 1-O FIG. 1-P
FIG. 1-Q FIG. 1-R FIG. 1-S FIG. 1-T

In accordance with 37 CFR 1.84(h)(2), FIG. 2 shows "a view of a large machine or device in its entirety . . . broken into partial views . . . extended over several sheets" labeled FIG. 2-A through FIG. 2-C (Sheets 21-24). The "views on two or more sheets form, in effect, a single complete view, [and] the views on the several sheets . . . [are] so arranged that the complete figure can be assembled" from "partial views drawn on separate sheets . . . linked edge to edge," in that (i) a "smaller scale view" is "included showing the whole formed by the partial views and indicating the positions of the parts shown," see 37 CFR 1.84(h)(2), and (ii) the partial-view FIGS. 2-A to 2-C are ordered alphabetically, by increasing column from left to right, as shown in the following table (with further orientation as indicated by tab-slot instructions on the partial-view figures):

FIG. 2-A FIG. 2-B FIG. 2-C

FIG. 3-A shows a schematic diagram of an implementation(s) of an environment(s) and/or an implementations(s) of technologies described herein including an implementation(s) of a base-station communication network system(s)

and an implementation(s) of a standby point-to-point communication network system(s).

Figure 4:
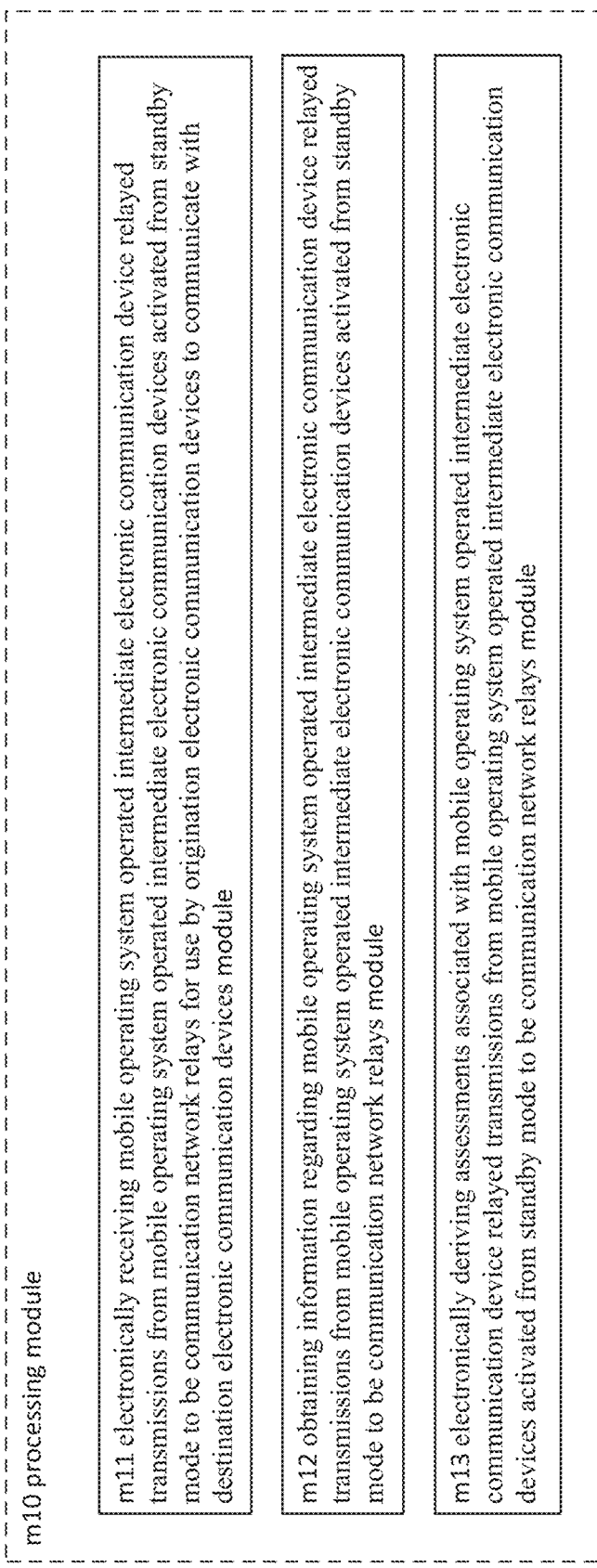

FIG. 4 shows a schematic diagram of an implementation(s) of a processing module.

FIG. 5 shows a partially schematic diagram of an implementation(s) of electronically receiving mobile operating system operated intermediate electronic communication device relayed transmissions from mobile operating system operated intermediate electronic communication devices activated from standby mode to be communication network relays for use by origination electronic communication devices to communicate with destination electronic communication devices module(s). FIG. 5 is inclusive of FIG. 5-A through FIG. 5-C (Sheets 27-29).

FIG. 6 shows a partially schematic diagram of an implementation(s) of obtaining information regarding mobile operating system operated intermediate electronic communication device relayed transmissions from mobile operating system operated intermediate electronic communication devices activated from standby mode to be communication network relays module(s). FIG. 6 is inclusive of FIG. 6-A through FIG. 6-D (Sheets 30-33).

FIG. 7 shows a partially schematic diagram of an implementation(s) of electronically deriving assessments associated with mobile operating system operated intermediate electronic communication device relayed transmissions from mobile operating system operated intermediate electronic communication devices activated from standby mode to be communication network relays module(s). FIG. 7 is inclusive of FIG. 7-A through FIG. 7-E (Sheets 34-38).

FIG. 8 shows a high-level flowchart illustrating an operational flow o10 representing exemplary operations related to operation o11, operation o12, and operation o13.

FIG. 9 shows a high-level flowchart including exemplary implementations of operation o11 of FIG. 8. FIG. 8 is inclusive of FIG. 9-A through FIG. 9-F (Sheets 40-45).

Figure 10:
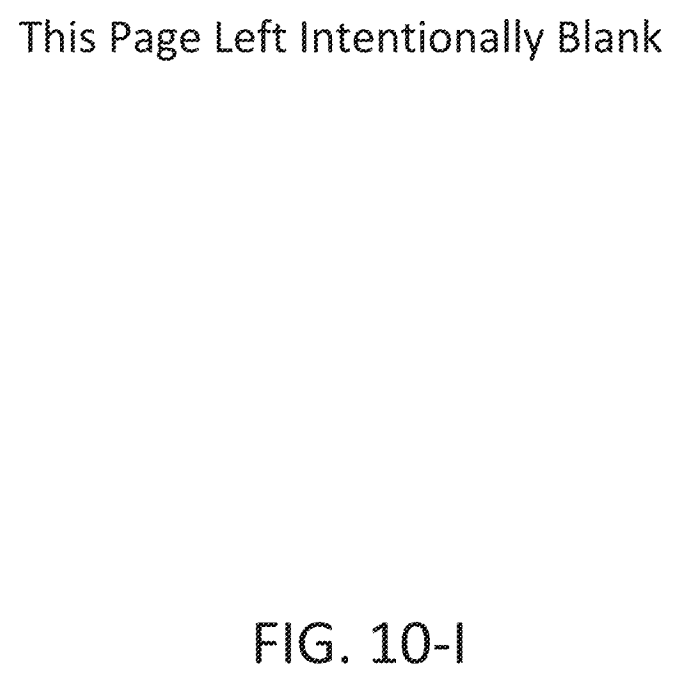

FIG. 10 shows a high-level flowchart including exemplary implementations of operation o12 of FIG. 8. FIG. 10 is inclusive of FIG. 10-A through FIG. 10-J (Sheets 46-55).

FIG. 11 shows a high-level flowchart including exemplary implementations of operation o13 of FIG. 8. FIG. 11 is inclusive of FIG. 11-A through FIG. 11-L (Sheets 56-67).

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present application may use formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Figure 1:
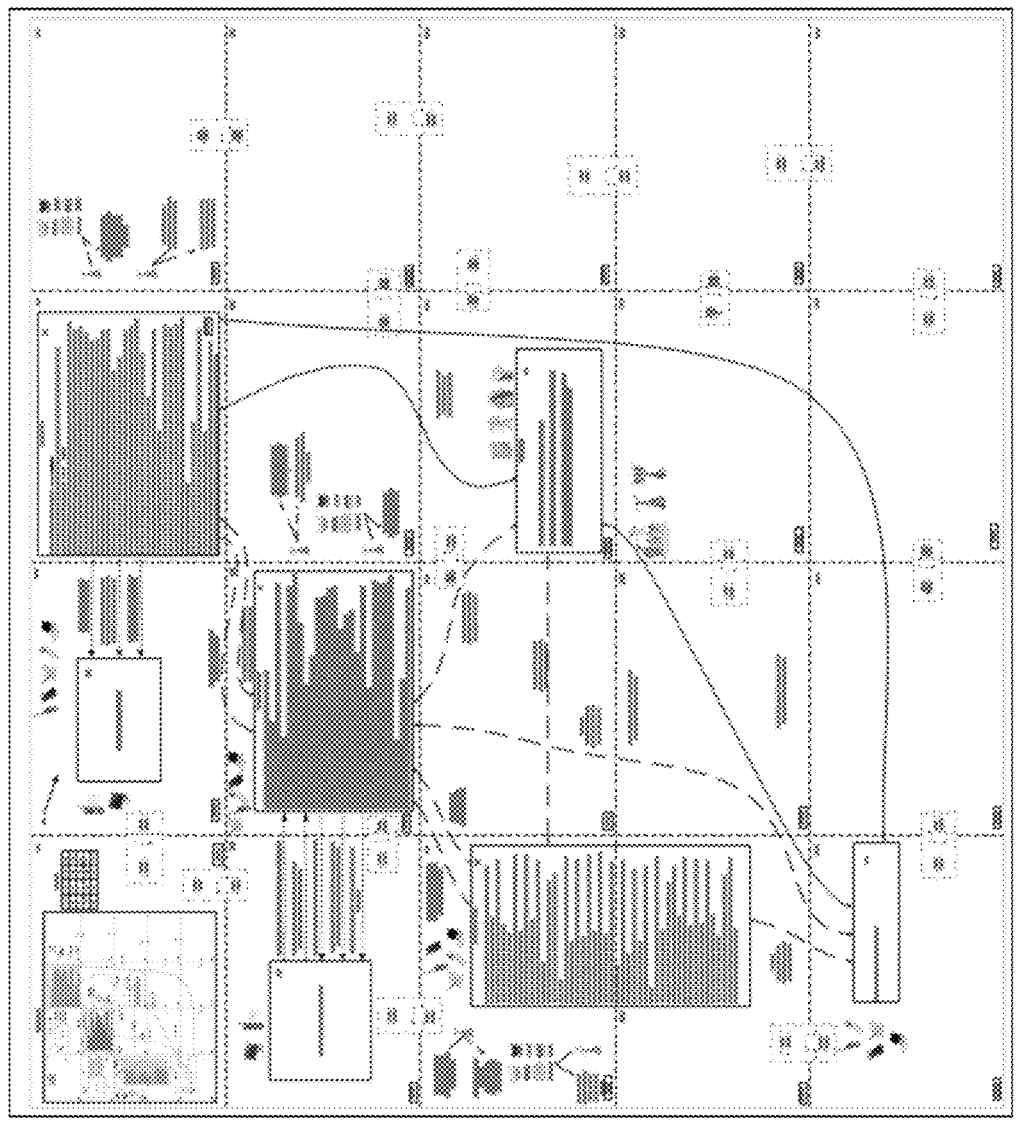
FIG. 1 shows "a view of a large machine or device in its entirety . . . broken into partial views . . . extended over several sheets" labeled FIG. 1-A through FIG. 1-T (Sheets 1-20). The "views on two or more sheets form, in effect, a single complete view, [and] the views on the several sheets . . . [are] so arranged that the complete figure can be assembled" from "partial views drawn on separate sheets . . . linked edge to edge," in that (i) a "smaller scale view" is "included showing the whole formed by the partial views and indicating the positions of the parts shown," see 37 CFR 1.84(h)(2), and (ii) the partial-view FIGS. 1-A to 1-T are ordered alphabetically, by increasing column from left to right, as shown in the following table (with further orientation as indicated by tab-slot instructions on the partial-view figures)
Figure 1:
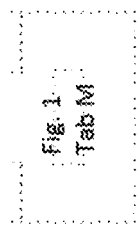
Figure 1:

As depicted in FIG. 1, a mobile network system 100 is shown to include a sender device 110 having a user interface 112, a receiver device 114, a base station 116, an intermediate device 118 having a user interface 120, and an intermediate device 122. The sender device 110, the receiver device 114, the intermediate device 118 and/or the intermediate device 122 can include but are not limited to one or more of the following: a mobile device, a tablet, a cell phone, a smart phone, a gaming unit, a laptop, a walkie-talkie, a notebook computer, a phablet, using operating systems including Android, iOS, Win 8 or other operating systems and/or including one or more other types of wireless mobile device. The mobile network system 100 provides for a conventional wireless network mode and also a hot standby point-to-point network mode. In some implementations there can be more intermediate devices than the intermediate device 118 and the intermediate device 122 and in other implementations there can be just the intermediate device 118 in the hot standby network. In some implementations, the sender device 110 can initiate a call or send a message to the receiver device 114 and in other implementations the reverse can occur where the receiver device 114 initiates a call or sends a message to the sender device 110. In implementations, the sender device 110 and the receiver device 114 can be involved with two-way communication where each device both sends messages to and receives messages from each other.

FIG. 1 depicts the conventional wireless network mode with solid arrows and the hot standby point-to-point network mode with dashed arrows. The conventional wireless network is shown supporting communication between the sender device 110 and the receiver device 114 either via the base station 116 or directly between the sender device and the receiver device. The hot standby point-to-point network mode uses one or more of the intermediate devices as in effect a replacement for the base station 116 when the base station becomes occluded to the sender device 110, the receiver device 114, and/or both the sender device and the receiver device. When activated the one or more intermediate devices can be used as in effect mini-base stations for high frequency directional transmissions. Since the communication is generally done through at least fairly directional acting beams, more than one intermediate device may be required to relay communication amongst the intermediate devices and consequently between the sender device 110 and the receiver device 114.

The hot standby point-to-point network in other words can thus be used to relay communication between the sender device 110 and the receiver device 114 when the base station 116 somehow becomes unavailable. The hot standby network is maintained to be continuously available as a backup network in case the conventional wireless network mode becomes unavailable for the sender device 110 and the receiver device 114 to communicate with each other. Part of this maintenance is performed by updating which devices can be used as intermediate devices at a present given moment if called upon at that moment. The devices are enrolled initially and their status is updated regarding their location and accessibility to each other and to the sender device 110 and the receiver device 114.

For instance, one or more at least relatively directional signals can be used to communicate between the sender device 110 and the receiver device 114, such as in the GHz range of frequencies including the 50-70 GHz range, including 60 GHz frequency. It is possible that these at least relatively directional signals can be blocked by physical objects or otherwise occluded so that the conventional mode of communication via the base station 116 may become unavailable to the sender device 110 and/or the receiver device 114. Such occlusive situations can occur more often at times in environments such as in dense urban (city, stadium, etc.) or dense non-urban (warehouses, parks, woods, etc.) environments. One or more intermediate devices can be included in the hot standby network based upon direct line of sight access to them through one or more best path determinations by one or more other devices (such as the sender device 110, the receiver device 114, and/or one or more of the intermediate devices) or alternatively based upon a form of non-direct access that is not line of sight but rather makes use of another means of access such as through one or more paths using one or more bank shots off of objects for the seeking beam and/or the communication beam to take to travel from its respective transmitting device to its respective receiving device.

In some implementations the sender device 110 monitors its accessibility to the base station 116 and reports on its accessibility to the intermediate device(s) in the hot standby network. The sender device 110 can also be used to update which of the intermediate device(s) are used for the hot standby network based upon intermediate device accessibility.

To maintain the hot standby network and accessibility thereof, the sender device 110 and the receiver device 114 (that are part of the hot standby network by virtue of being the continuing end points of the communication) and the one or more intermediate devices (that are at least momentarily also part of the hot standby network by virtue of their at least momentary accessibility to the sender device 110, the receiver device 114, and/or one or more of the other intermediate devices) can use various methods to search for, locate, maintain awareness of, etc., the accessibility of each other in the hot standby network.

In some implementations, the sender device 110 can take more of a management or status reporting role to the other devices of the hot standby network. In other implementations other devices, such as the receiver device 114, can take management or status reporting roles. Depending upon how each of the devices of the hot standby network are so configured one or more them can actively search, locate, maintain awareness, etc. of accessibility of each other by various methods and components. For instance, one or more of the devices such as the sender device 110 and/or the receiver device 114 can use a seeking beam (e.g. multiple beams, switching between single beams, beam diffraction, etc.) to determine which intermediate device(s) are accessible by the sender device 110 and which intermediate device(s) are accessible by the receiver device 114. Upon locating and/or determining one or more accessibilities of various devices such as the sender device 110, the receiver device 114, and/or one or more of the intermediate devices 118, a communication beam can be used for communication between the various devices.

Through these and/or various other measures the seeking beam can be swept or otherwise moved across a region in a rotating, zigzagged, patterned, and/or other fashion. In some implementations multiple seeking beams (e.g. from sender, intermediate, and/or receiver devices) can be moved at different speeds from each other to aid in thoroughly sweeping an area. The speeds used for sweeping the one or more seeking beams generally can be faster than walking speed for instance, but in other implementations speeds can be slowly as well. The one or more seeking beams can be used to also detect people, buildings, and other obstacles to better determine and/or update architecture and/or layout of the hot standby network. In some implementations one or more of the devices of the hot standby network can use one or more spread beams that are gradually narrowed down to optimize gain x bandwidth product for enhanced communication characteristics.

The sender device 110, the receiver device 114, and/or the one or more intermediate devices can use the one or more seeking beams to continually update which intermediate devices are being used for the hot standby network and when the hot standby network is activated for immediate use one or more communication beams can be used for negotiation and/or communication between two or more of the devices of the activated hot standby network. In other words, the one or more seeking beams can be used to acquire a target device as potentially available for immediate use by another device of the hot standby network and then the one or more communication beams can be used to transmit and/or receive one or more communication signals between the associated devices of the hot standby network.

In one or more implementations, the one or more seeking beams and/or the one or more communication beams can include 60 GHz and other frequencies used collectively. The devices of the hot standby network can include disparate devices such that, for example, the sender device 110 can be a smart phone, the intermediate device 118 can be a tablet whereas the intermediate device 122 can be a laptop and the receiver device 114 can be a cell phone. These one or more hybrid systems can all use one or more tokens or other identifiers to recognize the communicating users using the sender device 110 and the receiver device 114. In this manner the one or more hybrid systems of the disparate devices of the hot standby network can rely on other than solely one or more device identifiers but in addition or instead of can rely on one or more identifiers (such as tokens) that are directly associated with the one or more users of the devices (such as the sender device 110 and/or the receiver device 114).

In implementations one or more hybridized systems for the hot standby network can also use multiple different types of handsets hybridized together using different communication protocols such as 802.11 ad, 802.11 ac, 802.11n/g, standard cellular, etc. So in implementations, one or more hybridized systems can simultaneously use cell phone, tablet, TV, smart phone, laptop, etc. sharing connectivity relatively seamlessly as an integrated system. One or more hybridized systems can also use one or more hybridized bands (e.g. different frequencies for transmit and receive or for different devices and systems for same or similar functions, etc.). Through one or more hybridized systems the hot standby network can also extend paid or free Wi-Fi, other wireless networks and/or other paid or free networks. Technologies of the hot standby network can also support one or more IP based phone systems with multiple air interfaces. For an IP phone a phone number may be just an IP address rather than a conventional phone number.

To support implementations of one or more seeking beams and/or one or more communication beams by one or more hot standby network devices (such as the sender device 110, the receiver device 114, and/or one or more of the intermediate devices), one or more steerable antennas, one or more directional antennas, one or more omnidirectional antennas, and/or one or more other antennas can be located around one or more perimeters and/or peripherals of one or more of the hot standby devices. In implementations one or more transmitters can be used with changeable antenna architectures that can include various antenna types referenced above.

One or more mesh networks with one or more of the hot standby network devices (such as the sender device 110, the receiver device 114, and/or one or more of the intermediate devices) can each use multiple omnidirectional antennas for multiple simultaneous communication between associated hot standby network devices. Use of one or more mesh networks can allow for small cell size for use in stadiums, etc.

Before or during activation of the hot standby network, one or more of the devices (such as the sender device 110, the receiver device 114, and/or one or more of the intermediate devices) can use either one or more of the seeking beams and/or one or more of the communication beams to dialogue with one or more of the other devices of the hot standby network about how they can assist each other or negotiate with each other, or reform the hot standby network as accessibility between various of the devices or potential devices of the hot standby network may change.

In implementations, the devices of the hot standby network (such as the sender device 110, the receiver device 114, and/or one or more of the intermediate devices) can use vendor specific hardware or firmware rather than using an operating system to perform network administration tasks such as updating which intermediate devices are being used, etc. and/or to transmit and/or to receive communication data.

Other aspects of one or more implementations can include use of high speed data transmission between two or more of the devices of the hot standby network (such as the sender device 110, the receiver device 114, and/or one or more of the intermediate devices) to send information at high bandwidth greater than human bandwidth to cache, and sequentially dump to compensate for connection problems. For instance, the sender device 110 can send ahead communication data to one or more other devices of the hot standby network before a time that communication paths between the sender device 110 and the one or more other devices becomes blocked. This present communication data can then be sent on to the receiver device 114 also at high bandwidth if further blockages near the receiver device are anticipated or at a lesser rate dependent upon the human user operating the receiver device.

In this manner, the communication data is positioned closer to the receiver device 114 ahead of time before the user of the receiver device needs to receive the communication data so that there is still a high likelihood that if at least part of communication pathway to the receiver device is momentarily completely blocked that the communication data will still reach the receiver device in time for the user of the receiver device to not notice any communication problems. The hot standby network can also have more intermediate devices on standby than is necessary for a single path from the sender device 110 to the receiver device 114. Furthermore, the communication data can be positioned forward at multiple of the intermediate devices in case one or more of the multiple intermediate devices becomes blocked from sending the communication data on to the receiver device 114 at the appropriate time. The receiver device 114 could also include a data buffer to receive the forwarded communication data ahead of the time that the user of the receiver device 114 needs to receive the communication data for an additional or alternative way to insure reception of the communication data in time for the user of the receiver device to receive the communication data.

Implementations can also use digital maps either electronically stored internally with one or more of the devices of the hot standby network, or provided by a main device of the hot standby network such as the sender device 110 or the receiver device 114, or accessed online by the devices of the hot standby network, or elsewise acquired to determine hot standby network architecture of which intermediate devices to include in the hot standby network. Additionally or alternatively digital maps can be used to determine when the conventional base station network is available for use at least partially or fully.

Although two intermediate devices, namely the intermediate device 118 and the intermediate device 122, have been depicted in the FIG. 1 as being part of the hot standby network, the number of intermediate devices can change from as few as zero in some implementations if the sender device 110 and the receiver device 114 can communicate directly with each other over the hot standby network to multiple numbers of intermediate devices more than the two depicted. The number of intermediate devices considered part of the hot standby network can change during the time that the hot standby network is considered to be in standby mode wherein the hot standby network is not being used for communication between the sender device 110 and the receiver device 114.

The number of intermediate devices considered part of the hot standby network can change during the time that the hot standby network is considered to be in active mode as well wherein the hot standby network is being used for communication between the sender device 110 and the receiver device 114. Reasons for changes in the numbers of intermediate devices considered to be part of the hot standby network during standby and active modes of the hot standby network can include changes in positioning of the sender device 110, the receiver device 114, and/or one or more of the intermediate devices that are either currently considered or not consider part of the hot standby network. Changes in positioning of other physical objects such as people, vehicles, structures, etc. can also influence how many and which in particular of the intermediate devices that may at any given moment be consider part of the hot standby network.

Other considerations for when a device can be considered as an intermediate that is part of the hot standby network in the standby or active mode of the hot standby network may include situations where users of one or more of the intermediate devices may change their status of how they are using their respective intermediate devices. For instance, the users may start using their intermediate devices to an extent that makes their intermediate devices no longer available for the hot standby network. Or the users may stop using their intermediate devices to an extent that they become available for use by the hot standby network if needed. There may be other considerations involved such as certain payment structures being implemented to pay the users of the intermediate devices thereby stipulating that the intermediate devices only have to be available for a certain length of time, or period of time, or certain days of the week, or only if the devices are located in certain specified locations, etc. Other considerations regarding when the intermediate devices are considered part of the hot standby network can also exist as well such as whether the device's battery power level is above a certain threshold.

At one or more points in time users and/or owners of devices that are potentially capable of being used as intermediate devices can negotiate through their respective intermediate devices, through online internet access, through phone, or other access with one or more base station providers or other entities to become eligible to be an intermediate device. After this negotiation is successful, the device associated with the negotiation can be placed on an list of eligible devices, and/or assigned an access function, etc. so that when the device is in an area to serve as an intermediate device, it can be recognized by devices of the hot network standby network as it becomes accessible to these devices.

With these one or more negotiations various stipulations can be put forth by one or more of the parties involved with the negotiations. Such negotiations can include minimum battery power levels required by the device to be accessible as an intermediate device of the hot standby network. Other stipulations can include various credits to be used by the user of the device being enrolled as a potential intermediate device with the hot standby network and/or one or more conventional carrier networks. Credits can include the device seeking its user's permission to be put in standby mode for air time, system minutes, or other commercial incentive.

As an intermediate device in the hot standby network, the intermediate device can receive status of the sender device's accessibility of its base station. The intermediate device can monitor power levels its battery for performing networking and other communication functions.

As a receiver device, the receiver device in the hot standby network can receive transmissions from one or more of the intermediate devices and thereby is in a position to assess performance of such transmissions. The receiver device can also collect other information either through information contained directly in the transmissions received from the intermediate devices or can obtain other information elsewhere that can subsequently be used by the receiver device to derive or otherwise arrive at various rankings, listings, reports, and other assessments of how the intermediate devices in their standby network function are functioning. This can also be compared to one or more base station based network to help facilitate understanding of the assessments.

Turning now to FIG. 2, the receiver device 114 (also known herein as an destination electronic communication device) is shown in FIG. 2A as an implementation of the receiver device shown in FIG. 1. Referring again to FIG. 2A, the destination electronic communication device 114 may include a processor 130, a memory 132, and a mobile operating system 134 communicatively linked thereto. The mobile operating system 134 may include processing module m10, which may further include modules (some of which are described below), and virtual machines 136 (such as process virtual machines, virtual machines of hardware, virtual machines of virtual machines, Java virtual machines, Dalvik virtual machines, virtual machines for use with Android operating systems such as Samsung or Google mobile devices or for use with other mobile operating systems such as Apple iOS on Microsoft Windows based mobile operating systems, etc.). The origination electronic communication device 110 may also include device 140, which may include user interface 142, device input 144, and device output 146.

Implementations of processor 130 may include one or more microprocessors, central processing units, graphics processing units, digital signal processors, network processors, floating point processors, physics processing units, or other processors. Other implementations may include processor 130 as a distributed-core processor, server based processor, as part of multiple processors distributed over one or many other user devices in addition to origination electronic communication device 110. Furthermore processor 130 may execute computer readable instructions to execute one or more operations described herein. In implementations, processor 130 may operate as processing module m10, which may include one or more modules described below.

Implementations of memory 132 may cache memory such as random access memory (RAM), flash memory, synchronous random access memory (SRAM), dynamic random access memory (DRAM), other memory, read only memory ("ROM"), flash memory, hard drives, disk-based media, disc-based media, magnetic storage, optical storage, volatile memory, nonvolatile memory, separated from device 130 (such as on a network, server), mass storage, programmable read-only memory (PROM), erasable programmable read-only memory (EPROM), and/or other types of memory.

Referring again to FIG. 2A, implementations of device interface 140 may include one or more components to provide ways that origination electronic communication device 110 can input and output information with its environment and/or user. These components of device interface 140 may include one or more sensors, e.g., a camera, a microphone, an accelerometer, a thermometer, a satellite positioning system (SPS) sensor, a barometer, a humidity sensor, a compass, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), a radio, including a wireless radio, a transmitter, a receiver, an emitter, a broadcaster, etc., and other components as well to serve input and output functions such as for device input 144 and device output 146.

User interface 142 may include any hardware, software, firmware, and combination thereof to provide capability for a user thereof to interact with origination device 110. Implementations of user interface 142 can include a monitor, screen, touchscreen, liquid crystal display ("LCD") screen, light emitting diode ("LED") screen, speaker, handset, earpiece, keyboard, keypad, touchpad, mouse, trackball, remote control, button set, microphone, video camera, still camera, a charge-coupled device ("CCD") element, a photovoltaic element, etc.

Referring now to FIG. 3A, FIG. 3A depicts one or more systems involving base station based networks and standby point-to-point mobile network systems as described above for FIG. 1. As described, sender device 110 (also known herein as "origination electronic communication device") can communicate with receiver device 114 (also known herein as "destination electronic communication device") through one or more point-to-point communication networks 102, otherwise known in general as relay communication networks, provided by one or more networked base stations 116 and/or intermediate electronic communication devices (such as the intermediate electronic communication devices 118 or 122) dependent upon whether communication with the one or more base stations is occluded.

Implementations of modules can involve different combinations (limited to patentable subject matter under 35 U.S.C. 101) of one or more aspects from one or more electrical circuitry arrangements and/or one or more aspects from one or more instructions.

In one or more implementations, as shown in FIG. 4, the processing module m10 may include electronically receiving mobile operating system operated intermediate electronic communication device relayed transmissions from mobile operating system operated intermediate electronic communication devices activated from standby mode to be communication network relays for use by origination electronic communication devices to communicate with destination electronic communication devices module m11.

In one or more implementations, as shown in FIG. 4, the processing module m10 may include obtaining information regarding mobile operating system operated intermediate electronic communication device relayed transmissions from mobile operating system operated intermediate electronic communication devices activated from standby mode to be communication network relays module m12.

In one or more implementations, as shown in FIG. 4, the processing module m10 may include electronically deriving assessments associated with mobile operating system operated intermediate electronic communication device relayed transmissions from mobile operating system operated intermediate electronic communication devices activated from standby mode to be communication network relays module m13.

In one or more implementations, as shown in FIG. 5A, module m11 may include accessing data from a data source via a virtual machine representation a computing machine including accessing data from a data source via a virtual machine representation a real machine module m1101.

In one or more implementations, as shown in FIG. 5A, module m11 may include accessing data from a data source via a virtual machine representation a computing machine including accessing data from a data source via a virtual machine representation a virtual machine module m1102.

In one or more implementations, as shown in FIG. 5A, module m11 may include accessing data from a data source via a virtual machine representation a virtual machine including converting a file having a file-type associated with virtual machine to a file-type associated with virtual machine representation module m1103.

In one or more implementations, as shown in FIG. 5A, module m1103 may include wherein file-type associated with second virtual machine is configured for a limited-resource computing machine module m1104.

In one or more implementations, as shown in FIG. 5A, module m1104 may include wherein file-type associated with second virtual machine is configured for a mobile computing machine module m1105.

In one or more implementations, as shown in FIG. 5A, module m11 may include mobile operating system operated intermediate electronic communication devices being activated from standby mode based upon direct access by origination electronic communication devices to base stations of base station based communication networks becoming unavailable to origination electronic communication devices module m1106.

In one or more implementations, as shown in FIG. 5A, module m11 may include relayed transmissions being received after prior transmissions from mobile operating system operated intermediate electronic communication devices as mobile handset communication devices for communication with users of other mobile handset communication devices module m1107.

In one or more implementations, as shown in FIG. 5B, module m11 may include receiving wireless packetized communication module m1108.

In one or more implementations, as shown in FIG. 5B, module m1108 may include receiving incoming message traffic module m1109.

In one or more implementations, as shown in FIG. 5B, module m1109 may include receiving high bandwidth data transfers module m1110.

In one or more implementations, as shown in FIG. 5B, module m1109 may include receiving high resolution audio formatted messages module m1111.

In one or more implementations, as shown in FIG. 5B, module m1109 may include receiving high resolution video formatted messages module m1112.

In one or more implementations, as shown in FIG. 5B, module m1109 may include receiving high capacity data files module m1113.

In one or more implementations, as shown in FIG. 5B, module m1108 may include receiving mobile operating system operated intermediate electronic communication device relayed transmissions being originated from origination electronic communication devices module m1114.

In one or more implementations, as shown in FIG. 5B, module m1108 may include receiving mobile operating system operated intermediate electronic communication device relayed transmissions from intermediate electronic communication devices module m1115.

In one or more implementations, as shown in FIG. 5B, module m1108 may include receiving mobile operating system operated intermediate electronic communication device relayed transmissions from base stations of base station based communication networks module m1116.

In one or more implementations, as shown in FIG. 5B, module m1108 may include receiving mobile operating system operated intermediate electronic communication device relayed transmissions from electronic communication devices as heterogeneous types module m1117.

In one or more implementations, as shown in FIG. 5B, module m1117 may include receiving relayed transmissions from laptops, phablets, tablets, smart phones, notebooks, handsets, palmtops, personal digital assistants, digital audio players, portable media players, digital cameras, or cell phones module m1118.

In one or more implementations, as shown in FIG. 5B, module m1117 may include receiving relayed transmissions as using hybridized protocols including IEEE 802.11ac protocols, IEEE 802.11ad protocols, or IEEE 802.11n/g protocols module m1119.

In one or more implementations, as shown in FIG. 5C, module m1117 may include receiving relayed transmissions as using cellular protocols module m1120.

In one or more implementations, as shown in FIG. 5C, module m1117 may include receiving relayed transmissions as using WiFi protocols, or direct WiFi protocols module m1121.

In one or more implementations, as shown in FIG. 5C, module m1117 may include receiving relayed transmissions as using protocols including 3G protocols, 4G protocols, 5G protocols, 6G or 7G protocols module m1122.

In one or more implementations, as shown in FIG. 5C, module m1117 may include receiving relayed transmissions as using protocols including 20 GHz or above protocols, 30 GHz or above protocols, or 60 GHz or above protocols module m1123.

In one or more implementations, as shown in FIG. 5C, module m1117 may include receiving electronic token identifiers independent from device type of intermediate electronic communication devices module m1124.

In one or more implementations, as shown in FIG. 5C, module m1117 may include receiving rotating communication beams, alternating communication beams, sweeping communication beams, multiple communication beams, switching communication beams, or diffracted communication beams module m1125.

In one or more implementations, as shown in FIG. 5C, module m1117 may include receiving from multiple antennas, directional antennas, changeable antenna architectures, mesh network antennas, or omnidirectional antennas module m1126.

In one or more implementations, as shown in FIG. 6A, module m12 may include obtaining information contained in mobile operating system operated intermediate electronic communication device relayed transmissions module m1201.

In one or more implementations, as shown in FIG. 6A, module m1201 may include obtaining information regarding obstructed communication paths that intermediate electronic communication devices have encountered when attempting to communicate with devices other than origination electronic communication devices module m1202.

In one or more implementations, as shown in FIG. 6A, module m1202 may include obtaining location information regarding moveable objects that have previously obstructed communication intermediate electronic communication devices module m1203.

In one or more implementations, as shown in FIG. 6A, module m1202 may include obtaining location information regarding fixed position objects that have previously obstructed communication intermediate electronic communication devices module m1204.

In one or more implementations, as shown in FIG. 6A, module m1201 may include obtaining information regarding map data of locations of fixed position objects module m1205.

In one or more implementations, as shown in FIG. 6A, module m1201 may include obtaining information regarding time based distributions of instances of obstruction of electronic device communication for particular geographical locations module m1206.

In one or more implementations, as shown in FIG. 6A, module m1201 may include obtaining information contained in mobile operating system operated intermediate electronic communication device relayed transmissions including obtaining information regarding statistical probabilities of remaining in communication with intermediate electronic communication devices module m1207.

In one or more implementations, as shown in FIG. 6A, module m1201 may include obtaining information contained in mobile operating system operated intermediate electronic communication device relayed transmissions including obtaining information regarding distances from intermediate electronic communication devices to destination electronic communication devices module m1208.

In one or more implementations, as shown in FIG. 6A, module m1201 may include obtaining information contained in mobile operating system operated intermediate electronic communication device relayed transmissions including obtaining GPS positioning data regarding intermediate electronic communication devices module m1209.

In one or more implementations, as shown in FIG. 6B, module m1201 may include obtaining information associated with communication histories of other electronic communication devices communicating with intermediate electronic communication devices module m1210.

In one or more implementations, as shown in FIG. 6B, module m1210 may include obtaining information as positioning data for other electronic communication devices module m1211.

In one or more implementations, as shown in FIG. 6B, module m1210 may include obtaining information as communication history data previously stored and forwarded between electronic communication devices module m1212.

In one or more implementations, as shown in FIG. 6B, module m1201 may include obtaining information regarding potential obstructions to electronic communication located proximate to intermediate electronic communication devices module m1213.

In one or more implementations, as shown in FIG. 6B, module m1213 may include obtaining information regarding moveable communication obstructions module m1214.

In one or more implementations, as shown in FIG. 6B, module m1214 may include obtaining information regarding moveable communication obstructions as pedestrians module m1215.

In one or more implementations, as shown in FIG. 6B, module m1213 may include obtaining information regarding potential obstructions to electronic communication as architectural structures module m1216.

In one or more implementations, as shown in FIG. 6B, module m1216 may include obtaining information regarding architectural communication obstructions as stadiums module m1217.

In one or more implementations, as shown in FIG. 6B, module m1201 may include obtaining information regarding potential obstructions to point-to-point electronic communication with origination electronic communication device that are proximate to origination communication devices module m1218.

In one or more implementations, as shown in FIG. 6B, module m1218 may include obtaining information regarding moveable objects as obstructions to electronic communication with origination electronic communication devices module m1219.

In one or more implementations, as shown in FIG. 6B, module m1219 may include obtaining information regarding moveable communication obstructions as motor vehicles module m1220.

In one or more implementations, as shown in FIG. 6C, module m1218 may include obtaining information regarding potential obstructions to point-to-point electronic communication with origination electronic communication device as architectural structures module m1221.

In one or more implementations, as shown in FIG. 6C, module m1221 may include obtaining information regarding potential obstructions to point-to-point electronic communication with origination electronic communication device as architectural structures including obtaining information regarding architectural communication obstructions as downtown skyscraper buildings module m1222.

In one or more implementations, as shown in FIG. 6C, module m1201 may include obtaining information regarding potential obstructions to electronic communication with destination electronic communication devices proximate to destination electronic communication devices module m1223.

In one or more implementations, as shown in FIG. 6C, module m1223 may include obtaining information regarding moveable communication obstructions module m1224.

In one or more implementations, as shown in FIG. 6C, module m1224 may include obtaining information regarding audiences of human spectators module m1225.

In one or more implementations, as shown in FIG. 6C, module m1223 may include obtaining information regarding communication obstructions as architectural structures module m1226.

In one or more implementations, as shown in FIG. 6C, module m1226 may include obtaining information regarding transportation tunnels module m1227.

In one or more implementations, as shown in FIG. 6C, module m1201 may include obtaining information regarding communication capacity available to standby communication relays furnished by intermediate electronic communication devices module m1228.

In one or more implementations, as shown in FIG. 6C, module m1228 may include obtaining information regarding communication bandwidth available to standby communication relays furnished by intermediate electronic communication devices module m1229.

In one or more implementations, as shown in FIG. 6D, module m1228 may include obtaining information regarding runtime duration available to standby communication relays by intermediate electronic communication devices module m1230.

In one or more implementations, as shown in FIG. 6D, module m1230 may include obtaining information regarding runtime duration available regarding battery level available to intermediate electronic communication devices module m1231.

In one or more implementations, as shown in FIG. 6D, module m1230 may include obtaining information regarding runtime duration available regarding predetermined commitments for other uses of intermediate electronic communication devices module m1232.

In one or more implementations, as shown in FIG. 6D, module m1230 may include obtaining information regarding runtime duration available regarding potential obstructed communication paths of intermediate electronic communication devices module m1233.

In one or more implementations, as shown in FIG. 6D, module m1201 may include obtaining information regarding quality of service of communication available to standby communication network relay as furnished by intermediate electronic communication devices module m1234.

In one or more implementations, as shown in FIG. 6D, module m1201 may include obtaining information regarding economic cost structures to be imposed associated with standby communication relays furnished by intermediate electronic communication devices module m1235.

In one or more implementations, as shown in FIG. 6D, module m1235 may include obtaining information regarding commercial credit or cash requirements to access of standby communication relays as furnished by intermediate electronic communication devices module m1236.

In one or more implementations, as shown in FIG. 6D, module m1201 may include obtaining information regarding intermediate electronic communication devices as having communication paths including line of sight pathways or ricochet pathways module m1237.

In one or more implementations, as shown in FIG. 7A, module m13 may include deriving assessments associated with mobile operating system operated intermediate electronic communication device relayed transmissions through receiving information module m1301.

In one or more implementations, as shown in FIG. 7A, module m1301 may include receiving information involving access of data storage module m1302.

In one or more implementations, as shown in FIG. 7A, module m1301 may include receiving information involving receiving wireless transmissions module m1303.

In one or more implementations, as shown in FIG. 7A, module m1301 may include receiving location information regarding moveable objects that have previously obstructed communication of communication network relays furnished by intermediate electronic communication devices module m1304.

In one or more implementations, as shown in FIG. 7A, module m1301 may include receiving information regarding statistical probabilities of remaining in communication with communication network relays furnished by intermediate electronic communication devices module m1305.

In one or more implementations, as shown in FIG. 7A, module m1301 may include receiving GPS positioning data regarding network communication relays furnished by intermediate electronic communication devices module m1306.

In one or more implementations, as shown in FIG. 7A, module m1301 may include receiving information regarding potential obstructions to electronic network relay communication located proximate to intermediate electronic communication devices module m1307.

In one or more implementations, as shown in FIG. 7A, module m1301 may include receiving information associated with communication histories of successful communications of other electronic communication devices communicating with network communication relays as furnished by intermediate electronic communication device module m1308.

In one or more implementations, as shown in FIG. 7A, module m1308 may include receiving information as communication history data previously stored and forwarded between electronic communication devices module m1309.

In one or more implementations, as shown in FIG. 7A, module m1301 may include receiving information regarding communication capacity available to standby communication network relays furnished by intermediate electronic communication device module m1310.

In one or more implementations, as shown in FIG. 7B, module m1301 may include receiving information regarding potential obstructions to electronic communication with origination electronic communication devices that are proximate to origination communication devices module m1311.

In one or more implementations, as shown in FIG. 7B, module m1304 may include receiving information from fixed position communication network base stations module m1312.

In one or more implementations, as shown in FIG. 7B, module m1304 may include receiving information regarding potential obstructions to electronic relay network communication with destination electronic communication devices proximate to destination electronic communication devices module m1313.

In one or more implementations, as shown in FIG. 7B, module m1301 may include receiving service quality ratings regarding communication network relays as furnished by intermediate electronic communication devices module m1314.

In one or more implementations, as shown in FIG. 7B, module m1301 may include receiving cost ratings involved with standby network service plans associated with communication network relays as furnished by intermediate electronic communication devices module m1315.

In one or more implementations, as shown in FIG. 7B, module m1301 may include receiving availability forecast ratings involved with standby network communication relays as furnish by intermediate electronic communication devices module m1316.

In one or more implementations, as shown in FIG. 7B, module m1301 may include receiving reliability ratings involved with standby network relays as furnished by intermediate electronic communication devices module m1317.

In one or more implementations, as shown in FIG. 7B, module m1301 may include receiving duration of connection ratings involved with communication network relays as furnished by intermediate electronic communication devices module m1318.

In one or more implementations, as shown in FIG. 7B, module m1301 may include receiving communication bandwidth ratings involved with potential standby communication networks associated with communication network relays as furnished by intermediate electronic communication devices module m1319.

In one or more implementations, as shown in FIG. 7C, module m13 may include determining ratings of communication relay networks comprised by of intermediate electronic communication devices module m1320.

In one or more implementations, as shown in FIG. 7C, module m1320 may include determining service quality ratings regarding communication network relays as intermediate electronic communication devices module m1321.

In one or more implementations, as shown in FIG. 7C, module m1320 may include determining cost ratings involved with standby network service plans associated with communication network relays as provided by intermediate electronic communication devices module m1322.

In one or more implementations, as shown in FIG. 7C, module m1320 may include determining availability forecast ratings involved with standby networks associated with communication network relays of intermediate electronic communication devices module m1323.

In one or more implementations, as shown in FIG. 7C, module m1320 may include determining reliability ratings involved with relay networks associated with intermediate electronic communication devices module m1324.

In one or more implementations, as shown in FIG. 7C, module m1320 may include determining duration of connection ratings involved with communication network relays provided by intermediate electronic communication devices module m1325.

In one or more implementations, as shown in FIG. 7C, module m1320 may include communication bandwidth ratings involved with standby communication relay networks associated with intermediate electronic communication devices module m1326.

In one or more implementations, as shown in FIG. 7C, module m13 may include determining comparison ratings between fixed base station networks and communication relay networks of intermediate electronic communication devices module m1327.

In one or more implementations, as shown in FIG. 7C, module m1327 may include determining service quality comparison ratings between fixed base station communication networks and relay networks based on intermediate electronic communication devices module m1328.

In one or more implementations, as shown in FIG. 7C, module m1327 may include determining cost profile comparison ratings between fixed base station communication networks and communication relay networks based on intermediate electronic communication devices module m1329.

In one or more implementations, as shown in FIG. 7D, module m1327 may include determining availability forecast comparison ratings between fixed base station communication networks and network relays furnished by intermediate electronic communication devices module m1330.

In one or more implementations, as shown in FIG. 7D, module m1327 may include determining reliability comparison ratings between fixed base station communication networks and communication relay networks furnished by intermediate electronic communication devices module m1331.

In one or more implementations, as shown in FIG. 7D, module m1327 may include determining duration of connections comparison ratings between fixed base station communication networks and communication relay networks of intermediate electronic communication devices module m1332.

In one or more implementations, as shown in FIG. 7D, module m1327 may include determining bandwidth capacity comparison ratings between fixed base station communication networks and relay networks of intermediate electronic communication devices module m1333.

In one or more implementations, as shown in FIG. 7D, module m13 may include determining communication service ratings for communication with destination electronic communication devices module m1334.

In one or more implementations, as shown in FIG. 7D, module m1334 may include determining communication service ratings for destination electronic communication devices regarding use of fixed base station communication networks for communication therewith module m1335.

In one or more implementations, as shown in FIG. 7D, module m1334
may include determining communication service ratings for destination electronic communication devices regarding use of relay communication networks for communication therewith module m1336.

In one or more implementations, as shown in FIG. 7D, module m1334 may include determining communication service ratings for destination electronic communication devices regarding communication service quality for communication therewith module m1337.

In one or more implementations, as shown in FIG. 7E, module m1334 may include determining communication service ratings for destination electronic communication devices regarding financial costs associated with communication therewith module m1338.

In one or more implementations, as shown in FIG. 7E, module m1334 may include determining communication service ratings for destination electronic communication devices regarding forecasted availability of destination electronic communication devices for communication therewith module m1339.

In one or more implementations, as shown in FIG. 7E, module m1334 may include determining communication service ratings for destination electronic communication devices regarding communication reliability of destination electronic communication devices for communication therewith module m1340.

In one or more implementations, as shown in FIG. 7E, module m1334 may include determining communication service ratings for destination electronic communication devices regarding duration of connection time available of destination electronic communication devices for communication therewith module m1341.

In one or more implementations, as shown in FIG. 7E, module m1334 may include determining communication service ratings for destination electronic communication devices regarding communication bandwidth of destination electronic communication devices for communication therewith module m1342.

In one or more implementations, as shown in FIG. 7E, module m13 may include determining map data related to destination electronic communication devices regarding communication therewith module m1343.

In one or more implementations, as shown in FIG. 7E, module m1343 may include determining map data regarding obstructions to communication with intermediate electronic communication devices module m1344.

In one or more implementations, as shown in FIG. 7E, module m1343 may include determining map data regarding location data of fixed position base stations module m1345.

In one or more implementations, as shown in FIG. 7E, module m1343 may include determining map data regarding location data of destination electronic communication device module m1346.

An operational flow o10 as shown in FIG. 8 represents example operations related to electronically receiving one or more at least partially mobile operating system operated intermediate electronic communication device relayed transmissions from one or more at least partially mobile operating system operated intermediate electronic communication devices activated from standby mode to be one or more communication network relays for use by one or more origination electronic communication devices to communicate at least in part with one or more destination electronic communication devices; obtaining information regarding at least in part the at least partially one or more mobile operating system operated intermediate electronic communication device relayed transmissions from the one or more at least partially mobile operating system operated intermediate electronic communication devices activated from standby mode to be one or more communication network relays; and electronically deriving one or more assessments associated at least in part with the one or more at least partially mobile operating system operated intermediate electronic communication device relayed transmissions from the one or more at least partially mobile operating system operated intermediate electronic communication devices activated from standby mode to be one or more communication network relays.

FIG. 8 and those figures that follow may have various examples of operational flows, and explanation may be provided with respect to the above-described examples and/or with respect to other examples and contexts. Nonetheless, it should be understood that the operational flows may be executed in a number of other environments and contexts, and/or in modified versions. Furthermore, although the various operational flows are presented in the sequence(s) illustrated, it should be understood that the various operations may be performed in other orders than those which are illustrated, or may be performed concurrently.

In FIG. 8 and those figures that follow, various operations may be depicted in a box-within-a-box manner. Such depictions may indicate that an operation in an internal box may comprise an optional exemplary implementation of the operational step illustrated in one or more external boxes. However, it should be understood that internal box operations may be viewed as independent operations separate from any associated external boxes and may be performed in any sequence with respect to all other illustrated operations, or may be performed concurrently.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

In one or more implementations, as shown in FIG. 8, the operational flow o10 proceeds to operation o11 for electronically receiving one or more at least partially mobile operating system operated intermediate electronic communication device relayed transmissions from one or more at least partially mobile operating system operated intermediate electronic communication devices activated from standby mode to be one or more communication network relays for use by one or more origination electronic communication devices to communicate at least in part with one or more destination electronic communication devices. Origination of a physically tangible component group can be accomplished through skilled in the art design choice selection including use of one or more components and/or subsystems explicitly and/or implicitly referred to herein for at least in part implementing execution of one or more instructions i11 of the operation o11, for performance of the operation o11 by an electrical circuitry arrangement e11 as activated thereto, and/or otherwise fulfillment of the operation o11. One or more non-transitory signal bearing physical media can bear the one or more instructions i11 that when executed can direct performance of the operation o11. Furthermore, electronically receiving mobile operating system operated intermediate electronic communication device relayed transmissions from mobile operating system operated intermediate electronic communication devices activated from standby mode to be communication network relays for use by origination electronic communication devices to communicate with destination electronic communication devices module m11 depicted in FIG. 4 as being included in the processing module m10, when executed and/or activated, can direct performance of and/or perform the operation o11. Illustratively, in one or more implementations, the operation o11 can be carried out, for example, by electronically receiving (e.g. wireless reception, etc.) one or more at least partially mobile operating system operated (e.g. mobile Android, mobile iOS, mobile Windows, etc.) intermediate electronic communication device (e.g. smart phone, laptop, tablet, etc.) relayed (e.g. repeated, relayed, switched, etc.) transmissions (e.g. wireless transmissions, etc.) from one or more at least partially mobile operating system operated intermediate electronic communication devices (e.g. iPhone, etc.) activated (e.g. put in active network relay service, etc.) from standby mode (e.g. committed to be activated, but not yet so, etc.) to be one or more communication network relays (e.g. forwarding, switching, relaying, repeating, etc.) for use by one or more origination electronic communication devices (e.g. phablet, etc.) to communicate (e.g. two-way conversation, video streaming, etc.) at least in part with one or more destination electronic communication devices (e.g. mobile handset, computer, laptop, etc.).

In one or more implementations, as shown in FIG. 8, the operational flow o10 proceeds to operation o12 for obtaining information regarding at least in part the at least partially one or more mobile operating system operated intermediate electronic communication device relayed transmissions from the one or more at least partially mobile operating system operated intermediate electronic communication devices activated from standby mode to be one or more communication network relays. Origination of a physically tangible component group can be accomplished through skilled in the art design choice selection including use of one or more components and/or subsystems explicitly and/or implicitly referred to herein for at least in part implementing execution of one or more instructions i12 of the operation o12, for performance of the operation o12 by an electrical circuitry arrangement e12 as activated thereto, and/or otherwise fulfillment of the operation o12. One or more non-transitory signal bearing physical media can bear the one or more instructions i12 that when executed can direct performance of the operation o12. Furthermore, obtaining information regarding mobile operating system operated intermediate electronic communication device relayed transmissions from mobile operating system operated intermediate electronic communication devices activated from standby mode to be communication network relays module m12 depicted in FIG. 4 as being included in the processing module m10, when executed and/or activated, can direct performance of and/or perform the operation o12. Illustratively, in one or more implementations, the operation o12 can be carried out, for example, by obtaining information (accessing, receiving, etc.) regarding at least in part the at least partially one or more mobile operating system operated (e.g. mobile iOS, Android, etc.) intermediate electronic communication device (e.g. mobile personal data assistant, etc.) relayed transmissions (e.g. network switched, relayed, repeated, etc.) from the one or more at least partially mobile operating system operated intermediate electronic communication devices (e.g. smart phones, etc.) activated from standby mode (status change from ready but not active as a network relay, etc.) to be one or more communication network relays (e.g. network relay, switch, etc.).

In one or more implementations, as shown in FIG. 8, the operational flow o10 proceeds to operation o13 for electronically deriving one or more assessments associated at least in part with the one or more at least partially mobile operating system operated intermediate electronic communication device relayed transmissions from the one or more at least partially mobile operating system operated intermediate electronic communication devices activated from standby mode to be one or more communication network relays. Origination of a physically tangible component group can be accomplished through skilled in the art design choice selection including use of one or more components and/or subsystems explicitly and/or implicitly referred to herein for at least in part implementing execution of one or more instructions i13 of the operation o13, for performance of the operation o13 by an electrical circuitry arrangement e13 as activated thereto, and/or otherwise fulfillment of the operation o13. One or more non-transitory signal bearing physical media can bear the one or more instructions i13 that when executed can direct performance of the operation o13. Furthermore, electronically deriving assessments associated with mobile operating system operated intermediate electronic communication device relayed transmissions from mobile operating system operated intermediate electronic communication devices activated from standby mode to be communication network relays module m13 depicted in FIG. 4 as being included in the processing module m10, when executed and/or activated, can direct performance of and/or perform the operation o13. Illustratively, in one or more implementations, the operation o13 can be carried out, for example, by electronically deriving (e.g. computation, comparing, data calls, wireless reception, etc.) one or more assessments (e.g. comparisons, evaluations, rankings, listings, reports, etc.) associated (e.g. related, etc.) at least in part with the one or more at least partially mobile operating system operated (e.g. mobile iOS, etc.) intermediate electronic communication device (e.g. smartphone, etc.) relayed transmissions (e.g. wireless directed transmissions, etc.) from the one or more at least partially mobile operating system operated intermediate electronic communication devices (e.g. phablet, etc.) activated from standby mode (e.g. called through network to actively serve as relay, etc.) to be one or more communication network relays (e.g. network switch, router, repeater, relay, etc.).

In one or more implementations, as shown in FIG. 9A, the operation o11 can include operation o1101 for electronically receiving one or more at least partially mobile operating system operated intermediate electronic communication device relayed transmissions from one or more at least partially mobile operating system operated intermediate electronic communication devices activated from standby mode to be one or more communication network relays including accessing data from a data source via a virtual machine representation of at least a part of a computing machine including accessing data from a data source via a virtual machine representation of at least a part of a real machine. Origination of a physically tangible component group can be accomplished through skilled in the art design choice selection including use of one or more components and/or subsystems explicitly and/or implicitly referred to herein for at least in part implementing execution of one or more instructions i1101 of the operation o1101, for performance of the operation o1101 by an electrical circuitry arrangement e1101 as activated thereto, and/or otherwise fulfillment of the operation o1101. One or more non-transitory signal bearing physical media can bear the one or more instructions i1101 that when executed can direct performance of the operation o1101. Furthermore, accessing data from a data source via a virtual machine representation a computing machine including accessing data from a data source via a virtual machine representation a real machine module m1101 depicted in FIG. 5A as being included in the module m11, when executed and/or activated, can direct performance of and/or perform the operation o1101. Illustratively, in one or more implementations, the operation o1101 can be carried out, for example, by electronically receiving (e.g. wireless reception, etc.) one or more at least partially mobile operating system operated (e.g. mobile Android, mobile iOS, mobile Windows, etc.) intermediate electronic communication device (e.g. smart phone, laptop, tablet, etc.) relayed (e.g. repeated, relayed, switched, etc.) transmissions (e.g. wireless transmissions, etc.) from one or more at least partially mobile operating system operated intermediate electronic communication devices (e.g. iPhone, etc.) activated (e.g. put in active network relay service, etc.) from standby mode (e.g. committed to be activated, but not yet so, etc.) to be one or more communication network relays (e.g. forwarding, switching, relaying, repeating, etc.) including accessing data (e.g. data calls, etc.) from a data source (e.g. electronic memory, etc.) via a virtual machine representation (e.g. process virtual machine, etc.) of at least a part of a computing machine (e.g. mobile OS portion, etc.) including accessing data (e.g. through bus, etc.) from a data source (e.g. hard drive, etc.) via a virtual machine representation (e.g. process virtual machine, etc.) of at least a part of a real machine (e.g. processor hardware, etc.).

In one or more implementations, as shown in FIG. 9A, the operation o11 can include operation o1102 for electronically receiving one or more at least partially mobile operating system operated intermediate electronic communication device relayed transmissions from one or more at least partially mobile operating system operated intermediate electronic communication devices activated from standby mode to be one or more communication network relays including accessing data from a data source via a virtual machine representation of at least a part of a computing machine including accessing data from a data source via a virtual machine representation of at least a part of a virtual machine. Origination of a physically tangible component group can be accomplished through skilled in the art design choice selection including use of one or more components and/or subsystems explicitly and/or implicitly referred to herein for at least in part implementing execution of one or more instructions i1102 of the operation o1102, for performance of the operation o1102 by an electrical circuitry arrangement e1102 as activated thereto, and/or otherwise fulfillment of the operation o1102. One or more non-transitory signal bearing physical media can bear the one or more instructions i1102 that when executed can direct performance of the operation o1102. Furthermore, accessing data from a data source via a virtual machine representation a computing machine including accessing data from a data source via a virtual machine representation a virtual machine module m1102 depicted in FIG. 5A as being included in the module m11, when executed and/or activated, can direct performance of and/or perform the operation o1102. Illustratively, in one or more implementations, the operation o1102 can be carried out, for example, by electronically receiving (e.g. wireless reception, etc.) one or more at least partially mobile operating system operated (e.g. mobile Android, mobile iOS, mobile Windows, etc.) intermediate electronic communication device (e.g. smart phone, laptop, tablet, etc.) relayed (e.g. repeated, relayed, switched, etc.) transmissions (e.g. wireless transmissions, etc.) from one or more at least partially mobile operating system operated intermediate electronic communication devices (e.g. iPhone, etc.) activated (e.g. put in active network relay service, etc.) from standby mode (e.g. committed to be activated, but not yet so, etc.) to be one or more communication network relays (e.g. forwarding, switching, relaying, repeating, etc.) including accessing data (e.g. data calls, etc.) from a data source (e.g. electronic memory, etc.) via a virtual machine representation (e.g. process virtual machine, etc.) of at least a part of a computing machine (e.g. mobile OS portion, etc.) including accessing data (e.g. through bus, etc.) from a data source (e.g. hard drive, etc.) via a virtual machine representation (e.g. process virtual machine, Android, etc.) of at least a part of a virtual machine (e.g. Java, etc.).

In one or more implementations, as shown in FIG. 9A, the operation o11 can include operation o1103 for electronically receiving one or more at least partially mobile operating system operated intermediate electronic communication device relayed transmissions from one or more at least partially mobile operating system operated intermediate electronic communication devices activated from standby mode to be one or more communication network relays including accessing data from a data source via a virtual machine representation of at least a part of a virtual machine including converting a file having a file-type associated with the virtual machine to a file-type associated with the virtual machine representation. Origination of a physically tangible component group can be accomplished through skilled in the art design choice selection including use of one or more components and/or subsystems explicitly and/or implicitly referred to herein for at least in part implementing execution of one or more instructions i1103 of the operation o1103, for performance of the operation o1103 by an electrical circuitry arrangement e1103 as activated thereto, and/or otherwise fulfillment of the operation o1103. One or more non-transitory signal bearing physical media can bear the one or more instructions i1103 that when executed can direct performance of the operation o1103. Furthermore, accessing data from a data source via a virtual machine representation a virtual machine including converting a file having a file-type associated with virtual machine to a file-type associated with virtual machine representation module m1103 depicted in FIG. 5A as being included in the module m11, when executed and/or activated, can direct performance of and/or perform the operation o1103. Illustratively, in one or more implementations, the operation o1103 can be carried out, for example, by electronically receiving (e.g. wireless reception, etc.) one or more at least partially mobile operating system operated (e.g. mobile Android, mobile iOS, mobile Windows, etc.) intermediate electronic communication device (e.g. smart phone, laptop, tablet, etc.) relayed (e.g. repeated, relayed, switched, etc.) transmissions (e.g. wireless transmissions, etc.) from one or more at least partially mobile operating system operated intermediate electronic communication devices (e.g. iPhone, etc.) activated (e.g. put in active network relay service, etc.) from standby mode (e.g. committed to be activated, but not yet so, etc.) to be one or more communication network relays (e.g. forwarding, switching, relaying, repeating, etc.) including from a data source (e.g. memory, etc.) via a virtual machine representation (e.g. process virtual machine, Android, etc.) of at least a part of a virtual machine including converting a file having a file-type associated with the virtual machine (e.g. class JVM files, etc.) to a file-type associated with the virtual machine representation (e.g. dex Dalvik files, etc.).

In one or more implementations, as shown in FIG. 9A, the operation o1103 can include operation o1104 for accessing data from a data source via a virtual machine representation of at least a part of a virtual machine including converting a file having a file-type associated with the virtual machine to a file-type associated with the virtual machine representation including wherein the file-type associated with the second virtual machine is configured for a limited-resource computing machine. Origination of a physically tangible component group can be accomplished through skilled in the art design choice selection including use of one or more components and/or subsystems explicitly and/or implicitly referred to herein for at least in part implementing execution of one or more instructions i1104 of the operation o1104, for performance of the operation o1104 by an electrical circuitry arrangement e1104 as activated thereto, and/or otherwise fulfillment of the operation o1104. One or more non-transitory signal bearing physical media can bear the one or more instructions i1104 that when executed can direct performance of the operation o1104. Furthermore, wherein file-type associated with second virtual machine is configured for a limited-resource computing machine module m1104 depicted in FIG. 5A as being included in the module m1103, when executed and/or activated, can direct performance of and/or perform the operation o1104. Illustratively, in one or more implementations, the operation o1104 can be carried out, for example, by from a data source (e.g. memory, etc.) via a virtual machine representation (e.g. process virtual machine, Android, etc.) of at least a part of a virtual machine including converting a file having a file-type associated with the virtual machine (e.g. class JVM files, etc.) to a file-type associated with the virtual machine representation (e.g. dex Dalvik files, etc.) including wherein the file-type associated with the second virtual machine (e.g. dex Dalvik files, etc.) is configured for a limited-resource computing machine (e.g. Android operating system device, etc.).

In one or more implementations, as shown in FIG. 9A, the operation o1104 can include operation o1105 for wherein the file-type associated with the second virtual machine is configured for a limited-resource computing machine including wherein the file-type associated with the second virtual machine is configured for a mobile computing machine. Origination of a physically tangible component group can be accomplished through skilled in the art design choice selection including use of one or more components and/or subsystems explicitly and/or implicitly referred to herein for at least in part implementing execution of one or more instructions i1105 of the operation o1105, for performance of the operation o1105 by an electrical circuitry arrangement e1105 as activated thereto, and/or otherwise fulfillment of the operation o1105. One or more non-transitory signal bearing physical media can bear the one or more instructions i1105 that when executed can direct performance of the operation o1105. Furthermore, wherein file-type associated with second virtual machine is configured for a mobile computing machine module m1105 depicted in FIG. 5A as being included in the module m1104, when executed and/or activated, can direct performance of and/or perform the operation o1105. Illustratively, in one or more implementations, the operation o1105 can be carried out, for example, by wherein the file-type associated with the second virtual machine (e.g. dex Dalvik files, etc.) is configured for a limited-resource computing machine (e.g. Android operating system device, etc.) including wherein the file-type associated with the second virtual machine is configured for a mobile computing machine (e.g. mobile devices such as Samsung mobile devices, Google mobile devices, etc.).

In one or more implementations, as shown in FIG. 9B, the operation o11 can include operation o1106 for electronically receiving one or more at least partially mobile operating system operated intermediate electronic communication device relayed transmissions from one or more at least partially mobile operating system operated intermediate electronic communication devices activated from standby mode to be one or more communication network relays including the one or more at least partially mobile operating system operated intermediate electronic communication devices being activated from standby mode based at least in part upon direct access by the one or more origination electronic communication devices to one or more base stations of one or more base station based communication networks becoming unavailable to the one or more origination electronic communication devices. Origination of a physically tangible component group can be accomplished through skilled in the art design choice selection including use of one or more components and/or subsystems explicitly and/or implicitly referred to herein for at least in part implementing execution of one or more instructions i1106 of the operation o1106, for performance of the operation o1106 by an electrical circuitry arrangement e1106 as activated thereto, and/or otherwise fulfillment of the operation o1106. One or more non-transitory signal bearing physical media can bear the one or more instructions i1106 that when executed can direct performance of the operation o1106. Furthermore, mobile operating system operated intermediate electronic communication devices being activated from standby mode based upon direct access by origination electronic communication devices to base stations of base station based communication networks becoming unavailable to origination electronic communication devices module m1106 depicted in FIG. 5A as being included in the module m11, when executed and/or activated, can direct performance of and/or perform the operation o1106. Illustratively, in one or more implementations, the operation o1106 can be carried out, for example, by electronically receiving (e.g. wireless reception, etc.) one or more at least partially mobile operating system operated (e.g. mobile Android, mobile iOS, mobile Windows, etc.) intermediate electronic communication device (e.g. smart phone, laptop, tablet, etc.) relayed (e.g. repeated, relayed, switched, etc.) transmissions (e.g. wireless transmissions, etc.) from one or more at least partially mobile operating system operated intermediate electronic communication devices (e.g. iPhone, etc.) activated (e.g. put in active network relay service, etc.) from standby mode (e.g. committed to be activated, but not yet so, etc.) to be one or more communication network relays (e.g. forwarding, switching, relaying, repeating, etc.) including the one or more at least partially mobile operating system operated intermediate electronic communication devices (e.g. smart phone, etc.) being activated from standby mode based at least in part upon direct access by the one or more origination electronic communication devices (e.g. tablet computer, etc.) to one or more base stations (e.g. one or more fixed position cell towers, network routers, network switches, network routers, base transceiver stations, mobile switching centers, macrocells, microcells, picocells, femtocells, access point base stations, cell sites, repeaters, etc.) of one or more base station based communication networks (e.g. monthly or annual based subscription to use of cellular, point-to-point, or otherwise network of fixed position or other base station network, etc.) becoming unavailable to the one or more origination electronic communication devices (e.g. laptop, etc.).

In one or more implementations, as shown in FIG. 9B, the operation o11 can include operation o1107 for electronically receiving one or more at least partially mobile operating system operated intermediate electronic communication device relayed transmissions from one or more at least partially mobile operating system operated intermediate electronic communication devices activated from standby mode to be one or more communication network relays for use by one or more origination electronic communication devices to communicate at least in part with one or more destination electronic communication devices including the relayed transmissions being received after prior transmissions from the one or more at least partially mobile operating system operated intermediate electronic communication devices as one or more mobile handset communication devices for communication with one or more users of other one or more mobile handset communication devices. Origination of a physically tangible component group can be accomplished through skilled in the art design choice selection including use of one or more components and/or subsystems explicitly and/or implicitly referred to herein for at least in part implementing execution of one or more instructions i1107 of the operation o1107, for performance of the operation o1107 by an electrical circuitry arrangement e1107 as activated thereto, and/or otherwise fulfillment of the operation o1107. One or more non-transitory signal bearing physical media can bear the one or more instructions i1107 that when executed can direct performance of the operation o1107. Furthermore, relayed transmissions being received after prior transmissions from mobile operating system operated intermediate electronic communication devices as mobile handset communication devices for communication with users of other mobile handset communication devices module m1107 depicted in FIG. 5A as being included in the module m11, when executed and/or activated, can direct performance of and/or perform the operation o1107. Illustratively, in one or more implementations, the operation o1107 can be carried out, for example, by electronically receiving (e.g. wireless reception, etc.) one or more at least partially mobile operating system operated (e.g. mobile Android, mobile iOS, mobile Windows, etc.) intermediate electronic communication device (e.g. smart phone, laptop, tablet, etc.) relayed (e.g. repeated, relayed, switched, etc.) transmissions (e.g. wireless transmissions, etc.) from one or more at least partially mobile operating system operated intermediate electronic communication devices (e.g. iPhone, etc.) activated (e.g. put in active network relay service, etc.) from standby mode (e.g. committed to be activated, but not yet so, etc.) to be one or more communication network relays (e.g. forwarding, switching, relaying, repeating, etc.) for use by one or more origination electronic communication devices (e.g. phablet, etc.) to communicate (e.g. two-way conversation, video streaming, etc.) at least in part with one or more destination electronic communication devices (e.g. mobile handset, computer, laptop, etc.) including the relayed transmissions being received after prior transmissions (e.g. transmissions related to other devices, etc.) from the one or more at least partially mobile operating system operated intermediate electronic communication devices (e.g. Android tablet, Samsung smartphone, etc.) as one or more mobile handset communication devices (e.g. phablet, etc.) for communication with one or more users (e.g. businessperson, etc.) of other one or more mobile handset communication devices (e.g. Apple iPhones, etc.).

In one or more implementations, as shown in FIG. 9B, the operation o11 can include operation o1108 for electronically receiving one or more at least partially mobile operating system operated intermediate electronic communication device relayed transmissions from one or more at least partially mobile operating system operated intermediate electronic communication devices activated from standby mode to be one or more communication network relays including receiving wireless packetized communication. Origination of a physically tangible component group can be accomplished through skilled in the art design choice selection including use of one or more components and/or subsystems explicitly and/or implicitly referred to herein for at least in part implementing execution of one or more instructions i1108 of the operation o1108, for performance of the operation o1108 by an electrical circuitry arrangement e1108 as activated thereto, and/or otherwise fulfillment of the operation o1108. One or more non-transitory signal bearing physical media can bear the one or more instructions i1108 that when executed can direct performance of the operation o1108. Furthermore, receiving wireless packetized communication module m1108 depicted in FIG. 5B as being included in the module m11, when executed and/or activated, can direct performance of and/or perform the operation o1108. Illustratively, in one or more implementations, the operation o1108 can be carried out, for example, by electronically receiving (e.g. wireless reception, etc.) one or more at least partially mobile operating system operated (e.g. mobile Android, mobile iOS, mobile Windows, etc.) intermediate electronic communication device (e.g. smart phone, laptop, tablet, etc.) relayed (e.g. repeated, relayed, switched, etc.) transmissions (e.g. wireless transmissions, etc.) from one or more at least partially mobile operating system operated intermediate electronic communication devices (e.g. iPhone, etc.) activated (e.g. put in active network relay service, etc.) from standby mode (e.g. committed to be activated, but not yet so, etc.) to be one or more communication network relays (e.g. forwarding, switching, relaying, repeating, etc.) including receiving wireless packetized communication (e.g. IEEE 802.11 packets, cellular packets, etc.).

In one or more implementations, as shown in FIG. 9B, the operation o1108 can include operation o1109 for receiving wireless packetized communication including receiving incoming message traffic. Origination of a physically tangible component group can be accomplished through skilled in the art design choice selection including use of one or more components and/or subsystems explicitly and/or implicitly referred to herein for at least in part implementing execution of one or more instructions i1109 of the operation o1109, for performance of the operation o1109 by an electrical circuitry arrangement e1109 as activated thereto, and/or otherwise fulfillment of the operation o1109. One or more non-transitory signal bearing physical media can bear the one or more instructions i1109 that when executed can direct performance of the operation o1109. Furthermore, receiving incoming message traffic module m1109 depicted in FIG. 5B as being included in the module m1108, when executed and/or activated, can direct performance of and/or perform the operation o1109. Illustratively, in one or more implementations, the operation o1109 can be carried out, for example, by receiving wireless packetized communication (e.g. IEEE 802.11 packets, cellular packets, etc.) including receiving incoming message traffic (e.g. text messages, voice calls, etc.).

In one or more implementations, as shown in FIG. 9C, the operation o1109 can include operation o1110 for receiving incoming message traffic including receiving one or more high bandwidth data transfers. Origination of a physically tangible component group can be accomplished through skilled in the art design choice selection including use of one or more components and/or subsystems explicitly and/or implicitly referred to herein for at least in part implementing execution of one or more instructions i1110 of the operation o1110, for performance of the operation o1110 by an electrical circuitry arrangement e1110 as activated thereto, and/or otherwise fulfillment of the operation o1110. One or more non-transitory signal bearing physical media can bear the one or more instructions i1110 that when executed can direct performance of the operation o1110. Furthermore, receiving high bandwidth data transfers module m1110 depicted in FIG. 5B as being included in the module m1109, when executed and/or activated, can direct performance of and/or perform the operation o1110. Illustratively, in one or more implementations, the operation o1110 can be carried out, for example, by receiving incoming message traffic (e.g. text messages, voice calls, etc.) including receiving one or more high bandwidth data transfers (e.g. high resolution video calls, large capacity data files, etc.).

In one or more implementations, as shown in FIG. 9C, the operation o1109 can include operation o1111 for receiving incoming message traffic including receiving one or more high resolution audio formatted messages. Origination of a physically tangible component group can be accomplished through skilled in the art design choice selection including use of one or more components and/or subsystems explicitly and/or implicitly referred to herein for at least in part implementing execution of one or more instructions i1111 of the operation o1111, for performance of the operation o1111 by an electrical circuitry arrangement e1111 as activated thereto, and/or otherwise fulfillment of the operation o1111. One or more non-transitory signal bearing physical media can bear the one or more instructions i1111 that when executed can direct performance of the operation o1111. Furthermore, receiving high resolution audio formatted messages module m1111 depicted in FIG. 5B as being included in the module m1109, when executed and/or activated, can direct performance of and/or perform the operation o1111. Illustratively, in one or more implementations, the operation o1111 can be carried out, for example, by receiving incoming message traffic (e.g. text messages, voice calls, etc.) including receiving one or more high resolution audio formatted messages (e.g. FLAC formatted, Pono formatted, etc.).

In one or more implementations, as shown in FIG. 9C, the operation o1109 can include operation o1112 for receiving incoming message traffic including receiving one or more high resolution video formatted messages. Origination of a physically tangible component group can be accomplished through skilled in the art design choice selection including use of one or more components and/or subsystems explicitly and/or implicitly referred to herein for at least in part implementing execution of one or more instructions i1112 of the operation o1112, for performance of the operation o1112 by an electrical circuitry arrangement e1112 as activated thereto, and/or otherwise fulfillment of the operation o1112. One or more non-transitory signal bearing physical media can bear the one or more instructions i1112 that when executed can direct performance of the operation o1112. Furthermore, receiving high resolution video formatted messages module m1112 depicted in FIG. 5B as being included in the module m1109, when executed and/or activated, can direct performance of and/or perform the operation o1112. Illustratively, in one or more implementations, the operation o1112 can be carried out, for example, by receiving incoming message traffic (e.g. text messages, voice calls, etc.) including receiving one or more high resolution video formatted messages (e.g. ultra high definition format, 4K UHD (2160p), 8K UHD (4320p), etc.).

In one or more implementations, as shown in FIG. 9C, the operation o1109 can include operation o1113 for receiving incoming message traffic including receiving one or more high capacity data files. Origination of a physically tangible component group can be accomplished through skilled in the art design choice selection including use of one or more components and/or subsystems explicitly and/or implicitly referred to herein for at least in part implementing execution of one or more instructions i1113 of the operation o1113, for performance of the operation o1113 by an electrical circuitry arrangement e1113 as activated thereto, and/or otherwise fulfillment of the operation o1113. One or more non-transitory signal bearing physical media can bear the one or more instructions i1113 that when executed can direct performance of the operation o1113. Furthermore, receiving high capacity data files module m1113 depicted in FIG. 5B as being included in the module m1109, when executed and/or activated, can direct performance of and/or perform the operation o1113. Illustratively, in one or more implementations, the operation o1113 can be carried out, for example, by receiving incoming message traffic (e.g. text messages, voice calls, etc.) including receiving one or more high capacity data files (e.g. over one Terabyte sized file, etc.).

In one or more implementations, as shown in FIG. 9C, the operation o1108 can include operation o1114 for receiving wireless packetized communication including receiving the one or more at least partially mobile operating system operated intermediate electronic communication device relayed transmissions being originated from one or more origination electronic communication devices. Origination of a physically tangible component group can be accomplished through skilled in the art design choice selection including use of one or more components and/or subsystems explicitly and/or implicitly referred to herein for at least in part implementing execution of one or more instructions i1114 of the operation o1114, for performance of the operation o1114 by an electrical circuitry arrangement e1114 as activated thereto, and/or otherwise fulfillment of the operation o1114. One or more non-transitory signal bearing physical media can bear the one or more instructions i1114 that when executed can direct performance of the operation o1114. Furthermore, receiving mobile operating system operated intermediate electronic communication device relayed transmissions being originated from origination electronic communication devices module m1114 depicted in FIG. 5B as being included in the module m1108, when executed and/or activated, can direct performance of and/or perform the operation o1114. Illustratively, in one or more implementations, the operation o1114 can be carried out, for example, by receiving wireless packetized communication (e.g. IEEE 802.11 packets, cellular packets, etc.) including receiving the one or more at least partially mobile operating system operated intermediate electronic communication device relayed transmissions (e.g. one or more status inquiries from sweeping beam low bandwidth probing communication, etc.) being originated from one or more origination electronic communication devices (e.g. Research In Motion PDA device, etc.).

In one or more implementations, as shown in FIG. 9C, the operation o1108 can include operation o1115 for receiving wireless packetized communication including receiving the one or more at least partially mobile operating system operated intermediate electronic communication device relayed transmissions from one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1115 of the operation o1115, for performance of the operation o1115 by an electrical circuitry arrangement e1115 as activated thereto, and/or otherwise fulfillment of the operation o1115. One or more non-transitory signal bearing physical media can bear the one or more instructions i1115 that when executed can direct performance of the operation o1115. Furthermore, receiving mobile operating system operated intermediate electronic communication device relayed transmissions from intermediate electronic communication devices module m1115 depicted in FIG. 5B as being included in the module m1108, when executed and/or activated, can direct performance of and/or perform the operation o1115. Illustratively, in one or more implementations, the operation o1115 can be carried out, for example, by receiving wireless packetized communication (e.g. IEEE 802.11 packets, cellular packets, etc.) including receiving the one or more at least partially mobile operating system operated intermediate electronic communication device relayed transmissions (e.g. streaming high definition video files, etc.) from one or more intermediate electronic communication devices (e.g. acting as one or more standby network relay nodes, etc.).

In one or more implementations, as shown in FIG. 9D, the operation o1108 can include operation o1116 for receiving wireless packetized communication including receiving the one or more at least partially mobile operating system operated intermediate electronic communication device relayed transmissions from one or more base stations of one or more base station based communication networks. Origination of a physically tangible component group can be accomplished through skilled in the art design choice selection including use of one or more components and/or subsystems explicitly and/or implicitly referred to herein for at least in part implementing execution of one or more instructions i1116 of the operation o1116, for performance of the operation o1116 by an electrical circuitry arrangement e1116 as activated thereto, and/or otherwise fulfillment of the operation o1116. One or more non-transitory signal bearing physical media can bear the one or more instructions i1116 that when executed can direct performance of the operation o1116. Furthermore, receiving mobile operating system operated intermediate electronic communication device relayed transmissions from base stations of base station based communication networks module m1116 depicted in FIG. 5B as being included in the module m1108, when executed and/or activated, can direct performance of and/or perform the operation o1116. Illustratively, in one or more implementations, the operation o1116 can be carried out, for example, by receiving wireless packetized communication (e.g. IEEE 802.11 packets, cellular packets, etc.) including receiving the one or more at least partially mobile operating system operated intermediate electronic communication device relayed transmissions (e.g. alert message that one or more base stations are blocked and a standby network is required to be activated, etc.) from one or more base stations of one or more base station based communication networks (e.g. one or more base stations that are part of a combined Verizon and Sprint cellular communication network, etc.).

In one or more implementations, as shown in FIG. 9D, the operation o1108 can include operation o1117 for receiving wireless packetized communication including receiving the one or more at least partially mobile operating system operated intermediate electronic communication device relayed transmissions from one or more electronic communication devices as heterogeneous types. Origination of a physically tangible component group can be accomplished through skilled in the art design choice selection including use of one or more components and/or subsystems explicitly and/or implicitly referred to herein for at least in part implementing execution of one or more instructions i1117 of the operation o1117, for performance of the operation o1117 by an electrical circuitry arrangement e1117 as activated thereto, and/or otherwise fulfillment of the operation o1117. One or more non-transitory signal bearing physical media can bear the one or more instructions i1117 that when executed can direct performance of the operation o1117. Furthermore, receiving mobile operating system operated intermediate electronic communication device relayed transmissions from electronic communication devices as heterogeneous types module m1117 depicted in FIG. 5B as being included in the module m1108, when executed and/or activated, can direct performance of and/or perform the operation o1117. Illustratively, in one or more implementations, the operation o1117 can be carried out, for example, by receiving wireless packetized communication (e.g. IEEE 802.11 packets, cellular packets, etc.) including receiving the one or more at least partially mobile operating system operated intermediate electronic communication device relayed transmissions from one or more electronic communication devices as heterogeneous types (e.g. mixtures of laptops, phablets, smartphones, etc.).

In one or more implementations, as shown in FIG. 9D, the operation o1117 can include operation o1118 for receiving the one or more at least partially mobile operating system operated intermediate electronic communication device relayed transmissions from one or more electronic communication devices as heterogeneous types including receiving the one or more relayed transmissions from one or more laptops, one or more phablets, one or more tablets, one or more smart phones, one or more notebooks, one or more handsets, one or more palmtops, one or more personal digital assistants, one or more digital audio players, one or more portable media players, one or more digital cameras, or one or more cell phones. Origination of a physically tangible component group can be accomplished through skilled in the art design choice selection including use of one or more components and/or subsystems explicitly and/or implicitly referred to herein for at least in part implementing execution of one or more instructions i1118 of the operation o1118, for performance of the operation o1118 by an electrical circuitry arrangement e1118 as activated thereto, and/or otherwise fulfillment of the operation o1118. One or more non-transitory signal bearing physical media can bear the one or more instructions i1118 that when executed can direct performance of the operation o1118. Furthermore, receiving relayed transmissions from laptops, phablets, tablets, smart phones, notebooks, handsets, palmtops, personal digital assistants, digital audio players, portable media players, digital cameras, or cell phones module m1118 depicted in FIG. 5B as being included in the module m1117, when executed and/or activated, can direct performance of and/or perform the operation o1118. Illustratively, in one or more implementations, the operation o1118 can be carried out, for example, by receiving the one or more at least partially mobile operating system operated intermediate electronic communication device relayed transmissions from one or more electronic communication devices as heterogeneous types (e.g. mixtures of laptops, phablets, smartphones, etc.) including receiving the one or more relayed transmissions from one or more laptops (e.g. Sony Vaio, etc.), one or more phablets (e.g. Samsung Galaxy, etc.), one or more tablets (e.g. Toshiba tablets, etc.), one or more smart phones (e.g. Verizon smartphones, etc.), one or more notebooks (e.g. Thinkpad notebooks, etc.), one or more handsets (e.g. Google Android handset, etc.), one or more palmtops (e.g. HP next generation palmtop, etc.), one or more personal digital assistants (e.g. Blackberry PDA, etc.), one or more digital audio players (e.g. satellite radio mp3 receivers, etc.), one or more portable media players (e.g. downloading involving direct WiFi, etc.), one or more digital cameras (e.g. communicating cellular network, etc.), or one or more cell phones (e.g. Sprint network, etc.).

In one or more implementations, as shown in FIG. 9D, the operation o1117 can include operation o1119 for receiving the one or more at least partially mobile operating system operated intermediate electronic communication device relayed transmissions from one or more electronic communication devices as heterogeneous types including receiving the one or more relayed transmissions as using hybridized protocols including one or more IEEE 802.11ac protocols, one or more IEEE 802.11ad protocols, or one or more IEEE 802.11n/g protocols. Origination of a physically tangible component group can be accomplished through skilled in the art design choice selection including use of one or more components and/or subsystems explicitly and/or implicitly referred to herein for at least in part implementing execution of one or more instructions i1119 of the operation o1119, for performance of the operation o1119 by an electrical circuitry arrangement e1119 as activated thereto, and/or otherwise fulfillment of the operation o1119. One or more non-transitory signal bearing physical media can bear the one or more instructions i1119 that when executed can direct performance of the operation o1119. Furthermore, receiving relayed transmissions as using hybridized protocols including IEEE 802.11ac protocols, IEEE 802.11ad protocols, or IEEE 802.11n/g protocols module m1119 depicted in FIG. 5B as being included in the module m1117, when executed and/or activated, can direct performance of and/or perform the operation o1119. Illustratively, in one or more implementations, the operation o1119 can be carried out, for example, by receiving the one or more at least partially mobile operating system operated intermediate electronic communication device relayed transmissions from one or more electronic communication devices as heterogeneous types (e.g. mixtures of laptops, phablets, smartphones, etc.) including receiving the one or more relayed transmissions as using hybridized protocols including one or more IEEE 802.11 ac protocols, one or more IEEE 802.11 ad protocols, or one or more IEEE 802.11n/g protocols (e.g. IEEE 802 protocols used together by intermediate electronic communication devices, etc.).

In one or more implementations, as shown in FIG. 9D, the operation o1117 can include operation o1120 for receiving the one or more at least partially mobile operating system operated intermediate electronic communication device relayed transmissions from one or more electronic communication devices as heterogeneous types including receiving the one or more relayed transmissions as using one or more cellular protocols. Origination of a physically tangible component group can be accomplished through skilled in the art design choice selection including use of one or more components and/or subsystems explicitly and/or implicitly referred to herein for at least in part implementing execution of one or more instructions i1120 of the operation o1120, for performance of the operation o1120 by an electrical circuitry arrangement e1120 as activated thereto, and/or otherwise fulfillment of the operation o1120. One or more non-transitory signal bearing physical media can bear the one or more instructions i1120 that when executed can direct performance of the operation o1120. Furthermore, receiving relayed transmissions as using cellular protocols module m1120 depicted in FIG. 5C as being included in the module m1117, when executed and/or activated, can direct performance of and/or perform the operation o1120. Illustratively, in one or more implementations, the operation o1120 can be carried out, for example, by receiving the one or more at least partially mobile operating system operated intermediate electronic communication device relayed transmissions from one or more electronic communication devices as heterogeneous types (e.g. mixtures of laptops, phablets, smartphones, etc.) including receiving the one or more relayed transmissions as using one or more cellular protocols (e.g. IEEE 802 protocols used together by intermediate electronic communication devices, etc.).

In one or more implementations, as shown in FIG. 9E, the operation o1117 can include operation o1121 for receiving the one or more at least partially mobile operating system operated intermediate electronic communication device relayed transmissions from one or more electronic communication devices as heterogeneous types including receiving the one or more relayed transmissions as using one or more WiFi protocols, or one or more direct WiFi protocols. Origination of a physically tangible component group can be accomplished through skilled in the art design choice selection including use of one or more components and/or subsystems explicitly and/or implicitly referred to herein for at least in part implementing execution of one or more instructions i1121 of the operation o1121, for performance of the operation o1121 by an electrical circuitry arrangement e1121 as activated thereto, and/or otherwise fulfillment of the operation o1121. One or more non-transitory signal bearing physical media can bear the one or more instructions i1121 that when executed can direct performance of the operation o1121. Furthermore, receiving relayed transmissions as using WiFi protocols, or direct WiFi protocols module m1121 depicted in FIG. 5C as being included in the module m1117, when executed and/or activated, can direct performance of and/or perform the operation o1121. Illustratively, in one or more implementations, the operation o1121 can be carried out, for example, by receiving the one or more at least partially mobile operating system operated intermediate electronic communication device relayed transmissions from one or more electronic communication devices as heterogeneous types (e.g. mixtures of laptops, phablets, smartphones, etc.) including receiving the one or more relayed transmissions as using one or more WiFi protocols, or one or more direct WiFi protocols (e.g. IEEE 802 protocols used together by intermediate electronic communication devices, etc.).

In one or more implementations, as shown in FIG. 9E, the operation o1117 can include operation o1122 for receiving the one or more at least partially mobile operating system operated intermediate electronic communication device relayed transmissions from one or more electronic communication devices as heterogeneous types including receiving the one or more relayed transmissions as using protocols including one or more 3G protocols, one or more 4G protocols, one or more 5G protocols, one or more 6G or one or more 7G protocols. Origination of a physically tangible component group can be accomplished through skilled in the art design choice selection including use of one or more components and/or subsystems explicitly and/or implicitly referred to herein for at least in part implementing execution of one or more instructions i1122 of the operation o1122, for performance of the operation o1122 by an electrical circuitry arrangement e1122 as activated thereto, and/or otherwise fulfillment of the operation o1122. One or more non-transitory signal bearing physical media can bear the one or more instructions i1122 that when executed can direct performance of the operation o1122. Furthermore, receiving relayed transmissions as using protocols including 3G protocols, 4G protocols, 5G protocols, 6G or 7G protocols module m1122 depicted in FIG. 5C as being included in the module m1117, when executed and/or activated, can direct performance of and/or perform the operation o1122. Illustratively, in one or more implementations, the operation o1122 can be carried out, for example, by receiving the one or more at least partially mobile operating system operated intermediate electronic communication device relayed transmissions from one or more electronic communication devices as heterogeneous types (e.g. mixtures of laptops, phablets, smartphones, etc.) including receiving the one or more relayed transmissions as using protocols (e.g. IEEE 802 protocols used together by intermediate electronic communication devices, etc.) including one or more 3G protocols, one or more 4G protocols, one or more 5G protocols, one or more 6G or one or more 7G protocols.

In one or more implementations, as shown in FIG. 9E, the operation o1117 can include operation o1123 for receiving the one or more at least partially mobile operating system operated intermediate electronic communication device relayed transmissions from one or more electronic communication devices as heterogeneous types including receiving the one or more relayed transmissions as using protocols including one or more 20 GHz or above protocols, one or more 30 GHz or above protocols, or one or more 60 GHz or above protocols. Origination of a physically tangible component group can be accomplished through skilled in the art design choice selection including use of one or more components and/or subsystems explicitly and/or implicitly referred to herein for at least in part implementing execution of one or more instructions i1123 of the operation o1123, for performance of the operation o1123 by an electrical circuitry arrangement e1123 as activated thereto, and/or otherwise fulfillment of the operation o1123. One or more non-transitory signal bearing physical media can bear the one or more instructions i1123 that when executed can direct performance of the operation o1123. Furthermore, receiving relayed transmissions as using protocols including 20 GHz or above protocols, 30 GHz or above protocols, or 60 GHz or above protocols module m1123 depicted in FIG. 5C as being included in the module m1117, when executed and/or activated, can direct performance of and/or perform the operation o1123. Illustratively, in one or more implementations, the operation o1123 can be carried out, for example, by receiving the one or more at least partially mobile operating system operated intermediate electronic communication device relayed transmissions from one or more electronic communication devices as heterogeneous types (e.g. mixtures of laptops, phablets, smartphones, etc.) including receiving the one or more relayed transmissions (e.g. high definition gaming data being shared between multiple high-end performance mobile computers, etc.) as using protocols including one or more 20 GHz or above protocols, one or more 30 GHz or above protocols, or one or more 60 GHz or above protocols (e.g. Samsung advanced protocol sets, etc.).

In one or more implementations, as shown in FIG. 9F, the operation o1117 can include operation o1124 for receiving the one or more at least partially mobile operating system operated intermediate electronic communication device relayed transmissions from one or more electronic communication devices as heterogeneous types including receiving one or more electronic token identifiers independent from device type of the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1124 of the operation o1124, for performance of the operation o1124 by an electrical circuitry arrangement e1124 as activated thereto, and/or otherwise fulfillment of the operation o1124. One or more non-transitory signal bearing physical media can bear the one or more instructions i1124 that when executed can direct performance of the operation o1124. Furthermore, receiving electronic token identifiers independent from device type of intermediate electronic communication devices module m1124 depicted in FIG. 5C as being included in the module m1117, when executed and/or activated, can direct performance of and/or perform the operation o1124. Illustratively, in one or more implementations, the operation o1124 can be carried out, for example, by receiving the one or more at least partially mobile operating system operated intermediate electronic communication device relayed transmissions from one or more electronic communication devices as heterogeneous types (e.g. mixtures of laptops, phablets, smartphones, etc.) including receiving one or more electronic token identifiers (e.g. token identifiers as part of packet header information, etc.) independent from device type (e.g. cell phone versus tablet, etc.) of the one or more intermediate electronic communication devices (e.g. mobile communication devices, etc.).

In one or more implementations, as shown in FIG. 9F, the operation o1117 can include operation o1125 for receiving the one or more at least partially mobile operating system operated intermediate electronic communication device relayed transmissions from one or more electronic communication devices as heterogeneous types including receiving one or more rotating communication beams, one or more alternating communication beams, one or more sweeping communication beams, one or more multiple communication beams, one or more switching communication beams, or one or more diffracted communication beams. Origination of a physically tangible component group can be accomplished through skilled in the art design choice selection including use of one or more components and/or subsystems explicitly and/or implicitly referred to herein for at least in part implementing execution of one or more instructions i1125 of the operation o1125, for performance of the operation o1125 by an electrical circuitry arrangement e1125 as activated thereto, and/or otherwise fulfillment of the operation o1125. One or more non-transitory signal bearing physical media can bear the one or more instructions i1125 that when executed can direct performance of the operation o1125. Furthermore, receiving rotating communication beams, alternating communication beams, sweeping communication beams, multiple communication beams, switching communication beams, or diffracted communication beams module m1125 depicted in FIG. 5C as being included in the module m1117, when executed and/or activated, can direct performance of and/or perform the operation o1125. Illustratively, in one or more implementations, the operation o1125 can be carried out, for example, by receiving the one or more at least partially mobile operating system operated intermediate electronic communication device relayed transmissions from one or more electronic communication devices as heterogeneous types (e.g. mixtures of laptops, phablets, smartphones, etc.) including receiving one or more rotating communication beams (e.g. involving array antenna, etc.), one or more alternating communication beams (e.g. involving switched antennas, etc.), one or more sweeping communication beams (e.g. involving change of phase, etc.), one or more multiple communication beams (e.g. involving mesh antennas, etc.), one or more switching communication beams (e.g. involving switching antennas, etc.), or one or more diffracted communication beams (e.g. involving diffracted transmission, etc.).

In one or more implementations, as shown in FIG. 9F, the operation o1117 can include operation o1126 for receiving the one or more at least partially mobile operating system operated intermediate electronic communication device relayed transmissions from one or more electronic communication devices as heterogeneous types including receiving from one or more multiple antennas, one or more directional antennas, one or more changeable antenna architectures, one or more mesh network antennas, or one or more omnidirectional antennas. Origination of a physically tangible component group can be accomplished through skilled in the art design choice selection including use of one or more components and/or subsystems explicitly and/or implicitly referred to herein for at least in part implementing execution of one or more instructions i1126 of the operation o1126, for performance of the operation o1126 by an electrical circuitry arrangement e1126 as activated thereto, and/or otherwise fulfillment of the operation o1126. One or more non-transitory signal bearing physical media can bear the one or more instructions i1126 that when executed can direct performance of the operation o1126. Furthermore, receiving from multiple antennas, directional antennas, changeable antenna architectures, mesh network antennas, or omnidirectional antennas module m1126 depicted in FIG. 5C as being included in the module m1117, when executed and/or activated, can direct performance of and/or perform the operation o1126. Illustratively, in one or more implementations, the operation o1126 can be carried out, for example, by receiving the one or more at least partially mobile operating system operated intermediate electronic communication device relayed transmissions from one or more electronic communication devices as heterogeneous types (e.g. mixtures of laptops, phablets, smartphones, etc.) including receiving from one or more multiple antennas (e.g. located along perimeter of mobile handset, etc.), one or more directional antennas (e.g. incorporated into laptop, etc.), one or more changeable antenna architectures (e.g. as controlled by mobile OS, etc.), one or more mesh network antennas (e.g. to integrate as a mesh network node, etc.), or one or more omnidirectional antennas (e.g. incorporated into smartphone handset, etc.).

In one or more implementations, as shown in FIG. 10A, the operation o12 can include operation o1201 for obtaining information regarding at least in part the at least partially one or more mobile operating system operated intermediate electronic communication device relayed transmissions from the one or more at least partially mobile operating system operated intermediate electronic communication devices including obtaining information at least partially contained in the one or more at least partially mobile operating system operated intermediate electronic communication device relayed transmissions. Origination of a physically tangible component group can be accomplished through skilled in the art design choice selection including use of one or more components and/or subsystems explicitly and/or implicitly referred to herein for at least in part implementing execution of one or more instructions i1201 of the operation o1201, for performance of the operation o1201 by an electrical circuitry arrangement e1201 as activated thereto, and/or otherwise fulfillment of the operation o1201. One or more non-transitory signal bearing physical media can bear the one or more instructions i1201 that when executed can direct performance of the operation o1201. Furthermore, obtaining information contained in mobile operating system operated intermediate electronic communication device relayed transmissions module m1201 depicted in FIG. 6A as being included in the module m12, when executed and/or activated, can direct performance of and/or perform the operation o1201. Illustratively, in one or more implementations, the operation o1201 can be carried out, for example, by obtaining information (accessing, receiving, etc.) regarding at least in part the at least partially one or more mobile operating system operated (e.g. mobile iOS, Android, etc.) intermediate electronic communication device (e.g. mobile personal data assistant, etc.) relayed transmissions (e.g. network switched, relayed, repeated, etc.) from the one or more at least partially mobile operating system operated intermediate electronic communication devices (e.g. smart phones, etc.) including obtaining information (e.g. data calculation, electronic signal reception, etc.) at least partially contained in the one or more at least partially mobile operating system operated intermediate electronic communication device (e.g. portable computers, etc.) relayed transmissions.

In one or more implementations, as shown in FIG. 10A, the operation o1201 can include operation o1202 for obtaining information at least partially contained in the one or more at least partially mobile operating system operated intermediate electronic communication device relayed transmissions including obtaining information regarding one or more obstructed communication paths that the one or more intermediate electronic communication devices have encountered when attempting to communicate with devices other than the one or more origination electronic communication devices. Origination of a physically tangible component group can be accomplished through skilled in the art design choice selection including use of one or more components and/or subsystems explicitly and/or implicitly referred to herein for at least in part implementing execution of one or more instructions i1202 of the operation o1202, for performance of the operation o1202 by an electrical circuitry arrangement e1202 as activated thereto, and/or otherwise fulfillment of the operation o1202. One or more non-transitory signal bearing physical media can bear the one or more instructions i1202 that when executed can direct performance of the operation o1202. Furthermore, obtaining information regarding obstructed communication paths that intermediate electronic communication devices have encountered when attempting to communicate with devices other than origination electronic communication devices module m1202 depicted in FIG. 6A as being included in the module m1201, when executed and/or activated, can direct performance of and/or perform the operation o1202. Illustratively, in one or more implementations, the operation o1202 can be carried out, for example, by obtaining information (e.g. data calculation, electronic signal reception, etc.) at least partially contained in the one or more at least partially mobile operating system operated intermediate electronic communication device (e.g. portable computers, etc.) relayed transmissions including obtaining information (e.g. send query to data base, etc.) regarding one or more obstructed communication paths (e.g. transmission blocked by physical object for more than a predetermined amount of time, etc.) that the one or more intermediate electronic communication devices (e.g. handset, etc.) have encountered (e.g. for 10 minutes, etc.) when attempting to communicate (e.g. in middle of a call, etc.) with devices (e.g. other mobile devices, etc.) other than the one or more origination electronic communication devices (e.g. iPhone, etc.).

In one or more implementations, as shown in FIG. 10A, the operation o1202 can include operation o1203 for obtaining information regarding one or more obstructed communication paths that the one or more intermediate electronic communication devices have encountered when attempting to communicate with devices other than the one or more origination electronic communication devices including obtaining location information regarding one or more moveable objects that have previously obstructed communication of one or more of the intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1203 of the operation o1203, for performance of the operation o1203 by an electrical circuitry arrangement e1203 as activated thereto, and/or otherwise fulfillment of the operation o1203. One or more non-transitory signal bearing physical media can bear the one or more instructions i1203 that when executed can direct performance of the operation o1203. Furthermore, obtaining location information regarding moveable objects that have previously obstructed communication intermediate electronic communication devices module m1203 depicted in FIG. 6A as being included in the module m1202, when executed and/or activated, can direct performance of and/or perform the operation o1203. Illustratively, in one or more implementations, the operation o1203 can be carried out, for example, by obtaining information (e.g. send query to data base, etc.) regarding one or more obstructed communication paths (e.g. transmission blocked by physical object for more than a predetermined amount of time, etc.) that the one or more intermediate electronic communication devices (e.g. handset, etc.) have encountered (e.g. for 10 minutes, etc.) when attempting to communicate (e.g. in middle of a call, etc.) with devices (e.g. other mobile devices, etc.) other than the one or more origination electronic communication devices (e.g. iPhone, etc.) including obtaining location information (e.g. relative geographical coordinates, etc.) regarding one or more moveable objects (e.g. industrial construction equipment, etc.) that have previously obstructed communication (e.g. less than a day of obstruction, etc.) of one or more of the intermediate electronic communication devices (e.g. iPad, etc.).

In one or more implementations, as shown in FIG. 10A, the operation o1202 can include operation o1204 for obtaining information regarding one or more obstructed communication paths that the one or more intermediate electronic communication devices have encountered when attempting to communicate with devices other than the one or more origination electronic communication devices including obtaining location information regarding one or more fixed position objects that have previously obstructed communication of one or more of the intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1204 of the operation o1204, for performance of the operation o1204 by an electrical circuitry arrangement e1204 as activated thereto, and/or otherwise fulfillment of the operation o1204. One or more non-transitory signal bearing physical media can bear the one or more instructions i1204 that when executed can direct performance of the operation o1204. Furthermore, obtaining location information regarding fixed position objects that have previously obstructed communication intermediate electronic communication devices module m1204 depicted in FIG. 6A as being included in the module m1202, when executed and/or activated, can direct performance of and/or perform the operation o1204. Illustratively, in one or more implementations, the operation o1204 can be carried out, for example, by obtaining information (e.g. send query to data base, etc.) regarding one or more obstructed communication paths (e.g. transmission blocked by physical object for more than a predetermined amount of time, etc.) that the one or more intermediate electronic communication devices (e.g. handset, etc.) have encountered (e.g. for 10 minutes, etc.) when attempting to communicate (e.g. in middle of a call, etc.) with devices (e.g. other mobile devices, etc.) other than the one or more origination electronic communication devices (e.g. iPhone, etc.) including obtaining location information regarding one or more fixed position objects (e.g. hills, trees, etc.) that have previously obstructed communication (e.g. blocked one or more attempted calls for a least a portion of the attempts, etc.) of one or more of the intermediate electronic communication devices (e.g. mobile handsets, etc.).

In one or more implementations, as shown in FIG. 10A, the operation o1201 can include operation o1205 for obtaining information at least partially contained in the one or more at least partially mobile operating system operated intermediate electronic communication device relayed transmissions including obtaining information regarding map data of locations of fixed position objects. Origination of a physically tangible component group can be accomplished through skilled in the art design choice selection including use of one or more components and/or subsystems explicitly and/or implicitly referred to herein for at least in part implementing execution of one or more instructions i1205 of the operation o1205, for performance of the operation o1205 by an electrical circuitry arrangement e1205 as activated thereto, and/or otherwise fulfillment of the operation o1205. One or more non-transitory signal bearing physical media can bear the one or more instructions i1205 that when executed can direct performance of the operation o1205. Furthermore, obtaining information regarding map data of locations of fixed position objects module m1205 depicted in FIG. 6A as being included in the module m1201, when executed and/or activated, can direct performance of and/or perform the operation o1205. Illustratively, in one or more implementations, the operation o1205 can be carried out, for example, by obtaining information (e.g. data calculation, electronic signal reception, etc.) at least partially contained in the one or more at least partially mobile operating system operated intermediate electronic communication device (e.g. portable computers, etc.) relayed transmissions including obtaining information regarding map data (e.g. Google maps, other web-based map service, map database calls, etc.) of locations of fixed position objects (e.g. roadway signs, etc.).

In one or more implementations, as shown in FIG. 10B, the operation o1201 can include operation o1206 for obtaining information at least partially contained in the one or more at least partially mobile operating system operated intermediate electronic communication device relayed transmissions including obtaining information regarding one or more time based distributions of instances of obstruction of electronic device communication for one or more particular geographical locations. Origination of a physically tangible component group can be accomplished through skilled in the art design choice selection including use of one or more components and/or subsystems explicitly and/or implicitly referred to herein for at least in part implementing execution of one or more instructions i1206 of the operation o1206, for performance of the operation o1206 by an electrical circuitry arrangement e1206 as activated thereto, and/or otherwise fulfillment of the operation o1206. One or more non-transitory signal bearing physical media can bear the one or more instructions i1206 that when executed can direct performance of the operation o1206. Furthermore, obtaining information regarding time based distributions of instances of obstruction of electronic device communication for particular geographical locations module m1206 depicted in FIG. 6A as being included in the module m1201, when executed and/or activated, can direct performance of and/or perform the operation o1206. Illustratively, in one or more implementations, the operation o1206 can be carried out, for example, by obtaining information (e.g. data calculation, electronic signal reception, etc.) at least partially contained in the one or more at least partially mobile operating system operated intermediate electronic communication device (e.g. portable computers, etc.) relayed transmissions including obtaining information regarding one or more time based distributions of instances of obstruction (e.g. frequency occurrences regarding days of week, holidays, seasonal events, months of year, institutional calendars, etc.) of electronic device communication (e.g. cellular, mesh network, etc.) for one or more particular geographical locations (e.g. cities, parks, downtowns, buildings, etc.).

In one or more implementations, as shown in FIG. 10B, the operation o1201 can include operation o1207 for obtaining information at least partially contained in the one or more at least partially mobile operating system operated intermediate electronic communication device relayed transmissions including obtaining information regarding one or more statistical probabilities of remaining in communication with the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1207 of the operation o1207, for performance of the operation o1207 by an electrical circuitry arrangement e1207 as activated thereto, and/or otherwise fulfillment of the operation o1207. One or more non-transitory signal bearing physical media can bear the one or more instructions i1207 that when executed can direct performance of the operation o1207. Furthermore, obtaining information contained in mobile operating system operated intermediate electronic communication device relayed transmissions including obtaining information regarding statistical probabilities of remaining in communication with intermediate electronic communication devices module m1207 depicted in FIG. 6A as being included in the module m1201, when executed and/or activated, can direct performance of and/or perform the operation o1207. Illustratively, in one or more implementations, the operation o1207 can be carried out, for example, by obtaining information (e.g. data calculation, electronic signal reception, etc.) at least partially contained in the one or more at least partially mobile operating system operated intermediate electronic communication device (e.g. portable computers, etc.) relayed transmissions including obtaining information regarding one or more statistical probabilities (e.g. Gaussian distribution, manual surveys, user surveys, automated surveys, etc.) of remaining in communication (e.g. call not dropped, data transmission complete, no delays in transmission, etc.) with the one or more intermediate electronic communication devices (e.g. handset, etc.).

In one or more implementations, as shown in FIG. 10B, the operation o1201 can include operation o1208 for obtaining information at least partially contained in the one or more at least partially mobile operating system operated intermediate electronic communication device relayed transmissions including obtaining information regarding one or more distances from the one or more intermediate electronic communication devices to the one or more destination electronic communication devices. Origination of a physically tangible component group can be accomplished through skilled in the art design choice selection including use of one or more components and/or subsystems explicitly and/or implicitly referred to herein for at least in part implementing execution of one or more instructions i1208 of the operation o1208, for performance of the operation o1208 by an electrical circuitry arrangement e1208 as activated thereto, and/or otherwise fulfillment of the operation o1208. One or more non-transitory signal bearing physical media can bear the one or more instructions i1208 that when executed can direct performance of the operation o1208. Furthermore, obtaining information contained in mobile operating system operated intermediate electronic communication device relayed transmissions including obtaining information regarding distances from intermediate electronic communication devices to destination electronic communication devices module m1208 depicted in FIG. 6A as being included in the module m1201, when executed and/or activated, can direct performance of and/or perform the operation o1208. Illustratively, in one or more implementations, the operation o1208 can be carried out, for example, by obtaining information (e.g. data calculation, electronic signal reception, etc.) at least partially contained in the one or more at least partially mobile operating system operated intermediate electronic communication device (e.g. portable computers, etc.) relayed transmissions including obtaining information regarding one or more distances (e.g. line of sight distance, etc.) from the one or more intermediate electronic communication devices (e.g. laptop, etc.) to the one or more destination electronic communication devices (e.g. smartphone, etc.).

In one or more implementations, as shown in FIG. 10B, the operation o1201 can include operation o1209 for obtaining information at least partially contained in the one or more at least partially mobile operating system operated intermediate electronic communication device relayed transmissions including obtaining GPS positioning data regarding the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1209 of the operation o1209, for performance of the operation o1209 by an electrical circuitry arrangement e1209 as activated thereto, and/or otherwise fulfillment of the operation o1209. One or more non-transitory signal bearing physical media can bear the one or more instructions i1209 that when executed can direct performance of the operation o1209. Furthermore, obtaining information contained in mobile operating system operated intermediate electronic communication device relayed transmissions including obtaining GPS positioning data regarding intermediate electronic communication devices module m1209 depicted in FIG. 6A as being included in the module m1201, when executed and/or activated, can direct performance of and/or perform the operation o1209. Illustratively, in one or more implementations, the operation o1209 can be carried out, for example, by obtaining information (e.g. data calculation, electronic signal reception, etc.) at least partially contained in the one or more at least partially mobile operating system operated intermediate electronic communication device (e.g. portable computers, etc.) relayed transmissions including obtaining GPS positioning data (e.g. global positioning system satellite data, chipset information, data base inquiry, etc.) regarding the one or more intermediate electronic communication devices (e.g. phablet, etc.).

In one or more implementations, as shown in FIG. 10C, the operation o1201 can include operation o1210 for obtaining information at least partially contained in the one or more at least partially mobile operating system operated intermediate electronic communication device relayed transmissions including obtaining information associated with communication histories of one or more other electronic communication devices communicating with the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1210 of the operation o1210, for performance of the operation o1210 by an electrical circuitry arrangement e1210 as activated thereto, and/or otherwise fulfillment of the operation o1210. One or more non-transitory signal bearing physical media can bear the one or more instructions i1210 that when executed can direct performance of the operation o1210. Furthermore, obtaining information associated with communication histories of other electronic communication devices communicating with intermediate electronic communication devices module m1210 depicted in FIG. 6B as being included in the module m1201, when executed and/or activated, can direct performance of and/or perform the operation o1210. Illustratively, in one or more implementations, the operation o1210 can be carried out, for example, by obtaining information (e.g. data calculation, electronic signal reception, etc.) at least partially contained in the one or more at least partially mobile operating system operated intermediate electronic communication device (e.g. portable computers, etc.) relayed transmissions including obtaining information associated with communication histories (e.g. data base records of call duration, time of call, call locations, associated transmission issues, network systems used, etc.) of one or more other electronic communication devices (e.g. mobile cellular communication devices, etc.) communicating with the one or more intermediate electronic communication devices (e.g. mobile communication computer devices, etc.).

In one or more implementations, as shown in FIG. 10C, the operation o1210 can include operation o1211 for obtaining information associated with communication histories of one or more other electronic communication devices communicating with the one or more intermediate electronic communication devices including obtaining information as positioning data for the one or more other electronic communication devices. Origination of a physically tangible component group can be accomplished through skilled in the art design choice selection including use of one or more components and/or subsystems explicitly and/or implicitly referred to herein for at least in part implementing execution of one or more instructions i1211 of the operation o1211, for performance of the operation o1211 by an electrical circuitry arrangement e1211 as activated thereto, and/or otherwise fulfillment of the operation o1211. One or more non-transitory signal bearing physical media can bear the one or more instructions i1211 that when executed can direct performance of the operation o1211. Furthermore, obtaining information as positioning data for other electronic communication devices module m1211 depicted in FIG. 6B as being included in the module m1210, when executed and/or activated, can direct performance of and/or perform the operation o1211. Illustratively, in one or more implementations, the operation o1211 can be carried out, for example, by obtaining information associated with communication histories (e.g. data base records of call duration, time of call, call locations, associated transmission issues, network systems used, etc.) of one or more other electronic communication devices (e.g. mobile cellular communication devices, etc.) communicating with the one or more intermediate electronic communication devices (e.g. mobile communication computer devices, etc.) including obtaining information as positioning data (e.g. data describing location in relation to fixed objects, data describing location in relation to fixed base stations, data describing location in relation to environmental interference such as water falls, etc.) for the one or more other electronic communication devices (e.g. smartphones, etc.).

In one or more implementations, as shown in FIG. 10C, the operation o1210 can include operation o1212 for obtaining information associated with communication histories of one or more other electronic communication devices communicating with the one or more intermediate electronic communication devices including obtaining information as communication history data previously stored and forwarded between one or more electronic communication devices. Origination of a physically tangible component group can be accomplished through skilled in the art design choice selection including use of one or more components and/or subsystems explicitly and/or implicitly referred to herein for at least in part implementing execution of one or more instructions i1212 of the operation o1212, for performance of the operation o1212 by an electrical circuitry arrangement e1212 as activated thereto, and/or otherwise fulfillment of the operation o1212. One or more non-transitory signal bearing physical media can bear the one or more instructions i1212 that when executed can direct performance of the operation o1212. Furthermore, obtaining information as communication history data previously stored and forwarded between electronic communication devices module m1212 depicted in FIG. 6B as being included in the module m1210, when executed and/or activated, can direct performance of and/or perform the operation o1212. Illustratively, in one or more implementations, the operation o1212 can be carried out, for example, by obtaining information associated with communication histories (e.g. data base records of call duration, time of call, call locations, associated transmission issues, network systems used, etc.) of one or more other electronic communication devices (e.g. mobile cellular communication devices, etc.) communicating with the one or more intermediate electronic communication devices (e.g. mobile communication computer devices, etc.) including obtaining information as communication history data (e.g. successful communication versus communication problems with maintaining communication links, transmission dropout, degradation of transmission speed, etc.) previously stored and forwarded (e.g. temporarily held in device memory and then retransmitted, etc.) between one or more electronic communication devices (e.g. handheld computers, etc.).

In one or more implementations, as shown in FIG. 10C, the operation o1201 can include operation o1213 for obtaining information at least partially contained in the one or more at least partially mobile operating system operated intermediate electronic communication device relayed transmissions including obtaining information regarding one or more potential obstructions to electronic communication located proximate to one or more of the intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1213 of the operation o1213, for performance of the operation o1213 by an electrical circuitry arrangement e1213 as activated thereto, and/or otherwise fulfillment of the operation o1213. One or more non-transitory signal bearing physical media can bear the one or more instructions i1213 that when executed can direct performance of the operation o1213. Furthermore, obtaining information regarding potential obstructions to electronic communication located proximate to intermediate electronic communication devices module m1213 depicted in FIG. 6B as being included in the module m1201, when executed and/or activated, can direct performance of and/or perform the operation o1213. Illustratively, in one or more implementations, the operation o1213 can be carried out, for example, by obtaining information (e.g. data calculation, electronic signal reception, etc.) at least partially contained in the one or more at least partially mobile operating system operated intermediate electronic communication device (e.g. portable computers, etc.) relayed transmissions including obtaining information regarding one or more potential obstructions (e.g. thunderstorm cells, etc.) to electronic communication (e.g. above 50 GHz, etc.) located proximate (e.g. within one mile, etc.) to one or more of the intermediate electronic communication devices (e.g. tablet computers, etc.).

In one or more implementations, as shown in FIG. 10D, the operation o1213 can include operation o1214 for obtaining information regarding one or more potential obstructions to electronic communication located proximate to one or more of the intermediate electronic communication devices including obtaining information regarding one or more moveable communication obstructions. Origination of a physically tangible component group can be accomplished through skilled in the art design choice selection including use of one or more components and/or subsystems explicitly and/or implicitly referred to herein for at least in part implementing execution of one or more instructions i1214 of the operation o1214, for performance of the operation o1214 by an electrical circuitry arrangement e1214 as activated thereto, and/or otherwise fulfillment of the operation o1214. One or more non-transitory signal bearing physical media can bear the one or more instructions i1214 that when executed can direct performance of the operation o1214. Furthermore, obtaining information regarding moveable communication obstructions module m1214 depicted in FIG. 6B as being included in the module m1213, when executed and/or activated, can direct performance of and/or perform the operation o1214. Illustratively, in one or more implementations, the operation o1214 can be carried out, for example, by obtaining information regarding one or more potential obstructions (e.g. thunderstorm cells, etc.) to electronic communication (e.g. above 50 GHz, etc.) located proximate (e.g. within one mile, etc.) to one or more of the intermediate electronic communication devices (e.g. tablet computers, etc.) including obtaining information regarding one or more moveable communication obstructions (e.g. ship container traffic in relation to ferry traffic, etc.).

In one or more implementations, as shown in FIG. 10D, the operation o1214 can include operation o1215 for obtaining information regarding one or more moveable communication obstructions including obtaining information regarding one or more moveable communication obstructions as one or more pedestrians. Origination of a physically tangible component group can be accomplished through skilled in the art design choice selection including use of one or more components and/or subsystems explicitly and/or implicitly referred to herein for at least in part implementing execution of one or more instructions i1215 of the operation o1215, for performance of the operation o1215 by an electrical circuitry arrangement e1215 as activated thereto, and/or otherwise fulfillment of the operation o1215. One or more non-transitory signal bearing physical media can bear the one or more instructions i1215 that when executed can direct performance of the operation o1215. Furthermore, obtaining information regarding moveable communication obstructions as pedestrians module m1215 depicted in FIG. 6B as being included in the module m1214, when executed and/or activated, can direct performance of and/or perform the operation o1215. Illustratively, in one or more implementations, the operation o1215 can be carried out, for example, by obtaining information regarding one or more moveable communication obstructions (e.g. ship container traffic in relation to ferry traffic, etc.) including obtaining information regarding one or more moveable communication obstructions as one or more pedestrians (e.g. pedestrians on the ship containers or ferry traffic, pedestrians having health issues regarding high frequency electronic communications, etc.).

In one or more implementations, as shown in FIG. 10D, the operation o1213 can include operation o1216 for obtaining information regarding one or more potential obstructions to electronic communication located proximate to one or more of the intermediate electronic communication devices including obtaining information regarding one or more potential obstructions to electronic communication as one or more architectural structures. Origination of a physically tangible component group can be accomplished through skilled in the art design choice selection including use of one or more components and/or subsystems explicitly and/or implicitly referred to herein for at least in part implementing execution of one or more instructions i1216 of the operation o1216, for performance of the operation o1216 by an electrical circuitry arrangement e1216 as activated thereto, and/or otherwise fulfillment of the operation o1216. One or more non-transitory signal bearing physical media can bear the one or more instructions i1216 that when executed can direct performance of the operation o1216. Furthermore, obtaining information regarding potential obstructions to electronic communication as architectural structures module m1216 depicted in FIG. 6B as being included in the module m1213, when executed and/or activated, can direct performance of and/or perform the operation o1216. Illustratively, in one or more implementations, the operation o1216 can be carried out, for example, by obtaining information regarding one or more potential obstructions (e.g. thunderstorm cells, etc.) to electronic communication (e.g. above 50 GHz, etc.) located proximate (e.g. within one mile, etc.) to one or more of the intermediate electronic communication devices (e.g. tablet computers, etc.) including obtaining information regarding one or more potential obstructions (e.g. 50% percent probability of greater than 5% of a period of time that communication is blocked, etc.) to electronic communication as one or more architectural structures (e.g. warehouses, airport centers, etc.).

In one or more implementations, as shown in FIG. 10D, the operation o1216 can include operation o1217 for obtaining information regarding one or more potential obstructions to point-to-point electronic communication as one or more architectural structures including obtaining information regarding one or more architectural communication obstructions as one or more stadiums. Origination of a physically tangible component group can be accomplished through skilled in the art design choice selection including use of one or more components and/or subsystems explicitly and/or implicitly referred to herein for at least in part implementing execution of one or more instructions i1217 of the operation o1217, for performance of the operation o1217 by an electrical circuitry arrangement e1217 as activated thereto, and/or otherwise fulfillment of the operation o1217. One or more non-transitory signal bearing physical media can bear the one or more instructions i1217 that when executed can direct performance of the operation o1217. Furthermore, obtaining information regarding architectural communication obstructions as stadiums module m1217 depicted in FIG. 6B as being included in the module m1216, when executed and/or activated, can direct performance of and/or perform the operation o1217. Illustratively, in one or more implementations, the operation o1217 can be carried out, for example, by obtaining information regarding one or more potential obstructions (e.g. 50% percent probability of greater than 5% of a period of time that communication is blocked, etc.) to electronic communication as one or more architectural structures (e.g. warehouses, airport centers, etc.) including obtaining information regarding one or more architectural communication obstructions (e.g. communication is degraded in speed, quality, duration of availability, etc.) as one or more stadiums (e.g. sports arenas, concert halls, etc.).

In one or more implementations, as shown in FIG. 10E, the operation o1201 can include operation o1218 for obtaining information at least partially contained in the one or more at least partially mobile operating system operated intermediate electronic communication device relayed transmissions including obtaining information regarding one or more potential obstructions to point-to-point electronic communication with the origination electronic communication device that are proximate to one or more of the origination communication devices. Origination of a physically tangible component group can be accomplished through skilled in the art design choice selection including use of one or more components and/or subsystems explicitly and/or implicitly referred to herein for at least in part implementing execution of one or more instructions i1218 of the operation o1218, for performance of the operation o1218 by an electrical circuitry arrangement e1218 as activated thereto, and/or otherwise fulfillment of the operation o1218. One or more non-transitory signal bearing physical media can bear the one or more instructions i1218 that when executed can direct performance of the operation o1218. Furthermore, obtaining information regarding potential obstructions to point-to-point electronic communication with origination electronic communication device that are proximate to origination communication devices module m1218 depicted in FIG. 6B as being included in the module m1201, when executed and/or activated, can direct performance of and/or perform the operation o1218. Illustratively, in one or more implementations, the operation o1218 can be carried out, for example, by obtaining information (e.g. data calculation, electronic signal reception, etc.) at least partially contained in the one or more at least partially mobile operating system operated intermediate electronic communication device (e.g. portable computers, etc.) relayed transmissions including obtaining information regarding one or more potential obstructions (e.g. totally block communication in one or more directions of communication, etc.) to point-to-point electronic communication (e.g. line of sight, etc.) with the origination electronic communication device that are proximate to one or more of the origination communication devices (e.g. mobile handset, etc.).

In one or more implementations, as shown in FIG. 10E, the operation o1218 can include operation o1219 for obtaining information regarding one or more potential obstructions to point-to-point electronic communication with the origination electronic communication device that are proximate to one or more of the origination communication devices including obtaining information regarding one or more moveable objects as obstructions to electronic communication with one or more of the origination electronic communication devices. Origination of a physically tangible component group can be accomplished through skilled in the art design choice selection including use of one or more components and/or subsystems explicitly and/or implicitly referred to herein for at least in part implementing execution of one or more instructions i1219 of the operation o1219, for performance of the operation o1219 by an electrical circuitry arrangement e1219 as activated thereto, and/or otherwise fulfillment of the operation o1219. One or more non-transitory signal bearing physical media can bear the one or more instructions i1219 that when executed can direct performance of the operation o1219. Furthermore, obtaining information regarding moveable objects as obstructions to electronic communication with origination electronic communication devices module m1219 depicted in FIG. 6B as being included in the module m1218, when executed and/or activated, can direct performance of and/or perform the operation o1219. Illustratively, in one or more implementations, the operation o1219 can be carried out, for example, by obtaining information regarding one or more potential obstructions (e.g. totally block communication in one or more directions of communication, etc.) to point-to-point electronic communication (e.g. line of sight, etc.) with the origination electronic communication device that are proximate to one or more of the origination communication devices (e.g. mobile handset, etc.) including obtaining information regarding one or more moveable objects (e.g. temporary shelters, etc.) as obstructions (e.g. reduce transmission speeds, etc.) to electronic communication (e.g. within mile radius, etc.) with one or more of the origination electronic communication devices (e.g. mobile communication device, etc.).

In one or more implementations, as shown in FIG. 10E, the operation o1219 can include operation o1220 for obtaining information regarding one or more moveable objects as obstructions to electronic communication with one or more of the origination electronic communication devices including obtaining information regarding one or more moveable communication obstructions as motor vehicles. Origination of a physically tangible component group can be accomplished through skilled in the art design choice selection including use of one or more components and/or subsystems explicitly and/or implicitly referred to herein for at least in part implementing execution of one or more instructions i1220 of the operation o1220, for performance of the operation o1220 by an electrical circuitry arrangement e1220 as activated thereto, and/or otherwise fulfillment of the operation o1220. One or more non-transitory signal bearing physical media can bear the one or more instructions i1220 that when executed can direct performance of the operation o1220. Furthermore, obtaining information regarding moveable communication obstructions as motor vehicles module m1220 depicted in FIG. 6B as being included in the module m1219, when executed and/or activated, can direct performance of and/or perform the operation o1220. Illustratively, in one or more implementations, the operation o1220 can be carried out, for example, by obtaining information regarding one or more moveable objects (e.g. temporary shelters, etc.) as obstructions (e.g. reduce transmission speeds, etc.) to electronic communication (e.g. within mile radius, etc.) with one or more of the origination electronic communication devices (e.g. mobile communication device, etc.) including obtaining information regarding one or more moveable communication obstructions as motor vehicles (e.g. commuter bus traffic in relation to line of sight communication near commuter stations, etc.).

In one or more implementations, as shown in FIG. 10E, the operation o1218 can include operation o1221 for obtaining information regarding one or more potential obstructions to point-to-point electronic communication with the origination electronic communication device that are proximate to one or more of the origination communication devices including obtaining information regarding one or more potential obstructions to point-to-point electronic communication with the origination electronic communication device as one or more architectural structures. Origination of a physically tangible component group can be accomplished through skilled in the art design choice selection including use of one or more components and/or subsystems explicitly and/or implicitly referred to herein for at least in part implementing execution of one or more instructions i1221 of the operation o1221, for performance of the operation o1221 by an electrical circuitry arrangement e1221 as activated thereto, and/or otherwise fulfillment of the operation o1221. One or more non-transitory signal bearing physical media can bear the one or more instructions i1221 that when executed can direct performance of the operation o1221. Furthermore, obtaining information regarding potential obstructions to point-to-point electronic communication with origination electronic communication device as architectural structures module m1221 depicted in FIG. 6C as being included in the module m1218, when executed and/or activated, can direct performance of and/or perform the operation o1221. Illustratively, in one or more implementations, the operation o1221 can be carried out, for example, by obtaining information regarding one or more potential obstructions (e.g. totally block communication in one or more directions of communication, etc.) to point-to-point electronic communication (e.g. line of sight, etc.) with the origination electronic communication device that are proximate to one or more of the origination communication devices (e.g. mobile handset, etc.) including obtaining information regarding one or more potential obstructions (e.g. above 20% probability of 100% blockage of communication traffic for over 20 minutes, etc.) to point-to-point electronic communication (e.g. direct WiFi, etc.) with the origination electronic communication device (e.g. smartphone, etc.) as one or more architectural structures (e.g. roadway signs, etc.).

In one or more implementations, as shown in FIG. 10F, the operation o1221 can include operation o1222 for obtaining information regarding one or more potential obstructions to point-to-point electronic communication with the origination electronic communication device as one or more architectural structures including obtaining information regarding architectural communication obstructions as one or more downtown skyscraper buildings. Origination of a physically tangible component group can be accomplished through skilled in the art design choice selection including use of one or more components and/or subsystems explicitly and/or implicitly referred to herein for at least in part implementing execution of one or more instructions i1222 of the operation o1222, for performance of the operation o1222 by an electrical circuitry arrangement e1222 as activated thereto, and/or otherwise fulfillment of the operation o1222. One or more non-transitory signal bearing physical media can bear the one or more instructions i1222 that when executed can direct performance of the operation o1222. Furthermore, obtaining information regarding potential obstructions to point-to-point electronic communication with origination electronic communication device as architectural structures including obtaining information regarding architectural communication obstructions as downtown skyscraper buildings module m1222 depicted in FIG. 6C as being included in the module m1221, when executed and/or activated, can direct performance of and/or perform the operation o1222. Illustratively, in one or more implementations, the operation o1222 can be carried out, for example, by obtaining information regarding one or more potential obstructions (e.g. above 20% probability of 100% blockage of communication traffic for over 20 minutes, etc.) to point-to-point electronic communication (e.g. direct WiFi, etc.) with the origination electronic communication device (e.g. smartphone, etc.) as one or more architectural structures (e.g. roadway signs, etc.) including obtaining information regarding architectural communication obstructions (e.g. clusters of buildings that do not allow point-to-point communication with base stations located out of areas where humans congregate due for health safety requirements, etc.) as one or more downtown skyscraper buildings (e.g. Manhattan skyscrapers, etc.).

In one or more implementations, as shown in FIG. 10F, the operation o1201 can include operation o1223 for obtaining information at least partially contained in the one or more at least partially mobile operating system operated intermediate electronic communication device relayed transmissions including obtaining information regarding one or more potential obstructions to electronic communication with one or more of the destination electronic communication devices proximate to one or more of the destination electronic communication devices. Origination of a physically tangible component group can be accomplished through skilled in the art design choice selection including use of one or more components and/or subsystems explicitly and/or implicitly referred to herein for at least in part implementing execution of one or more instructions i1223 of the operation o1223, for performance of the operation o1223 by an electrical circuitry arrangement e1223 as activated thereto, and/or otherwise fulfillment of the operation o1223. One or more non-transitory signal bearing physical media can bear the one or more instructions i1223 that when executed can direct performance of the operation o1223. Furthermore, obtaining information regarding potential obstructions to electronic communication with destination electronic communication devices proximate to destination electronic communication devices module m1223 depicted in FIG. 6C as being included in the module m1201, when executed and/or activated, can direct performance of and/or perform the operation o1223. Illustratively, in one or more implementations, the operation o1223 can be carried out, for example, by obtaining information (e.g. data calculation, electronic signal reception, etc.) at least partially contained in the one or more at least partially mobile operating system operated intermediate electronic communication device (e.g. portable computers, etc.) relayed transmissions including obtaining information regarding one or more potential obstructions (e.g. having cross-sectional dimensions above predetermined thresholds, etc.) to electronic communication (e.g. substantially line of sight communication, etc.) with one or more of the destination electronic communication devices (e.g. mobile handheld device, etc.) proximate (e.g. within 500 feet, etc.) to one or more of the destination electronic communication devices (e.g. laptop, etc.).

In one or more implementations, as shown in FIG. 10F, the operation o1223 can include operation o1224 for obtaining information regarding one or more potential obstructions to electronic communication with one or more of the destination electronic communication devices proximate to one or more of the destination electronic communication devices including obtaining information regarding one or more moveable communication obstructions. Origination of a physically tangible component group can be accomplished through skilled in the art design choice selection including use of one or more components and/or subsystems explicitly and/or implicitly referred to herein for at least in part implementing execution of one or more instructions i1224 of the operation o1224, for performance of the operation o1224 by an electrical circuitry arrangement e1224 as activated thereto, and/or otherwise fulfillment of the operation o1224. One or more non-transitory signal bearing physical media can bear the one or more instructions i1224 that when executed can direct performance of the operation o1224. Furthermore, obtaining information regarding moveable communication obstructions module m1224 depicted in FIG. 6C as being included in the module m1223, when executed and/or activated, can direct performance of and/or perform the operation o1224. Illustratively, in one or more implementations, the operation o1224 can be carried out, for example, by obtaining information regarding one or more potential obstructions (e.g. having cross-sectional dimensions above predetermined thresholds, etc.) to electronic communication (e.g. substantially line of sight communication, etc.) with one or more of the destination electronic communication devices (e.g. mobile handheld device, etc.) proximate (e.g. within 500 feet, etc.) to one or more of the destination electronic communication devices (e.g. laptop, etc.) including obtaining information regarding one or more moveable communication obstructions (e.g. independently powered motion such as animals or humans, etc.).

In one or more implementations, as shown in FIG. 10F, the operation o1224 can include operation o1225 for obtaining information regarding one or more moveable communication obstructions including obtaining information regarding one or more audiences of human spectators. Origination of a physically tangible component group can be accomplished through skilled in the art design choice selection including use of one or more components and/or subsystems explicitly and/or implicitly referred to herein for at least in part implementing execution of one or more instructions i1225 of the operation o1225, for performance of the operation o1225 by an electrical circuitry arrangement e1225 as activated thereto, and/or otherwise fulfillment of the operation o1225. One or more non-transitory signal bearing physical media can bear the one or more instructions i1225 that when executed can direct performance of the operation o1225. Furthermore, obtaining information regarding audiences of human spectators module m1225 depicted in FIG. 6C as being included in the module m1224, when executed and/or activated, can direct performance of and/or perform the operation o1225. Illustratively, in one or more implementations, the operation o1225 can be carried out, for example, by obtaining information regarding one or more moveable communication obstructions (e.g. independently powered motion such as animals or humans, etc.) including obtaining information regarding one or more audiences of human spectators (e.g. football fans, concert attendees, commercial presentation at convention center, etc.).

In one or more implementations, as shown in FIG. 10G, the operation o1223 can include operation o1226 for obtaining information regarding one or more potential obstructions to electronic communication with one or more of the destination electronic communication devices proximate to one or more of the destination electronic communication devices including obtaining information regarding one or more communication obstructions as one or more architectural structures. Origination of a physically tangible component group can be accomplished through skilled in the art design choice selection including use of one or more components and/or subsystems explicitly and/or implicitly referred to herein for at least in part implementing execution of one or more instructions i1226 of the operation o1226, for performance of the operation o1226 by an electrical circuitry arrangement e1226 as activated thereto, and/or otherwise fulfillment of the operation o1226. One or more non-transitory signal bearing physical media can bear the one or more instructions i1226 that when executed can direct performance of the operation o1226. Furthermore, obtaining information regarding communication obstructions as architectural structures module m1226 depicted in FIG. 6C as being included in the module m1223, when executed and/or activated, can direct performance of and/or perform the operation o1226. Illustratively, in one or more implementations, the operation o1226 can be carried out, for example, by obtaining information regarding one or more potential obstructions (e.g. having cross-sectional dimensions above predetermined thresholds, etc.) to electronic communication (e.g. substantially line of sight communication, etc.) with one or more of the destination electronic communication devices (e.g. mobile handheld device, etc.) proximate (e.g. within 500 feet, etc.) to one or more of the destination electronic communication devices (e.g. laptop, etc.) including obtaining information regarding one or more communication obstructions as one or more architectural structures (e.g. monuments, museums, city halls, capitols, etc.).

In one or more implementations, as shown in FIG. 10G, the operation o1226 can include operation o1227 for obtaining information regarding one or more communication obstructions as one or more architectural structures including obtaining information regarding one or more transportation tunnels. Origination of a physically tangible component group can be accomplished through skilled in the art design choice selection including use of one or more components and/or subsystems explicitly and/or implicitly referred to herein for at least in part implementing execution of one or more instructions i1227 of the operation o1227, for performance of the operation o1227 by an electrical circuitry arrangement e1227 as activated thereto, and/or otherwise fulfillment of the operation o1227. One or more non-transitory signal bearing physical media can bear the one or more instructions i1227 that when executed can direct performance of the operation o1227. Furthermore, obtaining information regarding transportation tunnels module m1227 depicted in FIG. 6C as being included in the module m1226, when executed and/or activated, can direct performance of and/or perform the operation o1227. Illustratively, in one or more implementations, the operation o1227 can be carried out, for example, by obtaining information regarding one or more communication obstructions as one or more architectural structures (e.g. monuments, museums, city halls, capitols, etc.) including obtaining information regarding one or more transportation tunnels (e.g. Eisenhower tunnel, Washington tunnel, mountain pass, etc.).

In one or more implementations, as shown in FIG. 10G, the operation o1201 can include operation o1228 for obtaining information at least partially contained in the one or more at least partially mobile operating system operated intermediate electronic communication device relayed transmissions including obtaining information regarding communication capacity available to one or more of the standby communication relays furnished by the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1228 of the operation o1228, for performance of the operation o1228 by an electrical circuitry arrangement e1228 as activated thereto, and/or otherwise fulfillment of the operation o1228. One or more non-transitory signal bearing physical media can bear the one or more instructions i1228 that when executed can direct performance of the operation o1228. Furthermore, obtaining information regarding communication capacity available to standby communication relays furnished by intermediate electronic communication devices module m1228 depicted in FIG. 6C as being included in the module m1201, when executed and/or activated, can direct performance of and/or perform the operation o1228. Illustratively, in one or more implementations, the operation o1228 can be carried out, for example, by obtaining information (e.g. data calculation, electronic signal reception, etc.) at least partially contained in the one or more at least partially mobile operating system operated intermediate electronic communication device (e.g. portable computers, etc.) relayed transmissions including obtaining information regarding communication capacity (e.g. gigabit per second rates, etc.) available (e.g. end-users of intermediate electronic communication devices have signed up to have their devices provide standby service, etc.) to one or more of the standby communication relays (e.g. relays can have one or more intermediate devices and can share one or more intermediate devices, etc.) furnished by the one or more intermediate electronic communication devices (e.g. mobile communication devices, etc.).

In one or more implementations, as shown in FIG. 10G, the operation o1228 can include operation o1229 for obtaining information regarding communication capacity available to one or more of the standby communication relays furnished by the one or more intermediate electronic communication devices including obtaining information regarding communication bandwidth available to one or more of the standby communication relays furnished by the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1229 of the operation o1229, for performance of the operation o1229 by an electrical circuitry arrangement e1229 as activated thereto, and/or otherwise fulfillment of the operation o1229. One or more non-transitory signal bearing physical media can bear the one or more instructions i1229 that when executed can direct performance of the operation o1229. Furthermore, obtaining information regarding communication bandwidth available to standby communication relays furnished by intermediate electronic communication devices module m1229 depicted in FIG. 6C as being included in the module m1228, when executed and/or activated, can direct performance of and/or perform the operation o1229. Illustratively, in one or more implementations, the operation o1229 can be carried out, for example, by obtaining information regarding communication capacity (e.g. gigabit per second rates, etc.) available (e.g. end-users of intermediate electronic communication devices have signed up to have their devices provide standby service, etc.) to one or more of the standby communication relays (e.g. relays can have one or more intermediate devices and can share one or more intermediate devices, etc.) furnished by the one or more intermediate electronic communication devices (e.g. mobile communication devices, etc.) including obtaining information regarding communication bandwidth available (e.g. bit per second rates maximum or sustained, etc.) to one or more of the standby communication relays (e.g. available for immediate activation, etc.) furnished by the one or more intermediate electronic communication devices (e.g. laptops, etc.).

In one or more implementations, as shown in FIG. 10H, the operation o1228 can include operation o1230 for obtaining information regarding communication capacity available to one or more of the standby communication relays furnished by the one or more intermediate electronic communication devices including obtaining information regarding runtime duration available to one or more of the standby communication relays by the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1230 of the operation o1230, for performance of the operation o1230 by an electrical circuitry arrangement e1230 as activated thereto, and/or otherwise fulfillment of the operation o1230. One or more non-transitory signal bearing physical media can bear the one or more instructions i1230 that when executed can direct performance of the operation o1230. Furthermore, obtaining information regarding runtime duration available to standby communication relays by intermediate electronic communication devices module m1230 depicted in FIG. 6D as being included in the module m1228, when executed and/or activated, can direct performance of and/or perform the operation o1230. Illustratively, in one or more implementations, the operation o1230 can be carried out, for example, by obtaining information regarding communication capacity (e.g. gigabit per second rates, etc.) available (e.g. end-users of intermediate electronic communication devices have signed up to have their devices provide standby service, etc.) to one or more of the standby communication relays (e.g. relays can have one or more intermediate devices and can share one or more intermediate devices, etc.) furnished by the one or more intermediate electronic communication devices (e.g. mobile communication devices, etc.) including obtaining information regarding runtime duration available (e.g. length of time a call can be maintained, etc.) to one or more of the standby communication relays (e.g. available as contingency backup for standby network, etc.) by the one or more intermediate electronic communication devices (e.g. mobile communication devices, etc.).

In one or more implementations, as shown in FIG. 10H, the operation o1230 can include operation o1231 for obtaining information regarding runtime duration available to one or more of the standby communication relays by the one or more intermediate electronic communication devices including obtaining information regarding runtime duration available regarding battery level available to the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1231 of the operation o1231, for performance of the operation o1231 by an electrical circuitry arrangement e1231 as activated thereto, and/or otherwise fulfillment of the operation o1231. One or more non-transitory signal bearing physical media can bear the one or more instructions i1231 that when executed can direct performance of the operation o1231. Furthermore, obtaining information regarding runtime duration available regarding battery level available to intermediate electronic communication devices module m1231 depicted in FIG. 6D as being included in the module m1230, when executed and/or activated, can direct performance of and/or perform the operation o1231. Illustratively, in one or more implementations, the operation o1231 can be carried out, for example, by obtaining information regarding runtime duration available (e.g. length of time a call can be maintained, etc.) to one or more of the standby communication relays (e.g. available as contingency backup for standby network, etc.) by the one or more intermediate electronic communication devices (e.g. mobile communication devices, etc.) including obtaining information regarding runtime duration available regarding battery level (e.g. hours remaining, percentage power level above a minimum threshold, etc.) available to the one or more intermediate electronic communication devices (e.g. smartphones, etc.).

In one or more implementations, as shown in FIG. 10H, the operation o1230 can include operation o1232 for obtaining information regarding runtime duration available to one or more of the standby communication relays by the one or more intermediate electronic communication devices including obtaining information regarding runtime duration available regarding predetermined commitments for other uses of the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1232 of the operation o1232, for performance of the operation o1232 by an electrical circuitry arrangement e1232 as activated thereto, and/or otherwise fulfillment of the operation o1232. One or more non-transitory signal bearing physical media can bear the one or more instructions i1232 that when executed can direct performance of the operation o1232. Furthermore, obtaining information regarding runtime duration available regarding predetermined commitments for other uses of intermediate electronic communication devices module m1232 depicted in FIG. 6D as being included in the module m1230, when executed and/or activated, can direct performance of and/or perform the operation o1232. Illustratively, in one or more implementations, the operation o1232 can be carried out, for example, by obtaining information regarding runtime duration available (e.g. length of time a call can be maintained, etc.) to one or more of the standby communication relays (e.g. available as contingency backup for standby network, etc.) by the one or more intermediate electronic communication devices (e.g. mobile communication devices, etc.) including obtaining information regarding runtime duration available regarding predetermined commitments for other uses (e.g. number of standby communication networks a device is committed to support, etc.) of the one or more intermediate electronic communication devices (e.g. phablets, etc.).

In one or more implementations, as shown in FIG. 10H, the operation o1230 can include operation o1233 for obtaining information regarding runtime duration available to one or more of the standby communication relays by the one or more intermediate electronic communication devices including obtaining information regarding runtime duration available regarding potential obstructed communication paths of the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1233 of the operation o1233, for performance of the operation o1233 by an electrical circuitry arrangement e1233 as activated thereto, and/or otherwise fulfillment of the operation o1233. One or more non-transitory signal bearing physical media can bear the one or more instructions i1233 that when executed can direct performance of the operation o1233. Furthermore, obtaining information regarding runtime duration available regarding potential obstructed communication paths of intermediate electronic communication devices module m1233 depicted in FIG. 6D as being included in the module m1230, when executed and/or activated, can direct performance of and/or perform the operation o1233. Illustratively, in one or more implementations, the operation o1233 can be carried out, for example, by obtaining information regarding runtime duration available (e.g. length of time a call can be maintained, etc.) to one or more of the standby communication relays (e.g. available as contingency backup for standby network, etc.) by the one or more intermediate electronic communication devices (e.g. mobile communication devices, etc.) including obtaining information regarding runtime duration available regarding potential obstructed communication paths (e.g. based on location or projected path of intermediate device, etc.) of the one or more intermediate electronic communication devices (e.g. laptops, etc.).

In one or more implementations, as shown in FIG. 10J, the operation o1201 can include operation o1234 for obtaining information at least partially contained in the one or more at least partially mobile operating system operated intermediate electronic communication device relayed transmissions including obtaining information regarding quality of service of communication available to one or more standby communication network relay as furnished by the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1234 of the operation o1234, for performance of the operation o1234 by an electrical circuitry arrangement e1234 as activated thereto, and/or otherwise fulfillment of the operation o1234. One or more non-transitory signal bearing physical media can bear the one or more instructions i1234 that when executed can direct performance of the operation o1234. Furthermore, obtaining information regarding quality of service of communication available to standby communication network relay as furnished by intermediate electronic communication devices module m1234 depicted in FIG. 6D as being included in the module m1201, when executed and/or activated, can direct performance of and/or perform the operation o1234. Illustratively, in one or more implementations, the operation o1234 can be carried out, for example, by obtaining information (e.g. data calculation, electronic signal reception, etc.) at least partially contained in the one or more at least partially mobile operating system operated intermediate electronic communication device (e.g. portable computers, etc.) relayed transmissions including obtaining information regarding quality of service of communication available (e.g. regularly sustained high definition service, etc.) to one or more standby communication network relay (e.g. standby for immediate cutover if base station is occluded to origination device, etc.) as furnished by the one or more intermediate electronic communication devices (e.g. handsets, etc.).

In one or more implementations, as shown in FIG. 10J, the operation o1201 can include operation o1235 for obtaining information at least partially contained in the one or more at least partially mobile operating system operated intermediate electronic communication device relayed transmissions including obtaining information regarding one or more economic cost structures to be imposed associated with one or more standby communication relays furnished by the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1235 of the operation o1235, for performance of the operation o1235 by an electrical circuitry arrangement e1235 as activated thereto, and/or otherwise fulfillment of the operation o1235. One or more non-transitory signal bearing physical media can bear the one or more instructions i1235 that when executed can direct performance of the operation o1235. Furthermore, obtaining information regarding economic cost structures to be imposed associated with standby communication relays furnished by intermediate electronic communication devices module m1235 depicted in FIG. 6D as being included in the module m1201, when executed and/or activated, can direct performance of and/or perform the operation o1235. Illustratively, in one or more implementations, the operation o1235 can be carried out, for example, by obtaining information (e.g. data calculation, electronic signal reception, etc.) at least partially contained in the one or more at least partially mobile operating system operated intermediate electronic communication device (e.g. portable computers, etc.) relayed transmissions including obtaining information regarding one or more economic cost structures to be imposed (e.g. network credits, cash incentives, coupons, rebates earned, awarded for being available to provide standby capabilities, etc.) associated with one or more standby communication relays (e.g. on-call service available for immediate activation, etc.) furnished by the one or more intermediate electronic communication devices (e.g. smartphones, etc.).

In one or more implementations, as shown in FIG. 10J, the operation o1235 can include operation o1236 for obtaining information regarding one or more economic cost structures to be imposed associated with one or more of standby communication relays furnished by the one or more intermediate electronic communication devices including obtaining information regarding commercial credit or cash requirements to access one or more of the standby communication relays as furnished by the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1236 of the operation o1236, for performance of the operation o1236 by an electrical circuitry arrangement e1236 as activated thereto, and/or otherwise fulfillment of the operation o1236. One or more non-transitory signal bearing physical media can bear the one or more instructions i1236 that when executed can direct performance of the operation o1236. Furthermore, obtaining information regarding commercial credit or cash requirements to access of standby communication relays as furnished by intermediate electronic communication devices module m1236 depicted in FIG. 6D as being included in the module m1235, when executed and/or activated, can direct performance of and/or perform the operation o1236. Illustratively, in one or more implementations, the operation o1236 can be carried out, for example, by obtaining information regarding one or more economic cost structures to be imposed (e.g. network credits, cash incentives, coupons, rebates earned, awarded for being available to provide standby capabilities, etc.) associated with one or more standby communication relays (e.g. on-call service available for immediate activation, etc.) furnished by the one or more intermediate electronic communication devices (e.g. smartphones, etc.) including obtaining information regarding commercial credit or cash requirements (e.g. based on obligations imposed by intermediate devices onto each other or onto the origination device or onto the service plan provider of the standby network service, etc.) to access (e.g. various levels of use by the origination device based on time of day, amount of traffic required, quality requirements, etc.) one or more of the standby communication relays (e.g. hot-swap network service, etc.) as furnished by the one or more intermediate electronic communication devices.

In one or more implementations, as shown in FIG. 10J, the operation o1201 can include operation o1237 for obtaining information at least partially contained in the one or more at least partially mobile operating system operated intermediate electronic communication device relayed transmissions including obtaining information regarding the one or more intermediate electronic communication devices as having one or more communication paths including one or more line of sight pathways or one or more ricochet pathways. Origination of a physically tangible component group can be accomplished through skilled in the art design choice selection including use of one or more components and/or subsystems explicitly and/or implicitly referred to herein for at least in part implementing execution of one or more instructions i1237 of the operation o1237, for performance of the operation o1237 by an electrical circuitry arrangement e1237 as activated thereto, and/or otherwise fulfillment of the operation o1237. One or more non-transitory signal bearing physical media can bear the one or more instructions i1237 that when executed can direct performance of the operation o1237. Furthermore, obtaining information regarding intermediate electronic communication devices as having communication paths including line of sight pathways or ricochet pathways module m1237 depicted in FIG. 6D as being included in the module m1201, when executed and/or activated, can direct performance of and/or perform the operation o1237. Illustratively, in one or more implementations, the operation o1237 can be carried out, for example, by obtaining information (e.g. data calculation, electronic signal reception, etc.) at least partially contained in the one or more at least partially mobile operating system operated intermediate electronic communication device (e.g. portable computers, etc.) relayed transmissions including obtaining information regarding the one or more intermediate electronic communication devices as having one or more communication paths including one or more line of sight pathways or one or more ricochet pathways (e.g. communication pathways can be rated by likelihood they will become occluded, communication pathways can include combinations of line-of-sight segments as well as ricochet segments in which one or more communication beams can be bounced off of buildings or objects that may otherwise become obstructions to communication, etc.).

In one or more implementations, as shown in FIG. 11A, the operation o13 can include operation o1301 for electronically deriving one or more assessments associated at least in part with the one or more at least partially mobile operating system operated intermediate electronic communication device relayed transmissions from the one or more at least partially mobile operating system operated intermediate electronic communication devices activated from standby mode to be one or more communication network relays including deriving the one or more assessments associated at least in part with the one or more at least partially mobile operating system operated intermediate electronic communication device relayed transmissions through receiving information. Origination of a physically tangible component group can be accomplished through skilled in the art design choice selection including use of one or more components and/or subsystems explicitly and/or implicitly referred to herein for at least in part implementing execution of one or more instructions i1301 of the operation o1301, for performance of the operation o1301 by an electrical circuitry arrangement e1301 as activated thereto, and/or otherwise fulfillment of the operation o1301. One or more non-transitory signal bearing physical media can bear the one or more instructions i1301 that when executed can direct performance of the operation o1301. Furthermore, deriving assessments associated with mobile operating system operated intermediate electronic communication device relayed transmissions through receiving information module m1301 depicted in FIG. 7A as being included in the module m13, when executed and/or activated, can direct performance of and/or perform the operation o1301. Illustratively, in one or more implementations, the operation o1301 can be carried out, for example, by electronically deriving (e.g. computation, comparing, data calls, wireless reception, etc.) one or more assessments (e.g. comparisons, evaluations, rankings, listings, reports, etc.) associated (e.g. related, etc.) at least in part with the one or more at least partially mobile operating system operated (e.g. mobile iOS, etc.) intermediate electronic communication device (e.g. smartphone, etc.) relayed transmissions (e.g. wireless directed transmissions, etc.) from the one or more at least partially mobile operating system operated intermediate electronic communication devices (e.g. phablet, etc.) activated from standby mode (e.g. called through network to actively serve as relay, etc.) to be one or more communication network relays (e.g. network switch, router, repeater, relay, etc.) including deriving (e.g. determining, concluding, calculating, comparing, etc.) the one or more assessments associated at least in part with the one or more at least partially mobile operating system operated intermediate electronic communication device relayed transmissions through receiving information (e.g. receiving through network packet traffic, etc.).

In one or more implementations, as shown in FIG. 11A, the operation o1301 can include operation o1302 for deriving the one or more assessments associated at least in part with the one or more at least partially mobile operating system operated intermediate electronic communication device relayed transmissions through receiving information including receiving information involving access of data storage. Origination of a physically tangible component group can be accomplished through skilled in the art design choice selection including use of one or more components and/or subsystems explicitly and/or implicitly referred to herein for at least in part implementing execution of one or more instructions i1302 of the operation o1302, for performance of the operation o1302 by an electrical circuitry arrangement e1302 as activated thereto, and/or otherwise fulfillment of the operation o1302. One or more non-transitory signal bearing physical media can bear the one or more instructions i1302 that when executed can direct performance of the operation o1302. Furthermore, receiving information involving access of data storage module m1302 depicted in FIG. 7A as being included in the module m1301, when executed and/or activated, can direct performance of and/or perform the operation o1302. Illustratively, in one or more implementations, the operation o1302 can be carried out, for example, by deriving (e.g. determining, concluding, calculating, comparing, etc.) the one or more assessments associated at least in part with the one or more at least partially mobile operating system operated intermediate electronic communication device relayed transmissions through receiving information (e.g. receiving through network packet traffic, etc.) including receiving information (e.g. such as status information, etc.) involving access of data storage (e.g. such as memory or hard drive access calls, etc.).

In one or more implementations, as shown in FIG. 11A, the operation o1301 can include operation o1303 for deriving the one or more assessments associated at least in part with the one or more at least partially mobile operating system operated intermediate electronic communication device relayed transmissions through receiving information including receiving information involving receiving one or more wireless transmissions. Origination of a physically tangible component group can be accomplished through skilled in the art design choice selection including use of one or more components and/or subsystems explicitly and/or implicitly referred to herein for at least in part implementing execution of one or more instructions i1303 of the operation o1303, for performance of the operation o1303 by an electrical circuitry arrangement e1303 as activated thereto, and/or otherwise fulfillment of the operation o1303. One or more non-transitory signal bearing physical media can bear the one or more instructions i1303 that when executed can direct performance of the operation o1303. Furthermore, receiving information involving receiving wireless transmissions module m1303 depicted in FIG. 7A as being included in the module m1301, when executed and/or activated, can direct performance of and/or perform the operation o1303. Illustratively, in one or more implementations, the operation o1303 can be carried out, for example, by deriving (e.g. determining, concluding, calculating, comparing, etc.) the one or more assessments associated at least in part with the one or more at least partially mobile operating system operated intermediate electronic communication device relayed transmissions through receiving information (e.g. receiving through network packet traffic, etc.) including receiving information involving receiving one or more wireless transmissions (e.g. cellular transmissions, etc.).

In one or more implementations, as shown in FIG. 11A, the operation o1301 can include operation o1304 for deriving the one or more assessments associated at least in part with the one or more at least partially mobile operating system operated intermediate electronic communication device relayed transmissions through receiving information including receiving location information regarding one or more moveable objects that have previously obstructed communication of one or more communication network relays furnished by the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1304 of the operation o1304, for performance of the operation o1304 by an electrical circuitry arrangement e1304 as activated thereto, and/or otherwise fulfillment of the operation o1304. One or more non-transitory signal bearing physical media can bear the one or more instructions i1304 that when executed can direct performance of the operation o1304. Furthermore, receiving location information regarding moveable objects that have previously obstructed communication of communication network relays furnished by intermediate electronic communication devices module m1304 depicted in FIG. 7A as being included in the module m1301, when executed and/or activated, can direct performance of and/or perform the operation o1304. Illustratively, in one or more implementations, the operation o1304 can be carried out, for example, by deriving (e.g. determining, concluding, calculating, comparing, etc.) the one or more assessments associated at least in part with the one or more at least partially mobile operating system operated intermediate electronic communication device relayed transmissions through receiving information (e.g. receiving through network packet traffic, etc.) including receiving location information (e.g. relative geographical coordinates, etc.) regarding one or more moveable objects (e.g. industrial construction equipment, etc.) that have previously obstructed communication (e.g. less than a day of obstruction, etc.) of one or more communication network relays furnished by the one or more intermediate electronic communication devices (e.g. iPad, etc.).

In one or more implementations, as shown in FIG. 11A, the operation o1301 can include operation o1305 for deriving the one or more assessments associated at least in part with the one or more at least partially mobile operating system operated intermediate electronic communication device relayed transmissions through receiving information including receiving information regarding one or more statistical probabilities of remaining in communication with one or more communication network relays furnished by the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1305 of the operation o1305, for performance of the operation o1305 by an electrical circuitry arrangement e1305 as activated thereto, and/or otherwise fulfillment of the operation o1305. One or more non-transitory signal bearing physical media can bear the one or more instructions i1305 that when executed can direct performance of the operation o1305. Furthermore, receiving information regarding statistical probabilities of remaining in communication with communication network relays furnished by intermediate electronic communication devices module m1305 depicted in FIG. 7A as being included in the module m1301, when executed and/or activated, can direct performance of and/or perform the operation o1305. Illustratively, in one or more implementations, the operation o1305 can be carried out, for example, by deriving (e.g. determining, concluding, calculating, comparing, etc.) the one or more assessments associated at least in part with the one or more at least partially mobile operating system operated intermediate electronic communication device relayed transmissions through receiving information (e.g. receiving through network packet traffic, etc.) including receiving information regarding one or more statistical probabilities (e.g. Gaussian distribution, manual surveys, user surveys, automated surveys, etc.) of remaining in communication (e.g. call not dropped, data transmission complete, no delays in transmission, etc.) with one or more communication network relays (e.g. network repeaters, etc.) furnished by the one or more intermediate electronic communication devices (e.g. iPhone, etc.).

In one or more implementations, as shown in FIG. 11B, the operation o1301 can include operation o1306 for deriving the one or more assessments associated at least in part with the one or more at least partially mobile operating system operated intermediate electronic communication device relayed transmissions through receiving information including receiving GPS positioning data regarding the network communication relays furnished by the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1306 of the operation o1306, for performance of the operation o1306 by an electrical circuitry arrangement e1306 as activated thereto, and/or otherwise fulfillment of the operation o1306. One or more non-transitory signal bearing physical media can bear the one or more instructions i1306 that when executed can direct performance of the operation o1306. Furthermore, receiving GPS positioning data regarding network communication relays furnished by intermediate electronic communication devices module m1306 depicted in FIG. 7A as being included in the module m1301, when executed and/or activated, can direct performance of and/or perform the operation o1306. Illustratively, in one or more implementations, the operation o1306 can be carried out, for example, by deriving (e.g. determining, concluding, calculating, comparing, etc.) the one or more assessments associated at least in part with the one or more at least partially mobile operating system operated intermediate electronic communication device relayed transmissions through receiving information (e.g. receiving through network packet traffic, etc.) including receiving GPS positioning data (e.g. global positioning system satellite data, chipset information, data base inquiry, etc.) regarding the network communication relays furnished by the one or more intermediate electronic communication devices (e.g. phablet, etc.).

In one or more implementations, as shown in FIG. 11B, the operation o1301 can include operation o1307 for deriving the one or more assessments associated at least in part with the one or more at least partially mobile operating system operated intermediate electronic communication device relayed transmissions through receiving information including receiving information regarding one or more potential obstructions to electronic network relay communication located proximate to one or more of the intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1307 of the operation o1307, for performance of the operation o1307 by an electrical circuitry arrangement e1307 as activated thereto, and/or otherwise fulfillment of the operation o1307. One or more non-transitory signal bearing physical media can bear the one or more instructions i1307 that when executed can direct performance of the operation o1307. Furthermore, receiving information regarding potential obstructions to electronic network relay communication located proximate to intermediate electronic communication devices module m1307 depicted in FIG. 7A as being included in the module m1301, when executed and/or activated, can direct performance of and/or perform the operation o1307. Illustratively, in one or more implementations, the operation o1307 can be carried out, for example, by deriving (e.g. determining, concluding, calculating, comparing, etc.) the one or more assessments associated at least in part with the one or more at least partially mobile operating system operated intermediate electronic communication device relayed transmissions through receiving information (e.g. receiving through network packet traffic, etc.) including receiving information regarding one or more potential obstructions to electronic network relay communication located proximate to one or more of the intermediate electronic communication devices.

In one or more implementations, as shown in FIG. 11B, the operation o1301 can include operation o1308 for deriving the one or more assessments associated at least in part with the one or more at least partially mobile operating system operated intermediate electronic communication device relayed transmissions through receiving information including receiving information associated with communication histories of successful communications of one or more other electronic communication devices communicating with one or more network communication relays as furnished by the one or more intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1308 of the operation o1308, for performance of the operation o1308 by an electrical circuitry arrangement e1308 as activated thereto, and/or otherwise fulfillment of the operation o1308. One or more non-transitory signal bearing physical media can bear the one or more instructions i1308 that when executed can direct performance of the operation o1308. Furthermore, receiving information associated with communication histories of successful communications of other electronic communication devices communicating with network communication relays as furnished by intermediate electronic communication device module m1308 depicted in FIG. 7A as being included in the module m1301, when executed and/or activated, can direct performance of and/or perform the operation o1308. Illustratively, in one or more implementations, the operation o1308 can be carried out, for example, by deriving (e.g. determining, concluding, calculating, comparing, etc.) the one or more assessments associated at least in part with the one or more at least partially mobile operating system operated intermediate electronic communication device relayed transmissions through receiving information (e.g. receiving through network packet traffic, etc.) including receiving information associated with communication histories of successful communications (e.g. call not dropped, communication bandwidth above designated threshold, meet or exceed service quality thresholds for data transmission or media presentation quality, etc.) of one or more other electronic communication devices (e.g. portable media devices, etc.) communicating with one or more network communication relays as furnished by the one or more intermediate electronic communication device (e.g. portable computers, etc.).

In one or more implementations, as shown in FIG. 11B, the operation o1308 can include operation o1309 for receiving information associated with communication histories of successful communications of one or more other electronic communication devices communicating with the one or more network communication relays as furnished by the one or more intermediate electronic communication device including receiving information as communication history data previously stored and forwarded between one or more electronic communication devices. Origination of a physically tangible component group can be accomplished through skilled in the art design choice selection including use of one or more components and/or subsystems explicitly and/or implicitly referred to herein for at least in part implementing execution of one or more instructions i1309 of the operation o1309, for performance of the operation o1309 by an electrical circuitry arrangement e1309 as activated thereto, and/or otherwise fulfillment of the operation o1309. One or more non-transitory signal bearing physical media can bear the one or more instructions i1309 that when executed can direct performance of the operation o1309. Furthermore, receiving information as communication history data previously stored and forwarded between electronic communication devices module m1309 depicted in FIG. 7A as being included in the module m1308, when executed and/or activated, can direct performance of and/or perform the operation o1309. Illustratively, in one or more implementations, the operation o1309 can be carried out, for example, by receiving information associated with communication histories of successful communications (e.g. call not dropped, communication bandwidth above designated threshold, meet or exceed service quality thresholds for data transmission or media presentation quality, etc.) of one or more other electronic communication devices (e.g. portable media devices, etc.) communicating with one or more network communication relays as furnished by the one or more intermediate electronic communication device (e.g. portable computers, etc.) including receiving information as communication history data (e.g. successful communication versus communication problems with maintaining communication links, transmission dropout, degradation of transmission speed, etc.) previously stored and forwarded (e.g. temporarily held in device memory and then retransmitted, etc.) between one or more electronic communication devices (e.g. handheld computers, etc.).

In one or more implementations, as shown in FIG. 11C, the operation o1301 can include operation o1310 for deriving the one or more assessments associated at least in part with the one or more at least partially mobile operating system operated intermediate electronic communication device relayed transmissions through receiving information including receiving information regarding communication capacity available to one or more standby communication network relays furnished by the one or more intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1310 of the operation o1310, for performance of the operation o1310 by an electrical circuitry arrangement e1310 as activated thereto, and/or otherwise fulfillment of the operation o1310. One or more non-transitory signal bearing physical media can bear the one or more instructions i1310 that when executed can direct performance of the operation o1310. Furthermore, receiving information regarding communication capacity available to standby communication network relays furnished by intermediate electronic communication device module m1310 depicted in FIG. 7A as being included in the module m1301, when executed and/or activated, can direct performance of and/or perform the operation o1310. Illustratively, in one or more implementations, the operation o1310 can be carried out, for example, by deriving (e.g. determining, concluding, calculating, comparing, etc.) the one or more assessments associated at least in part with the one or more at least partially mobile operating system operated intermediate electronic communication device relayed transmissions through receiving information (e.g. receiving through network packet traffic, etc.) including receiving information regarding communication capacity (e.g. gigabit per second rates, etc.) available (e.g. end-users of intermediate electronic communication devices have signed up to have their devices provide standby service, etc.) to one or more standby communication network relays (e.g. network routers, etc.) furnished by the one or more intermediate electronic communication device (e.g. mobile handset, etc.).

In one or more implementations, as shown in FIG. 11C, the operation o1301 can include operation o1311 for deriving the one or more assessments associated at least in part with the one or more at least partially mobile operating system operated intermediate electronic communication device relayed transmissions through receiving information including receiving information regarding one or more potential obstructions to electronic communication with the one or more origination electronic communication devices that are proximate to the one or more origination communication devices. Origination of a physically tangible component group can be accomplished through skilled in the art design choice selection including use of one or more components and/or subsystems explicitly and/or implicitly referred to herein for at least in part implementing execution of one or more instructions i1311 of the operation o1311, for performance of the operation o1311 by an electrical circuitry arrangement e1311 as activated thereto, and/or otherwise fulfillment of the operation o1311. One or more non-transitory signal bearing physical media can bear the one or more instructions i1311 that when executed can direct performance of the operation o1311. Furthermore, receiving information regarding potential obstructions to electronic communication with origination electronic communication devices that are proximate to origination communication devices module m1311 depicted in FIG. 7B as being included in the module m1301, when executed and/or activated, can direct performance of and/or perform the operation o1311. Illustratively, in one or more implementations, the operation o1311 can be carried out, for example, by deriving (e.g. determining, concluding, calculating, comparing, etc.) the one or more assessments associated at least in part with the one or more at least partially mobile operating system operated intermediate electronic communication device relayed transmissions through receiving information (e.g. receiving through network packet traffic, etc.) including receiving information regarding one or more potential obstructions (e.g. totally block communication in one or more directions of communication, etc.) to electronic communication (e.g. line of sight, etc.) with the one or more origination electronic communication devices (e.g. mobile handset, etc.) that are proximate (e.g. 500 meters, etc.) to the one or more origination communication devices (e.g. laptop computer, etc.).

In one or more implementations, as shown in FIG. 11C, the operation o1304 can include operation o1312 for receiving location information regarding one or more moveable objects that have previously obstructed communication of the one or more communication network relays furnished by the one or more intermediate electronic communication devices including receiving information from one or more fixed position communication network base stations. Origination of a physically tangible component group can be accomplished through skilled in the art design choice selection including use of one or more components and/or subsystems explicitly and/or implicitly referred to herein for at least in part implementing execution of one or more instructions i1312 of the operation o1312, for performance of the operation o1312 by an electrical circuitry arrangement e1312 as activated thereto, and/or otherwise fulfillment of the operation o1312. One or more non-transitory signal bearing physical media can bear the one or more instructions i1312 that when executed can direct performance of the operation o1312. Furthermore, receiving information from fixed position communication network base stations module m1312 depicted in FIG. 7B as being included in the module m1304, when executed and/or activated, can direct performance of and/or perform the operation o1312. Illustratively, in one or more implementations, the operation o1312 can be carried out, for example, by receiving location information (e.g. relative geographical coordinates, etc.) regarding one or more moveable objects (e.g. industrial construction equipment, etc.) that have previously obstructed communication (e.g. less than a day of obstruction, etc.) of one or more communication network relays furnished by the one or more intermediate electronic communication devices (e.g. iPad, etc.) including receiving information from one or more fixed position communication network base stations e.g. routers, switches, relays, etc.).

In one or more implementations, as shown in FIG. 11C, the operation o1304 can include operation o1313 for receiving location information regarding one or more moveable objects that have previously obstructed communication of the one or more communication network relays furnished by the one or more intermediate electronic communication devices including receiving information regarding one or more potential obstructions to electronic relay network communication with one or more destination electronic communication devices proximate to one or more destination electronic communication devices. Origination of a physically tangible component group can be accomplished through skilled in the art design choice selection including use of one or more components and/or subsystems explicitly and/or implicitly referred to herein for at least in part implementing execution of one or more instructions i1313 of the operation o1313, for performance of the operation o1313 by an electrical circuitry arrangement e1313 as activated thereto, and/or otherwise fulfillment of the operation o1313. One or more non-transitory signal bearing physical media can bear the one or more instructions i1313 that when executed can direct performance of the operation o1313. Furthermore, receiving information regarding potential obstructions to electronic relay network communication with destination electronic communication devices proximate to destination electronic communication devices module m1313 depicted in FIG. 7B as being included in the module m1304, when executed and/or activated, can direct performance of and/or perform the operation o1313. Illustratively, in one or more implementations, the operation o1313 can be carried out, for example, by receiving location information (e.g. relative geographical coordinates, etc.) regarding one or more moveable objects (e.g. industrial construction equipment, etc.) that have previously obstructed communication (e.g. less than a day of obstruction, etc.) of one or more communication network relays furnished by the one or more intermediate electronic communication devices (e.g. iPad, etc.) including receiving information regarding one or more potential obstructions (e.g. having cross-sectional dimensions above predetermined thresholds, etc.) to electronic relay network communication (e.g. substantially line of sight communication, etc.) with one or more destination electronic communication devices (e.g. mobile handheld device, etc.) proximate (e.g.

within 500 feet, etc.) to one or more destination electronic communication devices (e.g. laptop, etc.).

In one or more implementations, as shown in FIG. 11D, the operation o1301 can include operation o1314 for deriving the one or more assessments associated at least in part with the one or more at least partially mobile operating system operated intermediate electronic communication device relayed transmissions through receiving information including receiving at least in part service quality ratings regarding the one or more communication network relays as furnished by the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1314 of the operation o1314, for performance of the operation o1314 by an electrical circuitry arrangement e1314 as activated thereto, and/or otherwise fulfillment of the operation o1314. One or more non-transitory signal bearing physical media can bear the one or more instructions i1314 that when executed can direct performance of the operation o1314. Furthermore, receiving service quality ratings regarding communication network relays as furnished by intermediate electronic communication devices module m1314 depicted in FIG. 7B as being included in the module m1301, when executed and/or activated, can direct performance of and/or perform the operation o1314. Illustratively, in one or more implementations, the operation o1314 can be carried out, for example, by deriving (e.g. determining, concluding, calculating, comparing, etc.) the one or more assessments associated at least in part with the one or more at least partially mobile operating system operated intermediate electronic communication device relayed transmissions through receiving information (e.g. receiving through network packet traffic, etc.) including receiving at least in part service quality ratings (e.g. service quality ratings to take into consideration weighted evaluations of a plurality of aspects that can include communication speed, uptime availability, transmission reliability, etc.) regarding the one or more communication network relays as furnished by the one or more intermediate electronic communication devices.

In one or more implementations, as shown in FIG. 11D, the operation o1301 can include operation o1315 for deriving the one or more assessments associated at least in part with the one or more at least partially mobile operating system operated intermediate electronic communication device relayed transmissions through receiving information including receiving at least in part cost ratings involved with standby network service plans associated with one or more communication network relays as furnished by the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1315 of the operation o1315, for performance of the operation o1315 by an electrical circuitry arrangement e1315 as activated thereto, and/or otherwise fulfillment of the operation o1315. One or more non-transitory signal bearing physical media can bear the one or more instructions i1315 that when executed can direct performance of the operation o1315. Furthermore, receiving cost ratings involved with standby network service plans associated with communication network relays as furnished by intermediate electronic communication devices module m1315 depicted in FIG. 7B as being included in the module m1301, when executed and/or activated, can direct performance of and/or perform the operation o1315. Illustratively, in one or more implementations, the operation o1315 can be carried out, for example, by deriving (e.g. determining, concluding, calculating, comparing, etc.) the one or more assessments associated at least in part with the one or more at least partially mobile operating system operated intermediate electronic communication device relayed transmissions through receiving information (e.g. receiving through network packet traffic, etc.) including receiving at least in part cost ratings involved with standby network service plans (e.g. network credits, cash requirements, rebate coupons needed to pay end-users of the intermediate electronic communication devices for providing such for the standby network service, etc.) associated with one or more communication network relays as furnished by the one or more intermediate electronic communication devices.

In one or more implementations, as shown in FIG. 11D, the operation o1301 can include operation o1316 for deriving the one or more assessments associated at least in part with the one or more at least partially mobile operating system operated intermediate electronic communication device relayed transmissions through receiving information including receiving at least in part availability forecast ratings involved with one or more standby network communication relays as furnish by the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1316 of the operation o1316, for performance of the operation o1316 by an electrical circuitry arrangement e1316 as activated thereto, and/or otherwise fulfillment of the operation o1316. One or more non-transitory signal bearing physical media can bear the one or more instructions i1316 that when executed can direct performance of the operation o1316. Furthermore, receiving availability forecast ratings involved with standby network communication relays as furnish by intermediate electronic communication devices module m1316 depicted in FIG. 7B as being included in the module m1301, when executed and/or activated, can direct performance of and/or perform the operation o1316. Illustratively, in one or more implementations, the operation o1316 can be carried out, for example, by deriving (e.g. determining, concluding, calculating, comparing, etc.) the one or more assessments associated at least in part with the one or more at least partially mobile operating system operated intermediate electronic communication device relayed transmissions through receiving information (e.g. receiving through network packet traffic, etc.) including receiving at least in part availability forecast ratings (e.g. based upon forecasted use by the end-users, planned travel locations in relation to known potential obstructions, etc.) involved with one or more standby network communication relays as furnish by the one or more intermediate electronic communication devices.

In one or more implementations, as shown in FIG. 11D, the operation o1301 can include operation o1317 for deriving the one or more assessments associated at least in part with the one or more at least partially mobile operating system operated intermediate electronic communication device relayed transmissions through receiving information including receiving at least in part reliability ratings involved with one or more standby network relays as furnished by the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1317 of the operation o1317, for performance of the operation o1317 by an electrical circuitry arrangement e1317 as activated thereto, and/or otherwise fulfillment of the operation o1317. One or more non-transitory signal bearing physical media can bear the one or more instructions i1317 that when executed can direct performance of the operation o1317. Furthermore, receiving reliability ratings involved with standby network relays as furnished by intermediate electronic communication devices module m1317 depicted in FIG. 7B as being included in the module m1301, when executed and/or activated, can direct performance of and/or perform the operation o1317. Illustratively, in one or more implementations, the operation o1317 can be carried out, for example, by deriving (e.g. determining, concluding, calculating, comparing, etc.) the one or more assessments associated at least in part with the one or more at least partially mobile operating system operated intermediate electronic communication device relayed transmissions through receiving information (e.g. receiving through network packet traffic, etc.) including receiving at least in part reliability ratings (e.g. accounts of down time, lack of capacity, etc. of past networks involved with the intermediate electronic communication devices, etc.) involved with one or more standby network relays as furnished by the one or more intermediate electronic communication devices.

In one or more implementations, as shown in FIG. 11E, the operation o1301 can include operation o1318 for deriving the one or more assessments associated at least in part with the one or more at least partially mobile operating system operated intermediate electronic communication device relayed transmissions through receiving information including receiving at least in part duration of connection ratings involved with one or more communication network relays as furnished by the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1318 of the operation o1318, for performance of the operation o1318 by an electrical circuitry arrangement e1318 as activated thereto, and/or otherwise fulfillment of the operation o1318. One or more non-transitory signal bearing physical media can bear the one or more instructions i1318 that when executed can direct performance of the operation o1318. Furthermore, receiving duration of connection ratings involved with communication network relays as furnished by intermediate electronic communication devices module m1318 depicted in FIG. 7B as being included in the module m1301, when executed and/or activated, can direct performance of and/or perform the operation o1318. Illustratively, in one or more implementations, the operation o1318 can be carried out, for example, by deriving (e.g. determining, concluding, calculating, comparing, etc.) the one or more assessments associated at least in part with the one or more at least partially mobile operating system operated intermediate electronic communication device relayed transmissions through receiving information (e.g. receiving through network packet traffic, etc.) including receiving at least in part duration of connection ratings (e.g. percentage of online network time compared with total time attempted to be online associated with general communication activities or particular communication activities as standby network nodes regarding the intermediate electronic communication devices, etc.) involved with one or more communication network relays as furnished by the one or more intermediate electronic communication devices.

In one or more implementations, as shown in FIG. 11E, the operation o1301 can include operation o1319 for deriving the one or more assessments associated at least in part with the one or more at least partially mobile operating system operated intermediate electronic communication device relayed transmissions through receiving information including receiving at least in part communication bandwidth ratings involved with potential one or more standby communication networks associated with one or more communication network relays as furnished by the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1319 of the operation o1319, for performance of the operation o1319 by an electrical circuitry arrangement e1319 as activated thereto, and/or otherwise fulfillment of the operation o1319. One or more non-transitory signal bearing physical media can bear the one or more instructions i1319 that when executed can direct performance of the operation o1319. Furthermore, receiving communication bandwidth ratings involved with potential standby communication networks associated with communication network relays as furnished by intermediate electronic communication devices module m1319 depicted in FIG. 7B as being included in the module m1301, when executed and/or activated, can direct performance of and/or perform the operation o1319. Illustratively, in one or more implementations, the operation o1319 can be carried out, for example, by deriving (e.g. determining, concluding, calculating, comparing, etc.) the one or more assessments associated at least in part with the one or more at least partially mobile operating system operated intermediate electronic communication device relayed transmissions through receiving information (e.g. receiving through network packet traffic, etc.) including receiving at least in part communication bandwidth ratings (e.g. communication speed such as in gigabits per second associated with general communication activities or particular communication activities as standby network nodes regarding the intermediate electronic communication devices, etc.) involved with potential one or more standby communication networks associated with one or more communication network relays as furnished by the one or more intermediate electronic communication devices.

In one or more implementations, as shown in FIG. 11E, the operation o13 can include operation o1320 for electronically deriving one or more assessments associated at least in part with the one or more at least partially mobile operating system operated intermediate electronic communication device relayed transmissions from the one or more at least partially mobile operating system operated intermediate electronic communication devices activated from standby mode to be one or more communication network relays including determining ratings of one or more communication relay networks comprised at least in part by one or more of the intermediate electronic communication devices.

Origination of a physically tangible component group can be accomplished through skilled in the art design choice selection including use of one or more components and/or subsystems explicitly and/or implicitly referred to herein for at least in part implementing execution of one or more instructions i1320 of the operation o1320, for performance of the operation o1320 by an electrical circuitry arrangement e1320 as activated thereto, and/or otherwise fulfillment of the operation o1320. One or more non-transitory signal bearing physical media can bear the one or more instructions i1320 that when executed can direct performance of the operation o1320. Furthermore, determining ratings of communication relay networks comprised by of intermediate electronic communication devices module m1320 depicted in FIG. 7C as being included in the module m13, when executed and/or activated, can direct performance of and/or perform the operation o1320. Illustratively, in one or more implementations, the operation o1320 can be carried out, for example, by electronically deriving (e.g. computation, comparing, data calls, wireless reception, etc.) one or more assessments (e.g. comparisons, evaluations, rankings, listings, reports, etc.) associated (e.g. related, etc.) at least in part with the one or more at least partially mobile operating system operated (e.g. mobile iOS, etc.) intermediate electronic communication device (e.g. smartphone, etc.) relayed transmissions (e.g. wireless directed transmissions, etc.) from the one or more at least partially mobile operating system operated intermediate electronic communication devices (e.g. phablet, etc.) activated from standby mode (e.g. called through network to actively serve as relay, etc.) to be one or more communication network relays (e.g. network switch, router, repeater, relay, etc.) including determining ratings (e.g. estimated ratings for future performance to indicate preferred configurations of intermediate electronic communication devices to constitute one or more standby electronic communication networks, etc.) of one or more communication relay networks comprised at least in part by one or more of the intermediate electronic communication devices.

In one or more implementations, as shown in FIG. 11E, the operation o1320 can include operation o1321 for determining ratings of one or more communication relay networks comprised at least in part by one or more of the intermediate electronic communication devices including determining service quality ratings regarding one or more communication network relays as the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1321 of the operation o1321, for performance of the operation o1321 by an electrical circuitry arrangement e1321 as activated thereto, and/or otherwise fulfillment of the operation o1321. One or more non-transitory signal bearing physical media can bear the one or more instructions i1321 that when executed can direct performance of the operation o1321. Furthermore, determining service quality ratings regarding communication network relays as intermediate electronic communication devices module m1321 depicted in FIG. 7C as being included in the module m1320, when executed and/or activated, can direct performance of and/or perform the operation o1321. Illustratively, in one or more implementations, the operation o1321 can be carried out, for example, by determining ratings (e.g. estimated ratings for future performance to indicate preferred configurations of intermediate electronic communication devices to constitute one or more standby electronic communication networks, etc.) of one or more communication relay networks comprised at least in part by one or more of the intermediate electronic communication devices including determining service quality ratings regarding (e.g. service quality ratings to take into consideration weighted evaluations of a plurality of aspects that can include communication speed, uptime availability, transmission reliability, etc.) one or more communication network relays as the one or more intermediate electronic communication devices.

In one or more implementations, as shown in FIG. 11F, the operation o1320 can include operation o1322 for determining ratings of one or more communication relay networks comprised at least in part by one or more of the intermediate electronic communication devices including determining cost ratings involved with standby network service plans associated with one or more communication network relays as provided by the intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1322 of the operation o1322, for performance of the operation o1322 by an electrical circuitry arrangement e1322 as activated thereto, and/or otherwise fulfillment of the operation o1322. One or more non-transitory signal bearing physical media can bear the one or more instructions i1322 that when executed can direct performance of the operation o1322. Furthermore, determining cost ratings involved with standby network service plans associated with communication network relays as provided by intermediate electronic communication devices module m1322 depicted in FIG. 7C as being included in the module m1320, when executed and/or activated, can direct performance of and/or perform the operation o1322. Illustratively, in one or more implementations, the operation o1322 can be carried out, for example, by determining ratings (e.g. estimated ratings for future performance to indicate preferred configurations of intermediate electronic communication devices to constitute one or more standby electronic communication networks, etc.) of one or more communication relay networks comprised at least in part by one or more of the intermediate electronic communication devices including determining cost ratings involved with standby network service plans (e.g. network credits, cash requirements, rebate coupons needed to pay end-users of the intermediate electronic communication devices for providing such for the standby network service, etc.) associated with one or more communication network relays as provided by the intermediate electronic communication devices.

In one or more implementations, as shown in FIG. 11F, the operation o1320 can include operation o1323 for determining ratings of one or more communication relay networks comprised at least in part by one or more of the intermediate electronic communication devices including determining availability forecast ratings involved with one or more standby networks associated with one or more communication network relays of the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1323 of the operation o1323, for performance of the operation o1323 by an electrical circuitry arrangement e1323 as activated thereto, and/or otherwise fulfillment of the operation o1323. One or more non-transitory signal bearing physical media can bear the one or more instructions i1323 that when executed can direct performance of the operation o1323. Furthermore, determining availability forecast ratings involved with standby networks associated with communication network relays of intermediate electronic communication devices module m1323 depicted in FIG. 7C as being included in the module m1320, when executed and/or activated, can direct performance of and/or perform the operation o1323. Illustratively, in one or more implementations, the operation o1323 can be carried out, for example, by determining ratings (e.g. estimated ratings for future performance to indicate preferred configurations of intermediate electronic communication devices to constitute one or more standby electronic communication networks, etc.) of one or more communication relay networks comprised at least in part by one or more of the intermediate electronic communication devices including determining availability forecast ratings (e.g. based upon forecasted use by the end-users, planned travel locations in relation to known potential obstructions, etc.) involved with one or more standby networks associated with one or more communication network relays of the one or more intermediate electronic communication devices.

In one or more implementations, as shown in FIG. 11F, the operation o1320 can include operation o1324 for determining ratings of one or more communication relay networks comprised at least in part by one or more of the intermediate electronic communication devices including determining reliability ratings involved with one or more relay networks associated with the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1324 of the operation o1324, for performance of the operation o1324 by an electrical circuitry arrangement e1324 as activated thereto, and/or otherwise fulfillment of the operation o1324. One or more non-transitory signal bearing physical media can bear the one or more instructions i1324 that when executed can direct performance of the operation o1324. Furthermore, determining reliability ratings involved with relay networks associated with intermediate electronic communication devices module m1324 depicted in FIG. 7C as being included in the module m1320, when executed and/or activated, can direct performance of and/or perform the operation o1324. Illustratively, in one or more implementations, the operation o1324 can be carried out, for example, by determining ratings (e.g. estimated ratings for future performance to indicate preferred configurations of intermediate electronic communication devices to constitute one or more standby electronic communication networks, etc.) of one or more communication relay networks comprised at least in part by one or more of the intermediate electronic communication devices including determining reliability ratings (e.g. accounts of down time, lack of capacity, etc. of past networks involved with the intermediate electronic communication devices, etc.) involved with one or more relay networks associated with the one or more intermediate electronic communication devices.

In one or more implementations, as shown in FIG. 11F, the operation o1320 can include operation o1325 for determining ratings of one or more communication relay networks comprised at least in part by one or more of the intermediate electronic communication devices including determining duration of connection ratings involved with communication network relays provided by the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1325 of the operation o1325, for performance of the operation o1325 by an electrical circuitry arrangement e1325 as activated thereto, and/or otherwise fulfillment of the operation o1325. One or more non-transitory signal bearing physical media can bear the one or more instructions i1325 that when executed can direct performance of the operation o1325. Furthermore, determining duration of connection ratings involved with communication network relays provided by intermediate electronic communication devices module m1325 depicted in FIG. 7C as being included in the module m1320, when executed and/or activated, can direct performance of and/or perform the operation o1325. Illustratively, in one or more implementations, the operation o1325 can be carried out, for example, by determining ratings (e.g. estimated ratings for future performance to indicate preferred configurations of intermediate electronic communication devices to constitute one or more standby electronic communication networks, etc.) of one or more communication relay networks comprised at least in part by one or more of the intermediate electronic communication devices including determining duration of connection ratings (e.g. percentage of online network time compared with total time attempted to be online associated with general communication activities or particular communication activities as standby network nodes regarding the intermediate electronic communication devices, etc.) involved with communication network relays provided by the one or more intermediate electronic communication devices.

In one or more implementations, as shown in FIG. 11F, the operation o1320 can include operation o1326 for determining ratings of one or more communication relay networks comprised at least in part by one or more of the intermediate electronic communication devices including communication bandwidth ratings involved with one or more standby communication relay networks associated with the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1326 of the operation o1326, for performance of the operation o1326 by an electrical circuitry arrangement e1326 as activated thereto, and/or otherwise fulfillment of the operation o1326. One or more non-transitory signal bearing physical media can bear the one or more instructions i1326 that when executed can direct performance of the operation o1326. Furthermore, communication bandwidth ratings involved with standby communication relay networks associated with intermediate electronic communication devices module m1326 depicted in FIG. 7C as being included in the module m1320, when executed and/or activated, can direct performance of and/or perform the operation o1326. Illustratively, in one or more implementations, the operation o1326 can be carried out, for example, by determining ratings (e.g. estimated ratings for future performance to indicate preferred configurations of intermediate electronic communication devices to constitute one or more standby electronic communication networks, etc.) of one or more communication relay networks comprised at least in part by one or more of the intermediate electronic communication devices including communication bandwidth ratings (e.g. communication speed such as in gigabits per second associated with general communication activities or particular communication activities as standby network nodes regarding the intermediate electronic communication devices, etc.) involved with one or more standby communication relay networks associated with the one or more intermediate electronic communication devices.

In one or more implementations, as shown in FIG. 11G, the operation o13 can include operation o1327 for electronically deriving one or more assessments associated at least in part with the one or more at least partially mobile operating system operated intermediate electronic communication device relayed transmissions from the one or more at least partially mobile operating system operated intermediate electronic communication devices activated from standby mode to be one or more communication network relays including determining one or more comparison ratings between one or more fixed base station networks and one or more communication relay networks of the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1327 of the operation o1327, for performance of the operation o1327 by an electrical circuitry arrangement e1327 as activated thereto, and/or otherwise fulfillment of the operation o1327. One or more non-transitory signal bearing physical media can bear the one or more instructions i1327 that when executed can direct performance of the operation o1327. Furthermore, determining comparison ratings between fixed base station networks and communication relay networks of intermediate electronic communication devices module m1327 depicted in FIG. 7C as being included in the module m13, when executed and/or activated, can direct performance of and/or perform the operation o1327. Illustratively, in one or more implementations, the operation o1327 can be carried out, for example, by electronically deriving (e.g. computation, comparing, data calls, wireless reception, etc.) one or more assessments (e.g. comparisons, evaluations, rankings, listings, reports, etc.) associated (e.g. related, etc.) at least in part with the one or more at least partially mobile operating system operated (e.g. mobile iOS, etc.) intermediate electronic communication device (e.g. smartphone, etc.) relayed transmissions (e.g. wireless directed transmissions, etc.) from the one or more at least partially mobile operating system operated intermediate electronic communication devices (e.g. phablet, etc.) activated from standby mode (e.g. called through network to actively serve as relay, etc.) to be one or more communication network relays (e.g. network switch, router, repeater, relay, etc.) determining one or more comparison ratings between one or more fixed base station networks and one or more communication relay networks of the one or more intermediate electronic communication devices (e.g. ratings to be compared can be based to indicate performance levels such as communication speed, availability, reliability, quality, etc.).

In one or more implementations, as shown in FIG. 11G, the operation o1327 can include operation o1328 for determining one or more comparison ratings between one or more fixed base station networks and one or more communication relay networks of the one or more intermediate electronic communication devices including determining one or more service quality comparison ratings between one or more fixed base station communication networks and one or more relay networks based on the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1328 of the operation o1328, for performance of the operation o1328 by an electrical circuitry arrangement e1328 as activated thereto, and/or otherwise fulfillment of the operation o1328. One or more non-transitory signal bearing physical media can bear the one or more instructions i1328 that when executed can direct performance of the operation o1328. Furthermore, determining service quality comparison ratings between fixed base station communication networks and relay networks based on intermediate electronic communication devices module m1328 depicted in FIG. 7C as being included in the module m1327, when executed and/or activated, can direct performance of and/or perform the operation o1328. Illustratively, in one or more implementations, the operation o1328 can be carried out, for example, by determining one or more comparison ratings between one or more fixed base station networks and one or more communication relay networks of the one or more intermediate electronic communication devices (e.g. ratings to be compared can be based to indicate performance levels such as communication speed, availability, reliability, quality, etc.) including determining one or more service quality comparison ratings between one or more fixed base station communication networks and one or more relay networks based on the one or more intermediate electronic communication devices (e.g. comparison ratings can be combined metrics to reflect various weighted ratings of communication speed, availability, reliability, quality, etc.).

In one or more implementations, as shown in FIG. 11G, the operation o1327 can include operation o1329 for determining one or more comparison ratings between one or more fixed base station networks and one or more communication relay networks of the one or more intermediate electronic communication devices including determining one or more cost profile comparison ratings between one or more fixed base station communication networks and one or more communication relay networks based on the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1329 of the operation o1329, for performance of the operation o1329 by an electrical circuitry arrangement e1329 as activated thereto, and/or otherwise fulfillment of the operation o1329. One or more non-transitory signal bearing physical media can bear the one or more instructions i1329 that when executed can direct performance of the operation o1329. Furthermore, determining cost profile comparison ratings between fixed base station communication networks and communication relay networks based on intermediate electronic communication devices module m1329 depicted in FIG. 7C as being included in the module m1327, when executed and/or activated, can direct performance of and/or perform the operation o1329. Illustratively, in one or more implementations, the operation o1329 can be carried out, for example, by determining one or more comparison ratings between one or more fixed base station networks and one or more communication relay networks of the one or more intermediate electronic communication devices (e.g. ratings to be compared can be based to indicate performance levels such as communication speed, availability, reliability, quality, etc.) including determining one or more cost profile comparison ratings between one or more fixed base station communication networks and one or more communication relay networks based on the one or more intermediate electronic communication devices (e.g. comparison ratings can reflect various cost parameters involved such as operational costs, subscriber costs, costs to reimburse third parties such as end-user owners of intermediate electronic communication devices available to participate in one or more standby networks, etc.).

In one or more implementations, as shown in FIG. 11G, the operation o1327 can include operation o1330 for determining one or more comparison ratings between one or more fixed base station networks and one or more communication relay networks of the one or more intermediate electronic communication devices including determining one or more availability forecast comparison ratings between one or more fixed base station communication networks and one or more network relays furnished by the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1330 of the operation o1330, for performance of the operation o1330 by an electrical circuitry arrangement e1330 as activated thereto, and/or otherwise fulfillment of the operation o1330. One or more non-transitory signal bearing physical media can bear the one or more instructions i1330 that when executed can direct performance of the operation o1330. Furthermore, determining availability forecast comparison ratings between fixed base station communication networks and network relays furnished by intermediate electronic communication devices module m1330 depicted in FIG. 7D as being included in the module m1327, when executed and/or activated, can direct performance of and/or perform the operation o1330. Illustratively, in one or more implementations, the operation o1330 can be carried out, for example, by determining one or more comparison ratings between one or more fixed base station networks and one or more communication relay networks of the one or more intermediate electronic communication devices (e.g. ratings to be compared can be based to indicate performance levels such as communication speed, availability, reliability, quality, etc.) including determining one or more availability forecast comparison ratings between one or more fixed base station communication networks and one or more network relays furnished by the one or more intermediate electronic communication devices (e.g. availability ratings can reflect differences between base station and networks to be made up by the intermediate devices regarding amount of time expected to be available for use given travel plans or other factors associated with the devices involved, etc.).

In one or more implementations, as shown in FIG. 11H, the operation o1327 can include operation o1331 for determining one or more comparison ratings between one or more fixed base station networks and one or more communication relay networks of the one or more intermediate electronic communication devices including determining one or more reliability comparison ratings between one or more fixed base station communication networks and one or more communication relay networks furnished by the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1331 of the operation o1331, for performance of the operation o1331 by an electrical circuitry arrangement e1331 as activated thereto, and/or otherwise fulfillment of the operation o1331. One or more non-transitory signal bearing physical media can bear the one or more instructions i1331 that when executed can direct performance of the operation o1331. Furthermore, determining reliability comparison ratings between fixed base station communication networks and communication relay networks furnished by intermediate electronic communication devices module m1331 depicted in FIG. 7D as being included in the module m1327, when executed and/or activated, can direct performance of and/or perform the operation o1331. Illustratively, in one or more implementations, the operation o1331 can be carried out, for example, by determining one or more comparison ratings between one or more fixed base station networks and one or more communication relay networks of the one or more intermediate electronic communication devices (e.g. ratings to be compared can be based to indicate performance levels such as communication speed, availability, reliability, quality, etc.) including determining one or more reliability comparison ratings between one or more fixed base station communication networks and one or more communication relay networks furnished by the one or more intermediate electronic communication devices (e.g. reliability ratings can reflect differences between base station and networks to be made up by the intermediate devices regarding likelihood of such occurrences as dropped communication connections based upon historical data, projected movement of the devices involved or other factors, etc.).

In one or more implementations, as shown in FIG. 11H, the operation o1327 can include operation o1332 for determining one or more comparison ratings between one or more fixed base station networks and one or more communication relay networks of the one or more intermediate electronic communication devices including determining one or more duration of connections comparison ratings between one or more fixed base station communication networks and one or more communication relay networks of the intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1332 of the operation o1332, for performance of the operation o1332 by an electrical circuitry arrangement e1332 as activated thereto, and/or otherwise fulfillment of the operation o1332. One or more non-transitory signal bearing physical media can bear the one or more instructions i1332 that when executed can direct performance of the operation o1332. Furthermore, determining duration of connections comparison ratings between fixed base station communication networks and communication relay networks of intermediate electronic communication devices module m1332 depicted in FIG. 7D as being included in the module m1327, when executed and/or activated, can direct performance of and/or perform the operation o1332. Illustratively, in one or more implementations, the operation o1332 can be carried out, for example, by determining one or more comparison ratings between one or more fixed base station networks and one or more communication relay networks of the one or more intermediate electronic communication devices (e.g. ratings to be compared can be based to indicate performance levels such as communication speed, availability, reliability, quality, etc.) including determining one or more duration of connections comparison ratings between one or more fixed base station communication networks and one or more communication relay networks of the intermediate electronic communication devices (e.g. reliability ratings can reflect differences between base station and networks to be made up by the intermediate devices regarding which may provide longer in time communication connections based upon historical data, projected movement of the devices involved or other factors, etc.).

In one or more implementations, as shown in FIG. 11H, the operation o1327 can include operation o1333 for determining one or more comparison ratings between one or more fixed base station networks and one or more communication relay networks of the one or more intermediate electronic communication devices including determining one or more bandwidth capacity comparison ratings between one or more fixed base station communication networks and one or more relay networks of the intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1333 of the operation o1333, for performance of the operation o1333 by an electrical circuitry arrangement e1333 as activated thereto, and/or otherwise fulfillment of the operation o1333. One or more non-transitory signal bearing physical media can bear the one or more instructions i1333 that when executed can direct performance of the operation o1333. Furthermore, determining bandwidth capacity comparison ratings between fixed base station communication networks and relay networks of intermediate electronic communication devices module m1333 depicted in FIG. 7D as being included in the module m1327, when executed and/or activated, can direct performance of and/or perform the operation o1333. Illustratively, in one or more implementations, the operation o1333 can be carried out, for example, by determining one or more comparison ratings between one or more fixed base station networks and one or more communication relay networks of the one or more intermediate electronic communication devices (e.g. ratings to be compared can be based to indicate performance levels such as communication speed, availability, reliability, quality, etc.) including determining one or more bandwidth capacity comparison ratings between one or more fixed base station communication networks and one or more relay networks of the intermediate electronic communication devices (e.g. reliability ratings can reflect differences between base station and networks to be made up by the intermediate devices regarding communication speed such as in gigabits per second for peak or sustained evaluations based upon historical data, projected movement of the devices involved or other factors, etc.).

In one or more implementations, as shown in FIG. 11J, the operation o13 can include operation o1334 for electronically deriving one or more assessments associated at least in part with the one or more at least partially mobile operating system operated intermediate electronic communication device relayed transmissions from the one or more at least partially mobile operating system operated intermediate electronic communication devices activated from standby mode to be one or more communication network relays including determining one or more communication service ratings for communication with one or more destination electronic communication devices. Origination of a physically tangible component group can be accomplished through skilled in the art design choice selection including use of one or more components and/or subsystems explicitly and/or implicitly referred to herein for at least in part implementing execution of one or more instructions i1334 of the operation o1334, for performance of the operation o1334 by an electrical circuitry arrangement e1334 as activated thereto, and/or otherwise fulfillment of the operation o1334. One or more non-transitory signal bearing physical media can bear the one or more instructions i1334 that when executed can direct performance of the operation o1334. Furthermore, determining communication service ratings for communication with destination electronic communication devices module m1334 depicted in FIG. 7D as being included in the module m13, when executed and/or activated, can direct performance of and/or perform the operation o1334. Illustratively, in one or more implementations, the operation o1334 can be carried out, for example, by electronically deriving (e.g. computation, comparing, data calls, wireless reception, etc.) one or more assessments (e.g. comparisons, evaluations, rankings, listings, reports, etc.) associated (e.g. related, etc.) at least in part with the one or more at least partially mobile operating system operated (e.g. mobile iOS, etc.) intermediate electronic communication device (e.g. smartphone, etc.) relayed transmissions (e.g. wireless directed transmissions, etc.) from the one or more at least partially mobile operating system operated intermediate electronic communication devices (e.g. phablet, etc.) activated from standby mode (e.g. called through network to actively serve as relay, etc.) to be one or more communication network relays (e.g. network switch, router, repeater, relay, etc.) determining one or more communication service ratings for communication with one or more destination electronic communication devices (e.g. service rating can include factors related to reliability, duration, speed, quality, etc. for communication with the destination electronic communication devices, etc.).

In one or more implementations, as shown in FIG. 11J, the operation o1334 can include operation o1335 for determining one or more communication service ratings for communication with one or more destination electronic communication devices including determining one or more communication service ratings for one or more destination electronic communication devices regarding use of one or more fixed base station communication networks for communication therewith. Origination of a physically tangible component group can be accomplished through skilled in the art design choice selection including use of one or more components and/or subsystems explicitly and/or implicitly referred to herein for at least in part implementing execution of one or more instructions i1335 of the operation o1335, for performance of the operation o1335 by an electrical circuitry arrangement e1335 as activated thereto, and/or otherwise fulfillment of the operation o1335. One or more non-transitory signal bearing physical media can bear the one or more instructions i1335 that when executed can direct performance of the operation o1335. Furthermore, determining communication service ratings for destination electronic communication devices regarding use of fixed base station communication networks for communication therewith module m1335 depicted in FIG. 7D as being included in the module m1334, when executed and/or activated, can direct performance of and/or perform the operation o1335. Illustratively, in one or more implementations, the operation o1335 can be carried out, for example, by determining one or more communication service ratings for communication with one or more destination electronic communication devices (e.g. service rating can include factors related to reliability, duration, speed, quality, etc. for communication with the destination electronic communication devices, etc.) including determining one or more communication service ratings for one or more destination electronic communication devices regarding use of one or more fixed base station communication networks for communication therewith (e.g., taking into consideration locations of potential obstructions to point-to-point communication, locations of fixed base station networks, historical performance data of fixed base station networks, etc. service ratings for destination electronic communication devices can be determined, etc.).

In one or more implementations, as shown in FIG. 11J, the operation o1334 can include operation o1336 for determining one or more communication service ratings for communication with one or more destination electronic communication devices including determining one or more communication service ratings for one or more destination electronic communication devices regarding use of one or more relay communication networks for communication therewith. Origination of a physically tangible component group can be accomplished through skilled in the art design choice selection including use of one or more components and/or subsystems explicitly and/or implicitly referred to herein for at least in part implementing execution of one or more instructions i1336 of the operation o1336, for performance of the operation o1336 by an electrical circuitry arrangement e1336 as activated thereto, and/or otherwise fulfillment of the operation o1336. One or more non-transitory signal bearing physical media can bear the one or more instructions i1336 that when executed can direct performance of the operation o1336. Furthermore, determining communication service ratings for destination electronic communication devices regarding use of relay communication networks for communication therewith module m1336 depicted in FIG. 7D as being included in the module m1334, when executed and/or activated, can direct performance of and/or perform the operation o1336. Illustratively, in one or more implementations, the operation o1336 can be carried out, for example, by determining one or more communication service ratings for communication with one or more destination electronic communication devices (e.g. service rating can include factors related to reliability, duration, speed, quality, etc. for communication with the destination electronic communication devices, etc.) including determining one or more communication service ratings for one or more destination electronic communication devices regarding use of one or more relay communication networks for communication therewith (e.g. taking into consideration locations of potential obstructions to point-to-point communication, locations of standby communication networks, historical performance data of standby communication networks, etc. service ratings for destination electronic communication devices can be determined, etc.).

In one or more implementations, as shown in FIG. 11J, the operation o1334 can include operation o1337 for determining one or more communication service ratings for communication with one or more destination electronic communication devices including determining one or more communication service ratings for one or more destination electronic communication devices regarding communication service quality for communication therewith. Origination of a physically tangible component group can be accomplished through skilled in the art design choice selection including use of one or more components and/or subsystems explicitly and/or implicitly referred to herein for at least in part implementing execution of one or more instructions i1337 of the operation o1337, for performance of the operation o1337 by an electrical circuitry arrangement e1337 as activated thereto, and/or otherwise fulfillment of the operation o1337. One or more non-transitory signal bearing physical media can bear the one or more instructions i1337 that when executed can direct performance of the operation o1337. Furthermore, determining communication service ratings for destination electronic communication devices regarding communication service quality for communication therewith module m1337 depicted in FIG. 7D as being included in the module m1334, when executed and/or activated, can direct performance of and/or perform the operation o1337. Illustratively, in one or more implementations, the operation o1337 can be carried out, for example, by determining one or more communication service ratings for communication with one or more destination electronic communication devices (e.g. service rating can include factors related to reliability, duration, speed, quality, etc. for communication with the destination electronic communication devices, etc.) including determining one or more communication service ratings for one or more destination electronic communication devices regarding communication service quality for communication therewith (e.g., taking into consideration locations of potential obstructions to point-to-point communication, locations of standby communication and fixed base station networks, historical performance data, etc., communication quality for destination electronic communication devices can be determined, etc.).

In one or more implementations, as shown in FIG. 11J, the operation o1334 can include operation o1338 for determining one or more communication service ratings for communication with one or more destination electronic communication devices including determining one or more communication service ratings for one or more destination electronic communication devices regarding financial costs associated with communication therewith. Origination of a physically tangible component group can be accomplished through skilled in the art design choice selection including use of one or more components and/or subsystems explicitly and/or implicitly referred to herein for at least in part implementing execution of one or more instructions i1338 of the operation o1338, for performance of the operation o1338 by an electrical circuitry arrangement e1338 as activated thereto, and/or otherwise fulfillment of the operation o1338. One or more non-transitory signal bearing physical media can bear the one or more instructions i1338 that when executed can direct performance of the operation o1338. Furthermore, determining communication service ratings for destination electronic communication devices regarding financial costs associated with communication therewith module m1338 depicted in FIG. 7E as being included in the module m1334, when executed and/or activated, can direct performance of and/or perform the operation o1338. Illustratively, in one or more implementations, the operation o1338 can be carried out, for example, by determining one or more communication service ratings for communication with one or more destination electronic communication devices (e.g. service rating can include factors related to reliability, duration, speed, quality, etc. for communication with the destination electronic communication devices, etc.) including determining one or more communication service ratings for one or more destination electronic communication devices regarding financial costs associated with communication therewith (e.g., taking into consideration locations of potential obstructions to point-to-point communication, locations of standby communication and fixed base station networks and costs associated thereby, historical performance data, etc. financial costs communication with destination electronic communication devices can be determined, etc.).

In one or more implementations, as shown in FIG. 11K, the operation o1334 can include operation o1339 for determining one or more communication service ratings for communication with one or more destination electronic communication devices including determining one or more communication service ratings for one or more destination electronic communication devices regarding forecasted availability of the one or more destination electronic communication devices for communication therewith. Origination of a physically tangible component group can be accomplished through skilled in the art design choice selection including use of one or more components and/or subsystems explicitly and/or implicitly referred to herein for at least in part implementing execution of one or more instructions i1339 of the operation o1339, for performance of the operation o1339 by an electrical circuitry arrangement e1339 as activated thereto, and/or otherwise fulfillment of the operation o1339. One or more non-transitory signal bearing physical media can bear the one or more instructions i1339 that when executed can direct performance of the operation o1339. Furthermore, determining communication service ratings for destination electronic communication devices regarding forecasted availability of destination electronic communication devices for communication therewith module m1339 depicted in FIG. 7E as being included in the module m1334, when executed and/or activated, can direct performance of and/or perform the operation o1339. Illustratively, in one or more implementations, the operation o1339 can be carried out, for example, by determining one or more communication service ratings for communication with one or more destination electronic communication devices (e.g. service rating can include factors related to reliability, duration, speed, quality, etc. for communication with the destination electronic communication devices, etc.) including determining one or more communication service ratings for one or more destination electronic communication devices regarding forecasted availability of the one or more destination electronic communication devices for communication therewith (e.g., taking into consideration locations of potential obstructions to point-to-point communication, locations of standby communication and fixed base station networks and historical performance data, etc. availability for communication of destination electronic communication devices can be determined, etc.).

In one or more implementations, as shown in FIG. 11K, the operation o1334 can include operation o1340 for determining one or more communication service ratings for communication with one or more destination electronic communication devices including determining one or more communication service ratings for one or more destination electronic communication devices regarding communication reliability of the one or more destination electronic communication devices for communication therewith. Origination of a physically tangible component group can be accomplished through skilled in the art design choice selection including use of one or more components and/or subsystems explicitly and/or implicitly referred to herein for at least in part implementing execution of one or more instructions i1340 of the operation o1340, for performance of the operation o1340 by an electrical circuitry arrangement e1340 as activated thereto, and/or otherwise fulfillment of the operation o1340. One or more non-transitory signal bearing physical media can bear the one or more instructions i1340 that when executed can direct performance of the operation o1340. Furthermore, determining communication service ratings for destination electronic communication devices regarding communication reliability of destination electronic communication devices for communication therewith module m1340 depicted in FIG. 7E as being included in the module m1334, when executed and/or activated, can direct performance of and/or perform the operation o1340. Illustratively, in one or more implementations, the operation o1340 can be carried out, for example, by determining one or more communication service ratings for communication with one or more destination electronic communication devices (e.g. service rating can include factors related to reliability, duration, speed, quality, etc. for communication with the destination electronic communication devices, etc.) including determining one or more communication service ratings for one or more destination electronic communication devices regarding communication reliability of the one or more destination electronic communication devices for communication therewith (e.g., taking into consideration locations of potential obstructions to point-to-point communication, locations of standby communication and fixed base station networks and historical performance data, etc. reliability of communication for destination electronic communication devices can be determined, etc.).

In one or more implementations, as shown in FIG. 11K, the operation o1334 can include operation o1341 for determining one or more communication service ratings for communication with one or more destination electronic communication devices including determining one or more communication service ratings for one or more destination electronic communication devices regarding duration of connection time available of the one or more destination electronic communication devices for communication therewith. Origination of a physically tangible component group can be accomplished through skilled in the art design choice selection including use of one or more components and/or subsystems explicitly and/or implicitly referred to herein for at least in part implementing execution of one or more instructions i1341 of the operation o1341, for performance of the operation o1341 by an electrical circuitry arrangement e1341 as activated thereto, and/or otherwise fulfillment of the operation o1341. One or more non-transitory signal bearing physical media can bear the one or more instructions i1341 that when executed can direct performance of the operation o1341. Furthermore, determining communication service ratings for destination electronic communication devices regarding duration of connection time available of destination electronic communication devices for communication therewith module m1341 depicted in FIG. 7E as being included in the module m1334, when executed and/or activated, can direct performance of and/or perform the operation o1341. Illustratively, in one or more implementations, the operation o1341 can be carried out, for example, by determining one or more communication service ratings for communication with one or more destination electronic communication devices (e.g. service rating can include factors related to reliability, duration, speed, quality, etc. for communication with the destination electronic communication devices, etc.) including determining one or more communication service ratings for one or more destination electronic communication devices regarding duration of connection time available of the one or more destination electronic communication devices for communication therewith (e.g., taking into consideration locations of potential obstructions to point-to-point communication, locations of standby communication and fixed base station networks and historical performance data, etc., duration of connection time available for communication of destination electronic communication devices can be determined, etc.).

In one or more implementations, as shown in FIG. 11K, the operation o1334 can include operation o1342 for determining one or more communication service ratings for communication with one or more destination electronic communication devices including determining one or more communication service ratings for one or more destination electronic communication devices regarding communication bandwidth of the one or more destination electronic communication devices for communication therewith. Origination of a physically tangible component group can be accomplished through skilled in the art design choice selection including use of one or more components and/or subsystems explicitly and/or implicitly referred to herein for at least in part implementing execution of one or more instructions i1342 of the operation o1342, for performance of the operation o1342 by an electrical circuitry arrangement e1342 as activated thereto, and/or otherwise fulfillment of the operation o1342. One or more non-transitory signal bearing physical media can bear the one or more instructions i1342 that when executed can direct performance of the operation o1342. Furthermore, determining communication service ratings for destination electronic communication devices regarding communication bandwidth of destination electronic communication devices for communication therewith module m1342 depicted in FIG. 7E as being included in the module m1334, when executed and/or activated, can direct performance of and/or perform the operation o1342. Illustratively, in one or more implementations, the operation o1342 can be carried out, for example, by determining one or more communication service ratings for communication with one or more destination electronic communication devices (e.g. service rating can include factors related to reliability, duration, speed, quality, etc. for communication with the destination electronic communication devices, etc.) including determining one or more communication service ratings for one or more destination electronic communication devices regarding communication bandwidth of the one or more destination electronic communication devices for communication therewith (e.g. taking into consideration locations of potential obstructions to point-to-point communication, locations of standby communication and fixed base station networks and historical performance data, etc. communication speed such as in gigabits per second available for communication of destination electronic communication devices can be determined, etc.).

In one or more implementations, as shown in FIG. 11L, the operation o13 can include operation o1343 for electronically deriving one or more assessments associated at least in part with the one or more at least partially mobile operating system operated intermediate electronic communication device relayed transmissions from the one or more at least partially mobile operating system operated intermediate electronic communication devices activated from standby mode to be one or more communication network relays including determining map data related to the one or more destination electronic communication devices regarding communication therewith. Origination of a physically tangible component group can be accomplished through skilled in the art design choice selection including use of one or more components and/or subsystems explicitly and/or implicitly referred to herein for at least in part implementing execution of one or more instructions i1343 of the operation o1343, for performance of the operation o1343 by an electrical circuitry arrangement e1343 as activated thereto, and/or otherwise fulfillment of the operation o1343. One or more non-transitory signal bearing physical media can bear the one or more instructions i1343 that when executed can direct performance of the operation o1343. Furthermore, determining map data related to destination electronic communication devices regarding communication therewith module m1343 depicted in FIG. 7E as being included in the module m13, when executed and/or activated, can direct performance of and/or perform the operation o1343. Illustratively, in one or more implementations, the operation o1343 can be carried out, for example, by electronically deriving (e.g. computation, comparing, data calls, wireless reception, etc.) one or more assessments (e.g. comparisons, evaluations, rankings, listings, reports, etc.) associated (e.g. related, etc.) at least in part with the one or more at least partially mobile operating system operated (e.g. mobile iOS, etc.) intermediate electronic communication device (e.g. smartphone, etc.) relayed transmissions (e.g. wireless directed transmissions, etc.) from the one or more at least partially mobile operating system operated intermediate electronic communication devices (e.g. phablet, etc.) activated from standby mode (e.g. called through network to actively serve as relay, etc.) to be one or more communication network relays (e.g. network switch, router, repeater, relay, etc.) determining map data related to the one or more destination electronic communication devices regarding communication therewith (e.g., taking into consideration locations of potential obstructions to point-to-point communication, locations of standby communication and fixed base station networks and historical performance data, etc. map data associated with communication with destination electronic communication devices can be determined, etc.).

In one or more implementations, as shown in FIG. 11L, the operation o1343 can include operation o1344 for determining map data related to the one or more destination electronic communication devices regarding communication therewith including determining map data regarding one or more obstructions to communication with the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1344 of the operation o1344, for performance of the operation o1344 by an electrical circuitry arrangement e1344 as activated thereto, and/or otherwise fulfillment of the operation o1344. One or more non-transitory signal bearing physical media can bear the one or more instructions i1344 that when executed can direct performance of the operation o1344. Furthermore, determining map data regarding obstructions to communication with intermediate electronic communication devices module m1344 depicted in FIG. 7E as being included in the module m1343, when executed and/or activated, can direct performance of and/or perform the operation o1344. Illustratively, in one or more implementations, the operation o1344 can be carried out, for example, by determining map data related to the one or more destination electronic communication devices regarding communication therewith (e.g., taking into consideration locations of potential obstructions to point-to-point communication, locations of standby communication and fixed base station networks and historical performance data, etc. map data associated with communication with destination electronic communication devices can be determined, etc.) including determining map data regarding one or more obstructions to communication with the one or more intermediate electronic communication devices (e.g., taking into consideration locations of historical obstructions to point-to-point communication, locations of standby communication and historical performance data, etc. map data associated with communication obstructions with intermediate electronic communication devices can be determined, etc.).

In one or more implementations, as shown in FIG. 11L, the operation o1343 can include operation o1345 for electronically deriving one or more assessments associated at least in part with the one or more at least partially mobile operating system operated intermediate electronic communication device relayed transmissions from the one or more at least partially mobile operating system operated intermediate electronic communication devices activated from standby mode to be one or more communication network relays including determining map data related to the one or more destination electronic communication devices regarding communication therewith including determining map data regarding location data of one or more fixed position base stations. Origination of a physically tangible component group can be accomplished through skilled in the art design choice selection including use of one or more components and/or subsystems explicitly and/or implicitly referred to herein for at least in part implementing execution of one or more instructions i1345 of the operation o1345, for performance of the operation o1345 by an electrical circuitry arrangement e1345 as activated thereto, and/or otherwise fulfillment of the operation o1345. One or more non-transitory signal bearing physical media can bear the one or more instructions i1345 that when executed can direct performance of the operation o1345. Furthermore, determining map data regarding location data of fixed position base stations module m1345 depicted in FIG. 7E as being included in the module m1343, when executed and/or activated, can direct performance of and/or perform the operation o1345. Illustratively, in one or more implementations, the operation o1345 can be carried out, for example, by determining map data related to the one or more destination electronic communication devices regarding communication therewith (e.g., taking into consideration locations of potential obstructions to point-to-point communication, locations of standby communication and fixed base station networks and historical performance data, etc. map data associated with communication with destination electronic communication devices can be determined, etc.) including determining map data regarding location data of one or more fixed position base stations (e.g., taking into consideration locations of obstructions to point-to-point communication, and historical performance data, etc. map data associated with fixed position based stations can be determined, etc.).

In one or more implementations, as shown in FIG. 11L, the operation o1343 can include operation o1346 for determining map data related to the one or more destination electronic communication devices regarding communication therewith including determining map data regarding location data of the destination electronic communication device. Origination of a physically tangible component group can be accomplished through skilled in the art design choice selection including use of one or more components and/or subsystems explicitly and/or implicitly referred to herein for at least in part implementing execution of one or more instructions i1346 of the operation o1346, for performance of the operation o1346 by an electrical circuitry arrangement e1346 as activated thereto, and/or otherwise fulfillment of the operation o1346. One or more non-transitory signal bearing physical media can bear the one or more instructions i1346 that when executed can direct performance of the operation o1346. Furthermore, determining map data regarding location data of destination electronic communication device module m1346 depicted in FIG. 7E as being included in the module m1343, when executed and/or activated, can direct performance of and/or perform the operation o1346. Illustratively, in one or more implementations, the operation o1346 can be carried out, for example, by determining map data related to the one or more destination electronic communication devices regarding communication therewith (e.g., taking into consideration locations of potential obstructions to point-to-point communication, locations of standby communication and fixed base station networks and historical performance data, etc. map data associated with communication with destination electronic communication devices can be determined, etc.) including determining map data regarding location data of the destination electronic communication device (e.g., taking into consideration locations of obstructions to point-to-point communication, and historical performance data, etc. map data associated with the destination electronic communication device can be determined, etc.).

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The one or more instructions discussed herein may be, for example, computer executable and/or logic-implemented instructions. In some implementations, signal-bearing medium as articles of manufacture may store the one or more instructions. In some implementations, the signal bearing medium may include a computer-readable medium. In some implementations, the signal-bearing medium may include a recordable medium. In some implementations, the signal-bearing medium may include a communication medium.

Those having skill in the art will recognize that the state of the art has progressed to the point where there is little distinction left between hardware and software implementations of aspects of systems; the use of hardware or software is generally (but not always, in that in certain contexts the choice between hardware an d software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture (limited to patentable subject matter under 35 USC 101). Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware in one or more machines or articles of manufacture.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof (limited to patentable subject matter under 35 U.S.C. 101). In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure (limited to patentable subject matter under 35 USC 101). In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, (e.g., transmitter, receiver, transmission logic, reception logic, etc.), etc.).

Electro-Mechanical System Support

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

Electrical Circuitry Support

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Image Processing System Support

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Data Processing System Support

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Software as Patentable Subject Matter Support

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex inter-chaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d)

virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Mote System Support

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

Licensing System Support Language

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

Extraterritorial Use Language

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

Residual Incorporation Language

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

Not Limited to Implementations Described Language

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Not Limited to Human User Language

Although user XXX is shown/described herein as a single illustrated figure, those skilled in the art will appreciate that user XXX may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

Plural Terms Language

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

Operably-Coupled Language

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

Active/Inactive Component Language

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

Cloud Computing Standard Language

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scalable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

Use of Trademarks in Specification Language

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Caselaw-Driven Clarification Language

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system, comprising:
    circuitry configured for electronically processing retransmitted communication sent by one or more mobile communication devices being used as supplemental network nodes for communication between one or more sender devices and one or more receiver devices;
    circuitry configured for electronically compiling information relating to input communication sent by the one or more mobile communication devices; and
    circuitry configured for electronically producing one or more evaluations associated with use of the one or more mobile communication devices as supplemental network nodes based on the compiled information including at least circuitry configured for producing one or more evaluations associated at least in part with one or more mobile communication device retransmitted communication through processing one or more of (1) one or more service quality ratings regarding the one or more communication network retransmissions as furnished by the one or more mobile communication devices, (2) one or more cost ratings involved with standby network service plans associated with one or more communication network retransmissions as furnished by the one or more mobile communication devices, (3) one or more connectivity ratings involved with one or more supplemental network node retransmissions as furnished by the one or more mobile communication devices, or (4) one or more communication bandwidth ratings involved with potential one or more supplemental network nodes associated with one or more communication network retransmissions as furnished by the one or more mobile communication devices.

2. The system of claim 1, wherein the circuitry configured for electronically processing retransmitted communication sent by one or more mobile communication devices being used as supplemental network nodes for communication between one or more sender devices and one or more receiver devices comprises:

circuitry configured for accessing data from a data source via a virtual machine representation of at least a part of a computing machine including accessing data from a data source via a virtual machine representation of at least a part of a real machine.

3. The system of claim 1, wherein the circuitry configured for electronically processing retransmitted communication sent by one or more mobile communication devices being used as supplemental network nodes for communication between one or more sender devices and one or more receiver devices comprises:

circuitry configured for accessing data from a data source via a virtual machine representation of at least a part of a computing machine including accessing data from a data source via a virtual machine representation of at least a part of a virtual machine.

4. The system of claim 1, wherein the circuitry configured for electronically processing retransmitted communication sent by one or more mobile communication devices being used as supplemental network nodes for communication between one or more sender devices and one or more receiver devices comprises:

circuitry configured for converting a file having a file-type associated with the virtual machine to a file-type associated with the virtual machine representation.

5. The system of claim 4, wherein the circuitry configured for converting a file having a file-type associated with the virtual machine to a file-type associated with the virtual machine representation comprises:

circuitry configured for converting a file wherein the file-type associated with the second virtual machine is configured for a limited-resource computing machine.

6. The system of claim 5, wherein the circuitry configured for converting a file wherein the file-type associated with the second virtual machine is configured for a limited-resource computing machine comprises:

circuitry configured for converting a file wherein the file-type associated with the second virtual machine is configured for a mobile computing machine.

7. The system of claim 1, wherein the circuitry configured for electronically processing retransmitted communication sent by one or more mobile communication devices being used as supplemental network nodes for communication between one or more sender devices and one or more receiver devices comprises:

circuitry configured for electronically processing retransmitted communication sent by one or more mobile communication devices being used as supplemental network nodes based at least in part upon direct access by the one or more sender devices to one or more base stations of one or more base station based communication networks becoming unavailable to the one or more sender devices.

8. The system of claim 1, wherein the circuitry configured for electronically processing retransmitted communication sent by one or more mobile communication devices being used as supplemental network nodes for communication between one or more sender devices and one or more receiver devices comprises:

circuitry configured for electronically processing retransmitted communication after prior transmissions from the one or more mobile communication devices as one or more mobile handset communication devices for communication with one or more users of other one or more mobile handset communication devices.

9. The system of claim 1, wherein the circuitry configured for electronically processing retransmitted communication sent by one or more mobile communication devices being used as supplemental network nodes for communication between one or more sender devices and one or more receiver devices comprises:

circuitry configured for processing wireless packetized communication.

10. The system of claim 9, wherein the circuitry configured for processing wireless packetized communication comprises:

circuitry configured for processing incoming message traffic.

11. The system of claim 10, wherein the circuitry configured for processing incoming message traffic comprises:

circuitry configured for processing one or more high bandwidth data transfers.

12. The system of claim 10, wherein the circuitry configured for processing incoming message traffic comprises:

circuitry configured for processing one or more high resolution audio formatted messages.

13. The system of claim 10, wherein the circuitry configured for processing incoming message traffic comprises:

circuitry configured for processing one or more high resolution video formatted messages.

14. The system of claim 10, wherein the circuitry configured for processing incoming message traffic comprises:

circuitry configured for processing one or more high capacity data files.

15. The system of claim 9, wherein the circuitry configured for processing wireless packetized communication comprises:

circuitry configured for processing one or more mobile communication device retransmitted communication being originated from one or more sender devices.

16. The system of claim 9, wherein the circuitry configured for processing wireless packetized communication comprises:

circuitry configured for processing one or more mobile communication device retransmitted communication from one or more mobile communication devices.

17. The system of claim 9, wherein the circuitry configured for processing wireless packetized communication comprises:

circuitry configured for processing one or more mobile communication device retransmitted communication from one or more base stations of one or more base station based communication networks.

18. The system of claim 9, wherein the circuitry configured for processing wireless packetized communication comprises:
  circuitry configured for processing one or more mobile communication device retransmitted communication from one or more electronic communication devices as heterogeneous types.

19. The system of claim 18, wherein the circuitry configured for processing one or more mobile communication device retransmitted communication from one or more electronic communication devices as heterogeneous types comprises:
  circuitry configured for processing retransmitted communication from one or more laptops, one or more phablets, one or more tablets, one or more smart phones, one or more notebooks, one or more handsets, one or more palmtops, one or more personal digital assistants, one or more digital audio players, one or more portable media players, one or more digital cameras, or one or more cell phones.

20. The system of claim 18, wherein the circuitry configured for processing one or more mobile communication device retransmitted communication from one or more electronic communication devices as heterogeneous types comprises:
  circuitry configured for processing retransmitted communication as using hybridized protocols including one or more IEEE 802.11ac protocols, one or more IEEE 802.11ad protocols, or one or more IEEE 802.11n/g protocols.

21. The system of claim 18, wherein the circuitry configured for processing one or more mobile communication device retransmitted communication from one or more electronic communication devices as heterogeneous types comprises:
  circuitry configured for processing retransmitted communication as using one or more cellular protocols.

22. The system of claim 18, wherein the circuitry configured for processing one or more mobile communication device retransmitted communication from one or more electronic communication devices as heterogeneous types comprises:
  circuitry configured for processing retransmitted communication as using one or more WiFi protocols, or one or more direct WiFi protocols.

23. The system of claim 18, wherein the circuitry configured for processing one or more mobile communication device retransmitted communication from one or more electronic communication devices as heterogeneous types comprises:
  circuitry configured for processing retransmitted communication as using protocols including one or more 3G protocols, one or more 4G protocols, one or more 5G protocols, one or more 6G or one or more 7G protocols.

24. The system of claim 18, wherein the circuitry configured for processing one or more mobile communication device retransmitted communication from one or more electronic communication devices as heterogeneous types comprises:
  circuitry configured for processing retransmitted communication as using protocols including one or more 20 GHz or above protocols, one or more 30 GHz or above protocols, or one or more 60 GHz or above protocols.

25. The system of claim 18, wherein the circuitry configured for processing one or more mobile communication device retransmitted communication from one or more electronic communication devices as heterogeneous types comprises:
  circuitry configured for processing one or more electronic token identifiers independent from device type of the one or more mobile communication devices.

26. The system of claim 18, wherein the circuitry configured for processing one or more mobile communication device retransmitted communication from one or more electronic communication devices as heterogeneous types comprises:
  circuitry configured for processing retransmitted communication from one or more rotating communication beams, one or more alternating communication beams, one or more sweeping communication beams, one or more multiple communication beams, one or more switching communication beams, or one or more diffracted communication beams.

27. The system of claim 18, wherein the circuitry configured for processing one or more mobile communication device retransmitted communication from one or more electronic communication devices as heterogeneous types comprises:
  circuitry configured for processing retransmitted communication from one or more multiple antennas, one or more directional antennas, one or more changeable antenna architectures, one or more mesh network antennas, or one or more omnidirectional antennas.

28. The system of claim 1, wherein the circuitry configured for electronically compiling information relating to input communication sent by the one or more mobile communication devices comprises:
  circuitry configured for compiling information at least partially contained in one or more mobile communication device retransmitted communication.

29. The system of claim 28, wherein the circuitry configured for compiling information at least partially contained in one or more mobile communication device retransmitted communication comprises:
  circuitry configured for compiling information regarding one or more blocked communication paths that the one or more mobile communication devices have encountered when attempting to communicate with devices other than the one or more sender devices.

30. The system of claim 29, wherein the circuitry configured for compiling information regarding one or more blocked communication paths that the one or more mobile communication devices have encountered when attempting to communicate with devices other than the one or more sender devices comprises:
  circuitry configured for obtaining location information regarding one or more moveable objects that have previously blocked communication of one or more of the mobile communication devices.

31. The system of claim 29, wherein the circuitry configured for compiling information regarding one or more blocked communication paths that the one or more mobile communication devices have encountered when attempting to communicate with devices other than the one or more sender devices comprises:
  circuitry configured for obtaining location information regarding one or more fixed position objects that have previously blocked communication of one or more of the mobile communication devices.

32. The system of claim 28, wherein the circuitry configured for compiling information at least partially contained in one or more mobile communication device retransmitted communication comprises:
 circuitry configured for compiling information regarding map data of locations of fixed position objects.

33. The system of claim 28, wherein the circuitry configured for compiling information at least partially contained in one or more mobile communication device retransmitted communication comprises:
 circuitry configured for compiling information regarding one or more time based distributions of instances of blockage of electronic device communication for one or more particular geographical locations.

34. The system of claim 28, wherein the circuitry configured for compiling information at least partially contained in one or more mobile communication device retransmitted communication comprises:
 circuitry configured for compiling information regarding one or more statistical probabilities of remaining in communication with the one or more mobile communication devices.

35. The system of claim 28, wherein the circuitry configured for compiling information at least partially contained in one or more mobile communication device retransmitted communication comprises:
 circuitry configured for compiling information regarding one or more distances from the one or more mobile communication devices to the one or more receiver devices.

36. The system of claim 28, wherein the circuitry configured for compiling information at least partially contained in one or more mobile communication device retransmitted communication comprises:
 circuitry configured for obtaining GPS positioning data regarding the one or more mobile communication devices.

37. The system of claim 28, wherein the circuitry configured for compiling information at least partially contained in one or more mobile communication device retransmitted communication comprises:
 circuitry configured for compiling information associated with communication histories of one or more other electronic communication devices communicating with the one or more mobile communication devices.

38. The system of claim 37, wherein the circuitry configured for compiling information associated with communication histories of one or more other electronic communication devices communicating with the one or more mobile communication devices comprises:
 circuitry configured for compiling information as positioning data for the one or more other electronic communication devices.

39. The system of claim 37, wherein the circuitry configured for compiling information associated with communication histories of one or more other electronic communication devices communicating with the one or more mobile communication devices comprises:
 circuitry configured for compiling information as communication history data previously stored and forwarded between one or more electronic communication devices.

40. The system of claim 28, wherein the circuitry configured for compiling information at least partially contained in one or more mobile communication device retransmitted communication comprises:
 circuitry configured for compiling information regarding one or more potential blockages to electronic communication located proximate to one or more of the mobile communication devices.

41. The system of claim 40, wherein the circuitry configured for compiling information regarding one or more potential blockages to electronic communication located proximate to one or more of the mobile communication devices comprises:
 circuitry configured for compiling information regarding one or more moveable communication blockages.

42. The system of claim 41, wherein the circuitry configured for compiling information regarding one or more moveable communication blockages comprises:
 circuitry configured for compiling information regarding one or more moveable communication blockages as one or more pedestrians.

43. The system of claim 40, wherein the circuitry configured for compiling information regarding one or more potential blockages to electronic communication located proximate to one or more of the mobile communication devices comprises:
 circuitry configured for compiling information regarding one or more potential blockages to electronic communication as one or more architectural structures.

44. The system of claim 43, wherein the circuitry configured for compiling information regarding one or more potential blockages to electronic communication as one or more architectural structures comprises:
 circuitry configured for compiling information regarding one or more architectural communication blockages as one or more stadiums.

45. The system of claim 28, wherein the circuitry configured for compiling information at least partially contained in one or more mobile communication device retransmitted communication comprises:
 circuitry configured for compiling information regarding one or more blocked communication paths that the one or more mobile communication devices have encountered when attempting to communicate with devices other than the one or more sender devices.

46. The system of claim 45, wherein the circuitry configured for compiling information regarding one or more potential blockages to direct electronic communication with one or more sender devices that are proximate to one or more of the sender devices comprises:
 circuitry configured for compiling information regarding one or more moveable objects as blockages to electronic communication with one or more of the sender devices.

47. The system of claim 46, wherein the circuitry configured for compiling information regarding one or more moveable objects as blockages to electronic communication with one or more of the sender devices comprises:
 circuitry configured for compiling information regarding one or more moveable communication blockages as motor vehicles.

48. The system of claim 45, wherein the circuitry configured for compiling information regarding one or more potential blockages to direct electronic communication with one or more sender devices that are proximate to one or more of the sender devices comprises:
 circuitry configured for compiling information regarding one or more potential blockages to direct electronic communication with one or more sender devices as one or more architectural structures.

49. The system of claim 48, wherein the circuitry configured for compiling information regarding one or more potential blockages to direct electronic communication with one or more sender devices as one or more architectural structures comprises:
  circuitry configured for compiling information regarding architectural communication blockages as one or more downtown skyscraper buildings.

50. The system of claim 28, wherein the circuitry configured for compiling information at least partially contained in one or more mobile communication device retransmitted communication comprises:
  circuitry configured for compiling information regarding one or more potential blockages to electronic communication with one or more of the receiver devices proximate to one or more of the receiver devices.

51. The system of claim 50, wherein the circuitry configured for compiling information regarding one or more potential blockages to electronic communication with one or more of the receiver devices proximate to one or more of the receiver devices comprises:
  circuitry configured for compiling information regarding one or more moveable communication blockages.

52. The system of claim 51, wherein the circuitry configured for compiling information regarding one or more moveable communication blockages comprises:
  circuitry configured for compiling information regarding one or more audiences of human spectators.

53. The system of claim 50, wherein the circuitry configured for compiling information regarding one or more potential blockages to electronic communication with one or more of the receiver devices proximate to one or more of the receiver devices comprises:
  circuitry configured for compiling information regarding one or more communication blockages as one or more architectural structures.

54. The system of claim 53, wherein the circuitry configured for compiling information regarding one or more communication blockages as one or more architectural structures comprises:
  circuitry configured for compiling information regarding one or more transportation tunnels.

55. The system of claim 28, wherein the circuitry configured for compiling information at least partially contained in one or more mobile communication device retransmitted communication comprises:
  circuitry configured for compiling information regarding communication capacity available to one or more of the supplemental network nodes furnished by the one or more mobile communication devices.

56. The system of claim 55, wherein the circuitry configured for compiling information regarding communication capacity available to one or more of the supplemental network nodes furnished by the one or more mobile communication devices comprises:
  circuitry configured for compiling information regarding communication bandwidth available to one or more of the supplemental network nodes furnished by the one or more mobile communication devices.

57. The system of claim 55, wherein the circuitry configured for compiling information regarding communication capacity available to one or more of the supplemental network nodes furnished by the one or more mobile communication devices comprises:
  circuitry configured for compiling information regarding runtime duration available to one or more of the supplemental network nodes by the one or more mobile communication devices.

58. The system of claim 57, wherein the circuitry configured for compiling information regarding runtime duration available to one or more of the supplemental network nodes by the one or more mobile communication devices comprises:
  circuitry configured for compiling information regarding runtime duration available regarding battery level available to the one or more mobile communication devices.

59. The system of claim 57, wherein the circuitry configured for compiling information regarding runtime duration available to one or more of the supplemental network nodes by the one or more mobile communication devices comprises:
  circuitry configured for compiling information regarding runtime duration available regarding predetermined commitments for other uses of the one or more mobile communication devices.

60. The system of claim 57, wherein the circuitry configured for compiling information regarding runtime duration available to one or more of the supplemental network nodes by the one or more mobile communication devices comprises:
  circuitry configured for compiling information regarding runtime duration available regarding potential blocked communication paths of the one or more mobile communication devices.

61. The system of claim 28, wherein the circuitry configured for compiling information at least partially contained in one or more mobile communication device retransmitted communication comprises:
  circuitry configured for compiling information regarding quality of service of communication available to one or more supplemental network nodes as furnished by the one or more mobile communication devices.

62. The system of claim 28, wherein the circuitry configured for compiling information at least partially contained in one or more mobile communication device retransmitted communication comprises:
  circuitry configured for compiling information regarding one or more economic cost structures to be imposed associated with one or more supplemental network nodes furnished by the one or more mobile communication devices.

63. The system of claim 62, wherein the circuitry configured for compiling information regarding one or more economic cost structures to be imposed associated with one or more supplemental network nodes furnished by the one or more mobile communication devices comprises:
  circuitry configured for compiling information regarding commercial credit or cash requirements to access one or more of the supplemental network nodes as furnished by the one or more mobile communication devices.

64. The system of claim 28, wherein the circuitry configured for compiling information at least partially contained in one or more mobile communication device retransmitted communication comprises:
  circuitry configured for compiling information regarding the one or more mobile communication devices as having one or more communication paths including one or more line of sight pathways or one or more ricochet pathways.

65. The system of claim 1, wherein the circuitry configured for electronically producing one or more evaluations associated with use of the one or more mobile communication devices as supplemental network nodes based on the compiled information includes:

circuitry configured for producing one or more evaluations associated at least in part with one or more mobile communication device retransmitted communication through processing information involving access of data storage.

66. The system of claim 1, wherein the circuitry configured for electronically producing one or more evaluations associated with use of the one or more mobile communication devices as supplemental network nodes based on the compiled information includes:

circuitry configured for producing one or more evaluations associated at least in part with one or more mobile communication device retransmitted communication through processing information involving processing one or more wireless transmissions.

67. The system of claim 1, wherein the circuitry configured for electronically producing one or more evaluations associated with use of the one or more mobile communication devices as supplemental network nodes based on the compiled information includes:

circuitry configured for producing one or more evaluations associated at least in part with one or more mobile communication device retransmitted communication through processing location information regarding one or more moveable objects that have previously blocked communication of one or more supplemental network nodes furnished by the one or more mobile communication devices.

68. The system of claim 1, wherein the circuitry configured for electronically producing one or more evaluations associated with use of the one or more mobile communication devices as supplemental network nodes based on the compiled information includes:

circuitry configured for producing one or more evaluations associated at least in part with one or more mobile communication device retransmitted communication through processing information regarding one or more statistical probabilities of remaining in communication with one or more supplemental network nodes furnished by the one or more mobile communication devices.

69. The system of claim 1, wherein the circuitry configured for electronically producing one or more evaluations associated with use of the one or more mobile communication devices as supplemental network nodes based on the compiled information includes:

circuitry configured for producing one or more evaluations associated at least in part with one or more mobile communication device retransmitted communication through processing GPS positioning data regarding the supplemental network nodes furnished by the one or more mobile communication devices.

70. The system of claim 1, wherein the circuitry configured for electronically producing one or more evaluations associated with use of the one or more mobile communication devices as supplemental network nodes based on the compiled information includes:

circuitry configured for producing one or more evaluations associated at least in part with one or more mobile communication device retransmitted communication through processing information regarding one or more potential blockages to electronic retransmitted communication located proximate to one or more of the mobile communication devices.

71. The system of claim 1, wherein the circuitry configured for electronically producing one or more evaluations associated with use of the one or more mobile communication devices as supplemental network nodes based on the compiled information includes:

circuitry configured for producing one or more evaluations associated at least in part with one or more mobile communication device retransmitted communication through processing information associated with communication histories of successful communication of one or more other electronic communication devices communicating with one or more supplemental network nodes as furnished by the one or more mobile communication devices.

72. The system of claim 1, wherein the circuitry configured for electronically producing one or more evaluations associated with use of the one or more mobile communication devices as supplemental network nodes based on the compiled information includes:

circuitry configured for producing one or more evaluations associated at least in part with one or more mobile communication device retransmitted communication through processing information associated with communication histories of successful communication of one or more other electronic communication devices communicating with one or more supplemental network nodes as furnished by the one or more mobile communication devices including processing information as communication history data previously stored and forwarded between one or more electronic communication devices.

73. The system of claim 1, wherein the circuitry configured for electronically producing one or more evaluations associated with use of the one or more mobile communication devices as supplemental network nodes based on the compiled information includes:

circuitry configured for producing one or more evaluations associated at least in part with one or more mobile communication device retransmitted communication through processing information regarding communication capacity available to one or more supplemental network nodes furnished by the one or more mobile communication devices.

74. The system of claim 1, wherein the circuitry configured for electronically producing one or more evaluations associated with use of the one or more mobile communication devices as supplemental network nodes based on the compiled information includes:

circuitry configured for producing one or more evaluations associated at least in part with one or more mobile communication device retransmitted communication through processing information regarding one or more potential blockages to electronic communication with the one or more sender devices that are proximate to the one or more sender devices.

75. The system of claim 1, wherein the circuitry configured for electronically producing one or more evaluations associated with use of the one or more mobile communication devices as supplemental network nodes based on the compiled information includes:

circuitry configured for producing one or more evaluations associated at least in part with one or more mobile communication device retransmitted communication through processing information including location information regarding one or more moveable objects that have previously blocked communication of one or more supplemental network nodes furnished by the one or more mobile communication devices wherein the location information is obtained from one or more fixed position communication network base stations.

76. The system of claim 1, wherein the circuitry configured for electronically producing one or more evaluations associated with use of the one or more mobile communication devices as supplemental network nodes based on the compiled information includes:
   circuitry configured for producing one or more evaluations associated at least in part with one or more mobile communication device retransmitted communication through processing information including location information regarding one or more moveable objects that have previously blocked communication of one or more supplemental network nodes furnished by the one or more mobile communication devices wherein the location information is associated with one or more potential blockages to transmitted communication with one or more receiver devices proximate to one or more receiver devices.

77. The system of claim 1, wherein the circuitry configured for electronically producing one or more evaluations associated with use of the one or more mobile communication devices as supplemental network nodes based on the compiled information includes:
   circuitry configured for producing one or more evaluations associated at least in part with one or more mobile communication device retransmitted communication through processing information including processing one or more availability forecast ratings involved with one or more supplemental network node retransmissions as furnished by the one or more mobile communication devices.

78. The system of claim 1, wherein the circuitry configured for electronically producing one or more evaluations associated with use of the one or more mobile communication devices as supplemental network nodes based on the compiled information includes:
   circuitry configured for producing one or more evaluations associated at least in part with one or more mobile communication device retransmitted communication through processing information including processing one or more reliability ratings involved with one or more supplemental network node retransmissions as furnished by the one or more mobile communication devices.

79. The system of claim 1, wherein the circuitry configured for electronically producing one or more evaluations associated with use of the one or more mobile communication devices as supplemental network nodes based on the compiled information includes:
   circuitry configured for producing one or more evaluations associated at least in part with one or more mobile communication device retransmitted communication through processing information including processing one or more duration of connection ratings involved with one or more communication network retransmissions as furnished by the one or more mobile communication devices.

80. The system of claim 1, wherein the circuitry configured for electronically producing one or more evaluations associated with use of the one or more mobile communication devices as supplemental network nodes based on the compiled information comprises:
   circuitry configured for producing evaluations regarding ratings of one or more supplemental network nodes included at least in part by one or more of the mobile communication devices.

81. The system of claim 80, wherein the circuitry configured for producing evaluations regarding ratings of one or more supplemental network nodes included at least in part by one or more of the mobile communication devices comprises:
   circuitry configured for producing evaluations regarding service quality ratings regarding one or more communication network retransmissions provided by the one or more mobile communication devices.

82. The system of claim 80, wherein the circuitry configured for producing evaluations regarding ratings of one or more supplemental network nodes included at least in part by one or more of the mobile communication devices comprises:
   circuitry configured for producing evaluations regarding cost ratings involved with supplemental network node service plans associated with one or more communication network retransmissions as provided by the mobile communication devices.

83. The system of claim 80, wherein the circuitry configured for producing evaluations regarding ratings of one or more supplemental network nodes included at least in part by one or more of the mobile communication devices comprises:
   circuitry configured for producing evaluations regarding availability forecast ratings involved with one or more supplemental network nodes associated with one or more communication network retransmissions of the one or more mobile communication devices.

84. The system of claim 80, wherein the circuitry configured for producing evaluations regarding ratings of one or more supplemental network nodes included at least in part by one or more of the mobile communication devices comprises:
   circuitry configured for producing evaluations regarding reliability ratings involved with one or more supplemental network nodes associated with the one or more mobile communication devices.

85. The system of claim 80, wherein the circuitry configured for producing evaluations regarding ratings of one or more supplemental network nodes included at least in part by one or more of the mobile communication devices comprises:
   circuitry configured for producing evaluations regarding duration of connection ratings involved with communication network retransmissions provided by the one or more mobile communication devices.

86. The system of claim 80, wherein the circuitry configured for producing evaluations regarding ratings of one or more supplemental network nodes included at least in part by one or more of the mobile communication devices comprises:
   circuitry configured for producing evaluations regarding communication bandwidth ratings involved with one or more supplemental network nodes associated with the one or more mobile communication devices.

87. The system of claim 1, wherein the circuitry configured for electronically producing one or more evaluations associated with use of the one or more mobile communication devices as supplemental network nodes based on the compiled information comprises:
   circuitry configured for producing evaluations regarding one or more comparison ratings between one or more fixed base station networks and one or more supplemental network nodes of the one or more mobile communication devices.

88. The system of claim 87, wherein the circuitry configured for producing evaluations regarding one or more comparison ratings between one or more fixed base station networks and one or more supplemental network nodes of the one or more mobile communication devices comprises:
circuitry configured for producing evaluations regarding one or more service quality comparison ratings between one or more fixed base station communication networks and one or more supplemental network nodes based on the one or more mobile communication devices.

89. The system of claim 87, wherein the circuitry configured for producing evaluations regarding one or more comparison ratings between one or more fixed base station networks and one or more supplemental network nodes of the one or more mobile communication devices comprises:
circuitry configured for producing evaluations regarding one or more cost profile comparison ratings between one or more fixed base station communication networks and one or more supplemental network nodes based on the one or more mobile communication devices.

90. The system of claim 87, wherein the circuitry configured for producing evaluations regarding one or more comparison ratings between one or more fixed base station networks and one or more supplemental network nodes of the one or more mobile communication devices comprises:
circuitry configured for producing evaluations regarding one or more availability forecast comparison ratings between one or more fixed base station communication networks and one or more network retransmissions furnished by the one or more mobile communication devices.

91. The system of claim 87, wherein the circuitry configured for producing evaluations regarding one or more comparison ratings between one or more fixed base station networks and one or more supplemental network nodes of the one or more mobile communication devices comprises:
circuitry configured for producing evaluations regarding one or more reliability comparison ratings between one or more fixed base station communication networks and one or more supplemental network nodes furnished by the one or more mobile communication devices.

92. The system of claim 87, wherein the circuitry configured for producing evaluations regarding one or more comparison ratings between one or more fixed base station networks and one or more supplemental network nodes of the one or more mobile communication devices comprises:
circuitry configured for producing evaluations regarding one or more duration of connections comparison ratings between one or more fixed base station communication networks and one or more supplemental network nodes of the mobile communication devices.

93. The system of claim 87, wherein the circuitry configured for producing evaluations regarding one or more comparison ratings between one or more fixed base station networks and one or more supplemental network nodes of the one or more mobile communication devices comprises:
circuitry configured for producing evaluations regarding one or more bandwidth capacity comparison ratings between one or more fixed base station communication networks and one or more supplemental network nodes of the mobile communication devices.

94. The system of claim 1, wherein the circuitry configured for electronically producing one or more evaluations associated with use of the one or more mobile communication devices as supplemental network nodes based on the compiled information comprises:
circuitry configured for producing evaluations regarding one or more communication service ratings for communication with one or more receiver devices.

95. The system of claim 94, wherein the circuitry configured for producing evaluations regarding one or more communication service ratings for communication with one or more receiver devices comprises:
circuitry configured for producing evaluations regarding one or more communication service ratings for one or more receiver devices regarding use of one or more fixed base station communication networks for communication therewith.

96. The system of claim 94, wherein the circuitry configured for producing evaluations regarding one or more communication service ratings for communication with one or more receiver devices comprises:
circuitry configured for producing evaluations regarding one or more communication service ratings for one or more receiver devices regarding use of one or more supplemental network nodes for communication therewith.

97. The system of claim 94, wherein the circuitry configured for producing evaluations regarding one or more communication service ratings for communication with one or more receiver devices comprises:
circuitry configured for producing evaluations regarding one or more communication service ratings for one or more receiver devices regarding communication service quality for communication therewith.

98. The system of claim 94, wherein the circuitry configured for producing evaluations regarding one or more communication service ratings for communication with one or more receiver devices comprises:
circuitry configured for producing evaluations regarding one or more communication service ratings for one or more receiver devices regarding financial costs associated with communication therewith.

99. The system of claim 94, wherein the circuitry configured for producing evaluations regarding one or more communication service ratings for communication with one or more receiver devices comprises:
circuitry configured for producing evaluations regarding one or more communication service ratings for one or more receiver devices regarding forecasted availability of the one or more receiver devices for communication therewith.

100. The system of claim 94, wherein the circuitry configured for producing evaluations regarding one or more communication service ratings for communication with one or more receiver devices comprises:
circuitry configured for producing evaluations regarding one or more communication service ratings for one or more receiver devices regarding communication reliability of the one or more receiver devices for communication therewith.

101. The system of claim 94, wherein the circuitry configured for producing evaluations regarding one or more communication service ratings for communication with one or more receiver devices comprises:
circuitry configured for producing evaluations regarding one or more communication service ratings for one or more receiver devices regarding duration of connection time available of the one or more receiver devices for communication therewith.

102. The system of claim 94, wherein the circuitry configured for producing evaluations regarding one or more communication service ratings for communication with one or more receiver devices comprises:
circuitry configured for producing evaluations regarding one or more communication service ratings for one or more receiver devices regarding communication bandwidth of the one or more receiver devices for communication therewith.

103. The system of claim 1, wherein the circuitry configured for electronically producing one or more evaluations associated with use of the one or more mobile communication devices as supplemental network nodes based on the compiled information comprises:
circuitry configured for producing evaluations regarding map data related to the one or more receiver devices regarding communication therewith.

104. The system of claim 103, wherein the circuitry configured for producing evaluations regarding map data related to the one or more receiver devices regarding communication therewith comprises:
circuitry configured for producing evaluations regarding map data regarding one or more blockages to communication with the one or more mobile communication devices.

105. The system of claim 103, wherein the circuitry configured for producing evaluations regarding map data related to the one or more receiver devices regarding communication therewith comprises:
circuitry configured for producing evaluations regarding map data regarding location data of one or more fixed position base stations.

106. The system of claim 103, wherein the circuitry configured for producing evaluations regarding map data related to the one or more receiver devices regarding communication therewith comprises:
circuitry configured for producing evaluations regarding map data regarding location data of the receiver device.

107. An article of manufacture comprising:
one or more non-transitory signal bearing storage media bearing:
one or more instructions for electronically processing retransmitted communication sent by one or more mobile communication devices being used as supplemental network nodes for communication between one or more sender devices and one or more receiver devices;
one or more instructions for electronically compiling information relating to input communication sent by the one or more mobile communication devices; and
one or more instructions for electronically producing one or more evaluations associated with use of the one or more mobile communication devices as supplemental network nodes based on the compiled information including one or more instructions for producing one or more evaluations associated at least in part with one or more mobile communication device retransmitted communication through processing one or more of
(1) at least in part service quality ratings regarding the one or more communication network communication network retransmissions as furnished by the one or more mobile communication devices,
(2) at least in part cost ratings involved with standby network service plans associated with one or more communication network retransmissions as furnished by the one or more mobile communication devices,
(3) at least in part connectivity ratings involved with one or more supplemental network node retransmissions as furnished by the one or more mobile communication devices, or
(4) at least in part communication bandwidth ratings involved with potential one or more supplemental network nodes associated with one or more communication network retransmissions as furnished by the one or more mobile communication devices.

108. The article of manufacture of claim 107, wherein the one or more non-transitory signal-bearing storage media includes one or more computer-readable media.

109. The article of manufacture of claim 107, wherein the one or more non-transitory signal-bearing storage media includes one or more recordable media.

110. The article of manufacture of claim 107, wherein the one or more non-transitory signal-bearing media includes one or more communication media.

111. The article of manufacture of claim 107, wherein the instructions for electronically processing retransmitted communication sent by one or more mobile communication devices being used as supplemental network nodes for communication between one or more sender devices and one or more receiver devices includes:
one or more instructions for accessing data from a data source via a virtual machine representation of at least a part of a computing machine including accessing data from a data source via a virtual machine representation of at least a part of a real machine.

112. A system comprising:
one or more computing devices; and
one or more instructions when executed on the one or more computing devices cause the
one or more computing devices to perform
electronically processing retransmitted communication sent by one or more mobile communication devices being used as supplemental network nodes for communication between one or more sender devices and one or more receiver devices;
electronically compiling information relating to input communication sent by the one or more mobile communication devices; and
electronically producing one or more evaluations associated with use of the one or more mobile communication devices as supplemental network nodes based on the compiled information including at least producing one or more evaluations associated at least in part with one or more mobile communication device retransmitted communication through processing one or more of
(1) at least in part service quality ratings regarding the one or more communication network retransmissions as furnished by the one or more mobile communication devices,
(2) at least in part cost ratings involved with standby network service plans associated with one or more communication network retransmissions as furnished by the one or more mobile communication devices,
(3) at least in part connectivity ratings involved with onr or more supplemental network node retransmissions as furnished by the one or more mobile communication devices, or (4) at least in part communication bandwidth ratings involved with potential one or more supplemental network nodes associated with one or more communication network retransmissions as furnished by the one or more mobile communication devices.

113. The system of claim 112, wherein the one or more instructions when executed on the one or more computing devices cause the one or more computing devices to perform the electronically processing retransmitted communication sent by one or more mobile communication devices being used as supplemental network nodes for communication between one or more sender devices and one or more receiver devices include:

accessing data from a data source via a virtual machine representation of at least a part of a real machine.

114. The system of claim 1, further comprising:
circuitry configured for modifying at least one connectivity function based at least in part on the one or more evaluations associated with use of the one or more mobile communication devices as supplemental network nodes including at least one of
    circuitry configured for determining at least one best communication path via the one or more mobile communication devices operating as supplemental network nodes based at least in part on the one or more evaluations;
    circuitry configured for updating which of the one or more mobile communication devices are included as supplemental network nodes in at least one best communication path based at least in part on the one or more evaluations;
    circuitry configured for activating at least one hot standby network composed of the one or more mobile communication devices as supplemental network nodes based at least in part on the one or more evaluations;
    circuitry configured for rerouting one or more communication paths through the one or more mobile communication devices as supplemental network nodes to adjust for positioning of physical objects based at least in part on the one or more evaluations; or
    circuitry configured for activating or deactivating at least one of the one or more mobile communication devices as supplemental network nodes based at least in part on payment structures included in the one or more evaluations.

115. The system of claim 1, further comprising:
circuitry configured for modifying at least one connectivity function based at least in part on the one or more evaluations associated with use of the one or more mobile communication devices as supplemental network nodes including at least one of
    circuitry configured for maintaining awareness of accessibility of the one or more mobile communication devices as supplemental network nodes based at least in part on the one or more evaluations;
    circuitry configured for activating at least one seeking beam for determining which of the one or more mobile communication devices are accessible as supplemental network nodes based at least in part on the one or more evaluations;
    circuitry configured for negotiating among the one or more mobile communication devices as supplemental network nodes based at least in part on the one or more evaluations;
    circuitry configured for recognizing tokens distinguishing between communicating users of disparate devices in the one or more mobile communication devices as supplemental network nodes based at least in part on the one or more evaluations; or
    circuitry configured for negotiating inclusion for accessibility in the one or more mobile communication devices as supplemental network nodes based at least in part on the one or more evaluations.

116. The system of claim 1, further comprising:
circuitry configured for sending information at a bandwidth greater than human bandwidth to cache and dump the information through the one or more mobile communication devices as supplemental network nodes to compensate for connection problems based at least in part on the one or more evaluations.

117. The system of claim 1, further comprising:
circuitry configured for hybridizing communication protocols among disparate devices of the one or more mobile communication devices as supplemental network nodes based at least in part on the one or more evaluations.

* * * * *